US011509422B2

(12) United States Patent
Lomayev et al.

(10) Patent No.: US 11,509,422 B2
(45) Date of Patent: Nov. 22, 2022

(54) APPARATUS, SYSTEM AND METHOD OF COMMUNICATING AN EDMG PPDU

(71) Applicant: INTEL IP CORPORATION, Santa Clara, CA (US)

(72) Inventors: Artyom Lomayev, Nizhny Novgorod (RU); Alexander Maltsev, Nizhny Novgorod (RU); Michael Genossar, Modiin (IL); Claudio Da Silva, Portland, OR (US); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/326,113

(22) Filed: May 20, 2021

(65) Prior Publication Data

US 2021/0281362 A1 Sep. 9, 2021

Related U.S. Application Data

(63) Continuation of application No. 16/488,006, filed as application No. PCT/US2018/023765 on Mar. 22, 2018, now Pat. No. 11,025,369.

(Continued)

(51) Int. Cl.
*H04L 1/06* (2006.01)
*H04L 25/02* (2006.01)
(Continued)

(52) U.S. Cl.
CPC .......... *H04L 1/0681* (2013.01); *H04L 1/0625* (2013.01); *H04L 25/0204* (2013.01); *H04L 25/0242* (2013.01); *H04L 5/0007* (2013.01)

(58) Field of Classification Search
CPC . H04L 1/0681; H04L 1/0625; H04L 25/0204; H04L 25/0242; H04L 5/0007;
(Continued)

(56) References Cited

U.S. PATENT DOCUMENTS 10,382,598 B1 * 8/2019 Zhang ................. H04L 25/0226
10,651,977 B2 * 5/2020 Seok .................. H04L 25/0226
(Continued)

FOREIGN PATENT DOCUMENTS

WO 2013122301 8/2013
WO 2017044420 3/2017
WO 2019010355 1/2019

OTHER PUBLICATIONS

International Search Report and the Written Opinion for International Application No. PCT/US2018/023765, dated Jul. 6, 2018, 9 pages.

(Continued)

*Primary Examiner* — Harry H Kim
(74) *Attorney, Agent, or Firm* — Shichrur & Co.

(57) ABSTRACT

Some demonstrative embodiments include apparatuses, devices, systems and methods of communicating an Enhanced Directional Multi-Gigabit (DMG) (EDMG) Physical Layer Protocol Data Unit (PPDU). For example, an EDMG wireless communication station (STA) may be configured to communicate an EDMG PPDU including a Channel Estimation Field (CEF) and/or a pilot sequence, which may be configured for an OFDM mode.

25 Claims, 6 Drawing Sheets

Related U.S. Application Data

(60) Provisional application No. 62/475,485, filed on Mar. 23, 2017, provisional application No. 62/475,472, filed on Mar. 23, 2017.

(51) Int. Cl.
*H04L 5/00* (2006.01)
*H04L 27/26* (2006.01)
*H04B 7/0413* (2017.01)

(58) Field of Classification Search
CPC ... H04L 5/0048; H04L 25/0226; H04L 27/26; H04L 27/26136; H04B 7/0413
See application file for complete search history.

(56) References Cited

U.S. PATENT DOCUMENTS

| | | | | |
|---|---|---|---|---|
| 11,025,369 | B2 | 6/2021 | Lomayev et al. | |
| 2011/0135023 | A1* | 6/2011 | Kwon | H04L 27/368 375/340 |
| 2011/0176626 | A1* | 7/2011 | Liao | H04L 5/0023 375/260 |
| 2012/0224659 | A1* | 9/2012 | Yu | H04L 27/2647 375/340 |
| 2016/0261319 | A1* | 9/2016 | Sanderovich | H04B 7/0417 |
| 2017/0033844 | A1 | 2/2017 | Kasher | |
| 2017/0048095 | A1 | 2/2017 | Sun et al. | |
| 2017/0070995 | A1 | 3/2017 | Eitan et al. | |
| 2017/0078008 | A1 | 3/2017 | Kasher et al. | |
| 2017/0257201 | A1 | 9/2017 | Eitan et al. | |
| 2018/0062902 | A1* | 3/2018 | Gagiev | H04L 27/2666 |
| 2018/0191419 | A1* | 7/2018 | Eitan | H04W 16/28 |
| 2019/0044781 | A1 | 2/2019 | Lomayev et al. | |
| 2019/0173636 | A1* | 6/2019 | Yun | H04L 27/26 |
| 2019/0190754 | A1* | 6/2019 | Kim | H04L 5/0007 |
| 2019/0215702 | A1* | 7/2019 | Yun | H04L 27/2607 |
| 2021/0168010 | A1 | 6/2021 | Lomayev et al. | |

OTHER PUBLICATIONS

International Preliminary Report on Patentability for International Application No. PCT/US2018/023765, dated Oct. 3, 2019, 6 pages.
Artyom Lomayev et al., 'SC PHY EDMG-CEF Design for Channel Bonding x3', IEEE 802 11-16/1207r0, Sep. 11, 2016, 16 pages.
IEEE Std 802.11™-2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.
International Search Report and the Written Opinion for International Application No. PCT/US2018/040991, dated Oct. 26, 2018, 11 pages.
Lei Huang et al., 'CR on MIMO phase of SU-MIMO and MU-MIMO beamforming', IEEE 802.11-17/0541r2 , Apr. 10, 2017, 6 pages.
Artyom Lomayev et al., 'Proposed Comment Resolution for CID 63, 68 in 11ay', IEEE 802.11-17/0893r2 , Jun. 12, 2017, 8 pages.
Artyom Lomayev et al., '30.6.3 OFDM EDMG-CEF Definition', IEEE 802.11-17/0596r0, Apr. 21, 2017, 7 pages.
Office Action for U.S. Appl. No. 16/056,787, dated Oct. 2, 2019, 20 pages.
International Preliminary Report on Patentability for International Application No. PCT/US2018/040991, dated Jan. 7, 2020, 9 pages.
Office Action for U.S. Appl. No. 16/056,787, dated Apr. 16, 2020, 16 pages.
Notice of Allowance for U.S. Appl. No. 16/056,787, dated Aug. 10, 2020, 7 pages.
Office Action for U.S. Appl. No. 16/488,006, dated Sep. 24, 2020, 28 pages.
Notice of Allowance for U.S. Appl. No. 16/488,006, dated Jan. 21, 2021, 13 pages.

* cited by examiner

APPARATUS, SYSTEM AND METHOD OF COMMUNICATING AN EDMG PPDU

CROSS REFERENCE

This application claims the benefit of and priority from U.S. Provisional Patent Application No. 62/475,485 entitled "Apparatus, System and Method of Communicating an EDMG PPDU With a Channel Estimation Field", filed Mar. 23, 2017, and from U.S. Provisional Patent Application No. 62/475,472 entitled "Apparatus, System and Method of Communicating an OFDM Transmission With Pilot Sequence", filed Mar. 23, 2017, the entire disclosures of which are incorporated herein by reference.

TECHNICAL FIELD

Embodiments described herein generally relate to communicating an Enhanced Directional Multi-Gigabit (DMG) (EDMG) Physical Layer Protocol Data Unit (PPDU).

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation.

Furthermore, reference numerals may be repeated among the figures to indicate corresponding or analogous elements. The figures are listed below.

DETAILED DESCRIPTION

Figure 1:
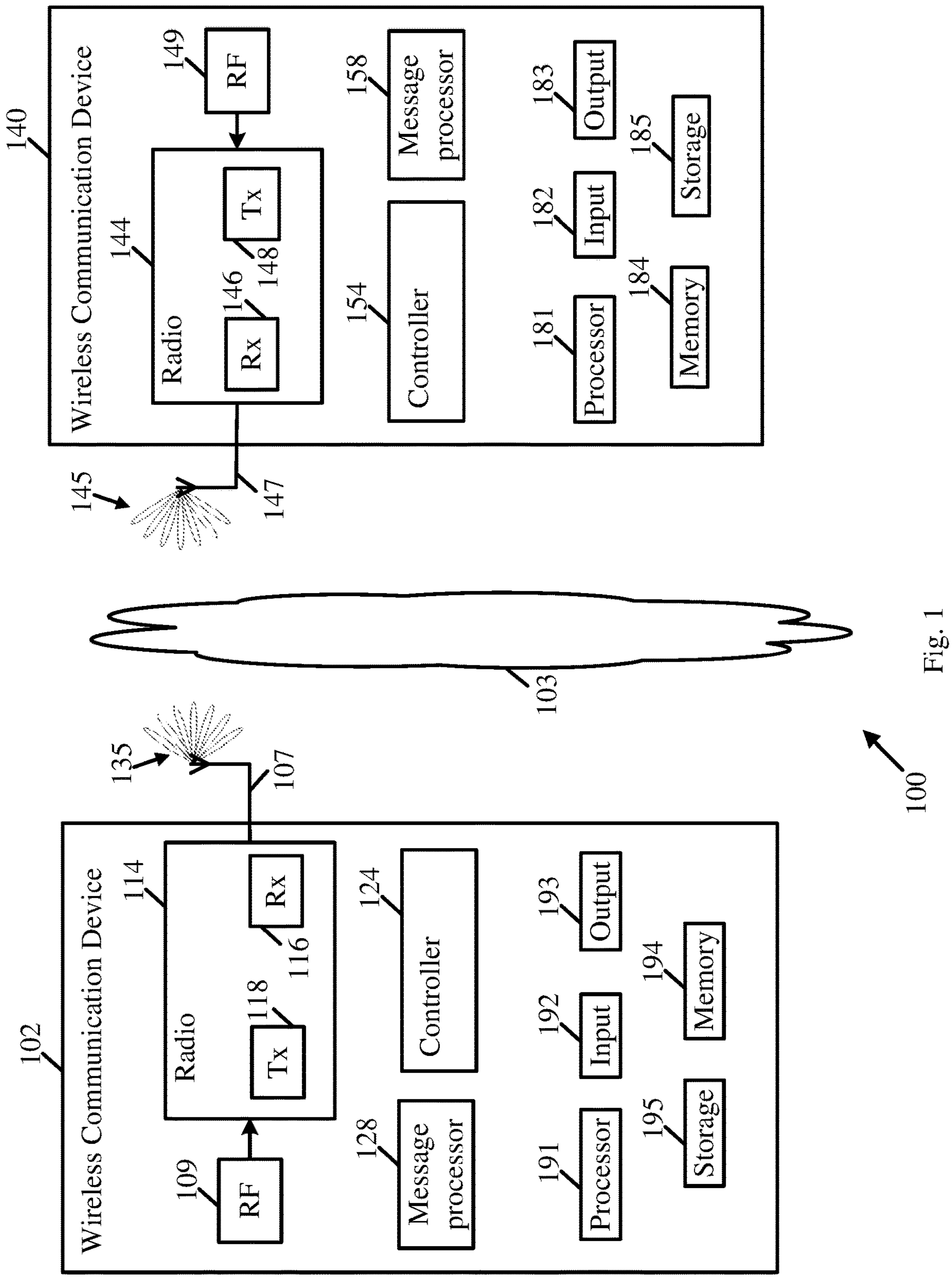
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE* 802.11-2016, *IEEE Standard for Information technology—Telecommunications and information exchange between systems Local and metropolitan area networks—Specific requirements Part* 11*: Wireless LAN Medium Access Control* (*MAC*) *and Physical Layer* (*PHY*) *Specifications, Dec.* 7, 2016); and/or IEEE 802.11ay (*P*802.11*ay Standard for Information Technology—Telecommunications and Information Exchange Between Systems Local and Metropolitan Area Networks—Specific Requirements Part* 11*: Wireless LAN Medium Access Control* (*MAC*) *and Physical*

*Layer (PHY) Specifications—Amendment: Enhanced Throughput for Operation in License-Exempt Bands Above 45 GHz*)) and/or future versions and/or derivatives thereof, devices and/or networks operating in accordance with existing WFA Peer-to-Peer (P2P) specifications (*WiFi P2P technical specification, version* 1.7, *Jul.* 6, 2016) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, *April* 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band above 45 Gigahertz (GHz), e.g., 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHz, a frequency band above 45 GHz, a 5G frequency band, a frequency band below 20 GHz, e.g., a Sub 1 GHz (S1G) band, a 2.4 GHz band, a 5 GHz band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, a 5G channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, a 5G band, and/or any other band, for example, a 2.4 GHz band, a 5 GHz band, a SiG band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Enhanced DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including one or more IEEE 802.11 Specifications, e.g., an IEEE 802.11-2016 Specification, an IEEE 802.11ay Specification, and/or any other specification and/or protocol.

Some demonstrative embodiments may be implemented, for example, as part of a new standard in an mmWave band, e.g., a 60 GHz frequency band or any other directional band, for example, as an evolution of an IEEE 802.11-2016 Specification and/or an IEEE 802.11ad Specification.

In some demonstrative embodiments, devices 102 and/or 140 may be configured according to one or more standards, for example, in accordance with an IEEE 802.11ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase the data transmission rates defined in the IEEE 802.11ad Specification, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an IEEE 802.11ay Standard and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

Some wireless communication Specifications, for example, the IEEE 802.11ad-2012 Specification, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102 and/or 140 may be configured to communicate over a channel bandwidth, e.g., of at least 2.16 GHz, in a frequency band above 45 GHz.

In some demonstrative embodiments, devices 102 and/or 140 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In one example, the single-channel BW scheme may include communication over a 2.16 GHz channel (also referred to as a "single-channel" or a "DMG channel").

In some demonstrative embodiments, devices 102 and/or 140 may be configured to implement one or more channel bonding mechanisms, which may, for example, support communication over a channel BW (also referred to as a "wide channel", an "EDMG channel", or a "bonded channel") including two or more channels, e.g., two or more 2.16 GHz channels, e.g., as described below.

In some demonstrative embodiments, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative embodiments are described herein with respect to communication over a channel BW including two or more 2.16 GHz channels, however other embodiments may be implemented with respect to communications over a channel bandwidth, e.g., a "wide" channel, including or formed by any other number of two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW, e.g., as described below.

In some demonstrative embodiments, device 102 and/or device 140 may be configured to implement one or more channel bonding mechanisms, which may, for example, support an increased channel bandwidth, for example, a channel BW of 4.32 GHz, e.g., including two 2.16 Ghz channels according to a channel bonding factor of two, a channel BW of 6.48 GHz, e.g., including three 2.16 Ghz channels according to a channel bonding factor of three, a channel BW of 8.64 GHz, e.g., including four 2.16 Ghz channels according to a channel bonding factor of four, and/or any other additional or alternative channel BW, e.g., including any other number of 2.16 Ghz channels and/or according to any other channel bonding factor.

In some demonstrative embodiments, device 102 and/or device 140 may be configured to communicate one or more transmissions over one or more channel BWs, for example, including a channel BW of 2.16 GHz, a channel BW of 4.32 GHz, a channel BW of 6.48 GHz, a channel BW of 8.64 GHz and/or any other channel BW.

In some demonstrative embodiments, introduction of MIMO may be based, for example, on implementing robust transmission modes and/or enhancing the reliability of data transmission, e.g., rather than the transmission rate, compared to a Single Input Single Output (SISO) case. For example, one or more Space Time Block Coding (STBC) schemes utilizing a space-time channel diversity property may be implemented to achieve one or more enhancements for the MIMO transmission.

In some demonstrative embodiments, devices 102 and/or 140 may be configured to generate, process, transmit and/or receive a Physical Layer (PHY) Protocol Data Unit (PPDU) having a PPDU format (also referred to as "EDMG PPDU format"), which may be configured, for example, for communication between EDMG stations, e.g., as described below.

In some demonstrative embodiments, a PPDU, e.g., an EDMG PPDU, may include at least one non-EDMG fields, e.g., a legacy field, which may be identified, decodable, and/or processed by one or more devices ("non-EDMG devices", or "legacy devices"), which may not support one or more features and/or mechanisms ("non-legacy" mechanisms or "EDMG mechanisms"). For example, the legacy devices may include non-EDMG stations, which may be, for example, configured according to an IEEE 802.11-2016 Standard, and the like. For example, a non-EDMG station may include a DMG station, which is not an EDMG station.

Figure 2:
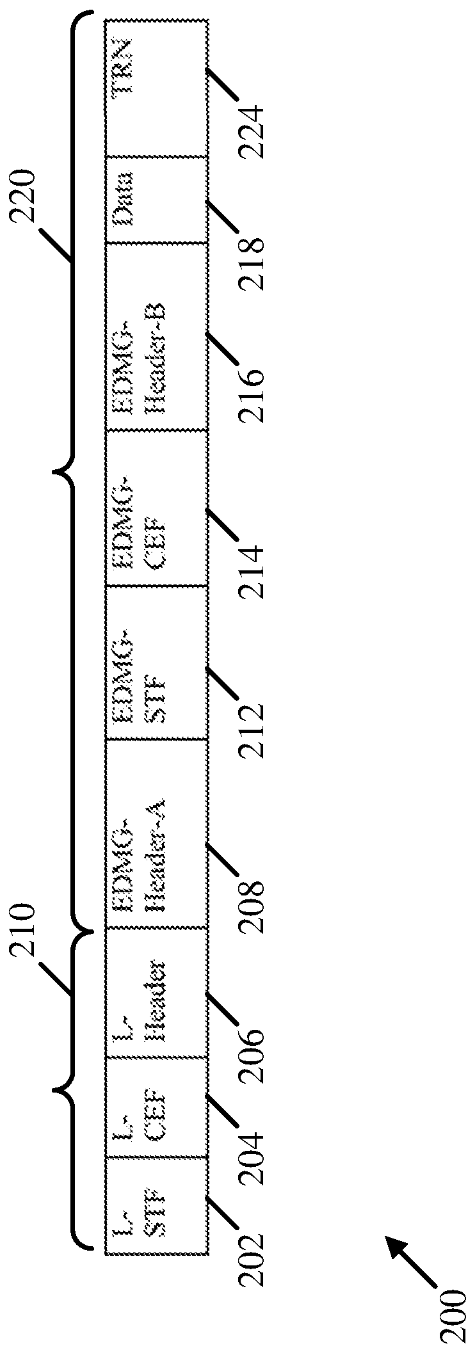
FIG. 2 is a schematic illustration of an Enhanced Directional Multi-Gigabit (EDMG) Physical Layer Protocol Data Unit (PPDU) format, which may be implemented in accordance with some demonstrative embodiments.

Reference is made to FIG. 2, which schematically illustrates an EDMG PPDU format 200, which may be implemented in accordance with some demonstrative embodiments. In one example, devices 102 (FIG. 1) and/or 140 (FIG. 1) may be configured to generate, transmit, receive and/or process one or more EDMG PPDUs having the structure and/or format of EDMG PPDU 200.

In one example, devices 102 (FIG. 1) and/or 140 (FIG. 1) may communicate EDMG PPDU 200, for example, as part of a transmission over a channel, e.g., an EDMG channel, having a channel bandwidth including one or more 2.16 GHz channels, e.g., as described below.

In some demonstrative embodiments, as shown in FIG. 2, EDMG PPDU 200 may include a non-EDMG portion 210 ("legacy portion"), e.g., as described below.

In some demonstrative embodiments, as shown in FIG. 2, non-EDMG portion 210 may include a non-EDMG (legacy) Short Training Field (STF) (L-STF) 202, a non-EDMG (Legacy) Channel Estimation Field (CEF) (L-CEF) 204, and/or a non-EDMG header (L-header) 206.

In some demonstrative embodiments, as shown in FIG. 2, EDMG PPDU 200, may include an EDMG portion 220, for example, following non-EDMG portion 210, e.g., as described below.

In some demonstrative embodiments, as shown in FIG. 2, EDMG portion 220 may include a first EDMG header, e.g., an EDMG-Header-A 208, an EDMG-STF 212, an EDMG-CEF 214, a second EDMG header, e.g., an EDMG-Header-B 216, a Data field 218, and/or one or more beamforming training fields, e.g., a TRN field 224.

In some demonstrative embodiments, EDMG portion 220 may include some or all of the fields shown in FIG. 2 and/or one or more other additional or alternative fields.

In some demonstrative embodiments, Header B field 216 may be included, for example, in EDMG MU PPDUs, for example, on a per STA basis.

In some demonstrative embodiments, Header B field 216 corresponding to a STA addressed by the EDMG MU PPDU may include, for example, information relating to a transmission of a data unit, for example, a PHY Service Data Unit (PSDU) to the STA.

In some demonstrative embodiments, EDMG Header B field 216 may include for example, 64 bits, e.g., as described below. In other embodiments, the EDMG Header B field 216 may include any other number of bits.

In one example, EDMG Header B field 216 corresponding to the STA may include, for example, at least a scrambler seed field, a PSDU length field, e.g., to indicate a length of the PSDU to the STA, and/or one or more Modulation and Coding Scheme (MCS) fields to indicate one or more MCSs. For example, the Header B field may include first and second MCS fields to indicate MCSs for first and second respective spatial streams.

In other embodiments, EDMG Header B field 216 may include any other additional or alternative fields and/or information.

Referring back to FIG. 1, in some demonstrative embodiments, devices 102 and/or 140 may be configured to transmit and/or receive one or more OFDM transmissions including a CEF, which may be configured, for example, for EDMG OFDM PHY, e.g., as described below.

In some demonstrative embodiments, devices 102 and/or 140 may be configured to implement one or more sequences, for example, in a frequency domain, for example, to define a CEF, for example, an EDMG-CEF, e.g., EDMG-CEF 214 (FIG. 2), for example, for a channel bonding transmission with a channel bonding factor of, for example, $N_{CB}$=1, 2, 3, or 4, and/or for MIMO transmission with the number of space-time streams of $N_{STS}$=1, 2, . . . , 8, e.g., as described below.

For example, the factor $N_{CB}$ may be implemented to define a number of channels, e.g., a number of contiguous 2.16 GHz channels, which may be used for transmission of the PPDU. For example, a PPDU bandwidth of the PPDU may be defined as $N_{CB}$*2.16 GHz.

In other embodiments, the EDMG-CEF may be configured for any other type of transmission over any other channel bandwidth, channel bonding factor, and/or number of streams.

In some demonstrative embodiments, devices 102 and/or 140 may be configured to transmit and/or receive an EDMG PPDU, for example, in an OFDM transmission, which may be configured, for example, to provide a technical solution, for example, to allow at least efficient and/or improved SISO and/or MIMO channel estimation and/or tracking, for example, with a plurality of space-time streams, e.g., up to 8 space-time streams, or any other number of space-time streams, e.g., 16 streams, and/or over a channel bandwidth including one or more 2.16 GHz channel, for example, with channel bonding factors of $N_{CB}$=1, 2, 3, or 4, and/or any other channel bonding factor, and/or one or more additional or alternative solutions and/or benefits.

In some demonstrative embodiments, devices 102 and/or 140 may be configured to generate, transmit, receive and/or process an EDMG PPDU including an EDMG-CEF, e.g., EDMG-CEF 214 (FIG. 2), which may be defined according to an EDMG-CEF structure, e.g., as described below.

In some demonstrative embodiments, a structure of the EDMG-CEF field of an EDMG PPDU may depend, for example, on a number of channels, e.g., a number of contiguous 2.16 GHz channels, over which the EDMG PPDU is to be transmitted, e.g., as described below.

For example, a structure of EDMG-CEF field 214 (FIG. 2) of EDMG PPDU 200 (FIG. 2) may depend on the count of 2.16 GHz channels over which EDMG PPDU 200 (FIG. 2) is to be transmitted, e.g., as described below.

In some demonstrative embodiments, a structure of the EDMG-CEF field of the EDMG PPDU may depend, for example, on a number of space-time streams over which the EDMG PPDU is to be transmitted, e.g., as described below.

For example, a structure of EDMG-CEF field 214 (FIG. 2) of EDMG PPDU 200 (FIG. 2) may depend on the count of space-time streams over which EDMG PPDU 200 (FIG. 2) is to be transmitted, e.g., as described below.

In some demonstrative embodiments, a structure of the EDMG-CEF field of an EDMG PPDU may depend, for example, on the number of channels, e.g., the number of contiguous 2.16 GHz channels over which the EDMG PPDU is to be transmitted, and the number, denoted $i_{STS}$, of space-time streams, e.g., as described below.

In some demonstrative embodiments, controller 124 may be configured to cause, trigger, and/or control a wireless station implemented by device 102, e.g., an EDMG STA, to determine one or more EDMG-CEF sequences in a frequency domain based on a count of one or more 2.16 Gigahertz (GHz) channels in a channel bandwidth for transmission of an EDMG PPDU including an EDMG-CEF, e.g., as described below.

In some demonstrative embodiments, the one or more EDMG-CEF sequences may correspond to one or more respective space-time streams, e.g., as described below.

In some demonstrative embodiments, controller 124 may be configured to cause, trigger, and/or control the wireless station implemented by device 102 to generate an EDMG- CEF transmit waveform in a time domain based on the one or more EDMG-CEF sequences and an EDMG-CEF mapping matrix, which is based on a count of the one or more space-time streams, e.g., as described below.

In some demonstrative embodiments, controller 124 may be configured to cause, trigger, and/or control the wireless station implemented by device 102 to transmit an OFDM mode transmission of the EDMG PPDU over the channel bandwidth, e.g., as described below.

In some demonstrative embodiments, the OFDM mode transmission may include transmission of the EDMG-CEF based on the EDMG-CEF transmit waveform, e.g., as described below.

In some demonstrative embodiments, the channel bandwidth may include a 2.16 GHz channel, a 4.32 GHz channel, a 6.48 GHz channel, or an 8.64 GHz channel.

In other embodiments, any other channel bandwidth may be used.

In some demonstrative embodiments, an EDMG-CEF sequence of the one or more EDMG-CEF sequences may include first and second predefined sequences corresponding to an index of a space-time stream of the one or more space-time streams, e.g., as described below.

In some demonstrative embodiments, the EDMG-CEF sequence may include the first predefined sequence followed by three zeros, which are followed by the second predefined sequence, e.g., as described below.

In other embodiments, the EDMG-CEF sequence may include any other combination of the first and second sequences.

In other embodiments, the EDMG-CEF sequence may include any other number of second sequences.

In some demonstrative embodiments, the first and second predefined sequences may have a same length, e.g., as described below.

In other embodiments, the first and second predefined sequences may have different lengths.

In some demonstrative embodiments, each of the first and second predefined sequences may include a predefined sequence of symbols, e.g., as described below.

In some demonstrative embodiments, each symbol of the predefined sequence of symbols may be +1, −1, +j, or −j, e.g., as described below.

In other embodiments, any other additional or alternative symbol values may be used.

In some demonstrative embodiments, devices 102 and/or 140 may be configured to generate, determine and/or define the EDMG-CEF field, for example, based on one or more sequences of a length, denoted N, which may be based, for example, on the number $i_{STS}$ of space-time streams, e.g., as described below.

In some demonstrative embodiments, devices 102 and/or 140 may be configured to generate, determine and/or define the EDMG-CEF field, for example, based on a pair of sequences, for example, including a first sequence, denoted $Seq^{i_{STS}}_{left,N}$, and/or a second sequence, denoted $Seq^{i_{STS}}_{right,N}$, having a length N, for example, for different space-time streams, e.g., as described below.

In some demonstrative embodiments, controller 124 may be configured to cause, trigger, and/or control the wireless station implemented by device 102 to determine the one or more EDMG-CEF sequences, for example, according to one of the following definitions:

$EDMG\text{-}CEF^{iSTS}_{-177,\ 177}=[Seq^{iSTS}_{left,\ 176},\ 0,\ 0,\ 0,\ Seq^{iSTS}_{right,\ 176}]$, for $i_{STS}$=1, 2, 3, 4, 5, 6, 7, 8, when the channel bandwidth includes a 2.16 GHz channel, wherein $i_{STS}$ denotes a space-time stream index, $EDMG\text{-}CEF^{iSTS}_{-177,\ 177}$ denotes an EDMG-CEF sequence for the 2.16 GHz channel and the space-time stream index $i_{STS}$, $Seq^{iSTS}_{left,\ 176}$ denotes a first predefined sequence of length 176 corresponding to the space-time stream index $i_{STS}$, and $Seq^{iSTS}_{right,\ 176}$ denotes a second predefined sequence of length 176 corresponding to the space-time stream index $i_{STS}$;

$EDMG\text{-}CEF^{iSTS}_{-386,\ 386}=[Seq^{iSTS}_{left,\ 385},\ 0,\ 0,\ 0,\ Seq^{iSTS}_{right,\ 385}]$, for $i_{STS}$=1, 2, 3, 4, 5, 6, 7, 8, when the channel bandwidth includes a 4.32 GHz channel, wherein $EDMG\text{-}CEF^{iSTS}_{-386,\ 386}$ denotes an EDMG-CEF sequence for the 4.32 GHz channel and the space-time stream index $i_{STS}$, $Seq^{iSTS}_{left,\ 385}$ denotes a first predefined sequence of length 385 corresponding to the space-time stream index $i_{STS}$, and $Seq^{iSTS}_{right,\ 385}$ denotes a second predefined sequence of length 385 corresponding to the space-time stream index $i_{STS}$;

$EDMG\text{-}CEF^{iSTS}_{-596,\ 596}=[Seq^{iSTS}_{left,\ 595},\ 0,\ 0,\ 0,\ Seq^{iSTS}_{right,\ 595}]$, for $i_{STS}$=1, 2, 3, 4, 5, 6, 7, 8, when the channel bandwidth includes a 6.48 GHz channel, wherein $EDMG\text{-}CEF^{iSTS}_{-596,\ 596}$ denotes an EDMG-CEF sequence for the 6.48 GHz channel and the space-time stream index $i_{STS}$, $Seq^{iSTS}_{left,\ 595}$ denotes a first predefined sequence of length 595 corresponding to the space-time stream index $i_{STS}$, and $Seq^{iSTS}_{right,\ 595}$ denotes a second predefined sequence of length 595 corresponding to the space-time stream index $i_{STS}$;

$EDMG\text{-}CEF^{iSTS}_{-805,\ 805}=[Seq^{iSTS}_{left,\ 804},\ 0,\ 0,\ 0,\ Seq^{iSTS}_{right,\ 804}]$, for $i_{STS}$=1, 2, 3, 4, 5, 6, 7, 8, when the channel bandwidth includes a 8.64 GHz channel, wherein $EDMG\text{-}CEF^{iSTS}_{-805,\ 805}$ denotes an EDMG-CEF sequence for the 8.64 GHz channel and the space-time stream index $i_{STS}$, $Seq^{iSTS}_{left,\ 804}$ denotes a first predefined sequence of length 804 corresponding to the space-time stream index $i_{STS}$, and $Seq^{iSTS}_{right,\ 804}$ denotes a second predefined sequence of length 804 corresponding to the space-time stream index $i_{STS}$.

In other embodiments, one or more of the EDMG-CEF sequences may be defined according to any other definition, parameter and/or criterion.

In some demonstrative embodiments, a length of each of the one or more EDMG-CEF sequences may be based on the count of one or more 2.16 GHz channels, e.g., as described below.

In other embodiments, the length of each of the one or more EDMG-CEF sequences may be based on any other additional or alternative parameter.

In some demonstrative embodiments, the count of the one or more space-time streams is 1, 2, 3, 4, 5, 6, 7, or 8, e.g., as described below. In other embodiments any other additional or alternative number of space-time streams may be supported.

In some demonstrative embodiments, device 102 may be configured to generate, determine and/or define the EDMG-CEF field, e.g., EDMG-CEF field 214 (FIG. 2), for example, for EDMG PPDU transmissions using an EDMG OFDM mode, for example, based on a channel bandwidth of a channel to communicate the EDMG PPDU, e.g., as described below.

In some demonstrative embodiments, device 102 may be configured to generate, determine and/or define the EDMG-CEF field, for example, for EDMG PPDU transmissions using an EDMG OFDM mode, for example, over a 2.16 GHz channel.

In one example, the EDMG-CEF sequence may be defined, for example, in a frequency domain, for an i-th space-time stream, e.g., as follows:

$$\text{EDMG-CEF}^{iSTS}_{-177,\ 177}=[\text{Seq}^{iSTS}_{left,\ 176},\ 0,\ 0,\ 0,\ \text{Seq}^{iSTS}_{right,\ 176}],\ \text{for } i_{STS}=1, 2, 3, 4, 5, 6, 7, 8$$

In some demonstrative embodiments, device 102 may be configured to generate, determine and/or define the EDMG-CEF field, for example, for EDMG PPDU transmissions using an EDMG OFDM mode, for example, over a 4.32 GHz channel.

In one example, the EDMG-CEF sequence may be defined, for example, in a frequency domain, for an i-th space-time stream, e.g., as follows:

$$\text{EDMG-CEF}^{iSTS}_{-386,\ 386}=[\text{Seq}^{iSTS}_{left,\ 385},\ 0,\ 0,\ 0,\ \text{Seq}^{iSTS}_{right,\ 385}],\ \text{for } i_{STS}=1, 2, 3, 4, 5, 6, 7, 8$$

In some demonstrative embodiments, device 102 may be configured to generate, determine and/or define the EDMG-CEF field, for example, for EDMG PPDU transmissions using an EDMG OFDM mode, for example, over a 6.48 GHz channel.

In one example, the EDMG-CEF sequence may be defined, for example, in a frequency domain, for an i-th space-time stream, e.g., as follows:

$$\text{EDMG-CEF}^{iSTS}_{-596,\ 596}=[\text{Seq}^{iSTS}_{left,\ 595},\ 0,\ 0,\ 0,\ \text{Seq}^{iSTS}_{right,\ 595}],\ \text{for } i_{STS}=1, 2, 3, 4, 5, 6, 7, 8$$

In some demonstrative embodiments, device 102 may be configured to generate, determine and/or define the EDMG-CEF field, for example, for EDMG PPDU transmissions using an EDMG OFDM mode, for example, over an 8.64 GHz channel.

In one example, the EDMG-CEF sequence may be defined, for example, in a frequency domain, for an i-th space-time stream, e.g., as follows:

$$\text{EDMG-CEF}^{iSTS}_{-805,\ 805}=[\text{Seq}^{iSTS}_{left,\ 804},\ 0,\ 0,\ 0,\ \text{Seq}^{iSTS}_{right,\ 804}],\ \text{for } i_{STS}=1, 2, 3, 4, 5, 6, 7, 8$$

In some demonstrative embodiments, device 102 may be configured to generate, determine and/or define the EDMG-CEF field, for example, for EDMG PPDU transmissions using an EDMG OFDM mode, for example, according to an EDMG-CEF mapping matrix, which may be based, for example, on the count of space-time streams, denoted $N_{STS}$, e.g., as described below.

In some demonstrative embodiments, the EDMG-CEF mapping matrix, denoted $P_{EDMG\text{-}CEF}$, may be based on the count of the one or more space time streams $N_{STS}$, e.g., as follows:

$$P_{EDMG-CEF} = [+1\ \ -1], \text{ for } N_{STS} = 1 \tag{1}$$

$$P_{EDMG-CEF} = \begin{bmatrix} +1 & -1 \\ +1 & +1 \end{bmatrix}, \text{ for } N_{STS} = 2$$

$$P_{EDMG-CEF} = \begin{bmatrix} +1 & -1 & +1 \\ +1 & -w_3^1 & w_3^2 \\ +1 & -w_3^2 & w_3^4 \end{bmatrix},$$

$$w_3 = \exp(-j2\pi/3), \text{ for } N_{STS} = 3$$

-continued $$P_{EDMG-CEF} = P_{4\times4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix}, \text{ for } N_{STS} = 4$$

$$P_{EDMG-CEF} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix},$$

$$w_6 = \exp(-j2\pi/6), \text{ for } N_{STS} = 5 \text{ or } 6$$

$$P_{EDMG-CEF} = \begin{bmatrix} P_{4\times4} & P_{4\times4} \\ P_{4\times4} & -P_{4\times4} \end{bmatrix}, \text{ for } N_{STS} = 7 \text{ or } 8$$

In other embodiments, any other mapping matrix may be used.

In some demonstrative embodiments, controller 124 may be configured to cause, trigger, and/or control the wireless station implemented by device 102 to generate the EDMG-CEF transmit waveform based on a number of OFDM symbols in the EDMG-CEF, e.g., as described below.

In some demonstrative embodiments, the number of OFDM symbols in the EDMG-CEF may be based on the count of the one or more space-time streams, e.g., as described below.

In some demonstrative embodiments, the number of OFDM symbols in the EDMG-CEF, denoted $N_{EDMG\text{-}CEF}^{N_{STS}}$, may be based on the count of the one or more space time streams, denoted $N_{STS}$, e.g., as follows:

$$N_{EDMG\text{-}CEF}^{N_{STS}}=2, \text{ for } N_{STS}=1$$

$$N_{EDMG\text{-}CEF}^{N_{STS}}=2, \text{ for } N_{STS}=2$$

$$N_{EDMG\text{-}CEF}^{N_{STS}}=3, \text{ for } N_{STS}=3$$

$$N_{EDMG\text{-}CEF}^{N_{STS}}=4, \text{ for } N_{STS}=4$$

$$N_{EDMG\text{-}CEF}^{N_{STS}}=6, \text{ for } N_{STS}=5 \text{ or } 6$$

$$N_{EDMG\text{-}CEF}^{N_{STS}}=8, \text{ for } N_{STS}=7 \text{ or } 8 \tag{2}$$

In one example, a combination of the EDMG-CEF mapping matrix and the value of $N_{EDMG\text{-}CEF}^{N_{STS}}$ for $N_{STS}=1$ may be defined, e.g., as follows:

$$P_{EDMG-CEF} = [+1\ \ -1], N_{EDMG-CEF}^{N_{STS}} = 2$$

In one example, a combination of the EDMG-CEF mapping matrix and the value of $N_{EDMG\text{-}CEF}^{N_{STS}}$ for $N_{STS}=2$ may be defined, e.g., as follows:

$$P_{EDMG-CEF} = \begin{bmatrix} +1 & -1 \\ +1 & +1 \end{bmatrix}, N_{EDMG-CEF}^{N_{STS}} = 2$$

In one example, a combination of the EDMG-CEF mapping matrix and the value of $N_{EDMG\text{-}CEF}^{N_{STS}}$ for $N_{STS}=3$ may be defined, e.g., as follows:

$$P_{EDMG-CEF}=\begin{bmatrix}+1 & -1 & +1\\ +1 & -w_3^1 & w_3^2\\ +1 & -w_3^2 & w_3^4\end{bmatrix},$$

$$w_3=\exp(-j2\pi/3),\ N_{EDMG-CEF}^{N_{STS}}=3$$

In one example, a combination of the EDMG-CEF mapping matrix and the value of $N_{EDMG-CEF}^{N_{STS}}$ for $N_{STS}$=4 may be defined, e.g., as follows:

$$P_{EDMG-CEF}=P_{4\times4}=\begin{bmatrix}+1 & -1 & +1 & +1\\ +1 & +1 & -1 & +1\\ +1 & +1 & +1 & -1\\ -1 & +1 & +1 & +1\end{bmatrix},\ N_{EDMG-CEF}^{N_{STS}}=4$$

In one example, a combination of the EDMG-CEF mapping matrix and the value of $N_{EDMG-CEF}^{N_{STS}}$ for $N_{STS}$=5, 6 may be defined, e.g., as follows:

$$P_{EDMG-CEF}=\begin{bmatrix}+1 & -1 & +1 & +1 & +1 & -1\\ +1 & -w_6^1 & w_6^2 & w_6^3 & w_6^4 & -w_6^5\\ +1 & -w_6^2 & w_6^4 & w_6^6 & w_6^8 & -w_6^{10}\\ +1 & -w_6^3 & w_6^6 & w_6^9 & w_6^{12} & -w_6^{15}\\ +1 & -w_6^4 & w_6^8 & w_6^{12} & w_6^{16} & -w_6^{20}\\ +1 & -w_6^5 & w_6^{10} & w_6^{15} & w_6^{20} & -w_6^{25}\end{bmatrix},$$

$$w_6=\exp(-j2\pi/6),\ \text{for}\ N_{EDMG-CEF}^{N_{STS}}=6$$

In one example, a combination of the EDMG-CEF mapping matrix and the value of $N_{EDMG-CEF}^{N_{STS}}$ for $N_{STS}$=7, 8 may be defined, e.g., as follows:

$$P_{EDMG-CEF}=\begin{bmatrix}P_{4\times4} & P_{4\times4}\\ P_{4\times4} & -P_{4\times4}\end{bmatrix},\ N_{EDMG-CEF}^{N_{STS}}=8$$

In other embodiments, any other definition of the EDMG-CEF mapping matrix and/or the number $N_{EDMG-CEF}^{N_{STS}}$ of OFDM symbols in the EDMG-CEF may be used.

In some demonstrative embodiments, for example, any orthogonal matrix $P_{EDMG-CEF}$ may be used in the definition for EDMG-CEF, e.g., as described above.

The matrices described above are only examples, which may be candidates, for example, for CEF definition in a future IEEE 802.11ay Specification.

In some demonstrative embodiments, any suitable $P_{EDMG-CEF}$ matrix choice may be implemented, for example, to be used with the OFDM sequences set described herein.

In some demonstrative embodiments, devices 102 and/or 140 may be configured to generate, determine and/or define the EDMG-CEF field, e.g., EDMG-CEF field 214 (FIG. 2), for example, for EDMG PPDU transmissions using an EDMG OFDM mode, for example, according to an EDMG-CEF field transmit waveform in a time domain, which, for example, may be defined at the OFDM sampling rate $F_s$ equal to $N_{CB}$*2.64 GHz and sampling time $T_s=1/F_s$ ns, e.g., as described below.

In some demonstrative embodiments, controller 124 may be configured to cause, trigger, and/or control the wireless station implemented by device 102 to generate the EDMG-CEF transmit waveform, denoted $r_{EDMG-CEF}^{n,i_{TX}}(qT_s)$, e.g., as follows:

$$r_{EDMG-CEF}^{n,i_{TX}}(qT_s)=\frac{1}{\sqrt{N_{STS}\cdot N_{Tones}}}w(qT_s)\cdot\sum_{k=-N_{SR}}^{N_{SR}}\sum_{i_{STS}=1}^{N_{STS}}[Q_k]_{i_{TX},i_{STS}}\left[P_{EDMG-CEF}\right]_{i_{STS},n}EDMG\text{-}CEF_k^{i_{STS}}\exp(j2\pi k\Delta_F(qT_s-T_{GI\ long})),\quad 1\le n\le N_{EDMG-CEF}^{N_{STS}} \tag{3}$$

wherein:

$N_{Tones}$ $N_{ST}$–$N_{DC}$ denotes total number of active tones;

$Q_k$ denotes a spatial mapping matrix per k-th subcarrier;

$P_{EDMG-CEF}$ denotes the EDMG-CEF mapping matrix;

$N_{EDMG-CEF}^{N_{STS}}$ denotes the number of OFDM symbols in the EDMG-CEF for the count of space-time streams, denoted $N_{STS}$;

$[\ ]_{m,n}$ denotes a matrix element from m-th row and n-th column; and $w(qT_s)$ denotes a window function to smooth transitions between consecutive OFDM symbols.

In other embodiments, any other definition of the EDMG-CEF field transmit waveform may be used.

In some demonstrative embodiments, one or more of the proposed sequence set described herein may have, for example, improved Peak to Average Power Ratio (PAPR) properties, e.g., as follows:

TABLE 1

Example of Peak to average power ratio (PAPR) in [dB] for proposed sequences set

| Space-time stream # | NCB = 1 | NCB = 2 | NCB = 3 | NCB = 4 |
|---|---|---|---|---|
| 1 | 2.9775 | 3.2192 | 3.5595 | 3.2681 |
| 2 | 2.9788 | 3.2259 | 3.5654 | 3.2696 |
| 3 | 2.9800 | 3.2261 | 3.5895 | 3.2928 |
| 4 | 2.9800 | 3.2270 | 3.6065 | 3.3038 |
| 5 | 2.9838 | 3.2292 | 3.6201 | 3.3066 |
| 6 | 2.9845 | 3.2299 | 3.6208 | 3.3114 |
| 7 | 2.9886 | 3.2477 | 3.6314 | 3.3188 |
| 8 | 2.9923 | 3.2499 | 3.6395 | 3.3190 |

In one example, the PAPR properties of Table 1 may be compared, for example, to PAPR properties of an IEEE 802.11ac Standard. For example, a sequence for a VHT-LTF field used for channel estimation according to an IEEE 802.11ac Standard may have the following PAPR properties:

TABLE 2

Peak to average power ratio (PAPR) in [dB] for sequences defined in IEEE 802.11 ac

| Space-time stream # | NCB = 1 | NCB = 2 | NCB = 3 | NCB = 4 |
|---|---|---|---|---|
| 1 | 3.5766 | 3.4066 | N/A | 4.7514 |

As may be seen from Table 1, for example, for a space-time stream number greater than one, i.e., $i_{STS}>1$, the sequence may maintain a same PAPR, for example, since the sequence may be defined by application of a cyclic shift in time domain to the basic sequence defined for $i_{STS}=1$.

For example, based on the PAPR values of Table 1 it may be concluded that the set described herein has good PAPR properties, e.g., compared to the properties in Table 2.

In some demonstrative embodiments, devices 102 and/or 140 may be configured to use the pairs of sequences $Seq^{iSTS}_{left,N}$ and $Seq^{iSTS}_{right,N}$ to define the EDMG-CEF sequences for the EDMG-CEF field in the frequency domain, e.g., as described above.

In some demonstrative embodiments, the EDMG OFDM PHY, e.g., of devices 102 and/or 140, may be configured to use the pairs of sequences $Seq^{iSTS}_{left,N}$ and $Seq^{iSTS}_{right,N}$, for example, of the length N=176, 385, 595, and 804, and/or any other length, to define the EDMG-CEF field in the frequency domain, e.g., as described above.

In some demonstrative embodiments, the use of each sequence may depend, for example, at least on the transmitted channel bandwidth and/or the number of transmitted space-time streams, e.g., as described below. The use of the sequence may be configured to depend on any other additional or alternative parameters.

In some demonstrative embodiments, the sequence pairs $Seq^{iSTS}_{left,N}$ and $Seq^{iSTS}_{right,N}$ of length N=176, 385, 595, and 804 may use, for example, {+1, −1, +j, −j} symbols alphabet, e.g., according to one or more of the following sequences:

TABLE 3

| The sequence $Seq^{iTX}_{left,\ 176}(k)$ |
|---|
| The Sequence $Seq^{1}_{left,\ 176}(k)$, to be transmitted from left to right, up to down |
| −1 −j −j +1 +j −j +1 −1 +1 −j −1 +1 −1 +1 −j −1 −1 +j +j +j −1 −1 +1 +j +j −1 −j +j −1 +1 −1 |
| +j +1 +1 −1 +1 −j −1 −1 +j +j +j −1 −1 +j −1 −1 −j +1 −1 −j +j −j −1 +j −j +j −j −1 +j +j +1 +1 |
| +1 +j +j +j −1 −1 −j +1 −1 −j +j −j −1 +j +j −j +j +1 −j −j −1 −1 −1 −j −j +j −1 −1 −j +1 −1 −j +j |
| −j −1 +j −j +j −j −1 +j +j +1 +1 +1 +j +j −j +1 +1 +j −1 +1 +j −j +j +1 −j −j +j −j −1 +j +j +1 |
| +1 +1 +j +j −1 −j −j +1 +j −j +1 −1 +1 −j −1 +1 −1 +1 −j −1 −1 +j +j +j −1 −1 −1 −j −j +1 +j −j |
| +1 −1 +1 −j −1 −1 +1 −1 +j +1 +1 −j −j −j +1 +1 |
| The Sequence $Seq^{2}_{left,\ 176}(k)$, to be transmitted from left to right, up to down |
| +1 −j −j −1 +j −j −1 +1 −1 −j +1 +1 −j −j −1 +j −j −1 +1 −1 −j +1 +j +1 +1 −j −1 +1 −j +j −j +1 |
| +j −j −1 −1 +j +1 −1 +j −j +j −1 −j +1 −1 +1 +j −1 −1 −j −j −j −1 −1 +1 −1 +1 +j −1 −1 −j −j −j |
| −1 −1 +j −j +j −1 −j −j +1 +1 +1 −j −j −j +j −j +1 +j +j −1 −1 −1 +j +j +j +1 +1 −j −1 +1 −j +j |
| −j +1 +j −j −1 −1 +j +1 −1 +j −j +j −1 −j −1 +j +j +1 −j +j +1 −1 +1 +j −1 −1 +j +j +1 −j +j +1 |
| −1 +1 +j −1 −j +j −j +1 +j +j −1 −1 −1 +j +j +j −j +j −1 −j −j +1 +1 +1 −j −j +1 −1 +1 +j −1 −1 |
| −j −j −j −1 −1 +1 −1 +1 +j −1 −1 −j −j −j −1 −1 |
| The Sequence $Seq^{3}_{left,\ 176}(k)$, to be transmitted from left to right, up to down |
| +1 +1 +j +j +j +1 +1 −j −1 +1 −1 +1 +1 +j +j +j +1 +1 −j −1 +1 −1 +j +j −1 −1 −1 +j +j +1 |
| −j +j −j −j −j +1 +1 +1 −j −j −1 +j −j +j +j +j −1 −1 −1 +j +j +1 −j +j −j +j +j −1 −1 −1 +j +j |
| +1 −j +j −j +1 +1 +j +j +j +1 +1 −j −1 +1 −1 −1 −1 −j −j −j −1 −1 +j +1 −1 +1 −j −1 +j −j +j −1 |
| +1 +j −1 −1 −j +j +1 −j +j −j +1 −1 −j +1 +1 +j +1 −j −1 +1 −1 −j +j −1 −j −j +1 +1 −j −1 +1 |
| −1 −j +j −1 −j −j +1 +1 −j −1 +1 −1 −j +j −1 −j −j +1 −1 +j +1 −1 +1 +j −j +1 +j +j −1 −j −1 +j |
| −j +j −1 +1 +j −1 −1 −j −j −1 +j −j +j −1 +1 +j −1 −1 −j |
| The Sequence $Seq^{4}_{left,\ 176}(k)$, to be transmitted from left to right, up to down |
| −1 +j +j +1 −j +j +1 −1 +1 +j −1 −j −1 −1 +j +1 −1 +j −j +j −1 −j +j −j +j −1 −j −j +1 +1 +1 −j |
| −j −1 +1 −1 −j +1 +1 +j +j +j +1 +1 −1 +j +j +1 −j +j +1 −1 +1 +j −1 −j −1 −1 +j +1 −1 +j −j |
| +j −1 −j −j +j −j +1 +j +j −1 −1 −1 +j +j +1 −1 +1 +j −1 −1 −j −j −j −1 −1 +1 −j −j −1 +j −j −1 |
| +1 −1 −j +1 −j −1 −1 +j +1 −1 +j −j +j −1 −j −j +j −j +1 +j +j −1 −1 −1 +j +j −1 +1 −1 −j +1 +1 |
| +j +j +j +1 +1 −1 +j +j +1 −j +j +1 −1 +1 +j −1 +j +1 +1 −j −1 +1 −j +j −j +1 +j −j +j −j +1 |
| +j +j −1 −1 −1 +j +j −1 +1 −1 −j +1 +1 +j +j +j +1 +1 |
| The Sequence $Seq^{5}_{left,\ 176}(k)$, to be transmitted from left to right, up to down |
| +1 −1 +1 −j −1 −1 +j +j +j −1 −1 +1 +j +j −1 −j +j −1 +1 −1 +j +1 +1 −1 +1 −j −1 −1 +j +j +j |
| −1 −1 +1 +j +j −1 −j +j −1 +1 −1 +j +1 +j −j +j +1 −j −j −1 −1 −1 −j −j +j −1 −1 −j +1 −1 −j +j |
| −j −1 +j −j +j −j −1 +j +j +1 +1 +1 +j +j −j +1 +1 +j −1 +1 +j −j +j +1 −j −j +j −j −1 +j +j +1 |
| +1 +1 +j +j +j −1 −1 −j +1 −1 −j +j −j −1 +j +j −j +j +1 −j −j −1 −1 −1 −j −j −j +1 +1 +j −1 +1 |
| +j −j +j +1 −j +1 −1 +1 −j −1 −1 +j +j +j −1 −1 −1 −j −j +1 +j −j +1 −1 +1 −j −1 +1 −1 +1 −j −1 |
| −1 +j +j +j −1 −1 −1 −j −j +1 +j −j +1 −1 +1 −j −1 |
| The Sequence $Seq^{6}_{left,\ 176}(k)$, to be transmitted from left to right, up to down |
| +1 +j −1 +1 −1 +j −j −1 +j +j +1 −1 −j +1 −1 +1 −j +j +1 −j −j −1 +j −1 −j +j −j −1 +1 −j −1 −1 |
| +j −j +1 +j −j +j +1 −1 +j +1 +1 −j +j +j +1 +1 +1 +j +j −1 −j +j −j +j +j +1 +1 +1 +j +j |
| −1 −j +j −j −1 −1 +j +j +j −1 −1 −j +1 −1 +1 −1 −1 +j +j +j −1 −1 −j +1 −1 +1 +j −1 −j +j −j −1 |
| +1 −j −1 −1 +j +j −1 −j +j −j −1 +1 −j −1 −1 +j +1 +j −1 +1 −1 +j −j −1 +j +j +1 +1 +j −1 +1 |
| −1 +j −j −1 +j +j +1 −1 −1 +j +j +j −1 −1 −j +1 −1 +1 +1 +1 −j −j −j +1 +1 +j −1 +1 −1 +j +j |
| +1 +1 +1 +j +j −1 −j +j −j −j −j −1 −1 −1 −j −j +1 +j −j +j |
| The Sequence $Seq^{7}_{left,\ 176}(k)$, to be transmitted from left to right, up to down |
| −j −1 +j −j +j −1 +1 +j −1 −1 −j +j +j −1 −1 −1 +j +j +1 −j +j −j +1 −j −1 +1 −1 −j +j −1 −j −j |
| +1 −1 −1 −j −j −j −1 −1 +j +1 −1 +1 +1 −j −1 +1 −1 −j +j −1 −j −j +1 −1 −1 −j −j −j −1 −1 +j +1 |
| −1 +1 −j −1 +j −j +j −1 +1 +j −1 −1 −j +j +j −1 −1 −1 +j +j +1 −j +j −j +1 −j −1 +1 −1 −j +j −1 |
| −j −j +1 +1 +1 +j +j +j +1 +1 −j −1 +1 −1 −j −1 +j −j +j −1 +1 +j −1 −1 −j −j −j +1 +1 +1 −j −j |
| −1 +j −j +j +j +1 −j +j −j +1 −1 −j +1 +1 +j +j +j −1 −1 −1 +j +j +1 −j +j −j −1 +j +1 −1 +1 |
| +j −j +1 +j +j −1 −1 −1 −j −j −j −1 −1 +j +1 −1 +1 |
| The Sequence $Seq^{8}_{left,\ 176}(k)$, to be transmitted from left to right, up to down |
| +1 −1 +1 +j −1 −1 −j −j −j −1 −1 +j −j +j −1 −j −j +1 +1 +1 −j −j −j +j −j +1 +j +j −1 −1 −1 +j |
| +j +1 −1 +1 +j −1 −1 −j −j −j −1 −1 +1 −1 +1 +j −1 −1 −j −j −j −1 −1 −j +j −j +1 +j +j −1 −1 −1 |
| +j +j +j −j +j −1 −j −j +1 +1 +1 −j −j +1 −1 +1 +j −1 −1 −j −j −j −1 −1 +j +1 +1 −j −1 +1 −j +j |
| −j +1 +j −1 +j +j +1 −j +j +1 −1 +1 +j −1 −1 +j +j +1 −j +j +1 −1 +1 +j −1 −j −1 −1 +j +1 −1 |
| +j −j +j −1 −j +j +1 +1 −j −1 +1 −j +j −j +1 +j +1 −j −j −1 +j −j −1 +1 −1 −j +1 +1 −j −j −1 +j |
| −j −1 +1 −1 −j +1 −j −1 −1 +j +1 −1 +j −j +j −1 −j |

TABLE 4

| The sequence $Seq^{iTX}_{right,\ 176}(k)$ |
|---|
| The Sequence $Seq^{1}_{right,\ 176}(k)$, to be transmitted from left to right, up to down |
| −1 −j −j +1 +j −j +1 −1 +1 −j −1 +1 −1 +1 −j −1 −1 +j +j +j −1 −1 +1 +j +j −1 −j +j −1 +1 −1 |
| +j +1 +1 −1 +1 −j −1 −1 +j +j +j −1 −1 +j −1 −1 −j +1 −1 −j +j −j −1 +j −j +j −j −1 +j +j +1 +1 |
| +1 +j +j +j −1 −1 −j +1 −1 −j +j −j −1 +j +j −j +j +1 −j −j −1 −1 −1 −j −j −j +1 +1 +j −1 +1 +j |
| −j +j +1 −j +j −j +j +1 −j −j −1 −1 −1 −j −j +j −1 −1 −j +1 −1 −j +j −j −1 +j +j −j +j +1 −j −j −1 −1 |
| −1 −j −j +1 +j +j −1 −j +j −1 +1 −1 +j +1 −1 +1 −1 +j +1 +1 −j −j −j +1 +1 +1 +j +j −1 −j +j |
| −1 +1 −1 +j +1 +1 −1 +1 −j −1 −1 +j +j +j −1 −1 |
| The Sequence $Seq^{2}_{right,\ 176}(k)$, to be transmitted from left to right, up to down |
| −1 +j +j +1 −j +j +1 −1 +1 +j −1 −1 +j +j +1 −j +j +1 −1 +1 +j −1 +j +1 +1 −j −1 +1 −j +j −j |
| +1 +j −j −1 −1 +j +1 −1 +j −j +j −1 −j −1 +1 −1 −j +1 +1 +j +j +j +1 +1 −1 +1 −1 −j +1 +1 +j |
| +j +j +1 +1 +j −j +j −1 −j −j +1 +1 +1 −j −j −j +j −j +1 +j +j −1 −1 −1 +j +j −j −1 −1 +j +1 −1 |
| +j −j +j −1 −j +j +1 +1 −j −1 +1 −j +j −j +1 +j −1 +j +j +1 −j +j +1 −1 +1 +j −1 −1 +j +j +1 |
| −j +j +1 −1 +1 +j −1 +j −j +j −1 −j −j +1 +1 +1 −j −j −j +j −j +1 +j +j −1 −1 −1 +j +j +1 −1 +1 |
| +j −1 −1 −j −j −j −1 −1 +1 −1 +1 +j −1 −1 −j −j −j −1 −1 |
| The Sequence $Seq^{3}_{right,\ 176}(k)$, to be transmitted from left to right, up to down |
| −1 −1 −j −j −j −1 −1 +j +1 −1 +1 −1 −1 −j −j −j −1 −1 +j +1 −1 +1 −j −j +1 +1 +1 −j −j −1 +j −j |
| +j +j +j −1 −1 −1 +j +j +1 −j +j −j +j +j −1 −1 −1 +j +j +1 −j +j −j +j +j −1 −1 −1 +j +j +1 −j |
| +j −j +1 +1 +j +j +j +1 +1 −j −1 +1 −1 −1 −1 −j −j −j −1 −1 +j +1 −1 +1 +j +1 −j +j −j +1 −1 |
| −j +1 +1 +j −j −1 +j −j +j −1 +1 +j −1 −1 −j −1 +j +1 −1 +1 +j −j +1 +j +j −1 −1 +j +1 −1 +1 |
| +j −j +1 +j +j −1 +1 −j −1 +1 −1 −j +j −1 −j −j +1 −1 +j +1 −1 +1 +j −j +1 +j +j −1 −j −1 +j −j |
| +j −1 +1 +j −1 −1 −j −j −1 +j −j +j −1 +1 +j −1 −1 −j |
| The Sequence $Seq^{4}_{right,\ 176}(k)$, to be transmitted from left to right, up to down |
| +1 −j −j −1 +j −j −1 +1 −1 −j +1 −j −1 −1 +j +1 −1 +j −j +j −1 −j −j +j −j +1 +j +j −1 −1 −1 +j |
| +j −1 +1 −1 −j +1 +1 +j +j +j +1 +1 +1 −j −j −1 +j −j −1 +1 −1 −j +1 −j −1 −1 +j +1 −1 +j −j |
| +j −1 −j +j −j +j −1 −j −j +1 +1 +1 −j −j +1 −1 +1 +j −1 −1 −j −j −j −1 −1 −1 +j +j +1 −j +j +1 |
| −1 +1 +j −1 −j −1 −1 +j +1 −1 +j −j +j −1 −j +j −j +j −1 −j −j +1 +1 +1 −j −j −1 +1 −1 −j +1 +1 |
| +j +j +j +1 +1 +1 −j −j −1 +j −j −1 +1 −1 −j +1 +j +1 +1 −j −1 +1 −j +j −j +1 +j +j −j +j −1 −j |
| −j +1 +1 +1 −j −j −1 +1 −1 −j +1 +1 +j +j +j +1 +1 |
| The Sequence $Seq^{5}_{right,\ 176}(k)$, to be transmitted from left to right, up to down |
| −1 +1 −1 +j +1 +1 −j −j −j +1 +1 −1 −j −j +1 +j −j +1 −1 +1 −j −1 −1 +1 −1 +j +1 +1 −j −j −j |
| +1 +1 −1 −j −j +1 +j −j +1 −1 +1 −j −1 +j −j +j +1 −j −j −1 −1 −1 −j −j +j −1 −1 −j +1 −1 −j +j −j |
| −1 +j −j +j −j −1 +j +j +1 +1 +1 +j +j −j +1 +1 +j −1 +1 +j −j +j +1 −j +j −j +j +1 −j −j −1 −1 |
| −1 −j −j −j +1 +1 +j −1 +1 +j −j +j +1 −j −j +j −j −1 +j +j +1 +1 +1 +j +j +j −1 −1 −j +1 −1 −j |
| +j −j −1 +j +1 −1 +1 −j −1 −1 +j +j +j −1 −1 −1 −j −j +1 +j −j +1 −1 +1 −j −1 +1 −1 +1 −j −1 −1 |
| +j +j +j −1 −1 −1 −j −j +1 +j −j +1 −1 +1 −j −1 |
| The Sequence $Seq^{6}_{right,\ 176}(k)$, to be transmitted from left to right, up to down |
| −1 −j +1 −1 +1 −j +j +1 −j −j −1 +1 +j −1 +1 −1 +j −j −1 +j +j +1 +j −1 −j +j −j −1 +1 −j −1 −1 |
| +j −j +1 +j −j +j +1 −1 +j +1 +1 −j −j −j −1 −1 −1 −j −j +1 +j −j +j −j −j −1 −1 −1 −j −j +1 +j −j |
| +j −1 −1 +j +j +j −1 −1 −j +1 −1 +1 −1 −1 +j +j +j −1 −1 −j +1 −1 +1 −j +1 +j −j +j +1 −1 +j |
| +1 +1 −j −j +1 +j −j +j +1 −1 +j +1 +1 −j +1 +j −1 +1 −1 +j −j −1 +j +j +1 +1 +j −1 +1 −1 |
| +j −j −1 +j +j +1 +1 +1 −j −j −j +1 +1 +j −1 +1 −1 −1 −1 +j +j +j −1 −1 −j +1 −1 +1 +j +j +1 |
| +1 +1 +j +j −1 −j +j −j −j −j −1 −1 −1 −j −j +1 +j −j +j |
| The Sequence $Seq^{7}_{right,\ 176}(k)$, to be transmitted from left to right, up to down |
| +j +1 −j +j −j +1 −1 −j +1 +1 +j −j −j +1 +1 +1 −j −j −1 +j −j +j −1 +j +1 −1 +1 +j −j +1 +j |
| +j −1 +1 +1 +j +j +j +1 +1 −j −1 +1 −1 +1 −j −1 +1 −1 −j +j −1 −j −j +1 −1 −1 −j −j −j −1 −1 +j |
| +1 −1 +1 −j −1 +j −j +j −1 +1 +j −1 −1 −j +j +j −1 −1 −1 +j +j +1 −j +j −j −1 +j +1 −1 +1 +j −j |
| +1 +j +j −1 −1 −1 −j −j −j −1 −1 +j +1 −1 +1 +j +1 −j +j −j +1 −1 −j +1 +1 +j +j +j −1 −1 −1 |
| +j +j +1 −j +j −j +j +1 −j +j −j +1 −1 −j +1 +1 +j +j +j −1 −1 −1 +j +j +1 −j +j −j −1 +j +1 −1 |
| +1 +j −j +1 +j +j −1 −1 −1 −j −j −j −1 −1 +j +1 −1 +1 |
| The Sequence $Seq^{8}_{right,\ 176}(k)$, to be transmitted from left to right, up to down |
| −1 +1 −1 −j +1 +1 +j +j +j +1 +1 +j −j +j −1 −j −j +1 +1 +1 −j −j +j −j +j −1 −j −j +1 +1 +1 |
| −j −j +1 −1 +1 +j −1 −1 −j −j −j −1 −1 −1 +1 −1 −j +1 +1 +j +j +j +1 +1 −j +j −j +1 +j +j −1 −1 |
| −1 +j +j −j +j −j +1 +j +j −1 −1 −1 +j +j +1 −1 +1 +j −1 −1 −j −j −j −1 −1 −j −1 −1 +j +1 −1 +j |
| −j +j −1 −j −1 +j +j +1 −j +j +1 −1 +1 +j −1 +1 −j −j −1 +j −j −1 +1 −1 −j +1 −j −1 −1 +j +1 −1 |
| +j −j +j −1 −j −j −1 −1 +j +1 −1 +j −j +j −1 −j +1 −j −j −1 +j −j −1 +1 −1 −j +1 −1 +j +j +1 −j +j |
| +1 −1 +1 +j −1 −j −1 −1 +j +1 −1 +j −j +j −1 −j |

TABLE 5

| The sequence $Seq^{iTX}_{left,\ 385}(k)$ |
|---|
| The Sequence $Seq^{1}_{left,\ 385}(k)$, to be transmitted from left to right, up to down |
| −1 −1 +j −1 +1 +1 −1 +j +1 +j +j +j −j −j −1 −j +j +j −j +1 −j +1 +1 +1 −1 −1 +j −1 +1 +1 −1 |
| +j +1 +j +j +j −j +j +1 +j −j −j +j −1 +j −1 −1 −1 +1 +1 −j +1 −1 −1 +1 −j −1 −j −j −j +j +j +1 |
| +j −j −j +j −1 +j −1 −1 −1 +1 −1 +j −1 +1 +1 −1 +j +1 +j +j +j −j +j +1 +j −j −j +j −1 +j −1 −1 |
| −1 +1 −1 +j −1 +1 +1 −1 +j +1 +j +j +j −j −j −1 −j +j +j −j +1 −j +1 +1 +1 −1 −1 +j −1 +1 +1 |
| −1 +j +1 +j +j +j −j +j +1 +j −j −j +j −1 +j −1 −1 −1 +1 −1 +j −1 +1 +1 −1 +j +1 +j +j +j −j −j |
| −1 −j +j +j −j +1 −j +1 +1 +1 −1 +1 −j +1 −1 −1 +1 −j −1 −j −j −j +j −j −1 −j +j +j −j +1 −j +1 |
| +1 +1 −1 −j −1 −j +j +j −j −1 +j −1 −1 −1 +1 +1 −j +1 −1 −1 +1 +j +1 +j +j +j −j −j −1 −j +j +j |
| −j −1 +j −1 −1 −1 +1 −1 +j −1 +1 +1 −1 −j −1 −j −j −j +j +j +1 +j −j −j +j +1 −j +1 +1 +1 −1 −1 |
| +j −1 +1 +1 −1 −j −1 −j −j −j +j −j −1 −j +j +j −j −1 +j −1 −1 −1 +1 −1 +j −1 +1 +1 −1 −j −1 −j −j |
| −j +j +j +1 +j −j −j +j +1 −j +1 +1 +1 −1 −1 +j −1 +1 +1 −1 −j −1 −j −j −j +j +j +1 +j −j −j +j |
| +1 −j +1 +1 +1 −1 +1 −j +1 −1 −1 +1 +j +1 +j +j +j −j +j +1 +j −j −j +j +1 −j +1 +1 +1 −1 −1 |

TABLE 5-continued

| The sequence $Seq^{iTX}_{left,\ 385}(k)$ |
|---|
| +j −1 +1 +1 −1 −j −1 −j −j −j +j −j −1 −j +j +j −j −1 +j −1 −1 −1 +1 −1 +j −1 +1 +1 −1 −j −1 −j |
| −j −j +j |
| The Sequence $Seq^{2}_{left,\ 385}(k)$, to be transmitted from left to right, up to down |
| −j +1 −1 −1 −1 +j −1 −j +j +j +j +1 +j +j −j −j +j +1 +j −1 +1 +1 −1 +j −1 −1 +1 +1 +1 −j +1 |
| +j −j −j −j −1 −j −j +j +j −j −1 −j +1 −1 −1 +1 −j +1 +1 −1 −1 −1 +j −1 −j +j +j +j +1 +j +j −j −j |
| +j +1 +j −1 +1 +1 −1 +j −1 +1 −1 −1 −1 +j −1 −j +j +j +j +1 +j +j −j −j +j +1 +j −1 +1 +1 −1 |
| +j −1 +1 −1 −1 −1 +j −1 −j +j +j +j +1 +j +j −j −j +j +1 +j −1 +1 +1 −1 +j −1 +1 −1 −1 −1 +j |
| −1 −j +j +j +j +1 +j +j −j −j +j +1 +j −1 +1 +1 −1 +j −1 +1 −1 −1 −1 +j −1 −j +j +j +j +1 +j |
| +j −j −j +j +1 +j −1 +1 +1 −1 +j −1 −1 +1 +1 +1 −j +1 +j −j −j −j −1 −j −j +j +j −j −1 −j +1 −1 |
| −1 +1 −j +1 +j −j −j −j −1 −j −1 +1 +1 +1 −j +1 −1 +1 +1 −1 +j −1 +j −j −j +j +1 +j −j +j +j +j |
| +1 +j +1 −1 −1 −1 +j −1 +1 −1 −1 +1 −j +1 −j +j +j −j −1 −j +j −j −j −j −1 −j −1 +1 +1 +1 −j +1 |
| −1 +1 +1 −1 +j −1 +j −j −j +j +1 +j +j −j −j −j −1 −j −1 +1 +1 +1 −j +1 −1 +1 +1 −1 +j −1 +j −j |
| −j +j +1 +j −j +j +j +j +1 +j +1 −1 −1 −1 +j −1 +1 −1 −1 +1 −j +1 −j +j +j −j −1 −j −j +j +j |
| +j +1 +j +1 −1 −1 −1 +j −1 +1 −1 −1 +1 −j +1 −j +j +j −j −1 −j −j +j +j +j +1 +j +1 −1 −1 −1 |
| +j −1 +1 −1 −1 +1 −j +1 −j +j +j −j −1 −j +j −j −j −j −1 −j −1 +1 +1 +1 −j +1 −1 +1 +1 −1 +j −1 |
| +j −j −j +j +1 +j |
| The SequenceSeq $^{3}_{left,\ 385}(k)$, to be transmitted from left to right, up to down |
| +1 −1 +j −1 +1 −j +1 +j +1 +j −j −1 −j +1 −j +1 −1 +j −1 +j +1 +j −j −1 −j +1 −j +1 −1 +j −1 |
| +j +1 +j −j −1 −j −1 +j −1 +1 −j +1 +j +1 +j −j −1 −j +1 +1 −1 −1 −1 +1 −j −j +j +j +j −j +1 |
| +1 −1 −1 −1 +1 +j +j −j −j −j +j −1 −1 +1 +1 +1 −1 −j −j +j +j +j −j −1 −1 +1 +1 +1 −1 +j +j −j |
| −j −j +j +j +1 +j −j −1 −j +1 −j +1 −1 +j −1 −j −1 −j +j +1 +j +1 −j +1 −1 +j −1 +j +1 +j −j −1 |
| −j −1 +j −1 +1 −j +1 −j −1 −j +j +1 +j −1 +j −1 +1 −j +1 −j −j +j +j +j −j −1 −1 +1 +1 +1 −1 |
| −j −j +j +j +j −j +1 +1 −1 −1 −1 +1 −j −j +j +j +j −j +1 +1 −1 −1 −1 +1 −j −j +j +j +j −j −1 −1 |
| +1 +1 +1 −1 +j +1 +j +j +1 +j +1 −j +1 +1 −j +1 −j −1 −j −j −1 −j +1 −j +1 +1 −j +1 −j −1 −j |
| −j −1 −j +1 −j +1 +1 −j +1 +j +1 +j +j +1 +j +1 −j +1 +1 −j +1 −j −j +j −j −j +j −1 −1 +1 −1 −1 |
| +1 −j −j +j −j −j +j +1 +1 −1 +1 +1 −1 +j +j −j +j +j −j −1 −1 +1 −1 −1 +1 +j +j −j +j +j −j |
| +1 +1 −1 +1 +1 −1 −1 +j −1 −1 +j −1 +j +1 +j +j +1 +j +1 −j +1 +1 −j +1 +j +1 +j +j +1 |
| +j −1 +j −1 −1 +j −1 −j −1 −j −j −1 −j +1 −j +1 +1 −j +1 −j −1 −j −j −1 −j +1 +1 −1 +1 +1 −1 −j −j |
| +j −j −j +j +1 +1 −1 +1 +1 −1 +j +j −j +j +j −j +1 +1 −1 +1 +1 −1 +j +j −j +j +j −j +1 +1 −1 |
| +1 +1 −1 −j −j +j −j −j +j |
| The Sequence $Seq^{4}_{left,\ 385}(k)$, to be transmitted from left to right, up to down |
| −1 −1 +j −1 +j +1 +j +1 +1 −1 −j −j +j −j −1 −j +1 −j +1 +j +j −j −1 −1 +1 +1 −j +1 −j −1 −j −1 |
| −1 +1 +j +j −j +j +1 +j −1 +j −1 −j −j +j +1 +1 −1 −j −1 −j −1 +j −1 −j −j +j −1 −1 +1 +1 −j +1 |
| +j +1 +j +1 +1 −1 +j +j −j +j +1 +j +1 −j +1 +j +j −j +1 +1 −1 −1 +j −1 −j −1 −j −1 −1 +1 −j |
| −j +j −1 +j −1 +j +1 +j +1 +1 −1 −j −j +j −j −1 −j +1 −j +1 +j +j −j −1 −1 +1 −1 +j −1 +j +1 +j |
| +1 +1 −1 −j −j +j −j −1 −j +1 −j +1 +j +j −j −1 −1 +1 +j +1 +j +1 −j +1 +j +j −j +1 +1 −1 −1 |
| +j −1 −j −1 −j −1 −1 +1 −j −j +j +j +1 +j +1 −j +1 +j +j −j +1 +1 −1 −1 +j −1 −j −1 −j −1 −1 +1 |
| −j −j +j +j +1 +j −1 +j −1 −j −j +j +1 +1 −1 −1 +j −1 +j +1 +j +1 +1 −1 −j −j +j +j +1 +j −1 |
| +j −1 −j −j +j +1 +1 −1 −1 +j −1 +j +1 +j +1 +1 −1 −j −j +j −1 +j −1 −j −1 −j −1 −1 +1 −j −j +j |
| −j −1 −j −1 +j −1 −j −j +j −1 −1 +1 −1 +j −1 −j −1 −j −1 −1 +1 −j −j +j −j −1 −j −1 +j −1 −j −j +j −1 |
| −1 +1 +j +1 +j −1 +j −1 −j −j +j +1 +1 −1 −1 +j −1 +j +1 +j +1 +1 −1 −j −j +j −j −1 −j +1 −j |
| +1 +j +j −j −1 −1 +1 +1 −j +1 −j −1 −j −1 −1 +1 +j +j −j +1 −j +1 +j +1 +j +1 +1 −1 +j +j −j |
| +j +1 +j +1 −j +1 +j +j −j +1 +1 −1 −1 +j −1 −j −1 −j −1 −1 +1 −j −j +j −j −1 −j −1 +j −1 −j −j |
| +j −1 −1 +1 |
| The Sequence $Seq^{5}_{left,\ 385}(k)$, to be transmitted from left to right, up to down |
| −j −1 +1 +1 −1 +1 +1 +j −j −j +j −j −j −j +j +j +j −j −j −1 +1 +1 +1 −1 −1 −1 +1 +1 +1 −1 −1 |
| +j −j −j −j +j +j −j +j +j −j +j +j −1 +1 +1 −1 +1 +1 +1 −1 −1 +1 −1 −1 +j −j −j +j −j −j +j −j −j |
| −j +j +j −1 +1 +1 +1 −1 −1 +1 −1 −1 −1 +1 +1 +j −j −j −j +j +j +j −j −j +j −j −j −1 +1 +1 −1 |
| +1 +1 −j +j +j −j +j +j +1 −1 −1 +1 −1 −1 +1 −1 −1 −1 +1 +1 +j −j −j −j +j +j +j −j −j −j +j +j |
| −1 +1 +1 +1 −1 −1 −1 +1 +1 −1 +1 +1 −j +j +j −j +j +j +j −j −j +j −j −j +1 −1 −1 +1 −1 −1 −1 |
| +1 +1 +1 −1 −1 +j −j −j −j +j +j −j +j +j +j −j −j −1 +1 +1 +1 −1 −1 +1 −1 −1 +1 −1 −1 −j +j |
| +j −j +j +j +1 −j +1 +1 −j +1 −j −1 −j −j −1 −j +j +1 +j −j −1 −j +1 −j +1 −1 +j −1 +1 −j +1 −1 |
| +j −1 −j −1 −j +j +1 +j +j +1 +j +j +1 +j +1 −j +1 +1 −j +1 +1 −j +1 +1 −j +1 +j +1 +j +j |
| +1 +j +j +1 +j −j −1 −j −1 +j −1 +1 −j +1 +1 −j +1 −1 +j −1 +j +1 +j −j −1 −j +j +1 +j +j +1 |
| +j −1 +j −1 −1 +j −1 +j +1 +j +j +1 +j −1 +j −1 −1 +j −1 −1 +j −1 +1 −j +1 −j −1 −j +j +1 +j −j |
| −1 −j +j +1 +j +1 −j +1 −1 +j −1 +1 −j +1 +1 −j +1 +j +1 +j +j +1 +j +j +1 +j +j +1 +j |
| +1 −j +1 +1 −j +1 −1 +j −1 +1 −j +1 +j +1 +j −j −1 −j −j −1 −j +j +1 +j −1 +j −1 +1 −j +1 +1 |
| −j +1 +1 −j +1 −j −1 −j −j −1 −j |
| The Sequence $Seq^{6}_{left,\ 385}(k)$, to be transmitted from left to right, up to down |
| +j −1 +j −1 +j +1 +j −1 +j −1 +j +1 +j −j −1 −j −1 +j −1 −j −1 −j −1 +j −1 −1 +j −1 −j −1 −j −1 |
| +j −1 −j −1 −j +j +1 +j −1 +j −1 +j +1 +j −1 +j −1 −j −1 −j −1 +j −1 +j +1 +j +1 −j +1 +1 −j |
| +1 −j −1 −j −1 +j −1 +j +1 +j −j −1 −j +1 −j +1 +j +1 +j −1 +j −1 −1 +j −1 −j −1 −j +1 −j +1 +j |
| +1 +j −j +j +j −1 +1 +1 −j +j +j −1 +1 +1 +1 −1 −1 −j +j +j +1 −1 −1 −j +j +j −j +j +j +1 −1 |
| −1 −j +j +j +1 −1 −1 −1 +1 +1 −j +j +j −1 +1 +1 −j +j +j −1 +1 +1 +j −j −j +1 −1 −1 −j +j +j −j |
| +j +j −1 +1 +1 +j −j −j +1 −1 −1 −1 +1 +1 −j +j +j +1 −1 −1 +j −j −j +j −j −j −1 +1 +1 −j +j |
| +j +1 −1 −1 +1 −j +1 +j +1 +j −1 +j −1 −j −1 −j +j +1 +j −1 +j −1 −j −1 −j +1 −j +1 +1 −j +1 −j |
| −1 −j −1 +j −1 +j +1 +j −j −1 −j −1 +j −1 +j +1 +j +1 −j +1 +j +1 +j −1 +j −1 +j +1 +j −1 +j |
| −1 −1 +j −1 −j −1 −j −1 +j −1 −j −1 −j +j +1 +j +1 −j +1 +j +1 +j +1 −j +1 +1 −j +1 −j −1 −j +1 |
| −j +1 −j −1 −j +j −j −j −1 +1 +1 −j +j +j +1 −1 −1 −1 +1 +1 −j +j +j +1 −1 −1 +j −j −j +j −j −j |
| +1 −1 −1 −j +j +j −1 +1 +1 +1 −1 −1 −j +j +j −1 +1 +1 +j −j −j +1 −1 −1 +j −j −j +1 −1 −1 +j −j |
| −j +j −j −j −1 +1 +1 +j −j −j −1 +1 +1 +1 −1 −1 −j +j +j +1 −1 −1 −j +j +j −j +j +j −1 +1 +1 −j |
| +j +j −1 +1 +1 |

TABLE 5-continued

The sequence $Seq^{iTX}_{left,\ 385}(k)$

The Sequence $Seq^{7}_{left,\ 385}(k)$, to be transmitted from left to right, up to down −1 +1 −1 −1 +j −j −j +1 −1 −1 +j −j −j +1 −1 −1 −j +j +j +1 −1 −1 −j +j +j +j +1 +j −1 +j −1 +j
+1 +j −1 +j −1 +j +1 +j +1 −j +1 +j +1 +j +1 −j +1 +j −j −j −1 +1 +1 −j +j +j +1 −1 −1 +j −j
−j +1 −1 −1 −j +j +j −1 +1 +1 +1 −j +1 +j +1 +j −1 +j −1 −j −1 −j +1 −j +1 −j −1 −j −1 +j −1 +j
+1 +j −1 +1 +1 +j −j −j −1 +1 +1 +j −j −j −1 +1 +1 −j +j +j −1 +1 +1 −j +j +j −j −1 −j −1 +j −1
−j −1 −j −1 +j −1 −j −1 −j +1 −j +1 −j −1 −j +1 −j +1 −j +j +j −1 +1 +1 +j −j −j +1 −1 −1 −j +j
+j +1 −1 −1 +j −j −j −1 +1 +1 −1 +j −1 +j +1 +j +1 −j +1 −j −1 −j −1 +j −1 −j −1 −j +1 −j +1 +j
+1 +j +j −j −j −1 +1 +1 −j +j +j +1 −1 −1 −j +j +j −1 +1 +1 +j −j −j +1 −1 −1 −1 +j −1 −j −1 −j
+1 −j +1 +j +1 +j +1 −j +1 −j −1 −j −1 +j −1 +j +1 +j −1 +1 +1 −j +j +j −1 +1 +1 −j +j +j
+1 −1 −1 −j +j +j +1 −1 −1 −j +j +j +j +1 +j −1 +j −1 +j +1 +j −1 +j −1 −j −1 −j −1 +j −1 −j −1
−j −1 +j −1 −j +j +j −1 +1 +1 +j −j −j +1 −1 −1 +j −j −j −1 +1 +1 −j +j +j +1 −1 −1 +1 −j +1 −j
−1 −j −1 +j −1 +j +1 +j −1 +j −1 −j −1 −j +1 −j +1 +j +1 +j +1 −1 −1 −j +j +j +1 −1 −1 −j +j +j
−1 +1 +1 −j +j +j −1 +1 +1 −j +j +j −j −1 −j −1 +j −1 −j −1 −j −1 +j −1 +j +1 +j −1 +j −1 +j +1
+j −1 +j −1

The Sequence $Seq^{8}_{left,\ 385}(k)$, to be transmitted from left to right, up to down +1 +1 −j +1 −j −1 −j +1 −j +1 +j +1 +j −1 +1 +1 +j −j −j −1 +1 +1 −j +j +j −1 +j −1 −j −1 −j −1
+j −1 +j +1 +j +1 −1 −1 +j −j −j +1 −1 −1 −j +j +j −1 +j −1 +j +1 +j −1 +j −1 −j −1 −j +1 −1
−1 −j +j +j +1 −1 −1 +j −j −j +1 −j +1 +j +1 +j +1 −j +1 −j −1 −j −1 +1 +1 −j +j +j −1 +1 +1
+j −j −j −1 +j −1 +j +1 +j +1 −j +1 +j +1 +j −1 +1 +1 +j −j −j +1 −1 −1 +j −j −j +1 −j +1 +j
+1 +j −1 +j −1 +j +1 +j +1 −1 −1 +j −j −j −1 +1 +1 +j −j −j +1 −j +1 −j −1 −j −1 +j −1 −j −1 −j
+1 −1 −1 −j +j +j −1 +1 +1 −j +j +j −1 +j −1 −j −1 −j +1 −j +1 −j −1 −j −1 +1 +1 −j +j +j +1 −1
−1 −j +j +j −j −1 −j −1 +j −1 −j −1 −j +1 −j +1 +j −j −j +1 −1 −1 +j −j −j −1 +1 +1 −j −1 −j +1 −j
+1 −j −1 −j −1 +j −1 +j −j −1 +1 +1 +j −j +1 −1 −1 −j −1 −j −1 +j −1 −j −1 −j +1 −j +1 +j −j
−j +1 −1 −1 +j −j −j −1 +1 +1 −j −1 −j +1 −j +1 −j −1 −j −1 +j −1 +j −j −j −1 +1 +1 +j −j −j +1 −1
−1 +j +1 +j +1 −j +1 −j −1 −j +1 −j +1 +j −j −j +1 −1 −1 −j +j +j +1 −1 −1 +j +1 +j −1 +j −1
−j −1 −j −1 +j −1 +j −j −j −1 +1 +1 −j +j +j −1 +1 +1 +j +1 +j +1 −j +1 −j −1 −j +1 −j +1 +j −j
−j +1 −1 −1 −j +j +j +1 −1 −1 +j +1 +j −1 +j −1 −j −1 −j −1 +j −1 +j −j −j −1 +1 +1 −j +j +j −1
+1 +1

TABLE 6

The sequence $Seq^{iTX}_{right,\ 385}(k)$

The Sequence $Seq^{1}_{right,\ 385}(k)$, to be transmitted from left to right, up to down +1 −j +1 −1 −1 +1 −j −1 −j −j −j +j +j +1 +j −j −j +j −1 +j −1 −1 −1 +1 +1 −j +1 −1 −1 +1 −j −1
−j −j −j +j −j −1 −j +j +j −j +1 −j +1 +1 +1 −1 −1 +j −1 +1 +1 −1 +j +1 +j +j +j −j −j −1 −j +j
+j −j +1 −j +1 +1 +1 −1 +1 −j +1 −1 −1 +1 −j −1 −j −j −j +j −j −1 −j +j +j −j +1 −j +1 +1 +1 −1
+1 −j +1 −1 −1 +1 −j −1 −j −j −j +j +j +1 +j −j −j +j −1 +j −1 −1 −1 +1 +1 −j +1 −1 −1 +1 −j −1
−j −j −j +j −j −1 −j +j +j −j +1 −j +1 +1 +1 −1 +1 −j +1 −1 −1 +1 −j −1 −j −j −j +j +j +1 +j −j −j
+j −1 +j −1 −1 −1 +1 −1 +j −1 +1 +1 −1 +j +1 +j +j +j −j +j +1 +j −j −j +j −1 +j −1 −1 −1 +1
−j −1 −j +j +j −j −1 +j −1 −1 −1 +1 +1 −j +1 −1 −1 +1 +j +1 +j +j +j −j −j −1 −j +j +j −j −1 +j −1
−1 −1 +1 −1 +j −1 +1 +1 −1 −j −1 −j −j −j +j +j +1 +j −j −j +j +1 −j +1 +1 +1 −1 −1 +j −1
+1 +1 −1 −j −1 −j −j −j +j −j −1 −j +j +j −j −1 +j −1 −1 −1 +1 −1 +j −1 +1 +1 −1 −j −1 −j −j −j +j
+j +1 +j −j −j +j +1 −j +1 +1 +1 −1 −1 +j −1 +1 +1 −1 −j −1 −j −j −j +j +j +1 +j −j −j +j +1 −j
+1 +1 +1 −1 +1 −j +1 −1 −1 +1 +j +1 +j +j +j −j +j +1 +j −j −j +j +1 −j +1 +1 +1 −1 −1 +j −1
+1 +1 −1 −j −1 −j −j −j +j −j −1 −j +j +j −j −1 +j −1 −1 −1 +1 −1 +j −1 +1 +1 −1 −j −1 −j −j −j
+j +j The Sequence $Seq^{2}_{right,\ 385}(k)$, to be transmitted from left to right, up to down −1 +1 +1 +1 −j +1 +j −j −j −j −1 −j −j +j +j −j −1 −j +1 −1 −1 +1 −j +1 +1 −1 −1 −1 +j −1 −j +j
+j +j +1 +j +j −j −j +j +1 +j −1 +1 +1 −1 +j −1 +1 −1 −1 −1 +j −1 −j +j +j +j +1 +j +j −j −j
+j +1 +j −1 +1 +1 −1 +j −1 +1 −1 −1 −1 +j −1 −j +j +j +j +1 +j +j −j −j +j +1 +j −1 +1 +1 −1
+j −1 −1 +1 +1 +1 −j +1 +j −j −j −j −1 −j −j +j +j −j −1 −j +1 −1 −1 +1 −j +1 −1 +1 +1 +1 −j
+1 +j −j −j −j −1 −j −j +j +j −j −1 −j +1 −1 −1 +1 −j +1 +1 −1 −1 −1 +j −1 −j +j +j +j +1 +j +j −j
−j +j +1 +j −1 +1 +1 −1 +j −1 −1 +1 +1 +1 −j +1 +j −j −j −j −1 −j −j +j +j −j −1 −j +1 −1 −1
+1 −j +1 −j +j +j +j +1 +j +1 −1 −1 −1 +j −1 +1 −1 −1 +1 −j +1 −j +j +j −j −1 −j +j −j −j −j −1
−j −1 +1 +1 +1 −j +1 −1 +1 +1 −1 +j −1 +j −j −j +j +1 +j +j −j −j −j −1 −j −1 +1 +1 +1 −j +1 −1
+1 +1 −1 +j −1 +j −j −j +j +1 +j +j −j −j −j −1 −j −1 +1 +1 +1 −j +1 −1 +1 +1 −1 +j −1 +j −j
−j +j +1 +j +j −j −j −j −1 −j −1 +1 +1 +1 −j +1 −1 +1 +1 −1 +j −1 +j −j −j +j +1 +j +j −j −j −j −1
−j −1 +1 +1 +1 −j +1 −1 +1 +1 −1 +j −1 +j −j −j +j +1 +j −j +j +j +j +1 +j +1 −1 −1 −1 +j
−1 +1 −1 −1 +1 −j +1 −j +j +j −j −1 −j +j −j −j −j −1 −j −1 +1 +1 +1 −j +1 −1 +1 +1 −1 +j −1 +j
−j −j +j +1 +j −j The Sequence $Seq^{3}_{right,\ 385}(k)$, to be transmitted from left to right, up to down +1 −j +1 +1 −j +1 −j −1 −j −j −1 −j −1 +j −1 −1 +j −1 −j −1 −j −j −1 −j −1 +j −1 −1 +j −1 −j −1 −j −j
−1 −j +1 −j +1 +1 −j +1 −j −1 −j −j −1 −j −1 −1 +1 −1 −1 +1 +j +j −j +j +j −j −1 −1 +1 −1 −1
+1 −j −j +j −j −j +j +1 +1 −1 +1 +1 −1 +j +j −j +j +j −j +1 +1 −1 +1 +1 −1 −j −j +j −j −j +j −j
−1 −j −j −1 −j −1 +j −1 −1 +j −1 +j +1 +j +j +1 +j −1 +j −1 −1 +j −1 −j −1 −j −j −1 −j +1 −j +1
+1 −j +1 +j +1 +j +j +1 +j +1 −j +1 +1 −j +1 +j +j −j +j +j −j +1 +1 −1 +1 +1 −1 +j +j −j
+j +j −j −1 −1 +1 −1 −1 +1 +j +j −j +j +j −j −1 −1 +1 −1 −1 +1 +j +j −j +j +j −j +1 +1 −1 +1
+1 −1 −j −1 −j +j +1 +j −1 +j −1 +1 −j +1 +j +1 +j −j −1 −j −1 +j −1 +1 −j +1 +j +1 +j −j −1 −j
−1 +j −1 +1 −j +1 −j −1 −j +j +1 +j −1 +j −1 +1 −j +1 +j +j −j −j −j +j +1 +1 −1 −1 −1 +1 +j TABLE 6-continued

| The sequence $Seq^{iTX}_{right,\ 385}(k)$ |
|---|
| +j −j −j −j +j −1 −1 +1 +1 +1 −1 −j −j +j +j +j −j +1 +1 −1 −1 −1 +1 −j −j +j +j +j −j −1 −1 +1<br>+1 +1 −1 +1 −j +1 −1 +j −1 −j −1 −j +j +1 +j −1 +j −1 +1 −j +1 −j −1 −j +j +1 +j +1 −j +1 −1<br>+j −1 +j +1 +j −j −1 −j −1 +j −1 +1 −j +1 +j +1 +j −j −1 −j −1 −1 +1 +1 +1 −1 +j +j −j −j −j +j<br>−1 −1 +1 +1 +1 −1 −j −j +j +j +j −j −1 −1 +1 +1 +1 −1 −j −j +j +j +j −j −1 −1 +1 +1 +1 −1 +j<br>+j −j −j −j +j +j |
| The Sequence $Seq^{4}_{right,\ 385}(k)$, to be transmitted from left to right, up to down |
| +1 −j +1 −j −1 −j −1 −1 +1 +j +j −j −j −1 −j +1 −j +1 +j +j −j −1 −1 +1 −1 +j −1 +j +1 +j +1<br>+1 −1 −j −j +j +j +1 +j −1 +j −1 −j −j +j +1 +1 −1 +j +1 +j +1 −j +1 +j +j −j +1 +1 −1 +1 −j<br>+1 +j +1 +j +1 +1 −1 +j +j −j −j −1 −j −1 +j −1 −j −j +j −1 −1 +1 −1 +j −1 −j −1 −j −1 −1 +1 −j<br>−j +j +1 −j +1 −j −1 −j −1 −1 +1 +j +j −j −j −1 −j +1 −j +1 +j +j −j −1 −1 +1 +1 −j +1 −j −1 −j −1<br>−1 +1 +j +j −j −j −1 −j +1 −j +1 +j +j −j −1 −1 +1 −j −1 −j −1 +j −1 −j −j +j −1 −1 +1 −1 +j −1<br>−j −1 −j −1 −1 +1 −j −j +j −j −1 −j −1 +j −1 −j −j +j −1 −1 +1 −1 +j −1 −j −1 −j −1 −1 +1 −j −j +j −j<br>−1 −j +1 −j +1 +j +j −j −1 −1 +1 −1 +j −1 +j +1 +j +1 +1 −1 −j −j +j −j −1 −j +1 −j +1 +j +j −j<br>−1 −1 +1 −1 +j −1 +j +1 +j +1 +1 −1 −j −j +j +1 −j +1 +j +1 +j +1 +1 −1 +j +j −j −j −1 −j −1<br>+j −1 −j −j +j −1 −1 +1 +1 −j +1 +j +1 +j +1 +1 −1 +j +j −j −j −1 −j −1 +j −1 −j −j +j −1 −1 +1<br>−j −1 −j +1 −j +1 +j +j −j −1 −1 +1 −1 +j −1 +j +1 +j +1 +1 −1 −j −j +j +j +1 +j −1 +j −1 −j −j<br>+j +1 +1 −1 +1 −j +1 −j −1 −j −1 −1 +1 +j +j −j −1 +j −1 −j −1 −j −1 −1 +1 −j −j +j +j +1 +j +1<br>−j +1 +j +j −j +1 +1 −1 +1 −j +1 +j +1 +j +1 +1 −1 +j +j −j −j −1 −j −1 +j −1 −j −j +j −1 −1<br>+1 −j |
| The Sequence $Seq^{5}_{right,\ 385}(k)$, to be transmitted from left to right, up to down |
| +1 −1 −1 +1 −1 −1 −j +j +j −j +j +j −j +j +j +j −j −j −1 +1 +1 +1 −1 −1 +1 −1 −1 −1 +1 +1 −j<br>+j +j +j −j −j −j +j +j −j +j +j −1 +1 +1 −1 +1 +1 −1 +1 +1 −1 +1 +1 −j +j +j −j +j +j +j −j −j<br>−j +j +j −1 +1 +1 +1 −1 −1 −1 +1 +1 +1 −1 −1 −j +j +j +j −j −j +j −j −j +j −j −j −1 +1 +1 −1<br>+1 +1 +j −j −j +j −j −j −1 +1 +1 −1 +1 +1 +1 −1 −1 −1 +1 +1 +j −j −j −j +j +j −j +j +j +j −j −j<br>+1 −1 −1 −1 +1 +1 −1 +1 +1 −1 +1 +1 −j +j +j −j +j +j −j +j +j −j +j +j −1 +1 +1 −1 +1 +1 −1<br>+1 +1 +1 −1 −1 +j −j −j −j +j +j +j −j −j −j +j +j +1 −1 −1 −1 +1 +1 +1 −1 −1 +1 −1 −1 −j +j<br>+j −j +j +j −1 +j −1 −1 +j −1 +j +1 +j +j +1 +j +j +1 +j −j −1 −j +1 −j +1 −1 +j −1 −1 +j −1<br>+1 −j +1 +j +1 +j −j −1 −j +j +1 +j +j +1 +j +1 −j +1 +1 −j +1 −1 +j −1 −1 +j −1 −j −1 −j −j −1<br>−j +j +1 +j −j −1 −j −1 +j −1 +1 −j +1 −1 +j −1 +1 −j +1 −j −1 −j +j +1 +j +j +1 +j +j +1 +j<br>−1 +j −1 −1 +j −1 −j −1 −j −j −1 −j +1 −j +1 +1 −j +1 −1 +j −1 +1 −j +1 −j −1 −j +j +1 +j +j +1<br>+j −j −1 −j −1 +j −1 +1 −j +1 +1 −j +1 +1 −j +1 +j +1 +j +j +1 +j −j −1 −j −j −1 −j −1 +j −1 −1<br>+j −1 −1 +j −1 +1 −j +1 +j +1 +j −j −1 −j +j +1 +j −j −1 −j +1 −j +1 −1 +j −1 +1 −j +1 +1 −j<br>+1 −j −1 −j −j −1 −j −j |
| The Sequence $Seq^{6}_{right,\ 385}(k)$, to be transmitted from left to right, up to down |
| +1 −j +1 −j −1 −j +1 −j +1 −j −1 −j −j −1 −j −1 +j −1 −j −1 −j −1 +j −1 +1 −j +1 +j +1 +j +1 −j<br>+1 +j +1 +j +j +1 +j −1 +j −1 +j +1 +j −1 +j −1 +j +1 +j +1 −j +1 −j −1 −j −1 +j −1 +1 −j<br>+1 −j −1 −j −1 +j −1 +j +1 +j +j +1 +j −1 +j −1 −j −1 −j +1 −j +1 −1 +j −1 −j −1 −j +1 −j +1 +j<br>+1 +j +j −j −j +1 −1 −1 +j −j −j +1 −1 −1 +1 −1 −1 −j +j +j +1 −1 −1 −j +j +j +j −j −j −1 +1 +1<br>+j −j −j −1 +1 +1 −1 +1 +1 −j +j +j −1 +1 +1 −j +j +j +1 −1 −1 −j +j +j −1 +1 +1 +j −j −j −j<br>+j +j −1 +1 +1 +j −j −j +1 −1 −1 +1 −1 −1 +j −j −j −1 +1 +1 −j +j +j +j −j −j −1 +1 +1 −j +j +j<br>+1 −1 −1 −1 +j −1 −j −1 −j +1 −j +1 +j +1 +j +j +1 +j −1 +j −1 −j −1 −j +1 −j +1 −1 +j −1 +j<br>+1 +j +1 −j +1 −j −1 −j −j −1 −j −1 +j −1 +j +1 +j +1 −j +1 −j −1 −j +1 −j +1 −j −1 −j +1 −j +1<br>−1 +j −1 −j −1 −j −1 +j −1 −j −1 −j −j −1 −j −1 +j −1 −j −1 −j −1 +j −1 +1 −j +1 −j −1 −j +1 −j +1 −j<br>−1 −j −j +j +j +1 −1 −1 +j −j −j −1 +1 +1 −1 +1 +1 −j +j +j +1 −1 −1 +j −j −j −j +j +j −1 +1<br>+1 +j −j −j +1 −1 −1 +1 −1 −1 −j +j +j −1 +1 +1 +j −j −j −1 +1 +1 −j +j +j −1 +1 +1 −j +j +j<br>+j −j −j −1 +1 +1 +j −j −j −1 +1 +1 −1 +1 +1 +j −j −j −1 +1 +1 +j −j −j −j +j +j −1 +1 +1 −j +j<br>+j −1 +1 +1 −j |
| The Sequence $Seq^{7}_{right,\ 385}(k)$, to be transmitted from left to right, up to down |
| −1 +1 +1 −j +j +j −1 +1 +1 −j +j +j −1 +1 +1 +j −j −j −1 +1 +1 +j −j −j −j −1 −j +1 −j +1 −j −1<br>−j +1 −j +1 −j −1 −j −1 +j −1 −j −1 −j −1 +j −1 −j +j +j +1 −1 −1 +j −j −j −1 +1 +1 −j +j +j −1<br>+1 +1 +j −j −j +1 −1 −1 −1 +j −1 −j −1 −j +1 −j +1 +j +1 +j −1 +j −1 +j +1 +j +1 −j +1 −j −1 −j<br>−1 +1 +1 +j −j −j −1 +1 +1 +j −j −j −1 +1 +1 −j +j +j −1 +1 +1 −j +j +j −j −1 −j −1 +j −1 −j −1<br>−j −1 +j −1 −j −1 −j +1 −j +1 −j −1 −j +1 −j +1 −j +j +j −1 +1 +1 +j −j −j +1 −1 −1 −j +j +j<br>+1 −1 −1 +j −j −j −1 +1 +1 −1 +j −1 +j +1 +j +1 −j +1 −j −1 −j −1 +j −1 −j −1 −j +1 −j +1 +j<br>+1 +j −j +j +j +1 −1 −1 +j −j −j −1 +1 +1 +j −j −j +1 −1 −1 −j +j +j −1 +1 +1 +1 −j +1 +j +1<br>+j −1 +j −1 −j −1 −j −1 +j −1 +j +1 +j +1 −j +1 −j −1 −j +1 −1 −1 +j −j −j +1 −1 −1 +j −j −j −1<br>+1 +1 +j −j −j −1 +1 +1 +j −j −j −j −1 −j +1 −j +1 −j −1 −j +1 −j +1 +j +1 +j +1 −j +1 +j +1<br>+j +1 −j +1 −j +j +j −1 +1 +1 +j −j −j +1 −1 −1 +j −j −j −1 +1 +1 −j +j +j +1 −1 −1 +1 −j +1 −j<br>−1 −j −1 +j −1 +j +1 +j −1 +j −1 −j −1 −j +1 −j +1 +j +1 +j +1 −1 −1 −j +j +j +1 −1 −1 −j +j<br>+j −1 +1 +1 −j +j +j −1 +1 +1 −j +j +j −j −1 −j −1 +j −1 −j −1 −j −1 +j −1 +j +1 +j −1 +j −1 +j<br>+1 +j −1 +j −1 +1 |
| The Sequence $Seq^{8}_{right,\ 385}(k)$, to be transmitted from left to right, up to down |
| −1 +j −1 +j +1 +j −1 +j −1 −j −1 −j +1 −1 −1 −j +j +j +1 −1 −1 +j −j −j +1 −j +1 +j +1 +j +1 −j<br>+1 −j −1 −j −1 +1 +1 −j +j +j −1 +1 +1 +j −j −j −1 +j −1 +j +1 +j −1 +j −1 −j −1 −j +1 −1 −1 −j<br>+j +j +1 −1 −1 +j −j −j +1 −j +1 +j +1 +j +1 −j +1 −j −1 −j −1 +1 +1 −j +j +j −1 +1 +1 +j −j −j<br>+1 −j +1 −j −1 −j −1 +j −1 −j −1 −j +1 −1 −1 −j +j +j −1 +1 +1 −j +j +j −1 +j −1 −j −1 −j +1 −j<br>+1 −j −1 −j −1 +1 +1 −j +j +j +1 −1 −1 −j +j +j +1 −j +1 −j −1 −j −1 +j −1 −j −1 −j +1 −1 −1 −j<br>+j +j −1 +1 +1 −j +j +j −1 +j −1 −j −1 −j +1 −j +1 −j −1 −j −1 +1 +1 −j +j +j +1 −1 −1 −j +j +j<br>+j +1 +j +1 −j +1 +j +1 +j −1 +j −1 −j +j +j −1 +1 +1 −j +j +j +1 −1 −1 +j +1 +j −1 +j −1<br>+j +1 +j +1 −j +1 −j +j +j +1 −1 −1 −j +j +j −1 +1 +1 −j −1 −j −1 +j −1 −j −1 −j +1 −j +1 +j −j<br>−j +1 −1 −1 +j −j −j −1 +1 +1 −j −1 −j +1 −j +1 −j −1 −j −1 +j −1 +j −j −j −1 +1 +1 +j −j −j +1 −1<br>−1 −j −1 −j −1 +j −1 +j +1 +j −1 +j −1 −j +j +j −1 +1 +1 +j −j −j −1 +1 +1 −j −1 −j +1 −j +1 |

TABLE 6-continued

| The sequence $Seq^{iTX}_{right,\ 385}(k)$ |
| --- |
| +j +1 +j +1 −j +1 −j +j +j +1 −1 −1 +j −j −j +1 −1 −1 +j +1 +j +1 −j +1 −j −1 −j +1 −j +1 +j −j<br>−j +1 −1 −1 −j +j +j +1 −1 −1 +j +1 +j −1 +j −1 −j −1 −j −1 +j −1 +j −j −j −1 +1 +1 −j +j +j −1<br>+1 +1 +1 |

TABLE 7

| The sequence $Seq^{iTX}_{left,\ 595}(k)$ |
| --- |
| The Sequence $Seq^{1}_{left,\ 595}(k)$, to be transmitted from left to right, up to down |
| +j +1 −1 +j +1 +j −j −1 −1 +j +j −1 −1 +1 +1 +1 −j −j −1 +1 −j +1 −1 −1 +1 −j −1 −j −j −j +j +j<br>+1 +j −j −j +j −1 +j −1 −1 −1 +1 +1 −j +1 −1 −1 +1 −j −1 −j −j −j +j −j −1 −j +j +j −j +1 −j +1<br>+1 +1 −1 −1 +j −1 +1 +1 −1 +j +1 +j +j +j −j −j −1 −j +j +j −j +1 −j +1 +1 +1 −1 +1 −j +1 −1<br>−1 +1 −j −1 −j −j −j +j −j −1 −j +j +j −j +1 −j +1 +1 +1 −1 −j −1 −j +j +j −j −1 +j −1 −1 −1 +1<br>+1 −j +1 −1 −1 +1 +j +1 +j +j +j −j −j −1 −j +j +j −j −1 +j −1 −1 −1 +1 −1 +j −1 +1 +1 −1 −j −1<br>−j −j −j +j −j −1 −j +j +j −j −1 +j −1 −1 −1 +1 +1 −j +1 −1 −1 +1 +j +1 +j +j +j −j +j +1 +j −j<br>−j +j +1 −j +1 +1 +1 −1 +1 −j +1 −1 −1 +1 +j +1 +j +j +j −j +1 −j +1 −1 −1 +1 −j −1 −j −j −j<br>+j +j +1 +j −j −j +j −1 +j −1 −1 −1 +1 +1 −j +1 −1 −1 +1 −j −1 −j −j −j +j −j −1 −j +j +j −j +1 −j<br>+1 +1 +1 −1 −1 +j −1 +1 +1 −1 +j +1 +j +j +j −j −j −1 −j +j +j −j +1 −j +1 +1 +1 −1 +1 −j<br>+1 −1 −1 +1 −j −1 −j −j −j +j −j −1 −j +j +j −j +1 −j +1 +1 +1 −1 −j −1 −j +j +j −j −1 +j −1 −1 −1<br>+1 +1 −j +1 −1 −1 +1 +j +1 +j +j +j −j −j −1 −j +j +j −j −1 +j −1 −1 −1 +1 −1 +j −1 +1 +1 −1<br>−j −1 −j −j −j +j −j −1 −j +j +j −j −1 +j −1 −1 −1 +1 +1 −j +1 −1 −1 +1 +j +1 +j +j +j −j +j +1<br>+j −j −j +j +1 −j +1 +1 +1 −1 +1 −j +1 −1 −1 +1 +j +1 +j +j +j −j −1 +j −1 +1 +1 −1 +j +1<br>+j +j +j −j −j −1 −j +j +j −j +1 −j +1 +1 +1 −1 −1 +j −1 +1 +1 −1 +j +1 +j +j +j −j +j +1 +j −j<br>−j +j −1 +j −1 −1 −1 +1 +1 −j +1 −1 −1 +1 −j −1 −j −j −j +j +j +1 +j −j −j +j −1 +j −1 −1 −1 +1<br>−1 +j −1 +1 +1 −1 +j +1 +j +j +j −j +j +1 +j −j −j +j −1 +j −1 −1 −1 +1 +j +1 +j −j −j +j +1 −j<br>+1 +1 +1 −1 −1 +j −1 +1 +1 −1 −j −1 −j −j −j +j +j +1 +j −j −j +j +1 −j +1 +1 +1 −1 +1 −j<br>+1 −1 −1 +1 +j +1 +j +j +j −j +j +1 +j −j −j +j +1 −j +1 +1 +1 −1 −1 +j −1 +1 +1 −1 −j −1 −j<br>−j −j +j −j −1 −j +j +j −j −1 +j −1 −1 −1 +1 −1 +j −1 +1 +1 −1 −j −1 −j −j −j +j |
| The Sequence $Seq^{2}_{left,\ 595}(k)$, to be transmitted from left to right, up to down |
| −1 +1 −j +1 −j −1 +j +j +j −1 −1 +1 −1 −1 +j +1 +j −j −1 +1 −j +1 −1 +j −1 +1 −j +1 +1 −j +1<br>+1 −j +1 −1 +j −1 −1 +j −1 −1 +j −1 −j −1 −j +j +1 +j −j −1 −j −j −1 −j +j +1 +j −j −1 −j −j −1 −j<br>−j −1 −j −1 +j −1 +1 −j +1 −1 +j −1 −1 +j −1 −1 +j −1 +1 −j +1 +1 −j +1 +1 −j +1 −j −1 −j +j<br>+1 +j −j −1 −j −j −1 −j +j +1 +j −j −1 −j −j −1 −j −j −1 −j +j +j −j −j −j +j +j +j −j +j +j −j +j +j −j<br>−j −j +j −j −j +j −j −j +j +1 +1 −1 −1 −1 +1 +1 +1 −1 +1 +1 −1 −1 −1 +1 +1 +1 −1 +1 +1 −1<br>+1 +1 −1 +j +j −j −j −j +j +j +j −j +j +j −j +j +j −j −j −j +j −j −j +j −j −j +j −1 −1 +1 +1 +1 −1<br>−1 −1 +1 −1 −1 +1 +1 +1 −1 −1 −1 +1 −1 −1 +1 −1 −1 +1 +1 −j +1 −1 +j −1 +1 −j +1 +1 −j +1<br>+1 −j +1 −1 +j −1 −1 +j −1 −1 +j −1 −j −1 −j +j +1 +j −j −1 −j −j −1 −j +j +1 +j −j −1 −j −j −1 −j<br>−j −1 −j −1 +j −1 +1 −j +1 −1 +j −1 −1 +j −1 −1 +j −1 +1 −j +1 +1 −j +1 +1 −j +1 −j −1 −j +j<br>+1 +j −j −1 −j −j −1 −j +j +1 +j −j −1 −j −j −1 −j −j −1 −j +j +j −j −j −j +j +j +j −j +j +j −j +j +j −j<br>−j −j +j −j −j +j −j −j +j +1 +1 −1 −1 −1 +1 +1 +1 −1 +1 +1 −1 −1 −1 +1 +1 +1 −1 +1 +1 −1<br>+1 +1 −1 +j +j −j −j −j +j +j +j −j +j +j −j +j +j −j −j −j +j −j −j +j −j −j +j −1 −1 +1 +1 +1 −1<br>−1 −1 +1 −1 −1 +1 +1 +1 −1 −1 −1 +1 −1 −1 +1 −1 −1 +1 −1 −1 +1 −1 +j −1 +1 −j +1 −1 +j −1 −1 +j −1<br>−1 +j −1 +1 −j +1 +1 −j +1 +1 −j +1 +j +1 +j −j −1 −j +j +1 +j +j +1 +j −j −1 −j +j +1 +j +j<br>+1 +j +j +1 +j +1 −j +1 −1 +j −1 +1 −j +1 +1 −j +1 +1 −j +1 −1 +j −1 −1 +j −1 −1 +j −1 +j<br>+1 +j −j −1 −j +j +1 +j +j +1 +j −j −1 −j +j +1 +j +j +1 +j +j +1 +j −j −j +j +j +j −j −j −j +j −j<br>−j +j −j −j +j +j +j −j +j +j −j +j +j −j −1 −1 +1 +1 +1 −1 −1 −1 +1 −1 −1 +1 +1 +1 −1 −1 −1<br>+1 −1 −1 +1 −1 −1 +1 −j −j +j +j +j −j −j −j +j −j −j +j −j −j +j +j +j −j +j +j −j +j +j −j +1 +1<br>−1 −1 −1 +1 +1 +1 −1 +1 +1 −1 −1 −1 +1 +1 +1 −1 +1 +1 −1 +1 +1 −1 |
| The Sequence $Seq^{3}_{left,\ 595}(k)$, to be transmitted from left to right, up to down |
| −j −j −j −j −j +j −j +1 −j −j −j +j +j +j +1 −1 +j −1 +1 +1 −j +1 +j +1 +j +1 −j +1 −j −1 −j −j −1<br>−j −1 +j −1 −j −1 −j +1 −j +1 −1 +j −1 −j −1 −j −1 +j −1 +j +1 +j −j −1 −j −1 +j −1 −j −1 −j +1 −j<br>+1 −1 −1 +1 −j −j +j −1 −1 +1 +j +j −j +j +j −j +1 +1 −1 +j +j −j −1 −1 +1 −1 −1 +1 −j −j +j −1<br>−1 +1 +j +j −j −j −j +j −1 −1 +1 −j −j +j +1 +1 −1 +j +1 +j −1 +j −1 −j −1 −j −1 +j −1 +1 −j +1<br>−j −1 −j −1 +j −1 −j −1 −j −j −1 −j +1 −j +1 +j +1 +j +1 −j +1 +1 −j +1 −j −1 −j −1 +j −1 −j −1 −j<br>−j −j +j +1 +1 −1 +j +j −j +1 +1 −1 −1 −1 +1 +j +j −j +1 +1 −1 +j +j −j −j −j +j +1 +1 −1 +j<br>+j −j +1 +1 −1 +1 +1 −1 −j −j +j −1 −1 +1 −j −j +j +j +1 +j −1 +j −1 +j +1 +j +1 −j +1 +1 −j<br>+1 −j −1 −j +1 −j +1 +j +1 +j −j −1 −j +1 −j +1 −j −1 −j −1 +j −1 +1 −j +1 −j −1 −j +1 −j +1 +j<br>+1 +j −j −j +j +1 +1 −1 −j −j +j −1 −1 +1 −1 −1 +1 +j +j −j −1 −1 +1 −j −j +j −j −j +j +1 +1 −1<br>−j −j +j −1 −1 +1 +1 +1 −1 −j −j +j +1 +1 −1 +j +j −j −1 +j −1 −j −1 −j +1 −j +1 −j −1 −j +j +1<br>+j +1 −j +1 −j −1 −j +1 −j +1 +1 −j +1 +j +1 +j −1 +j −1 +j +1 +j +j +1 +j +1 −j +1 −j −1 −j<br>+1 −j +1 +1 +1 −1 +j +j −j −1 −1 +1 +j +j −j −j −j +j −1 −1 +1 +j +j −j −1 −1 +1 +1 +1 −1 +j<br>+j −j −1 −1 +1 +j +j −j +j +j −j +1 +1 −1 −j −j +j +1 +1 −1 +1 −j +1 +j +1 +j +1 −j +1 −j −1 −j<br>−j −1 −j −1 +j −1 −j −1 −j +1 −j +1 −1 +j −1 −j −1 −j −1 +j −1 +j +1 +j −j −1 −j −1 +j −1 −j −1 −j<br>+1 −j +1 −1 −1 +1 −j −j +j −1 −1 +1 +j +j −j +j +j −j +1 +1 −1 +j +j −j −1 −1 +1 −1 −1 +1 −j −j<br>+j −1 −1 +1 +j +j −j −j −j +j −1 −1 +1 −j −j +j +1 +1 −1 +j +1 +j −1 +j −1 −j −1 −j −1 +j −1 +1<br>−j +1 −j −1 −j −1 +j −1 −j −1 −j −j −1 −j +1 −j +1 +j +1 +j +1 −j +1 +1 −j +1 −j −1 −j −1 +j −1 −j<br>−1 −j −j −j +j +1 +1 −1 +j +j −j +1 +1 −1 −1 −1 +1 +j +j −j +1 +1 −1 +j +j −j −j −j +j +1 +1 −1<br>+j +j −j +1 +1 −1 +1 +1 −1 −j −j +j −1 −1 +1 −j −j +j |
| The Sequence $Seq^{4}_{left,\ 595}(k)$, to be transmitted from left to right, up to down |
| +1 +1 +1 −1 −j −1 +1 −1 −j −1 −j −j −1 −j +j +1 +j −1 +1 +1 −j +1 +j +1 +j +j +1 +j +1 −j +1<br>+1 +1 −1 +j +j −j +j +j −j +1 +1 −1 +j +1 +j +1 −j +1 −1 +j −1 −j −1 −j −j −j +j −1 −1 +1 +1 |

TABLE 7-continued

The sequence $Seq^{iTX}_{left,\ 595}(k)$

+1 −1 +j +j −j −1 +j −1 −j −1 −j −j −1 −j −1 +j −1 −1 −1 +1 −j −j +j −j −j +j −1 −1 +1 −j −1 −j −1
+j −1 +1 −j +1 +j +1 +j +j +j −j +1 +1 −1 −1 −1 +1 −j −j +j +1 −j +1 +j +1 +j −j −1 −j −1 +j −1
+1 +1 −1 +j +j −j −j −j +j −1 −1 +1 +j +1 +j +1 −j +1 +1 −j +1 +j +1 +j −j −j +j −1 −1 +1 −1
−1 +1 −j −j +j +1 −j +1 +j +1 +j −j −1 −j −1 +j −1 +1 +1 −1 +j +j −j −j −j +j −1 −1 +1 +j +1
+j +1 −j +1 +1 −j +1 +j +1 +j −j −j +j −1 −1 +1 −1 −1 +1 −j −j +j +j +1 +j −1 +j −1 −1 +j −1
+j +1 +j +j +j −j −1 −1 +1 −1 −1 +1 +j +j −j −1 +j −1 +j +1 +j −j −1 −j +1 −j +1 +1 +1 −1 −j −j
+j +j +j −j −1 −1 +1 −j −1 −j +1 −j +1 +1 −j +1 −j −1 −j −j −j +j +1 +1 −1 +1 +1 −1 −j −j +j
+1 −j +1 −j −1 −j +j +1 +j −1 +j −1 −1 −1 +1 +j +j −j −j −j +j +1 +1 −1 +j +1 +j −1 +j −1 +1 −j
+1 −j −1 −j +j +j −j −1 −1 +1 +1 +1 −1 −j −j +j −1 +j −1 +j +1 +j +j +1 +j −1 +j −1 +1 +1 −1
−j −j +j −j −j +j +1 +1 −1 +j +1 +j −1 +j −1 +1 −j +1 −j −1 −j +j +j −j −1 −1 +1 +1 +1 −1 −j −j
+j −1 +j −1 +j +1 +j +j +1 +j −1 +j −1 +1 +1 −1 −j −j +j −j −j +j +1 +1 −1 +1 −j +1 +j +1
+j +j +1 +j +1 −j +1 +1 +1 −1 +j +j −j +j +j −j +1 +1 −1 +j +1 +j +1 −j +1 −1 +j −1 −j −1 −j
−j −j +j −1 −1 +1 +1 +1 −1 +j +j −j −1 +j −1 −j −1 −j −j −1 −j −1 +j −1 −1 −1 +1 −j −j +j −j −j +j
−1 −1 +1 −j −1 −j −1 +j −1 +1 −j +1 +j +1 +j +j +j −j +1 +1 −1 −1 −1 +1 −j −j +j +1 −j +1 +j
+1 +j −j −1 −j −1 +j −1 +1 +1 −1 +j +j −j −j −j +j −1 −1 +1 +j +1 +j +1 −j +1 +1 −j +1 +j +1
+j −j −j +j −1 −1 +1 −1 −1 +1 −j −j +j +1 −j +1 +j +1 +j −j −1 −j −1 +j −1 +1 +1 −1 +j +j −j −j
−j +j −1 −1 +1 +j +1 +j +1 −j +1 +1 −j +1 +j +1 +j −j −j +j −1 −1 +1 −1 −1 +1 −j −j +j

The Sequence $Seq^{5}_{left,\ 595}(k)$, to be transmitted from left to right, up to down +1 −j +1 −1 +1 −j −j −1 −j +j −1 +j +1 +1 +j +1 −j +1 +1 +1 −1 −1 +1 −1 −1 +1 −1 −1 −1 +1
+1 +j −j −j +j −j −j +j −j −j −j +j +j −j −1 −j −j −1 −j +j +1 +j −j −1 −j +1 −j +1 +1 −j +1 −1 +j −1
+1 −j +1 −j +j +j −j +j +j −j +j +j +j −j −j −1 +1 +1 −1 +1 +1 −1 +1 +1 +1 −1 −1 −1 +j −1 −1
+j −1 +1 −j +1 −1 +j −1 +j +1 +j +j +1 +j −j −1 −j +j +1 −j −1 +j +1 +1 +1 −1 −1 −1 +1 +1 −1
+1 +1 −j +j +j +j −j −j −j +j +j −j +j +j +j +1 +j −j −1 −j −j −1 −j −j −1 −j −1 +j −1 +1 −j +1
+1 −j +1 +1 −j +1 −j +j +j +j −j −j −j +j +j −j +j +j −1 +1 +1 +1 −1 −1 −1 +1 +1 −1 +1 +1 −1
+j −1 +1 −j +1 +1 −j +1 +1 −j +1 +j +1 +j −j −1 −j −j −1 −j −j −1 −j +j −j −j +j −j −j +j −j −j −j
+j +j −1 +1 +1 −1 +1 +1 −1 +1 +1 +1 −1 −1 +1 −j +1 +1 −j +1 −1 +j −1 +1 −j +1 +j +1 +j
+j +1 +j −j −1 −j +j +1 +j +1 −1 −1 +1 −1 −1 +1 −1 −1 −1 +1 +1 −j +j +j −j +j +j −j +j +j +j −j
−j −j −1 −j −j −1 −j +j +1 +j −j −1 −j −1 +j −1 +j −1 +1 −j +1 −1 +j −1 −j +j +j +j −j −j −j +j
+j −j +j +j +1 −1 −1 −1 +1 +1 +1 −1 −1 +1 −1 −1 −1 +j −1 +1 −j +1 +1 −j +1 +1 −j +1 −j −1 −j
+j +1 +j +j +1 +j +j +1 +j +1 −1 −1 −1 +1 +1 +1 −1 −1 +1 −1 −1 −j +j +j +j −j −j −j +j +j −j
+j +j −j −1 −j +j +1 +j +j +1 +j +j +1 +j −1 +j −1 +1 −j +1 +1 −j +1 +1 −j +1 +1 −1 −1 +1 −1
−1 +1 −1 −1 −1 +1 +1 +j −j −j +j −j −j +j −j −j +j +j −j −1 −j −j −1 −j +j +1 +j −j −1 −j +1 −j
+1 +1 −j +1 −1 +j −1 +1 −j +1 −j +j −j +j +j −j +j +j −j −j −1 +1 +1 −1 +1 +1 −1 +1 +1
+1 −1 −1 −1 +j −1 −1 +j −1 +1 −j +1 −1 +j −1 +j +1 +j +j +1 +j −j −1 −j +j +1 +j −1 +1 +1
+1 −1 −1 −1 +1 +1 −1 +1 +1 −j +j +j +j −j −j −j +j +j −j +j +j +j +1 +j −j −1 −j −j −1 −j −j −1 −j
−1 +j −1 +1 −j +1 +1 −j +1 +1 −j +1 −j +1 −j +j +j +j −j −j −j +j +j −j +j +j −1 +1 +1 +1 −1 −1 −1
+1 +1 −1 +1 +1 −1 +j −1 +1 −j +1 +1 −j +1 +1 −j +1 +j +1 +j −j −1 −j −j −1 −j −j −1 −j The Sequence $Seq^{6}_{left,\ 595}(k)$, to be transmitted from left to right, up to down +1 −j +1 +1 −j +j +1 −1 −j +j −j −1 +j +j +1 −1 +1 +1 −1 +1 −1 −1 −j +j +j −1 +j −1 +j +1 +j
−j +j +j −1 +1 +1 +j +1 +j −j +1 +1 −1 −1 −j +j +j −1 +j −1 +j +1 +j +j −j −j +1 −1 −1 −j −1
−j −1 +j −1 +j −j −j −1 +1 +1 −j −1 −j +1 −j +1 −1 +1 +1 −j +j +j +1 −j +1 +j +1 +j +j −j −j −1
+1 +1 −j −1 −j +1 −j +1 +1 −1 −1 +j −j −j −1 +j −1 −j −1 −j −1 +1 +1 −j +j +j −1 +j −1 −j −1 −j
+j −j −j −1 +1 +1 +j +1 +j −1 +j −1 −1 +1 +1 −j +j +j −1 +j −1 −j −1 −j −j +j +j +1 −1 −1 −j −1
−j +1 −j +1 −j +j +j −1 +1 +1 −j −1 −j −1 +j −1 +1 −1 −1 −j +j +j +1 −j +1 −j −1 −j −j +j +j −1
+1 +1 −j −1 −j −1 +j −1 −1 +1 +1 +j −j −j −1 +j −1 +j +1 +j +j −j −j +1 −1 −1 −j −1 −j −1 +j −1
+1 −1 −1 −j +j +j −1 +j −1 +j +1 +j +j −j −j +1 −1 −1 −j −1 −j −1 +j −1 −1 +1 +1 +j −j −j +1 −j
+1 −j −1 −j −1 +1 +1 −j +j +j +1 −j +1 +j +1 +j −j +j +j +1 −1 −1 +j +1 +j −1 +j −1 −1 +1 +1
−j +j +j +1 −j +1 +j +1 +j +j −j −j −1 +1 +1 −j −1 −j +1 −j +1 −j +j +j +1 −1 −1 −j −1 −j +1 −j
+1 −1 +1 +1 −j +j +j −1 +j −1 −j −1 −j −j +j +j +1 −1 −1 −j −1 −j +1 −j +1 +1 −1 +j −j −j +1
−j +1 +j +1 +j +1 −1 −1 −j +j +j +1 −j +1 −j −1 −j +j −j −j +1 −1 −1 +j +1 +j +1 −j +1 +1 −1 −1
−j +j +j +1 −j +1 −j −1 −j −j +j +j −1 +1 +1 −j −1 −j −1 +j −1 +1 −1 −1 −j +j +j −1 +j −1 +j
+1 +j −j +j +j −1 +1 +j +1 +j +j −1 +1 +1 −j +1 +1 −1 −1 −j +j +j −1 +j −1 +j +1 +j +j −j −j +1 −1
−1 −j −1 −j −1 +j −1 +j −j −j −1 +1 +1 −j −1 −j +1 −j +1 −1 +1 +1 −j +j +j +1 −j +1 +j +1 +j +j
−j −j −1 +1 +1 −j −1 −j +1 −j +1 +1 −1 −1 +j −j −j −1 +j −1 −j −1 −j −1 +1 +1 −j +j +j −1 +j −1 −j
−1 −j +j −j −j −1 +1 +1 +j +1 +j −1 +j −1 −1 +1 +1 −j +j +j −1 +j −1 −j −1 −j −j +j +j +1 −1 −1
−j −1 −j +1 −j +1 −j +j +j −1 +1 +1 −j −1 −j −1 +j −1 +1 −1 −1 −j +j +j +1 −j +1 −j −1 −j −j +j
+j −1 +1 +1 −j −1 −j −1 +j −1 −1 +1 +1 +j −j −j −1 +j −1 +j +1 +j The Sequence $Seq^{7}_{left,\ 595}(k)$, to be transmitted from left to right, up to down +j −j +j −1 −1 +1 +j +1 −1 −j +j −j −j −j −j −1 +1 +1 +1 +1 −1 −1 −1 +1 +1 −j +j +j +j −j −j +j
−j −j +j −j −j +1 −1 −1 +1 −1 −1 −j +j +j +j −j −j +1 −1 −1 −1 +1 +1 +1 −1 −1 +1 −1 −1 +j −j −j
+j −j −j +j −j −j −j +j +j −1 +1 +1 +1 −1 −1 +1 −1 −1 +1 −1 −1 +j −j −j +j −j −j +1 −1 −1 −1 +1
+1 −j +j +j +j −j −j −j +j +j −j +j +j −1 +1 +1 −1 +1 +1 +1 −j +1 +1 −j +1 −j −1 −j −j −1 −j +j
+1 +j −j −1 −j +1 −j +1 −1 +j −1 −j −1 −j −j −1 −j +1 −j +1 +1 −j +1 +1 −j +1 −1 +j −1 +j +1 +j
−j −1 −j +j +1 +j +j +1 +j −1 +j −1 −1 +j −1 +1 −j +1 −1 +j −1 +j +1 +j −j −1 −j +1 −j +1 +1 −j
+1 −j −1 −j −j −1 −j −j −1 −j +j +1 +j −1 +j −1 +1 −j +1 +1 −1 −1 −1 +1 +1 −j +j +j +j −j −j +j
−j −j +j −j −j +1 −1 −1 +1 −1 −1 −j +j +j +j −j −j +1 −1 −1 −1 +1 +1 +1 −1 −1 +1 −1 −1 +j −j −j
+j −j −j +j −j −j −j +j +j −1 +1 +1 +1 −1 −1 +1 −1 −1 +1 −1 −1 +j −j −j +j −j −j +1 −1 −1 −1 +1
+1 −j +j +j +j −j −j −j +j +j −j +j +j −1 +1 +1 −1 +1 +1 +1 −j +1 +1 −j +1 −j −1 −j −j −1 −j +j
+1 +j −j −1 −j +1 −j +1 −1 +j −1 −j −1 −j −j −1 −j +1 −j +1 +1 −j +1 +1 −j +1 −1 +j −1 +j +1 +j
−j −1 −j +j +1 +j +j +1 +j −1 +j −1 −1 +j −1 +1 −j +1 −1 +j −1 +j +1 +j −j −1 −j +1 −j +1 +1 −j
+1 −j −1 −j −j −1 −j −j −1 −j +j +1 +j −1 +j −1 +1 −j +1 −1 +1 +1 +1 −1 −1 +j −j −j −j +j +j −j
+j +j −j +j +j −1 +1 +1 −1 +1 +1 +j −j −j −j +j +j −1 +1 +1 +1 −1 −1 −1 +1 +1 −1 +1 +1 −j
+j +j −j +j +j −j +j +j +j −j −j +1 −1 −1 −1 +1 +1 −1 +1 +1 −1 +1 +1 −j +j +j −j +j +j −1 +1

TABLE 7-continued

| The sequence $Seq^{iTX}_{left,\ 595}(k)$ |
|---|
| +1 +1 −1 −1 +j −j −j −j +j +j +j −j −j +j −j −j +1 −1 −1 +1 −1 −1 −1 +j −1 −1 +j −1 +j +1 +j +j |
| +1 +j −j −1 −j +j +1 +j −1 +j −1 +1 −j +1 +j +1 +j +j +1 +j −1 +j −1 −1 +j −1 −1 +j −1 +1 −j |
| +1 −j −1 −j +j +1 +j −j −1 −j −j −1 −j +1 −j +1 +1 −j +1 −1 +j −1 +1 −j +1 −j −1 −j +j +1 +j −1 |
| +j −1 −1 +j −1 +j +1 +j +j +1 +j +j +1 +j −j −1 −j +1 −j +1 −1 +j −1 |
| The Sequence $Seq^{8}_{left,\ 595}(k)$, to be transmitted from left to right, up to down |
| −1 +j +j +1 +1 −1 −j +j −j −1 −j +j −1 +j −j +j −1 +j +1 +1 −1 −1 −1 +1 +1 +j −j −j −j +j +j −1 |
| +j −1 −1 +j −1 −j −1 −j −j −1 −j −j +j +j +j −j −j −1 +1 +1 +1 −1 −1 +j +1 +j +j +1 +j +1 −j +1 |
| +1 −j +1 −j +j +j −j +j +j −1 +1 +1 −1 +1 +1 +j +1 +j −j −1 −j +1 −j +1 −1 +j −1 −1 +1 +1 −1 |
| +1 +1 −j +j +j −j +j +j +1 −j +1 −1 +j −1 +j +1 +j −j −1 −j +1 −1 −1 −1 +1 +1 +j −j −j −j +j +j |
| −1 +j −1 −1 +j −1 −j −1 −j −j −1 −j +j −j −j −j +j +j +1 −1 −1 −1 +1 +1 −j −1 −j −j −1 −j −1 +j −1 −1 |
| +j −1 −j +j +j −j +j +j −1 +1 +1 −1 +1 +1 +j +1 +j −j −1 −j +1 −j +1 −1 +j −1 +1 −1 −1 +1 |
| −1 −1 +j −j −j +j −j −j −1 +j −1 +1 −j +1 −j −1 −j +j +1 +j +1 −1 −1 −1 +1 +1 +j −j −j −j +j +j −1 |
| +j −1 −1 +j −1 −j −1 −j −j −1 −j −j +j +j +j −j −j −1 +1 +1 +1 −1 −1 +j +1 +j +j +1 +j +1 −j |
| +1 +1 −j +1 −j +j +j −j +j +j −1 +1 +1 −1 +1 +1 +j +1 +j −j −1 −j +1 −j +1 −1 +j −1 −1 +1 |
| +1 −1 +1 +1 −j +j +j −j +j +j +1 −j +1 −1 +j −1 +j +1 +j −j −1 −j +1 −1 −1 −1 +1 +1 +j −j −j −j |
| +j +j −1 +j −1 −1 +j −1 −j −1 −j −j −1 −j +j −j −j −j +j +j +1 −1 −1 −1 +1 +1 −j −1 −j −j −1 −j −1 |
| +j −1 −1 +j −1 −j +j +j −j +j +j −1 +1 +1 −1 +1 +1 +j +1 +j −j −1 −j +1 −j +1 −1 +j −1 +1 −1 |
| −1 +1 −1 −1 +j −j −j +j −j −j −1 +j −1 +1 −j +1 −j −1 −j +j +1 +j −1 +1 +1 +1 −1 −1 −j +j +j +j |
| −j −j +1 −j +1 +1 −j +1 +j +1 +j +j +1 +j +j −j −j −j +j +j +1 −1 −1 −1 +1 +1 −j −1 −j −j −1 −j |
| −1 +j −1 −1 +j −1 +j −j −j +j −j −j +1 −1 −1 +1 −1 −1 −j −1 −j +j +1 +j −1 +j −1 +1 −j +1 +1 −1 |
| −1 +1 −1 −1 +j −j −j +j −j −j −1 +j −1 +1 −j +1 −j −1 −j +j +1 +j −1 +1 +1 +1 −1 −1 −j +j +j +j |
| −j −j +1 −j +1 +1 −j +1 +j +1 +j +j +1 +j −j +j +j +j −j −j −1 +1 +1 +1 −1 −1 +j +1 +j +j +1 |
| +j +1 −j +1 +1 −j +1 +j −j −j +j −j −j +1 −1 −1 +1 −1 −1 −j −1 −j +j +1 +j −1 +j −1 +1 −j +1 −1 |
| +1 +1 −1 +1 + 1 −j +j +j −j +j +j +1 −j +1 −1 +j −1 +j +1 +j −j −1 −j |

TABLE 8

| The sequence $Seq^{iTX}_{right,\ 595}(k)$ |
|---|
| The Sequence $Seq^{1}_{right,\ 595}(k)$, to be transmitted from left to right, up to down |
| −j −1 −j +j +j −j −1 +j −1 −1 −1 +1 +1 −j +1 −1 −1 +1 +j +1 +j +j +j −j −j −1 −j +j +j −j −1 +j −1 |
| −1 −1 +1 −1 +j −1 +1 +1 −1 −j −1 −j −j −j +j +j +1 +j −j −j +j +1 −j +1 +1 +1 −1 −1 +j −1 |
| +1 +1 −1 −j −1 −j −j −j +j −j −1 −j +j +j −j −1 +j −1 −1 −1 +1 −1 +j −1 +1 +1 −1 −j −1 −j −j −j +j |
| +1 −j +1 −1 −1 +1 −j −1 −j −j −j +j +j +1 +j −j −j +j −1 +j −1 −1 −1 +1 +1 −j +1 −1 −1 +1 −j −1 |
| −j −j −j +j −j −1 −j +j +j −j +1 −j +1 +1 +1 −1 +1 −j +1 −1 −1 +1 −j −1 −j −j −j +j +j +1 +j −j −j |
| +j −1 +j −1 −1 −1 +1 −1 +j −1 +1 +1 −1 +j +1 +j +j +j −j +j +1 +j −j −j +j −1 +j −1 −1 −1 +1 |
| +1 −j +1 −1 −1 +1 −j −1 −j −j −j +j +j +1 +j −j −j +j −1 +j −1 −1 −1 +1 +1 −j +1 −1 −1 +1 −j −1 |
| −j −j −j +j −j −1 −j +j +j −j +1 −j +1 +1 +1 −1 −1 +j −1 +1 +1 −1 +j +1 +j +j +j −j −j −1 −j +j |
| +j −j +1 −j +1 +1 +1 −1 +1 −j +1 −1 −1 +1 −j −1 −j −j −j +j −j −1 −j +j +j −j +1 −j +1 +1 +1 −1 |
| +j +1 +j −j −j +j +1 −j +1 +1 +1 −1 −1 +j −1 +1 +1 −1 −j −1 −j −j −j +j +j +1 +j −j −j +j +1 −j |
| +1 +1 +1 −1 +1 −j +1 −1 −1 +1 +j +1 +j +j +j −j +j +1 +j −j −j +j +1 −j +1 +1 +1 −1 −1 +j −1 |
| +1 +1 −1 −j −1 −j −j −j +j −j −1 −j +j +j −j −1 +j −1 −1 −1 +1 −1 +j −1 +1 +1 −1 −j −1 −j −j −j |
| +j −j −1 −j +j +j −j −1 +j −1 −1 −1 +1 +1 −j +1 −1 −1 +1 +j +1 +j +j +j −j −j −1 −j +j +j −j −1 |
| +j −1 −1 −1 +1 −1 +j −1 +1 +1 −1 −j −1 −j −j −j +j +j +1 +j −j −j +j +1 −j +1 +1 +1 −1 −1 +j −1 |
| +1 +1 −1 −j −1 −j −j −j +j −j −1 −j +j +j −j −1 +j −1 −1 −1 +1 −1 +j −1 +1 +1 −1 −j −1 −j −j −j |
| +j +1 −j +1 −1 −1 +1 −j −1 −j −j −j +j +j +1 +j −j −j +j −1 +j −1 −1 −1 +1 +1 −j +1 −1 −1 +1 −j |
| −1 −j −j −j +j −j −1 −j +j +j −j +1 −j +1 +1 +1 −1 +1 −j +1 −1 −1 +1 −j −1 −j −j −j +j +j +1 +j −j |
| −j +j −1 +j −1 −1 −1 +1 −1 +j −1 +1 +1 −1 +j +1 +j +j +j −j +j +1 +j −j −j +j −1 +j −1 −1 −1 |
| +1 −1 +1 +j +j −1 +1 +1 +j −j +j −1 +j +1 +1 +j +1 +j −1 −j |
| The Sequence $Seq^{2}_{right,\ 595}(k)$, to be transmitted from left to right, up to down |
| −j −1 −j −j −1 −j −j −1 −j +j +1 +j −j −1 −j −j −1 −j +j +1 +j −j −1 −j −1 +j −1 −1 +j −1 −1 +j −1 |
| +1 −j +1 +1 −j +1 +1 −j +1 −1 +j −1 +1 −j +1 +j +1 +j +j +1 +j +j +1 +j −j −1 −j +j +1 +j |
| +j +1 +j −j −1 −j +j +1 +j −1 +j −1 −1 +j −1 −1 +j −1 +1 −j +1 +1 −j +1 +1 −j +1 −1 +j −1 +1 |
| −j +1 +1 +1 −1 +1 +1 −1 +1 +1 −1 −1 −1 +1 +1 +1 −1 +1 +1 −1 −1 −1 +1 +1 +1 −1 −j −j +j −j |
| −j +j −j −j +j +j +j −j +j +j −j +j +j −j −j −j +j +j +j −j +1 +1 −1 +1 +1 −1 +1 +1 +1 −1 −1 −1 |
| +1 +1 +1 −1 +1 +1 −1 −1 −1 +1 +1 +1 −1 +j +j −j +j +j −j +j +j −j −j −j +j −j −j +j −j −j +j +j |
| +j −j −j −j +j +1 −j +1 +1 −j +1 +1 −j +1 −1 +j −1 +1 −j +1 +1 −j +1 −1 +j −1 +1 −j +1 −j −1 −j |
| −j −1 −j −j −1 −j +j +1 +j +j +1 +j +j +1 +j −j −1 −j +j +1 +j −1 +j −1 −1 +j −1 −1 +j −1 +1 −j |
| +1 −1 +j −1 −1 +j −1 +1 −j +1 −1 +j −1 −j −1 −j −j −1 −j −j −1 −j +j +1 +j +j +1 +j +j +1 +j −j |
| −1 −j +j +1 +j +j +j −j +j +j −j +j +j −j −j −j +j +j +j −j +j +j −j −j −j +j +j +j −j +1 +1 −1 |
| +1 +1 −1 +1 +1 −1 −1 −1 +1 −1 −1 +1 −1 −1 +1 +1 +1 −1 −1 −1 +1 +j +j −j +j +j −j +j +j −j −j |
| −j +j +j +j −j +j +j −j −j −j +j +j +j −j −1 −1 +1 −1 −1 +1 −1 −1 +1 +1 +1 −1 +1 +1 −1 +1 |
| +1 −1 −1 −1 +1 +1 +1 −1 −j −1 −j −j −1 −j −j −1 −j +j +1 +j −j −1 −j −j −1 −j +j +1 +j −j −1 −j −1 |
| +j −1 −1 +j −1 −1 +j −1 +1 −j +1 +1 −j +1 +1 −j +1 −1 +j −1 +1 −j +1 +j +1 +j +j +1 +j +j |
| +1 +j −j −1 −j +j +1 +j +j +1 +j −j −1 −j +j +1 +j −1 +j −1 −1 +j −1 −1 +j −1 +1 −j +1 +1 −j |
| +1 +1 −j +1 −1 +j −1 +1 −j +1 +1 +1 −1 +1 +1 −1 +1 +1 −1 +1 +1 −1 −1 −1 +1 +1 +1 −1 +1 +1 −1 −1 |
| −1 +1 +1 +1 −1 −j −j +j −j −j +j −j −j +j +j +j −j +j +j −j +j +j −j −j −j +j +j +j −j +1 +1 −1 +1 |
| +1 −1 +1 +1 −1 −1 −1 +1 +1 +1 −1 +1 +1 −1 −1 −1 +1 +1 +1 −1 +j +j −j +j +j −j +j +j −j −j −j |
| +j −j −j +j −j −j +j +j +j −j −j −j +j −1 −j +j −1 +1 −1 −1 +j −1 +j −j −1 +1 +1 −1 +1 −j −j +1 |

TABLE 8-continued

| The sequence $Seq^{iTX}_{right, 595}(k)$ |
|---|
| The Sequence $Seq^{3}_{right, 595}(k)$, to be transmitted from left to right, up to down |
| +1 −j +1 +j +1 +j +1 −j +1 −j −1 −j −j −1 −j −1 +j −1 −j −1 −j +1 −j +1 −1 +j −1 −j −1 −j −1 +j −1 |
| +j +1 +j −j −1 −j −1 +j −1 −j −1 −j +1 −j +1 −1 −1 +1 −j −j +j −1 −1 +1 +j +j −j +j +j −j +1 |
| +1 −1 +j +j −j −1 −1 +1 −1 −1 +1 −j −j +j −1 −1 +1 +j +j −j −j −j +j −1 −1 +1 −j −j +j +1 +1 −1 |
| −j −1 −j +1 −j +1 +j +1 +j +1 −j +1 −1 +j −1 +j +1 +j +1 −j +1 +j +1 +j +j +1 +j −1 +j −1 −j |
| −1 −j −1 +j −1 −1 +j −1 +j +1 +j +1 −j +1 +j +1 +j +j +j −j −1 −1 +1 −j −j +j −1 −1 +1 +1 +1 |
| −1 −j −j +j −1 −1 +1 −j −j +j +j +j −j −1 −1 +1 −j −j +j −1 −1 +1 −1 −1 +1 +j +j −j +1 +1 −1 +j |
| +j −j −1 +j −1 −j −1 −j −1 +j −1 +j +1 +j +j +1 +j +1 −j +1 +j +1 +j −1 +j −1 +1 −j +1 +j +1 |
| +j +1 −j +1 −j −1 −j +j +1 +j +1 −j +1 +j +1 +j −1 +j −1 +1 +1 −1 +j +j −j +1 +1 −1 −j −j +j |
| −j −j +j −1 −1 +1 −j −j +j +1 +1 −1 +1 +1 −1 +j +j −j +1 +1 −1 −j −j +j +j +j −j +1 +1 −1 +j |
| +j −j −1 −1 +1 +j +1 +j −1 +j −1 −j −1 −j −1 +j −1 +1 −j +1 −j −1 −j −1 +j −1 −j −1 −j −j −1 −j +1 |
| −j +1 +j +1 +j +1 −j +1 +1 −j +1 −j −1 −j −1 +j −1 −j −1 −j −j −j +j +1 +1 −1 +j +j −j +1 +1 −1 |
| −1 −1 +1 +j +j −j +1 +1 −1 +j +j −j −j −j +j +1 +1 −1 +j +j −j +1 +1 −1 +1 +1 −1 −j −j +j −1 −1 |
| +1 −j −j +j −1 +j −1 −j −1 −j −1 +j −1 +j +1 +j +j +1 +j +1 −j +1 +j +1 +j −1 +j −1 +1 −j |
| +1 +j +1 +j +1 −j +1 −j −1 −j +j +1 +j +1 −j +1 +j +1 +j −1 +j −1 +1 +1 −1 +j +j −j +1 +1 −1 |
| −j −j +j −j −j +j −1 −1 +1 −j −j +j +1 +1 −1 +1 +1 −1 +j +j −j +1 +1 −1 −j −j +j +j +j −j +1 |
| +1 −1 +j +j −j −1 −1 +1 +j +1 +j −1 +j −1 −j −1 −j −1 +j −1 +1 −j +1 −j −1 −j −1 +j −1 −j −1 −j −j |
| −1 −j +1 −j +1 +j +1 +j +1 −j +1 +1 −j +1 −j −1 −j −1 +j −1 −j −1 −j −j −j +j +1 +1 −1 +j +j −j |
| +1 +1 −1 −1 −1 +1 +j +j −j +1 +1 −1 +j +j −j −j −j +j +1 +1 −1 +j +j −j +1 +1 −1 +1 +1 −1 |
| −j −j +j −1 −1 +1 −j −j +j −j −j +j +1 −1 −1 −j +j −j +j −1 +j +1 +1 +1 −1 +1 −1 −j |
| The Sequence $Seq^{4}_{right, 595}(k)$, to be transmitted from left to right, up to down |
| +1 −j +1 +j +1 +j +j +1 +j +1 −j +1 +1 +1 −1 +j +j −j +j +j −j +1 +1 −1 +j +1 +j +1 −j +1 |
| −1 +j −1 −j −1 −j −j −j +j −1 −1 +1 +1 +1 −1 +j +j −j +1 −j +1 +j +1 +j +j +1 +j +1 −j +1 +1 |
| +1 −1 +j +j −j +j +j −j +1 +1 −1 +j +1 +j +1 −j +1 −1 +j −1 −j −1 −j −j −j +j −1 −1 +1 +1 +1 −1 |
| +j +j −j +1 −j +1 +j +1 +j −j −1 −j −1 +j −1 +1 +1 −1 +j +j −j −j −j +j −1 −1 +1 +j +1 +j +1 |
| −j +1 +1 −j +1 +j +1 +j −j −j +j −1 −1 +1 −1 −1 +1 −j −j +j −1 +j −1 −j −1 −j +j +1 +j +1 −j +1 |
| −1 −1 +1 −j −j +j +j +j −j +1 +1 −1 −j −1 −j −1 +j −1 −1 +j −1 −j −1 −j +j +j −j +1 +1 −1 +1 +1 |
| −1 +j +j −j −1 +j −1 −j −1 −j −j −1 −j −1 +j −1 −1 −1 +1 −j −j +j −j −j +j −1 −1 +1 −j −1 −j −1 +j −1 |
| +1 −j +1 +j +1 +j +j +j −j +1 +1 −1 −1 −1 +1 −j −j +j −1 +j −1 −j −1 −j −j −1 −j −1 +j −1 −1 −1 |
| +1 −j −j +j −j −j +j −1 −1 +1 −j −1 −j −1 +j −1 +1 −j +1 +j +1 +j +j +j −j +1 +1 −1 −1 −1 +1 |
| −j −j +j −1 +j −1 −j −1 −j +j +1 +j +1 −j +1 −1 −1 +1 −j −j +j +j +j −j +1 +1 −1 −j −1 −j −1 +j −1 |
| −1 +j −1 −j −1 −j +j +j −j +1 +1 −1 +1 +1 −1 +j +j −j +1 −j +1 +j +1 +j −j −1 −j −1 +j −1 +1 |
| +1 −1 +j +j −j −j −j +j −1 −1 +1 +j +1 +j +1 −j +1 +1 −j +1 +j +1 +j −j −j +j −1 −1 +1 −1 −1 |
| +1 −j −j +j −1 +j −1 −j −1 −j −j −1 −j −1 +j −1 −1 −1 +1 −j −j +j −j −j +j −1 −1 +1 −j −1 −j −1 +j −1 |
| +1 −j +1 +j +1 +j +j +j −j +1 +1 −1 −1 −1 +1 −j −j +j −1 +j −1 −j −1 −j −j −1 −j −1 +j −1 −1 −1 |
| +1 −j −j +j −j −j +j −1 −1 +1 −j −1 −j −1 +j −1 +1 −j +1 +j +1 +j +j +j −j +1 +1 −1 −1 −1 +1 |
| −j −j +j −1 +j −1 −j −1 −j +j +1 +j +1 −j +1 −1 −1 +1 −j −j +j +j +j −j +1 +1 −1 −j −1 −j −1 +j −1 |
| −1 +j −1 −j −1 −j +j +j −j +1 +1 −1 +1 +1 −1 +j +j −j +1 −j +1 +j +1 +j −j −1 −j −1 +j −1 +1 |
| +1 −1 +j +j −j −j −j +j −1 −1 +1 +j +1 +j +1 −j +1 +1 −j +1 +j +1 +j −j −j +j −1 −1 +1 −1 −1 |
| +1 −j −j +j −j −1 +j +1 +j −1 +1 +1 +j +1 −j −j +1 +1 +1 +j +1 −1 −1 |
| The Sequence $Seq^{5}_{right, 595}(k)$, to be transmitted from left to right, up to down |
| +1 −1 −1 +1 −1 −1 +1 −1 −1 −1 +1 +1 −j +j +j −j +j +j −j +j +j +j −j −j −j −1 −j −j −1 −j +j +1 |
| +j −j −1 −j −1 +j −1 −1 +j −1 +1 −j +1 −1 +j −1 −j +j +j −j +j +j −j +j +j +j −j −j +1 −1 −1 +1 −1 |
| −1 +1 −1 −1 −1 +1 +1 −1 +j −1 −1 +j −1 +1 −j +1 −1 +j −1 −j −1 −j −j −1 −j +j +1 +j −j −1 −j −1 |
| +1 +1 +1 −1 −1 −1 +1 +1 −1 +1 +1 +j −j −j +j +j +j −j −j +j −j −j +j +1 +j −j −1 −j −j −1 −j |
| −j −1 −j +1 −j +1 −1 +j −1 −1 +j −1 −1 +j −1 −j +j +j −j −j −j +j +j −j +j +j +1 −1 −1 −1 +1 |
| +1 +1 −1 −1 +1 −1 −1 −1 +j −1 +1 −j +1 +1 −j +1 +1 −j +1 −j −1 −j +j +1 +j +j +1 +j +j +1 |
| +j −1 +1 +1 −1 +1 +1 −1 +1 +1 +1 −1 −1 +j −j −j +j −j −j +j −j −j +j +j +j +1 +j +j +1 +j −j |
| −1 −j +j +1 +j +1 −j +1 +1 −j +1 −1 +j −1 +1 −j +1 +j −j −j +j −j −j +j −j −j −j +j +j −1 +1 |
| +1 −1 +1 +1 −1 +1 +1 +1 −1 −1 +1 −j +1 +1 −j +1 −1 +j −1 +1 −j +1 +j +1 +j +1 +j −j −1 |
| −j +j +1 +j +1 −1 −1 −1 +1 +1 +1 −1 −1 +1 −1 −1 −j +j +j +j −j −j −j +j +j −j +j +j −j −1 −j |
| +j +1 +j +j +1 +j +j +1 +j −1 +j −1 +1 −j +1 +1 −j +1 +1 −j +1 +j −j −j −j +j +j +j −j −j +j −j |
| −j −1 +1 +1 +1 −1 −1 −1 +1 +1 −1 +1 +1 +1 −j +1 −1 +j −1 −1 +j −1 −1 +j −1 +j +1 +j −j −1 −j |
| −j −1 −j −j −1 −j −1 +1 +1 −1 +1 +1 −1 +1 +1 +1 −1 −1 +j −j −j +j −j −j +j −j −j −j +j +j +j +1 |
| +j +j +1 +j −j −1 −j +j +1 +j +1 −j +1 +1 −j +1 −1 +j −1 +1 −j +1 +j −j −j +j −j −j +j −j −j −j |
| +j +j −1 +1 +1 −1 +1 +1 −1 +1 +1 +1 −1 −1 +1 −j +1 +1 −j +1 −1 +j −1 +1 −j +1 +j +1 +j |
| +j +1 +j −j −1 −j +j +1 +j +1 −1 −1 −1 +1 +1 +1 −1 −1 +1 −1 −1 −j +j +j +j −j −j −j +j +j −j +j |
| +j −j −1 −j +j +1 +j +j +1 +j +j +1 +j −1 +j −1 +1 −j +1 +1 −j +1 +1 −j +1 +j −j −j −j +j +j |
| +j −j −j +j −j −j −1 +1 +1 +1 −1 −1 −1 +1 +1 −1 +1 +1 +1 −j +1 −1 +j −1 −1 +j −1 −1 +j −1 +j |
| +1 +j −j −1 −j −j −1 −j −j −1 −j −1 −j +1 −j −1 +1 +j −j +1 +j −1 −j +1 +1 +1 −j +j +j +j |
| The Sequence $Seq^{6}_{right, 595}(k)$, to be transmitted from left to right, up to down |
| +1 −1 −1 −j +j +j −1 +j −1 +j +1 +j −j +j +j −1 +1 +1 +j +1 +j +1 −j +1 −1 +1 +1 +j −j −j |
| +1 −j +1 −j −1 −j −j +j +j −1 +1 +1 +j +1 +j +1 −j +1 +j −j −j −1 +1 +1 −j −1 −j +1 −j +1 −1 |
| +1 +1 −j +j +j +1 −j +1 +j +1 +j −j +j +j +1 −1 −1 +j +1 +j −1 +j −1 −1 +1 +1 −j +j +j +1 −j |
| +1 +j +1 +j −1 +1 +1 −j +j +j −1 +j −1 −j −1 −j +j −j −j −1 +1 +1 +j +1 +j −1 +j −1 +1 −1 −1 |
| +j −j −j +1 −j +1 +j +1 +j +j −j −j −1 +1 +1 +j +1 +j −1 +j −1 −j +j +j −1 +1 +1 −j −1 −j −1 |
| +j −1 +1 −1 −1 −j +j +j +1 −j +1 −j −1 −j +j −j −j +1 −1 −1 +j +1 +j +1 −j +1 +1 −1 −1 −j +j +j |
| +1 −j +1 −j −1 −j −1 +1 +1 +j −j −j +1 −j +1 −j −1 −j +j −j −j +1 −1 −1 −j −1 −j −1 +j −1 +1 −1 −1 |
| −j +j +j −1 +j −1 +j +1 +j +j −j −j +1 −1 −1 −j −1 −j −1 +j −1 −j +j +j +1 −1 −1 +j +1 +j −1 |
| +j −1 +1 −1 −1 +j −j −j −1 +j −1 −j −1 −j +j −j −j −1 +1 +1 −j −1 −j +1 −j +1 +1 −1 −1 +j −j −j −1 |
| +j −1 −j −1 −j +1 −1 −1 +j −j −j +1 −j +1 +j +1 +j −j +j +j +1 −1 −1 −j −1 −j +1 −j +1 −1 +1 +1 |
| −j +j +j −1 +j −1 −j −1 −j −j +j +j +1 −1 −1 −j −1 −j +1 −j +1 +j −j −j +1 −1 −1 +j +1 +j +1 −j |
| +1 −1 +1 +1 +j −j −j −1 +j −1 +j +1 +j −j +j +j −1 +1 +1 −j −1 −j −1 +j −1 −1 +1 +1 +j −j −j −1 |
| +j −1 +j +1 +j −1 +1 +1 +j −j −j +1 −j +1 −j −1 −j +j −j −j +1 −1 −1 −j −1 −j −1 +j −1 +1 −1 −1 |

TABLE 8-continued

| The sequence $Seq^{iTX}_{right,\ 595}(k)$ |
|---|
| −j +j +j −1 +j −1 +j +1 +j +j −j −j +1 −1 −1 −j −1 −j −1 +j −1 −j +j +j +1 −1 −1 +j +1 +j −1 |
| +j −1 +1 −1 −1 +j −j −j −1 +j −1 −j −1 −j +j −j −j −1 +1 +1 −j −1 −j +1 −j +1 +1 −1 −1 +j −j −j −1 |
| +j −1 −j −1 −j +1 −1 −1 +j −j −j +1 −j +1 +j +1 +j −j +j +j +1 −1 −1 −j −1 −j +1 −j +1 −1 +1 +1 |
| −j +j +j −1 +j −1 −j −1 −j −j +j +j +1 −1 −1 −j −1 −j +1 −j +1 +j −j −j +1 −1 −1 +j +1 +j +1 −j |
| +1 −1 +1 +1 +j −j −j −1 +j −1 +j +1 +j −j +j +j −1 +1 +1 −j −1 −j −1 +j −1 −1 +1 +1 +j −j −j −1 |
| +j −1 +j +1 +j +1 +1 +1 +j +j −1 +j +1 −j +1 +j −1 +1 +1 +1 +j −j +j +j |
| The Sequence $Seq^{7}_{right,\ 595}(k)$, to be transmitted from left to right, up to down |
| −j +j +j +j −j −j −1 +1 +1 +1 −1 −1 +1 −1 −1 +1 −1 −1 −j +j +j −j +j +j +1 −1 −1 −1 +1 +1 +j |
| −j −j −j +j +j +j −j −j +j −j −j −1 +1 +1 −1 +1 +1 +1 −1 −1 −1 +1 +1 +j −j −j −j +j +j −j +j +j −j |
| +j +j +1 −1 −1 +1 −1 −1 +j −j −j −j +j +j +1 −1 −1 −1 +1 +1 +1 −1 −1 +1 −1 −1 −j +j +j −j +j |
| +j −j −1 −j −j −1 −j −1 +j −1 −1 +j −1 +1 −j +1 −1 +j −1 −j −1 −j +j +1 +j +1 −j +1 +1 −j +1 +j |
| +1 +j +j +1 +j +j +1 +j −j −1 −j −1 +j −1 +1 −j +1 +1 −j +1 +1 −j +1 +j +1 +j +j +1 +j −j −1 |
| −j +j +1 +j +1 −j +1 −1 +j −1 +j +1 +j +j +1 +j +1 −j +1 +1 −j +1 +1 −j +1 −1 +j −1 −j −1 |
| −j +j +1 +j +1 −1 −1 −1 +1 +1 −j +j +j +j −j −j +j −j −j +j −j −j +1 −1 −1 +1 −1 −1 +j −j −j −j +j |
| +j −1 +1 +1 +1 −1 −1 −1 +1 +1 −1 +1 +1 −j +j +j −j +j +j +j −j −j −j +j +j −1 +1 +1 +1 −1 −1 |
| +1 −1 −1 +1 −1 −1 +j −j −j +j −j −j −1 +1 +1 +1 −1 −1 +j −j −j −j +j +j +j −j −j +j −j −j +1 −1 −1 |
| +1 −1 −1 +1 −j +1 +1 −j +1 −j −1 −j −j −1 −j +j +1 +j −j −1 −j +1 −j +1 −1 +j −1 +j +1 +j +j |
| +1 +j −1 +j −1 −1 +j −1 −1 +j −1 +1 −j +1 −j −1 −j +j +1 +j +j +1 +j +j +1 +j −1 +j −1 −1 +j |
| −1 +1 −j +1 −1 +j −1 +j +1 +j −j −1 −j −1 +j −1 −1 +j −1 +j +1 +j +j +1 +j +j +1 +j −j −1 −j |
| +1 −j +1 −1 +j −1 −j +j +j +j −j −j −1 +1 +1 +1 −1 −1 +1 −1 −1 +1 −1 −1 −j +j +j −j +j +j +1 −1 |
| −1 −1 +1 +1 +j −j −j −j +j +j +j −j −j +j −j −j −1 +1 +1 −1 +1 +1 +1 −1 −1 −1 +1 +1 +j −j −j |
| −j +j +j −j +j +j −j +j +j +1 −1 −1 +1 −1 −1 +j −j −j −j +j +j +1 −1 −1 −1 +1 +1 +1 −1 −1 +1 −1 |
| −1 −j +j +j −j +j +j −j −1 −j −j −1 −j −1 +j −1 −1 +j −1 +1 −j +1 −1 +j −1 −j −1 −j +j +1 +j +1 |
| −j +1 +1 −j +1 +j +1 +j +j +1 +j +j +1 +j −j −1 −j −1 +j −1 +1 −j +1 +1 −j +1 +1 −j +1 +j |
| +1 +j +j +1 +j −j −1 −j +j +1 +j +1 −j +1 −1 +j −1 +j +1 +j +j +1 +j +1 −j +1 +1 −j +1 +1 −j |
| +1 −1 +j −1 −j −1 −j +j +1 +j −1 +1 −1 +1 +j +j −1 −1 −j +1 −1 +j +1 +1 −1 −j +j +j +1 |
| The Sequence $Seq^{8}_{right,\ 595}(k)$, to be transmitted from left to right, up to down |
| −j +j +j +j −j −j +1 −1 −1 −1 +1 +1 +j +1 +j +j +1 +j −1 +j −1 −1 +j −1 −1 +1 +1 +1 −1 −1 +j |
| −j −j −j +j +j +1 −j +1 +1 −j +1 −j −1 −j −j −1 −j −1 +1 +1 −1 +1 +1 +j −j −j +j −j −j +1 −j +1 −1 |
| +j −1 −j −1 −j +j +1 +j +j −j −j +j −j −j −1 +1 +1 −1 +1 +1 −j −1 −j +j +1 +j +1 −j +1 −1 +j −1 |
| +j −j −j −j +j +j −1 +1 +1 +1 −1 −1 −j −1 −j −j −1 −j +1 −j +1 +1 −j +1 −1 +1 +1 +1 −1 −1 +j |
| −j −j −j +j +j +1 −j +1 +1 −j +1 −j −1 −j −j −1 −j +1 −1 −1 +1 −1 −1 −j +j +j −j +j +j −1 +j −1 |
| +1 −j +1 +j +1 +j −j −1 −j +j −j −j +j −j −j −1 +1 +1 −1 +1 +1 −j −1 −j +j +1 +j +1 −j +1 −1 +j |
| −1 +1 −1 −1 −1 +1 +1 +j −j −j −j +j +j −1 +j −1 −1 +j −1 −j −1 −j −j −1 −j −j +j +j +j −j −j −1 +1 |
| +1 +1 −1 −1 +j +1 +j +j +1 +j +1 −j +1 +1 −j +1 −j +j +j −j +j +j −1 +1 +1 −1 +1 +1 +j +1 |
| +j −j −1 −j +1 −j +1 −1 +j −1 −1 +1 +1 −1 +1 +1 −j +j +j −j +j +j +1 −j +1 −1 +j −1 +j +1 +j |
| −j −1 −j −1 +1 +1 +1 −1 −1 −j +j +j +j −j −j +1 −j +1 +1 −j +1 +j +1 +j +j +1 +j −j +j +j +j −j |
| −j −1 +1 +1 +1 −1 −1 +j +1 +j +j +1 +j +1 −j +1 +1 −j +1 +j −j −j +j −j −j +1 −1 −1 +1 −1 −1 |
| −j −1 −j +j +1 +j −1 +j −1 +1 −j +1 −1 +1 +1 −1 +1 +1 −j +j +j −j +j +j +1 −j +1 −1 +j −1 +j |
| +1 +j −j −1 −j −j +j +j +j −j −j +1 −1 −1 −1 +1 +1 +j +1 +j +j +1 +j −1 +j −1 −1 +j −1 −1 +1 |
| +1 +1 −1 −1 +j −j −j −j +j +j +1 −j +1 +1 −j +1 −j −1 −j −j −1 −j −1 +1 +1 −1 +1 +1 +j −j −j +j |
| −j −j +1 −j +1 −1 +j −1 −j −1 −j +j +1 +j +j −j −j +j −j −j −1 +1 +1 −1 +1 +1 −j −1 −j +j +1 +j |
| +1 −j +1 −1 +j −1 +j −j −j −j +j +j −1 +1 +1 +1 −1 −1 −j −1 −j −j −1 −j +1 −j +1 +1 −j +1 −1 +1 |
| +1 +1 −1 −1 +j −j −j −j +j +j +1 −j +1 +1 −j +1 −j −1 −j −j −1 −j +1 −1 −1 +1 −1 −1 −j +j +j −j |
| +j +j −1 +j −1 +1 −j +1 +j +1 +j −j −1 −j +j −j −j +j −j −j −1 +1 +1 −1 +1 +1 −j −1 −j +j +1 +j |
| +1 −j +1 −1 +j −1 +j +1 −1 +1 +1 −1 +1 −1 +j +j −1 −1 +1 +1 −1 −j −j −j +1 |

TABLE 9

| The sequence $Seq^{iTX}_{left,\ 804}(k)$ |
|---|
| The Sequence $Seq^{1}_{left,\ 804}(k)$, to be transmitted from left to right, up to down |
| −j +j +1 −1 +j −1 −j −j −1 +j −j +j +1 +1 +1 +j −1 −1 +j −1 +1 −1 +j +j −1 −j +1 +1 −j −1 +1 −1 |
| +j +j −j +1 +j +j +1 +j −j +j +1 +1 +j −1 −j −j −1 +j −j +j +1 +1 +1 +j −1 −1 +j −1 +1 −1 |
| +j +j +1 +j −1 −1 +j +1 −1 +1 −j −j +j −1 −j −j −1 −j +j −j −1 −1 −j +1 +j +j +1 −j +j −j −1 −1 −1 |
| −j +1 +1 −j +1 −1 +1 −j −j +1 +j −1 −1 +j +1 −1 +1 −j −j +j −1 −j −j −1 −j +j −j −1 −1 +j −1 −j |
| −j −1 +j −j +j +1 +1 +1 +j −1 −1 +j −1 +1 −1 +j +j +1 +j −1 −1 +j +1 −1 +1 −j −j +j −1 −j −j −1 |
| −j +j −j −1 −1 +j −1 −j −j −1 +j −j +j +1 +1 +1 +j −1 −1 +j −1 +1 −1 +j +j −1 −j +1 +1 −j −1 |
| +1 −1 +j +j −j +1 +j +j +1 +j −j +j +1 +1 +j −1 −j −j −1 +j −j +j +1 +1 +1 +j −1 −1 +j −1 +1 |
| −1 +j +j +1 +j −1 −1 +j +1 −1 +1 −j −j +j −1 −j −j −1 −j +j −j −1 −1 −j +1 +j +j +1 −j +j −j −1 −1 |
| −1 −j +1 +1 −j +1 −1 +1 −j −j +1 +j −1 −1 +j +1 −1 +1 −j −j +j −1 −j −j −1 −j +j −j −1 −1 +j −1 |
| −j −j −1 +j −j +j +1 +1 +1 +j −1 −1 +j −1 +1 −1 +j +j +1 +j −1 −1 +j +1 −1 +1 −j −j +j −1 −j −j |
| −1 −j +j −j −1 −1 +1 +j −1 −1 +j +1 −1 +1 −j −j −j +1 +j +j +1 +j −j +j +1 +1 +j −1 −j −j −1 +j |
| −j +j +1 +1 −1 −j +1 +1 −j +1 −1 +1 −j −j +1 +j −1 −1 +j +1 −1 +1 −j −j −j +1 +j +j +1 +j −j |
| +j +1 +1 −j +1 +j +j +1 −j +j −j −1 −1 +1 +j −1 −1 +j −1 +1 −1 +j +j −1 −j +1 +1 −j −1 +1 −1 |
| +j +j +j −1 −j −j −1 −j +j −j −1 −1 −j +1 +j +j +1 −j +j −j −1 −1 +1 +j −1 −1 +j −1 +1 −1 +j +j |
| +1 +j −1 −1 +j +1 −1 +1 −j −j −j +1 +j +j +1 +j −j +j +1 +1 −j +1 +j +j +1 −j +j −j −1 −1 +1 |
| +j −1 −1 +j −1 +1 −1 +j +j −1 −j +1 +1 −j −1 +1 −1 +j +j +j −1 −j −j −1 −j +j −j −1 −1 −j +1 +j |
| +j +1 −j +j −j −1 −1 +1 +j −1 −1 +j −1 +1 −1 +j +j −1 −j +1 +1 −j −1 +1 −1 +j +j +j −1 −j −j −1 |
| −j +j −j −1 −1 +j −1 −j −j −1 +j −j +j +1 +1 −1 −j +1 +1 −j +1 −1 +1 −j −j +1 +j −1 −1 +j +1 −1 |
| +1 −j −j −j +1 +j +j +1 +j −j +j +1 +1 +j −1 −j −j −1 +j −j +j +1 +1 −1 −j +1 +1 −j +1 −1 +1 −j |
| −j −1 −j +1 +1 −j −1 +1 −1 +j +j +j −1 −j −j −1 −j +j −j −1 −1 +j −1 −j −j −1 +j −j +j +1 +1 −1 −j |

TABLE 9-continued

The sequence $\mathrm{Seq}^{iTX}_{left,\,804}(k)$

+1 +1 −j +1 −1 +1 −j −j +1 +j −1 −1 +j +1 −1 +1 −j −j −j +1 +j +j +1 +j −j +j +1 +1 +j −1 −j
−j −1 +j −j +j +1 +1 −1 −j +1 +1 −j +1 −1 +1 −j −j +1 +j −1 −1 +j +1 −1 +1 −j −j −j +1 +j +j
+1 +j −j +j +1 +1 −j +1 +j +j +1 −j +j −j −1 −1 +1 +j −1 −1 +j −1 +1 −1 +j +j −1 −j +1 +1 −j
−1 +1 −1 +j +j +j −1 −j −j −1 −j +j −j −1 −1 −j +1 +j +j +1 −j +j −j −1 −1 +1 +j −1 −1 +j −1 +1
−1 +j +j +1 +j −1 −1 +j +1 −1 +1 −j −j −j +1 +j +j +1 +j −j +j +1 +1 −j +1 +j +j +1 −j +j −j −1
−1 +1 +j −1 −1 +j −1 +1 −1 +j +j

The Sequence $\mathrm{Seq}^{2}_{left,\,804}(k)$, to be transmitted from left to right, up to down +1 −1 −1 +1 +j −1 −j −j −1 +j −1 −j −j −1 +1 +j −1 −1 +j +1 +j −1 −1 +j −j +1 +j +j +1 −j +1
+j +j +1 +1 +j −1 −1 +j +1 +j −1 −1 +j +j −1 −j −j −1 −j +1 +j +j +1 −1 −j +1 +1 −j +1 +j −1
−1 +j −j +1 +j +j +1 +j −1 −j −j −1 −1 −j +1 +1 −j +1 +j −1 −1 +j +1 −1 +1 −j −j +1 −1 +1 −j −j
−j +j −j −1 −1 −j +j −j −1 −1 +1 −1 +1 −j −j +1 −1 +1 −j −j +j −j +j +1 +1 +j −j +j +1 +1 +1 −1
+1 −j −j −1 +1 −1 +j +j +j −j +j +1 +1 −j +j −j −1 −1 +1 −1 +1 −j −j −1 +1 −1 +j +j −j +j −j −1
−1 +j −j +j +1 +1 +j −1 −j −j −1 +j −1 −j −j −1 +1 +j −1 −1 +j +1 +j −1 −1 +j −j +1 +j +j +1 −j
+1 +j +j +1 +1 +j −1 −1 +j +1 +j −1 −1 +j +j −1 −j −j −1 −j +1 +j +j +1 −1 −j +1 +1 −j +1 +j
−1 −1 +j −j +1 +j +j +1 +j −1 −j −j −1 −1 −j +1 +1 −j +1 +j −1 −1 +j +1 −1 +1 −j −j +1 −1 +1 −j
−j −j +j −j −1 −1 −j +j −j −1 −1 +1 −1 +1 −j −j +1 −1 +1 −j −j +j −j +j +1 +1 +j −j +j +1 +1
+1 −1 +1 −j −j −1 +1 −1 +j +j +j −j +j +1 +1 −j +j −j −1 −1 +1 −1 +1 −j −j −1 +1 −1 +j +j −j +j
−j −1 −1 +j −j +j +1 +1 +1 +j −1 −1 +j +1 +j −1 −1 +j −j +1 +j +j +1 −j +1 +j +j +1 −1 −j +1
+1 −j −1 −j +1 +1 −j −j +1 +j +j +1 −j +1 +j +j +1 +1 +j −1 −1 +j −1 −j +1 +1 −j +j −1 −j −j −1
−j +1 +j +j +1 −1 −j +1 +1 −j +1 +j −1 −1 +j +j −1 −j −j −1 −j +1 +j +j +1 −j +j −j −1 −1 −j
+j −j −1 −1 −1 +1 −1 +j +j −1 +1 −1 +j +j −j +j −j −1 −1 −j +j −j −1 −1 +1 −1 +1 −j −j +1 −1 +1
−j −j −j +j −j −1 −1 +j −j +j +1 +1 +1 −1 +1 −j −j −1 +1 −1 +j +j −j +j −j −1 −1 +j −j +j +1 +1 −1
+1 −1 +j +j +1 −1 +1 −j −j −1 −j +1 +1 −j −1 −j +1 +1 −j +j −1 −j −j −1 +j −1 −j −j −1 +1 +j −1
−1 +j +1 +j −1 −1 +j +j −1 −j −j −1 +j −1 −j −j −1 −1 −j +1 +1 −j +1 +j −1 −1 +j −j +1 +j +j
+1 +j −1 −j −j −1 +1 +j −1 −1 +j −1 −j +1 +1 −j −j +1 +j +j +1 +j −1 −j −j −1 +j −j +j +1 +1 +j
−j +j +1 +1 +1 −1 +1 −j −j +1 −1 +1 −j −j +j −j +j +1 +1 +j −j +j +1 +1 −1 +1 −1 +j +j −1 +1
−1 +j +j +j −j +j +1 +1 −j +j −j −1 −1 −1 +1 −1 +j +j +1 −1 +1 −j −j +j −j +j +1 +1 −j +j −j −1
−1 +1 −1 +1 −j −j −1 +1 −1 +j +j +1 +j −1 −1 +j +1 +j −1 −1 +j −j +1 +j +j +1 −j +1 +j +j +1
−1 −j +1 +1 −j −1 −j +1 +1 −j −j +1 +j +j +1 −j +1 +j +j +1 +1 +j −1 −1 +j −1 −j +1 +1 −j +j
−1 −j −j −1 −j +1 +j +j +1 −1 −j +1 +1 −j +1 +j −1 −1 +j +j −1 −j −j −1 −j +1 +j +j +1 −j +j −j −1
−1 −j +j −j −1 −1 −1 +1 −1 +j +j −1 +1 −1 +j +j −j +j −j −1 −1 −j +j −j −1 −1 +1 −1 +1 −j −j +1
−1 +1 −j −j −j +j −j −1 −1 +j −j +j +1 +1 +1 −1 +1 −j −j −1 +1 −1 +j +j −j +j −j −1 −1 +j −j +j
+1 +1 −1 +1 −1 +j +j +1 −1 +1 −j −j The Sequence $\mathrm{Seq}^{3}_{left,\,804}(k)$, to be transmitted from left to right, up to down −j −1 −1 −1 +j −1 −j −j −1 +j −j +j +1 +1 −1 −j +1 +1 −j −1 +1 −1 +j +j −j +1 +j +j +1 +j −j +j
+1 +1 +1 +j −1 −1 +j −1 +1 −1 +j +j +1 +j −1 −1 +j +1 −1 +1 −j −j −j +1 +j +j +1 −j +j −j −1
−1 +1 +j −1 −1 +j −1 +1 −1 +j +j −j +1 +j +j +1 +j −j +j +1 +1 +j −1 −j −j −1 +j −j +j +1 +1
+1 +j −1 −1 +j +1 −1 +1 −j −j −j +1 +j +j +1 +j −j +j +1 +1 −1 −j +1 +1 −j +1 −1 +1 −j −j +1
+j −1 −1 +j +1 −1 +1 −j −j +j −1 −j −j −1 +j −j +j +1 +1 +1 +j −1 −1 +j −1 +1 −1 +j +j +j −1 −j
−j −1 −j +j −j −1 −1 −j +1 +j +j +1 −j +j −j −1 −1 +1 +j −1 −1 +j +1 −1 +1 −j −j +j −1 −j −j −1 −j
+j −j −1 −1 −1 −j +1 +1 −j +1 −1 +1 −j −j −1 −j +1 +1 −j −1 +1 −1 +j +j +j −1 −j −j −1 +j −j +j
+1 +1 −1 −j +1 +1 −j +1 −1 +1 −j −j +j −1 −j −j −1 −j +j −j −1 −1 −j +1 +j +j +1 −j +j −j −1 −1 −1
−j +1 +1 −j −1 +1 −1 +j +j +j −1 −j −j −1 −j +j −j −1 −1 +1 +j −1 −1 +j −1 +1 −1 +j +j −1 −j
+1 +1 −j −1 +1 −1 +j +j −j +1 +j +j +1 −j +j −j −1 −1 −1 −j +1 +1 −j +1 −1 +1 −j −j −j +1 +j
+j +1 +j −j +j +1 +1 +j −1 −j −j −1 +j −j +j +1 +1 −1 −j +1 +1 −j −1 +1 −1 +j +j −j +1 +j +j
+1 +j −j +j +1 +1 +1 +j −1 −1 +j −1 +1 −1 +j +j +1 +j −1 −1 +j +1 −1 +1 −j −j −j +1 +j +j
+1 −j +j −j −1 −1 +1 +j −1 −1 +j −1 +1 −1 +j +j −j +1 +j +j +1 +j −j +j +1 +1 +j −1 −j −j −1
+j −j +j +1 +1 +1 +j −1 −1 +j +1 −1 +1 −j −j −j +1 +j +j +1 +j −j +j +1 +1 −1 −j +1 +1 −j
+1 −1 +1 −j −j +1 +j −1 −1 +j +1 −1 +1 −j −j +j −1 −j −j −1 +j −j +j +1 +1 +1 +j −1 −1 +j −1
+1 −1 +j +j +j −1 −j −j −1 −j +j −j −1 −1 −1 −j +1 +1 −j −1 +1 −1 +j +j −j +1 +j +j +1 −j +j −j −1
−1 +1 +j −1 −1 +j −1 +1 −1 +j +j +j −1 −j −j −1 −j +j −j −1 −1 +j −1 −j −j −1 +j −j +j +1 +1
+1 +j −1 −1 +j +1 −1 +1 −j −j +j −1 −j −j −1 −j +j −j −1 −1 +1 +j −1 −1 +j −1 +1 −1 +j +j −1 −j
+1 +1 −j −1 +1 −1 +j +j +j −1 −j −j −1 +j −j +j +1 +1 +1 +j −1 −1 +j −1 +1 −1 +j +j −j +1 +j
+j +1 +j −j +j +1 +1 +j −1 −j −j −1 +j −j +j +1 +1 −1 −j +1 +1 −j −1 +1 −1 +j +j +j −1 −j −j −1
−j +j −j −1 −1 −1 −j +1 +1 −j +1 −1 +1 −j −j −1 −j +1 +1 −j −1 +1 −1 +j +j −j +1 +j +j +1 −j +j
−j −1 −1 +1 +j −1 −1 +j −1 +1 −1 +j +j +j −1 −j −j −1 −j +j −j −1 −1 +j −1 −j −j −1 +j −j +j +1
+1 +1 +j −1 −1 +j +1 −1 +1 −j −j +j −1 −j −j −1 −j +j −j −1 −1 +1 +j −1 −1 +j −1 +1 −1 +j +j −1
−j +1 +1 −j −1 +1 −1 +j +j +j −1 −j −j −1 +j −j +j +1 +1 +1 +j −1 −1 +j −1 +1 −1 +j +j −j +1
+j +j +1 +j −j +j +1 +1 +j −1 −j −j −1 +j −j +j +1 +1 −1 −j +1 +1 −j −1 +1 −1 +j +j +j −1 −j −j
−1 −j +j −j −1 −1 −1 −j +1 +1 −j +1 −1 +1 −j −j The Sequence $\mathrm{Seq}^{4}_{left,\,804}(k)$, to be transmitted from left to right, up to down +1 +j +j −j +j −1 −j −j −1 +j −1 −j −j −1 −j +j −j −1 −1 −j +j −j −1 −1 −1 −j +1 +1 −j −1 −j +1 +1
−j +1 −1 +1 −j −j +1 −1 +1 −j −j −1 −j +1 +1 −j +1 +j −1 −1 +j +1 −1 +1 −j −j −1 +1 −1 +j +j
+j −1 −j −j −1 −j +1 +j +j +1 −j +j −j −1 −1 +j −j +j +1 +1 −1 −j +1 +1 −j −1 −j +1 +1 −j −1 +1
−1 +j +j −1 +1 −1 +j +j +j −1 −j −j −1 +j −1 −j −j −1 +j −j +j +1 +1 +j −j +j +1 +1 −j +1 +j +j
+1 +j −1 −j −j −1 −j +j −j −1 −1 +j −j +j +1 +1 +1 +j −1 −1 +j −1 −j +1 +1 −j +1 −1 +1 −j −j −1
+1 −1 +j +j −j +1 +j +j +1 −j +1 +j +j +1 +j −j +j +1 +1 +j −j +j +1 +1 +1 +j −1 −1 +j +1
+j −1 −1 +j −1 +1 −1 +j +j −1 +1 −1 +j +j +1 +j −1 −1 +j −1 −j +1 +1 −j −1 +1 −1 +j +j +1 −1
+1 −j −j −j +1 +j +j +1 +j −1 −j −j −1 +j −j +j +1 +1 −j +j −j −1 −1 +1 +j −1 −1 +j +1 +j −1 −1
+j +1 −1 +1 −j −j +1 −1 +1 −j −j −j +1 +j +j +1 −j +1 +j +j +1 −j +j −j −1 −1 −j +j −j −1 −1 +j
−1 −j −j −1 −j +1 +j +j +1 +j −j +j +1 +1 −j +j −j −1 −1 −1 −j +1 +1 −j +1 +j −1 −1 +j −1 +1 −1
+j +j +1 −1 +1 −j −j +j −1 −j −j −1 +j −1 −j −j −1 −j +j −j −1 −1 −j +j −j −1 −1 −1 −j +1 +1 −j −1 −j
+1 +1 −j +1 −1 +1 −j −j +1 −1 +1 −j −j −1 −j +1 +1 −j +1 +j −1 −1 +j +1 −1 +1 −j −j −1 +1 −1
+j +j +j −1 −j −j −1 −j +1 +j +j +1 −j +j −j −1 −1 +j −j +j +1 +1 −1 −j +1 +1 −j −1 −j +1 +1 −j
−1 +1 −1 +j +j −1 +1 −1 +j +j +j −1 −j −j −1 +j −1 −j −j −1 +j −j +j +1 +1 +j −j +j +1 +1 −j TABLE 9-continued The sequence $Seq^{iTX}_{left,\ 804}(k)$ +1 +j +j +1 +j −1 −j −j −1 −j +j −j −1 −1 +j −j +j +1 +1 +1 +j −1 −1 +j −1 −j +1 +1 −j +1 −1
+1 −j −j −1 +1 −1 +j +j −1 −j +1 +1 −j −1 −j +1 +1 −j +1 −1 +1 −j −j +1 −1 +1 −j −j −j +1 +j +j
+1 −j +1 +j +j +1 +j −j +j +1 +1 +j −j +j +1 +1 −j +1 +j +j +1 +j −1 −j −j −1 +j −j +j +1 +1
−j +j −j −1 −1 −1 −j +1 +1 −j +1 +j −1 −1 +j +1 −1 +1 −j −j −1 +1 −1 +j +j −j +1 +j +j +1 −j
+1 +j +j +1 −j +j −j −1 −1 −j +j −j −1 −1 −1 −j +1 +1 −j −1 −j +1 +1 −j −1 +1 −1 +j +j −1 +1 −1
+j +j +1 +j −1 −1 +j −1 −j +1 +1 −j +1 −1 +1 −j −j −1 +1 −1 +j +j +j −1 −j −j −1 −j +1 +j +j
+1 +j −j +j +1 +1 −j +j −j −1 −1 −1 −j +1 +1 −j −1 −j +1 +1 −j +1 −1 +1 −j −j +1 −1 +1 −j −j −j
+1 +j +j +1 −j +1 +j +j +1 +j −j +j +1 +1 +j −j +j +1 +1 −j +1 +j +j +1 +j −1 −j −j −1 +j −j
+j +1 +1 −j +j −j −1 −1 −1 −j +1 +1 −j +1 +j −1 −1 +j +1 −1 +1 −j −j −1 +1 −1 +j +j −j +1 +j
+j +1 −j +1 +j +j +1 −j +j −j −1 −1 −j +j −j −1 −1 −1 −j +1 +1 −j −1 −j +1 +1 −j −1 +1 −1 +j +j
−1 +1 −1 +j +j +1 +j −1 −1 +j −1 −j +1 +1 −j +1 −1 +1 −j −j −1 +1 −1 +j +j +j −1 −j −j −1 −j
+1 +j +j +1 +j −j +j +1 +1 −j +j −j −1 −1

The Sequence $Seq^{5}_{left,\ 804}(k)$, to be transmitted from left to right, up to down −j −j +1 −j −1 −1 −j +j −j −1 −1 −j +j −j +1 +1 +j −j +j −1 −1 −j +j −j −j +1 +1 −j −1 −j +1 +1 −j
−1 +j −1 −1 +j +1 −j +1 +1 −j −1 −1 −1 −j +j −j +1 +1 +j −j +j +1 +1 +j −j +j +1 +1 +j −j +j
+j −1 −1 +j +1 −j +1 +1 −j −1 −j +1 +1 −j −1 −j +1 +1 −j −1 +j +j −1 +1 −1 +j +j −1 +1 −1 +j
+j −1 +1 −1 −j −j +1 −1 +1 −1 −j −j −1 +j −1 −j −j −1 +j −1 −j −j −1 +j +1 +j +j +1 −j +j +j −1
+1 −1 −j −j +1 −1 +1 +j +j −1 +1 −1 +j +j −1 +1 −1 +1 +j +j +1 −j −1 −j −j −1 +j +1 +j +j +1
−j +1 +j +j +1 −j −1 −1 −j +j −j −1 −1 −j +j −j +1 +1 +j −j +j −1 −1 −j +j −j −j +1 +1 −j −1 −j +1
+1 −j −1 +j −1 −1 +j +1 −j +1 +1 −j −1 −1 −1 −j +j −j +1 +1 +j −j +j +1 +1 +j −j +j +1 +1 +j
−j +j +j −1 −1 +j +1 −j +1 +1 −j −1 −j +1 +1 −j −1 −j +1 +1 −j −1 +j +j −1 +1 −1 +j +j −1 +1 −1
+j +j −1 +1 −1 −j −j +1 −1 +1 −1 −j −j −1 +j −1 −j −j −1 +j −1 −j −j −1 +j +1 +j +j +1 −j +j +j
−1 +1 −1 −j −j +1 −1 +1 +j +j −1 +1 −1 +j +j −1 +1 −1 +1 +j +j +1 −j −1 −j −j −1 +j +1 +j +j
+1 −j +1 +j +j +1 −j +j +j −1 +1 −1 +j +j −1 +1 −1 −j −j +1 −1 +1 +j +j −1 +1 −1 −1 −j −j −1
+j −1 −j −j −1 +j +1 +j +j +1 −j −1 −j −j −1 +j +j +j −1 +1 −1 −j −j +1 −1 +1 −j −j +1 −1 +1 −j −j
+1 −1 +1 +1 +j +j +1 −j −1 −j −j −1 +j −1 −j −j −1 +j −1 −j −j −1 +j +1 +1 +j −j +j +1 +1 +j −j
+j +1 +1 +j −j +j −1 −1 −j +j −j +j −1 −1 +j +1 +j −1 −1 +j +1 +j −1 −1 +j +1 −j +1 +1 −j −1
+1 +1 +j −j +j −1 −1 −j +j −j +1 +1 +j −j +j +1 +1 +j −j +j −j +1 +1 −j −1 +j −1 −1 +j +1 −j
+1 +1 −j −1 −j +1 +1 −j −1 −j −j +1 −1 +1 −j −j +1 −1 +1 +j +j −1 +1 −1 −j −j +1 −1 +1 +1 +j
+j +1 −j +1 +j +j +1 −j −1 −j −j −1 +j +1 +j +j +1 −j −j −j +1 −1 +1 +j +j −1 +1 −1 +j +j −1
+1 −1 +j +j −1 +1 −1 −1 −j −j −1 +j +1 +j +j +1 −j +1 +j +j +1 −j +1 +j +j +1 −j −1 −1 −j +j −j
−1 −1 −j +j −j −1 −1 −j +j −j +1 +1 +j −j +j −j +1 +1 −j −1 −j +1 +1 −j −1 −j +1 +1 −j −1 +j −1
−1 +j +1 −1 −1 −j +j −j +1 +1 +j −j +j −1 −1 −j +j −j −1 −1 −j +j −j +j −1 −1 +j +1 −j +1 +1 −j −1
+j −1 −1 +j +1 +j −1 −1 +j +1 +j +j −1 +1 −1 +j +j −1 +1 −1 −j −j +1 −1 +1 +j +j −1 +1 −1
−1 −j −j −1 +j −1 −j −j −1 +j +1 +j +j +1 −j −1 −j −j −1 +j +j +j −1 +1 −1 −j −j +1 −1 +1 −j −j +1
−1 +1 −j −j +1 −1 +1 +1 +j +j +1 −j −1 −j −j −1 +j −1 −j −j −1 +j −1 −j −j −1 +j +1 +1 +j −j +j
+1 +1 +j −j +j +1 +1 +j −j +j −1 −1 −j +j −j +j −1 −1 +j +1 +j −1 −1 +j +1 +j −1 −1 +j +1 −j
+1 +1 −j −1 +1 +1 +j −j +j −1 −1 −j +j −j +1 +1 +j −j +j +1 +1 +j −j +j −j +1 +1 −j −1 +j −1 −1
+j +1 −j +1 +1 −j −1 −j +1 +1 −j −1

The Sequence $Seq^{6}_{left,\ 804}(k)$, to be transmitted from left to right, up to down +j +j +1 −1 +1 +j +j +1 −j −j +1 +1 −j −1 −1 −j −j −1 +j −j +1 +1 −j −1 −j +1 +1 −j −1 −1 −j −j
−1 +j +j −1 −1 +j +1 −1 −j −j −1 +j +1 +1 +j −j +j −j −j +1 −1 +1 +1 +1 +j −j +j +j +j −1 +1 −1
−j −j +1 −1 +1 −1 −1 −j +j −j −j −j +1 −1 +1 +1 +1 +j −j +j +j −1 −1 +j +1 −1 −j −j −1 +j −j
+1 +1 −j −1 −1 −j −j −1 +j −1 −j −j −1 +j −j +1 +1 −j −1 +1 +j +j +1 −j −j +1 +1 −j −1 +j +j −1
+1 −1 −1 −1 −j +j −j +j +j −1 +1 −1 +1 +1 +j −j +j −1 −1 −j +j −j −j −j +1 −1 +1 −1 −1 −j +j −j
+j +j −1 +1 −1 +1 +j +j +1 −j −j +1 +1 −j −1 −1 −j −j −1 +j −j +1 +1 −j −1 −j +1 +1 −j −1 −1 −j
−j −1 +j +j −1 −1 +j +1 −1 −j −j −1 +j +1 +1 +j −j +j −j −j +1 −1 +1 +1 +1 +j −j +j +j +j −1
+1 −1 −j −j +1 −1 +1 −1 −1 −j +j −j −j −j +1 −1 +1 +1 +1 +j −j +j +j −1 −1 +j +1 −1 −j −j −1 +j
−j +1 +1 −j −1 −1 −j −j −1 +j −1 −j −j −1 +j −j +1 +1 −j −1 +1 +j +j +1 −j −j +1 +1 −j −1 +j +j −1
+1 −1 −1 −1 −j +j −j +j +j −1 +1 −1 +1 +1 +j −j +j −1 −1 −j +j −j −j −j +1 −1 +1 −1 −1 −j +j −j
+j +j −1 +1 −1 −j +1 +1 −j −1 −1 −j −j −1 +j +j −1 −1 +j +1 −1 −j −j −1 +j −1 −j −j −1 +j +j −1 −1
+j +1 +1 +j +j +1 −j +j −1 −1 +j +1 −j −j +1 −1 +1 −1 −1 −j +j −j −j −j +1 −1 +1 +1 +1 +j −j
+j −1 −1 −j +j −j +j +j −1 +1 −1 −1 −1 −j +j −j −j −j +1 −1 +1 +1 +j +j +1 −j +j −1 −1 +j +1 −1
−j −j −1 +j +j −1 −1 +j +1 +j −1 −1 +j +1 −1 −j −j −1 +j −j +1 +1 −j −1 −1 −j −j −1 +j +1 +1
+j −j +j +j +j −1 +1 −1 +1 +1 +j −j +j −j −j +1 −1 +1 +j +j −1 +1 −1 −1 −1 −j +j −j +j +j −1
+1 −1 +1 +1 +j −j +j +j −1 −1 +j +1 +1 +j +j +1 −j −j +1 +1 −j −1 +1 +j +j +1 −j +1 +j +j
+1 −j −j +1 +1 −j −1 −1 −j −j −1 +j −j +1 +1 −j −1 +j +j −1 +1 −1 +1 +1 +j −j +j +j +j −1 +1 −1
−1 −1 −j +j −j +1 +1 +j −j +j −j −j +1 −1 +1 +1 +1 +j −j +j +j +j −1 +1 −1 −1 −j −j −1 +j −j
+1 +1 −j −1 +1 +j +j +1 −j −j +1 +1 −j −1 −j +1 +1 −j −1 +1 +j +j +1 −j +j −1 −1 +j +1 +1 +j
+j +1 −j −1 −1 −j +j −j −j −j +1 −1 +1 −1 −1 −j +j −j +j +j −1 +1 −1 −j −j +1 −1 +1 +1 +1 +j −j
+j −j −j +1 −1 +1 −1 −1 −j +j −j −j +1 +1 −j −1 −1 −j −j −1 +j +j −1 −1 +j +1 −1 −j −j −1 +j −1 −j
−j −1 +j +j −1 −1 +j +1 +1 +j +j +1 −j +j −1 −1 +j +1 −j −j +1 −1 +1 −1 −1 −j +j −j −j −j +1 −1
+1 +1 +1 +j −j +j −1 −1 −j +j −j +j +j −1 +1 −1 −1 −1 −j +j −j −j −j +1 −1 +1 +1 +j +j +1 −j +j
−1 −1 +j +1 −1 −j −j −1 +j +j −1 −1 +j +1 +j −1 −1 +j +1 −1 −j −j −1 +j −j +1 +1 −j −1 −1 −j −j −1
+j +1 +1 +j −j +j +j +j −1 +1 −1 +1 +1 +j −j +j −j −j +1 −1 +1 +j +j −1 +1 −1 −1 −1 −j +j −j
+j +j −1 +1 −1 +1 +1 +j −j +j The Sequence $Seq^{7}_{left,\ 804}(k)$, to be transmitted from left to right, up to down +j −j −1 −1 −1 −1 −j +j −j +1 +1 +j −j +j +1 +j +j +1 −j +1 +j +j +1 −j −j −j +1 −1 +1 +j +j −1
+1 −1 +j −1 −1 +j +1 +j −1 −1 +j +1 +j +j −1 +1 −1 −j −j +1 −1 +1 −j +1 +1 −j −1 −j +1 +1 −j
−1 +1 +1 +j −j +j −1 −1 −j +j −j −1 −j −j −1 +j −1 −j −j −1 +j −j −j +1 −1 +1 −j −j +1 −1 +1 +j −1
−1 +j +1 −j +1 +1 −j −1 −1 −1 −j +j −j −1 −1 −j +j −j +1 +j +j +1 −j −1 −j −j −1 +j −1 −1 −j +j −j
−1 −1 −j +j −j +1 +j +j +1 −j −1 −j −j −1 +j −j −j +1 −1 +1 −j −j +1 −1 +1 +j −1 −1 +j +1 −j +1
+1 −j −1 +1 +1 +j −j +j −1 −1 −j +j −j −1 −j −j −1 +j −1 −j −j −1 +j +j +j −1 +1 −1 −j −j +1 −1
+1 −j +1 +1 −j −1 −j +1 +1 −j −1 −j −j +1 −1 +1 +j +j −1 +1 −1 +j −1 −1 +j +1 +j −1 −1 +j +1
−1 −1 −j +j −j +1 +1 +j −j +j +1 +j +j +1 −j +1 +j +j +1 −j +j +j −1 +1 −1 +j +j −1 +1 −1 −j TABLE 9-continued

| The sequence $Seq^{iTX}_{left,\ 804}(k)$ |
| --- |
| +1 +1 −j −1 +j −1 −1 +j +1 +1 +1 +j −j +j +1 +1 +j −j +j −1 −j −j −1 +j +1 +j +j +1 −j +1 |
| +1 +j −j +j +1 +1 +j −j +j −1 −j −j −1 +j +1 +j +j +1 −j +j +j −1 +1 −1 +j +j −1 +1 −1 −j +1 |
| +1 −j −1 +j −1 −1 +j +1 −1 −1 −j +j −j +1 +1 +j −j +j +1 +j +j +1 −j +1 +j +j +1 −j −j −j +1 −1 |
| +1 +j +j −1 +1 −1 +j −1 −1 +j +1 +j −1 −1 +j +1 +j +j −1 +1 −1 −j −j +1 −1 +1 −j +1 +1 −j |
| −1 −j +1 +1 −j −1 +1 +1 +j −j +j −1 −1 −j +j −j −1 −j −j −1 +j −1 −j −j −1 +j −j −j +1 −1 +1 −j −j |
| +1 −1 +1 +j −1 −1 +j +1 −j +1 +1 −j −1 −1 −1 −j +j −j −1 −1 −j +j −j +1 +j +j +1 −j −1 −j −j −1 |
| +j −1 −1 −j +j −j −1 −1 −j +j −j +1 +j +j +1 −j −1 −j −j −1 +j −j −j +1 −1 +1 −j −j +1 −1 +1 +j −1 |
| −1 +j +1 −j +1 +1 −j −1 −j −j +1 −1 +1 +j +j −1 +1 −1 +j −1 −1 +j +1 +j −1 −1 +j +1 +1 +1 |
| +j −j +j −1 −1 −j +j −j −1 −j −j −1 +j −1 −j −j −1 +j −1 −1 −j +j −j +1 +1 +j −j +j +1 +j +j +1 −j |
| +1 +j +j +1 −j +j +j −1 +1 −1 −j −j +1 −1 +1 −j +1 +1 −j −1 −j +1 +1 −j −1 +1 +1 +j −j +j +1 |
| +1 +j −j +j −1 −j −j −1 +j +1 +j +j +1 −j −j −j +1 −1 +1 −j −j +1 −1 +1 +j −1 −1 +j +1 −j +1 |
| +1 −j −1 −j −j +1 −1 +1 −j −j +1 −1 +1 +j −1 −1 +j +1 −j +1 +1 −j −1 +1 +1 +j −j +j +1 +1 +j |
| −j +j −1 −j −j −1 +j +1 +j +j +1 −j −j −j +1 −1 +1 +j +j −1 +1 −1 +j −1 −1 +j +1 +j −1 −1 +j |
| +1 +1 +1 +j −j +j −1 −1 −j +j −j −1 −j −j −1 +j −1 −j −j −1 +j −1 −1 −j +j −j +1 +1 +j −j +j +1 |
| +j +j +1 −j +1 +j +j +1 −j +j +j −1 +1 −1 −j −j +1 −1 +1 −j +1 +1 −j −1 −j +1 +1 −j −1 +1 +1 |
| +j −j +j +1 +1 +j −j +j −1 −j −j −1 +j +1 +j +j +1 −j −j −j +1 −1 +1 −j −j +1 −1 +1 +j −1 −1 +j |
| +1 −j +1 +1 −j −1 −j −j +1 −1 +1 −j −j +1 −1 +1 +j −1 −1 +j +1 −j +1 +1 −j −1 +1 +1 +j −j +j |
| +1 +1 +j −j +j −1 −j −j −1 +j +1 +j +j +1 −j |
| The Sequence $Seq^{8}_{left,\ 804}(k)$, to be transmitted from left to right, up to down |
| −1 +j +1 −1 −j −j +1 −1 +1 −1 −1 −j +j −j −1 −1 −j +j −j +j +j −1 +1 −1 −j +1 +1 −j −1 −1 −j −j −1 |
| +j −1 −j −j −1 +j +j −1 −1 +j +1 +1 +1 +j −j +j +j +j −1 +1 −1 +j +j −1 +1 −1 −1 −1 −j +j −j |
| +1 +j +j +1 −j +j −1 −1 +j +1 +j −1 −1 +j +1 −1 −j −j −1 +j +j +j −1 +1 −1 −1 −1 −j +j −j +1 |
| +1 +j −j +j +j +j −1 +1 −1 −j +1 +1 −j −1 +1 +j +j +1 −j −1 −j −j −1 +j −j +1 +1 −j −1 −1 −1 −j |
| +j −j +j +j −1 +1 −1 −j −j +1 −1 +1 −1 −1 −j +j −j +1 +j +j +1 −j −j +1 +1 −j −1 +j −1 −1 +j +1 |
| +1 +j +j +1 −j +j +j −1 +1 −1 +1 +1 +j −j +j +1 +1 +j −j +j −j −j +1 −1 +1 +j −1 −1 +j +1 |
| +1 +j +j +1 −j +1 +j +j +1 −j −j +1 +1 −j −1 −1 −1 −j +j −j −j −j +1 −1 +1 −j −j +1 −1 +1 +1 |
| +1 +j −j +j −1 −j −j −1 +j −j +1 +1 −j −1 −j +1 +1 −j −1 +1 +j +j +1 −j −j −j +1 −1 +1 +1 +1 |
| +j −j +j −1 −1 −j +j −j −j −j +1 −1 +1 +j −1 −1 +j +1 −1 −j −j −1 +j +1 +j +j +1 −j +j −1 −1 +j |
| +1 +1 +1 +j −j +j −j −j +1 −1 +1 +j +j −1 +1 −1 +1 +1 +j −j +j −1 −j −j −1 +j +j −1 −1 +j +1 |
| −j +1 +1 −j −1 −1 −j −j −1 +j −j −j +1 −1 +1 −1 −1 −j +j −j −1 −1 −j +j −j +j +j −1 +1 −1 −j +1 |
| +1 −j −1 −1 −j −j −1 +j −1 −j −j −1 +j +j −1 −1 +j +1 +1 +1 +j −j +j +j +j −1 +1 −1 +j +j −1 +1 |
| −1 −1 −1 −j +j −j +1 +j +j +1 −j +j −1 −1 +j +1 +j −1 −1 +j +1 −1 −j −j −1 +j +j +j −1 +1 −1 −1 |
| −1 −j +j −j +1 +1 +j −j +j +j +j −1 +1 −1 −j +1 +1 −j −1 +1 +j +j +1 −j −1 −j −j −1 +j −j +1 +1 |
| −j −1 −1 −1 −j +j −j +j +j −1 +1 −1 −j −j +1 −1 +1 −1 −1 −j +j −j +1 +j +j +1 −j −j +1 +1 −j −1 |
| +j −1 −1 +j +1 +1 +j +j +1 −j +1 +1 +j −j +j −j −j +1 −1 +1 −j −j +1 −1 +1 −1 −1 −j +j −j +1 |
| +j +j +1 −j −j +1 +1 −j −1 −j +1 +1 −j −1 −1 −j −j −1 +j +j +j −1 +1 −1 −1 −1 −j +j −j −1 −1 −j |
| +j −j −j −j +1 −1 +1 +j −1 −1 +j +1 −1 −j −j −1 +j −1 −j −j −1 +j −j +1 +1 −j −1 −1 −1 −j +j −j −j |
| −j +1 −1 +1 +j +j −1 +1 −1 −1 −1 −j +j −j +1 +j +j +1 −j +j −1 −1 +j +1 −j +1 +1 −j −1 +1 +j |
| +j +1 −j −j −j +1 −1 +1 −1 −1 −j +j −j +1 +1 +j −j +j −j −j +1 −1 +1 +j −1 −1 +j +1 +1 +j +j |
| +1 −j −1 −j −j −1 +j +j −1 −1 +j +1 +1 +1 +j −j +j −j −j +1 −1 +1 −j −j +1 −1 +1 −1 −1 −j +j −j |
| +1 +j +j +1 −j −j +1 +1 −j −1 −j +1 +1 −j −1 −1 −j −j −1 +j +j +j −1 +1 −1 −1 −1 −j +j −j −1 −1 |
| −j +j −j −j −j +1 −1 +1 +j −1 −1 +j +1 −1 −j −j −1 +j −1 −j −j −1 +j −j +1 +1 −j −1 −1 −1 −j +j −j |
| −j −j +1 −1 +1 +j +j −1 +1 −1 −1 −1 −j +j −j +1 +j +j +1 −j +j −1 −1 +j +1 −j +1 +1 −j −1 +1 |
| +j +j +1 −j −j −j +1 −1 +1 −1 −1 −j +j −j +1 +1 +j −j +j −j −j +1 −1 +1 +j −1 −1 +j +1 +1 +j |
| +j +1 −j −1 −j −j −1 +j +j −1 −1 +j +1 |

TABLE 10

| The sequence $Seq^{iTX}_{right,\ 804}(k)$ |
| --- |
| The Sequence $Seq^{1}_{right,\ 804}(k)$, to be transmitted from left to right, up to down |
| −j +1 +j +j +1 −j +j −j −1 −1 −1 −j +1 +1 −j +1 −1 +1 −j −j +1 +j −1 −1 +j +1 −1 +1 −j −j +j −1 |
| −j −j −1 −j +j −j −1 −1 −j +1 +j +j +1 −j +j −j −1 −1 −1 −j +1 +1 −j +1 −1 +1 −j −j −1 −j +1 +1 −j |
| −1 +1 −1 +j +j −j +1 +j +j +1 +j −j +j +1 +1 −j +1 +j +j +1 −j +j −j −1 −1 −1 −j +1 +1 −j +1 |
| −1 +1 −j −j +1 +j −1 −1 +j +1 −1 +1 −j −j +j −1 −j −j −1 −j +j −j −1 −1 +j −1 −j −j −1 +j −j +j +1 |
| +1 +1 +j −1 −1 +j −1 +1 −1 +j +j +1 +j −1 −1 +j +1 −1 +1 −j −j +j −1 −j −j −1 −j +j −j −1 −1 −1 |
| −j +1 +1 −j −1 +1 −1 +j +j +j −1 −j −j −1 −j +j −j −1 −1 −j +1 +j +j +1 −j +j −j −1 −1 +1 +j −1 −1 |
| +j −1 +1 −1 +j +j −1 −j +1 +1 −j −1 +1 −1 +j +j +j −1 −j −j −1 −j +j −j −1 −1 +j −1 −j −j −1 +j |
| −j +j +1 +1 −1 −j +1 +1 −j +1 −1 +1 −j −j −1 −j +1 +1 −j −1 +1 −1 +j +j +j −1 −j −j −1 −j +j −j |
| −1 −1 −j +1 +j +j +1 −j +j −j −1 −1 +1 +j −1 −1 +j −1 +1 −1 +j +j +1 +j −1 −1 +j +1 −1 +1 −j |
| −j −j +1 +j +j +1 +j −j +j +1 +1 −j +1 +j +j +1 −j +j −j −1 −1 +1 +j −1 −1 +j −1 +1 −1 +j +j −1 |
| −j +1 +1 −j −1 +1 −1 +j +j +j −1 −j −j −1 −j +j −j −1 −1 −j +1 +j +j +1 −j +j −j −1 −1 +1 +j −1 |
| −1 +j −1 +1 −1 +j +j −1 −j +1 +1 −j −1 +1 −1 +j +j +j −1 −j −j −1 −j +j −j −1 −1 +j −1 −j −j −1 |
| +j −j +j +1 +1 −1 −j +1 +1 −j +1 −1 +1 −j −j −1 −j +1 +1 −j −1 +1 −1 +j +j +j −1 −j −j −1 −j +j |
| −j −1 −1 −j +1 +j +j +1 −j +j −j −1 −1 +1 +j −1 −1 +j −1 +1 −1 +j +j +1 +j −1 −1 +j +1 −1 +1 |
| −j −j −j +1 +j +j +1 +j −j +j +1 +1 −j +1 +j +j +1 −j +j −j −1 −1 +1 +j −1 −1 +j −1 +1 −1 +j |
| +j −j +1 +j +j +1 −j +j −j −1 −1 −1 −j +1 +1 −j +1 −1 +1 −j −j +1 +j −1 −1 +j +1 −1 +1 −j −j +j |
| −1 −j −j −1 −j +j −j −1 −1 −j +1 +j +j +1 −j +j −j −1 −1 −1 −j +1 +1 −j +1 −1 +1 −j −j −1 −j +1 |
| +1 −j −1 +1 −1 +j +j −j +1 +j +j +1 +j −j +j +1 +1 −j +1 +j +j +1 −j +j −j −1 −1 −1 −j +1 +1 |
| −j +1 −1 +1 −j −j +1 +j −1 −1 +j +1 −1 +1 −j −j +j −1 −j −j −1 −j +j −j −1 −1 +j −1 −j −j −1 +j −j |
| +j +1 +1 +1 +j −1 −1 +j −1 +1 −1 +j +j +1 +j −1 −1 +j +1 −1 +1 −j −j +j −1 −j −j −1 −j +j −j −1 |
| −1 +1 +j −1 −1 +j +1 −1 +1 −j −j −j +1 +j +j +1 +j −j +j +1 +1 +j −1 −j −j −1 +j −j +j +1 |
| +1 −1 −j +1 +1 −j +1 −1 +1 −j −j +1 +j −1 −1 +j +1 −1 +1 −j −j −j +1 +j +j +1 +j −j +j +1 +1 |

TABLE 10-continued

| The sequence $Seq^{iTX}_{right,\ 804}(k)$ |
| --- |
| −j +1 +j +j +1 −j +j −j −1 −1 +1 +j −1 −1 +j −1 +1 −1 +j +j +1 +j −1 −1 +j +1 −1 +1 −j −j −j |
| +1 +j +j +1 +j −j +j +1 +1 +j −1 −j −j −1 +j −j +j +1 +1 −1 −j +1 +1 −j +1 −1 +1 −j −j −1 −j |
| +1 +1 −j −1 +1 −1 +j +j +j −1 −j −j −1 −j +j −j −1 −1 +j −1 −j −j −1 +j −j +j +1 +1 −1 −j +1 +1 |
| −j +1 −1 +1 −j −j +1 +1 +j −1 |
| The Sequence $Seq^{2}_{right,\ 804}(k)$, to be transmitted from left to right, up to down |
| −j +1 +j +j +1 +j −1 −j −j −1 −1 −j +1 +1 −j +1 +j −1 −1 +j +j −1 −j −j −1 −j +1 +j +j +1 −1 −j |
| +1 +1 −j +1 +j −1 −1 +j −j +1 +j +j +1 −j +1 +j +j +1 +1 +j −1 −1 +j +1 +j −1 −1 +j +j −1 −j |
| −j −1 +j −1 −j −j −1 +1 +j −1 −1 +j +1 +j −1 −1 +j −1 +1 −1 +j +j +1 −1 +1 −j −j +j −j +j +1 |
| +1 −j +j −j −1 −1 −1 +1 −1 +j +j +1 −1 +1 −j −j −j +j −j −1 −1 +j −j +j +1 +1 −1 +1 −1 +j +j −1 |
| +1 −1 +j +j −j +j −j −1 −1 −j +j −j −1 −1 −1 +1 −1 +j +j −1 +1 −1 +j +j +j −j +j +1 +1 +j −j +j |
| +1 +1 −1 −j +1 +1 −j +1 +j −1 −1 +j +j −1 −j −j −1 −j +1 +j +j +1 +1 +j −1 −1 +j −1 −j +1 +1 |
| −j +j −1 −j −j −1 −j +1 +j +j +1 −1 −j +1 +1 −j −1 −j +1 +1 −j −j +1 +j +j +1 −j +1 +j +j +1 |
| +1 +j −1 −1 +j +1 +j −1 −1 +j −j +1 +j +j +1 −j +1 +j +j +1 +j −j +j +1 +1 −j +j −j −1 −1 +1 |
| −1 +1 −j −j −1 +1 −1 +j +j +j −j +j +1 +1 −j +j −j −1 −1 −1 +1 −1 +j +j +1 −1 +1 −j −j +j −j +j |
| +1 +1 +j −j +j +1 +1 −1 +1 −1 +j +j −1 +1 −1 +j +j +j −j +j +1 +1 +j −j +j +1 +1 +1 −1 +1 |
| −j −j +1 −1 +1 −j −j −1 −j +1 +1 −j +1 +j −1 −1 +j +j −1 −j −j −1 −j +1 +j +j +1 +1 +j −1 −1 +j |
| −1 −j +1 +1 −j +j −1 −j −j −1 −j +1 +j +j +1 −1 −j +1 +1 −j −1 −j +1 +1 −j −j +1 +j +j +1 −j +1 |
| +j +j +1 +1 +j −1 −1 +j +1 +j −1 −1 +j −j +1 +j +j +1 −j +1 +j +j +1 +j −j +j +1 +1 −j +j −j |
| −1 −1 +1 −1 +1 −j −j −1 +1 −1 +j +j +j −j +j +1 +1 −j +j −j −1 −1 −1 +1 −1 +j +j +1 −1 +1 −j −j |
| +j −j +j +1 +1 +j −j +j +1 +1 −1 +1 −1 +j +j −1 +1 −1 +j +j +j −j +j +1 +1 +j −j +j +1 +1 |
| +1 −1 +1 −j −j +1 −1 +1 −j −j −j +1 +j +j +1 +j −1 −j −j −1 −1 −j +1 +1 −j +1 +j −1 −1 +j +j −1 |
| −j −j −1 −j +1 +j +j +1 −1 −j +1 +1 −j +1 +j −1 −1 +j −j +1 +j +j +1 −j +1 +j +j +1 +1 +j −1 |
| −1 +j +1 +j −1 −1 +j +j −1 −j −j −1 +j −1 −j −j −1 +1 +j −1 −1 +j +1 +j −1 −1 +j −1 +1 −1 +j +j |
| +1 −1 +1 −j −j +j −j +j +1 +1 −j +j −j −1 −1 −1 +1 −1 +j +j +1 −1 +1 −j −j −j +j −j −1 −1 +j −j |
| +j +1 +1 −1 +1 −1 +j +j −1 +1 −1 +j +j −j +j −j −1 −1 −j +j −j −1 −1 −1 +1 −1 +j +j −1 +1 −1 |
| +j +j +j −j +j +1 +1 +j −j +j +1 +1 +1 +j −1 −1 +j −1 −j +1 +1 −j −j +1 +j +j +1 +j −1 −j −j −1 |
| −1 −j +1 +1 −j +1 +j −1 −1 +j −j +1 +j +j +1 +j −1 −j −j −1 +1 +j −1 −1 +j +1 +j −1 −1 +j |
| +j −1 −j −j −1 +j −1 −j −j −1 −1 −j +1 +1 −j −1 −j +1 +1 −j +j −1 −j −j −1 +j −1 −j −j −1 −j +j −j −1 |
| −1 +j −j +j +1 +1 −1 +1 −1 +j +j +1 −1 +1 −j −j −j +j −j −1 −1 +j −j +j +1 +1 +1 −1 +1 −j −j −1 |
| +1 −1 +j +j −j +j −j −1 −1 −j +j −j −1 −1 +1 −1 +1 −j −j +1 −1 +1 −j −j −j +j −j −1 −1 −j +j −j −1 |
| −1 −1 +1 −1 +j +j −1 +1 −1 +j +j +j +j +j −j |
| The Sequence $Seq^{3}_{right,\ 804}(k)$, to be transmitted from left to right, up to down |
| +1 +j −1 −1 +j +1 −1 +1 −j −j +j −1 −j −j −1 +j −j +j +1 +1 −1 −j +1 +1 −j +1 −1 +1 −j −j −j +1 |
| +j +j +1 +j −j +j +1 +1 −j +1 +j +j +1 −j +j −j −1 −1 −1 −j +1 +1 −j −1 +1 −1 +j +j −j +1 +j |
| +j +1 +j −j +j +1 +1 −1 −j +1 +1 −j +1 −1 +1 −j −j −1 −j +1 +1 −j −1 +1 −1 +j +j +j −1 −j −j −1 |
| +j −j +j +1 +1 +1 +j −1 −1 +j −1 +1 −1 +j +j −j +1 +j +j +1 +j −j +j +1 +1 +j −1 −j −j −1 |
| +j −j +j +1 +1 −1 −j +1 +1 −j −1 +1 −1 +j +j +j −1 −j −j −1 −j +j −j −1 −1 −1 −j +1 +1 −j +1 −1 |
| +1 −j −j −j +1 +j +j +1 −j +j −j −1 −1 +1 +j −1 −1 +j +1 −1 +1 −j −j +j −1 −j −j −1 −j +j −j −1 −1 |
| −1 −j +1 +1 −j +1 −1 +1 −j −j −1 −j +1 +1 −j −1 +1 −1 +j +j +j −1 −j −j −1 +j −j +j +1 +1 −1 −j |
| +1 +1 −j +1 −1 +1 −j −j +j −1 −j −j −1 −j +j −j −1 −1 +j −1 −j −j −1 +j −j +j +1 +1 +1 +j −1 −1 |
| +j +1 −1 +1 −j −j −j +1 +j +j +1 +j −j +j +1 +1 −1 −j +1 +1 −j +1 −1 +1 −j −j +1 +j −1 −1 +j |
| +1 −1 +1 −j −j +j −1 −j −j −1 +j −j +j +1 +1 +1 +j −1 −1 +j −1 +1 −1 +j +j +j −1 −j −j −1 −j +j |
| −j −1 −1 −1 −j +1 +1 −j −1 +1 −1 +j +j −j +1 +j +j +1 −j +j −j −1 −1 +1 +j −1 −1 +j −1 +1 −1 |
| +j +j +j −1 −j −j −1 −j +j −j −1 −1 +j −1 −j −j −1 +j −j +j +1 +1 +1 +j −1 −1 +j +1 −1 +1 −j −j |
| +j −1 −j −j −1 −j +j −j −1 −1 +1 +j −1 −1 +j −1 +1 −1 +j +j +1 +j −1 −1 +j +1 −1 +1 −j −j −j +1 |
| +j +j +1 −j +j −j −1 −1 −1 −j +1 +1 −j +1 −1 +1 −j −j +j −1 −j −j −1 −j +j −j −1 −1 −j +1 +j +j |
| +1 −j +j −j −1 −1 +1 +j −1 −1 +j +1 −1 +1 −j −j −j +1 +j +j +1 +j −j +j +1 +1 +1 +j −1 −1 +j |
| −1 +1 −1 +j +j −1 −j +1 +1 −j −1 +1 −1 +j +j −j +1 +j +j +1 −j +j −j −1 −1 +1 +j −1 −1 +j −1 |
| +1 −1 +j +j +j −1 −j −j −1 −j +j −j −1 −1 +j −1 −j −j −1 +j −j +j +1 +1 +1 +j −1 −1 +j +1 −1 +1 |
| −j −j +j −1 −j −j −1 −j +j −j −1 −1 +1 +j −1 −1 +j −1 +1 −1 +j +j +1 +j −1 −1 +j +1 −1 +1 −j −j −j |
| +1 +j +j +1 −j +j −j −1 −1 −1 −j +1 +1 −j +1 −1 +1 −j −j +j −1 −j −j −1 −j +j −j −1 −1 −j +1 +j |
| +j +1 −j +j −j −1 −1 +1 +j −1 −1 +j +1 −1 +1 −j −j −j +1 +j +j +1 +j −j +j +1 +1 +1 +j −1 −1 |
| +j −1 +1 −1 +j +j −j +1 +j +j +1 −j +j −j −1 −1 +1 +j −1 −1 +j +1 −1 +1 −j −j +j −1 −j −j −1 −j |
| +j −j −1 −1 −1 −j +1 +1 −j +1 −1 +1 −j −j −1 −j +1 +1 −j −1 +1 −1 +j +j +j −1 −j −j −1 +j −j +j |
| +1 +1 −1 −j +1 +1 −j +1 −1 +1 −j −j +j −1 −j −j −1 −j +j −j −1 −1 +j −1 −j −j −1 +j −j +j +1 +1 |
| +1 +j −1 −1 +j +1 −1 +1 −j −j −j +1 +j +j +1 +j −j +j +1 +1 −1 −j +1 +1 −j +1 −1 +1 −j −j +1 |
| +j −1 −1 +j +1 −1 +1 −j −j +j −1 −j −j −1 +j −j +j +1 +1 +1 +j −1 −1 +j −1 +1 −1 +j +j +j −1 −j |
| −j −1 −j +j −j −1 −1 −1 +1 −1 −j |
| The Sequence $Seq^{4}_{right,\ 804}(k)$, to be transmitted from left to right, up to down |
| +1 +j −1 −1 +j −1 −j +1 +1 −j −1 +1 −1 +j +j +1 −1 +1 −j −j +j −1 −j −j −1 −j +1 +j +j +1 −j +j |
| −j −1 −1 +j −j +j +1 +1 +j −1 −j −j −1 +j −1 −j −j −1 −j +j −j −1 −1 −j +j −j −1 −1 +1 +j −1 −1 +j |
| +1 +j −1 −1 +j −1 +1 −1 +j +j −1 +1 −1 +j +j +j −1 −j −j −1 −j +1 +j +j +1 +j −j +j +1 +1 −j |
| +j −j −1 −1 +1 +j −1 −1 +j −1 −j +1 +1 −j +1 −1 +1 −j −j −1 +1 −1 +j +j −1 −j +1 +1 −j −1 −j |
| +1 +1 −j −1 +1 −1 +j +j −1 +1 −1 +j +j −j +1 +j +j +1 −j +1 +j +j +1 −j +j −j −1 −1 −j +j −j −1 |
| −1 −j +1 +j +j +1 +j −1 −j −j −1 +j −j +j +1 +1 −j +j −j −1 −1 +1 +j −1 −1 +j −1 −j +1 +1 −j −1 |
| +1 −1 +j +j +1 −1 +1 −j −j +1 +j −1 −1 +j +1 +j −1 −1 +j −1 +1 −1 +j +j −1 +1 −1 +j +j −j |
| +1 +j +j +1 −j +1 +j +j +1 +j −j +j +1 +1 +j −j +j +1 +1 +1 +j −1 −1 +j −1 −j +1 +1 −j +1 −1 |
| +1 −j −j −1 +1 −1 +j +j −j +1 +j +j +1 +j −1 −j −j −1 −j +j −j −1 −1 +j −j +j +1 +1 +j −1 −j −j |
| −1 +j −1 −j −j −1 +j −j +j +1 +1 +j −j +j +1 +1 −1 −j +1 +1 −j −1 −j +1 +1 −j −1 +1 −1 +j +j −1 |
| +1 −1 +j +j −1 −j +1 +1 −j +1 +j −1 −1 +j +1 −1 +1 −j −j −1 +1 −1 +j +j −j +1 +j +j +1 +j |
| −1 −j −j −1 +j −j +j +1 +1 −j +j −j −1 −1 −j +1 +j +j +1 −j +1 +j +j +1 +j −j +j +1 +1 +j −j +j |
| +1 +1 −1 −j +1 +1 −j −1 −j +1 +1 −j +1 −1 +1 −j −j +1 −1 +1 −j −j −j +1 +j +j +1 +j −1 −j −j −1 |
| −j +j −j −1 −1 +j −j +j +1 +1 −1 −j +1 +1 −j +1 +j −1 −1 +j −1 +1 −1 +j +j +1 −1 +1 −j −j |
| +1 +j −1 −1 +j +1 +j −1 −1 +j +1 −1 +1 −j −j +1 −1 +1 −j −j +j −1 −j −j −1 +j −1 −j −j −1 +j −j |
| +j +1 +1 +j −j +j +1 +1 −1 −j +1 +1 −j +1 +j −1 −1 +j +1 −1 +1 −j −j −1 +1 −1 +j +j −j +1 +j |

TABLE 10-continued

| The sequence $Seq^{iTX}_{right,\ 804}(k)$ |
|---|
| +j +1 +j −1 −j −j −1 +j −j +j +1 +1 −j +j −j −1 −1 −j +1 +j +j +1 −j +1 +j +j +1 +j −j +j +1 |
| +1 +j −j +j +1 +1 −1 −j +1 +1 −j −1 −j +1 +1 −j +1 −1 +1 −j −j +1 −1 +1 −j −j −j +1 +j +j +1 |
| +j −1 −j −j −1 −j +j −j −1 −1 +j −j +j +1 +1 −1 −j +1 +1 −j +1 +j −1 −1 +j −1 +1 −1 +j +j +1 −1 |
| +1 −j −j +1 +j −1 −1 +j +1 +j −1 −1 +j +1 −1 +1 −j −j +1 −1 +1 −j −j +j −1 −j −j −1 +j −1 −j −j −1 |
| +j −j +j +1 +1 +j −j +j +1 +1 −j +1 +j +j +1 +j −1 −j −j −1 +j −j +j +1 +1 −j +j −j −1 −1 +1 |
| +j −1 −1 +j −1 −j +1 +1 −j −1 +1 −1 +j +j +1 −1 +1 −j −j +1 +j −1 −1 +j +1 +j −1 −1 +j −1 +1 |
| −1 +j +j −1 +1 −1 +j +j −j +1 +j +j +1 −j +1 +j +j +1 +j −j +j +1 +1 +j −j +j +1 +1 +1 +j −1 |
| −1 +j −1 −j +1 +1 −j +1 −1 +1 −j −j −1 +1 −1 +j +j −j +1 +j +j +1 +j −1 −j −j −1 −j +j −j −1 −1 |
| +j −j +j +1 +1 +j −1 −j −j −1 +j −1 −j −j −1 +j −j +j +1 +1 +j −j +j +1 +1 −1 −j +1 +1 −j −1 −j |
| +1 +1 −j −1 +1 −1 +j +j −1 +1 −1 +j +j +1 +1 −1 −j |
| The Sequence $Seq^{5}_{right,\ 804}(k)$, to be transmitted from left to right, up to down |
| +1 +1 +j −j +j +1 +1 +j −j +j −1 −1 −j +j −j +1 +1 +j −j +j +j −1 −1 +j +1 +j −1 −1 +j +1 −j |
| +1 +1 −j −1 +j −1 −1 +j +1 +1 +1 +j −j +j −1 −1 −j +j −j −1 −1 −j +j −j −1 −1 −j +j −j −j +1 +1 |
| −j −1 +j −1 −1 +j +1 +j −1 −1 +j +1 +j −1 −1 +j +1 +j +j −1 +1 −1 +j +j −1 +1 −1 +j +j −1 +1 |
| −1 −j −j +1 −1 +1 −1 −j −j −1 +j −1 −j −j −1 +j −1 −j −j −1 +j +1 +j +j +1 −j +j +j −1 +1 −1 −j −j |
| +1 −1 +1 +j +j −1 +1 −1 +j +j −1 +1 −1 +1 +j +j +1 −j −1 −j −j −1 +j +1 +j +j +1 −j +1 +j |
| +j +1 −j −j −j +1 −1 +1 −j −j +1 −1 +1 +j +j −1 +1 −1 −j −j +1 −1 +1 +1 +j +j +1 −j +1 +j +j |
| +1 −j −1 −j −j −1 +j +1 +j +j +1 −j −j −j +1 −1 +1 +j +j −1 +1 −1 +j +j −1 +1 −1 +j +j −1 +1 −1 |
| −1 −j −j −1 +j +1 +j +j +1 −j +1 +j +j +1 −j +1 +j +j +1 −j +1 +1 +j −j +j +1 +1 +j −j +j |
| +1 +1 +j −j +j −1 −1 −j +j −j +j −1 −1 +j +1 +j −1 −1 +j +1 +j −1 −1 +j +1 −j +1 +1 −j −1 +1 |
| +1 +j −j +j −1 −1 −j +j −j +1 +1 +j −j +j +1 +1 +j −j +j −j +1 +1 −j −1 +j −1 −1 +j +1 −j +1 |
| +1 −j −1 −j +1 +1 −j −1 −j −j +1 −1 +1 −j −j +1 −1 +1 +j +j −1 +1 −1 −j −j +1 −1 +1 +1 +j +j |
| +1 −j +1 +j +j +1 −j −1 −j −j −1 +j +1 +j +j +1 −j −j −j +1 −1 +1 +j +j −1 +1 −1 +j +j −1 +1 −1 |
| +j +j −1 +1 −1 −1 −j −j −1 +j +1 +j +j +1 −j +1 +j +j +1 −j +1 +j +j +1 −j +1 +1 +j −j +j |
| +1 +1 +j −j +j +1 +1 +j −j +j −1 −1 −j +j −j +j −1 −1 +j +1 +j −1 −1 +j +1 +j −1 −1 +j +1 −j |
| +1 +1 −j −1 +1 +1 +j −j +j −1 −1 −j +j −j +1 +1 +j −j +j +1 +1 +j −j +j −j +1 +1 −j −1 +j −1 −1 |
| +j +1 −j +1 +1 −j −1 −j +1 +1 −j −1 +1 +1 +j −j +j +1 +1 +j −j +j −1 −1 −j +j −j +1 +1 +j −j |
| +j +j −1 −1 +j +1 +j −1 −1 +j +1 −j +1 +1 −j −1 +j −1 −1 +j +1 +1 +1 +j −j +j −1 −1 −j +j −j |
| −1 −1 −j +j −j −1 −1 −j +j −j −j +1 +1 −j −1 +j −1 −1 +j +1 +j −1 −1 +j +1 +j −1 −1 +j +1 +j +j |
| −1 +1 −1 +j +j −1 +1 −1 +j +j −1 +1 −1 −j −j +1 −1 +1 −1 −j −j −1 +j −1 −j −j −1 +j −1 −j −j −1 |
| +j +1 +j +j +1 −j +j +j −1 +1 −1 −j −j +1 −1 +1 +j +j −1 +1 −1 +j +j −1 +1 −1 +1 +j +j +1 −j |
| −1 −j −j −1 +j +1 +j +j +1 −j +1 +j +j +1 −j +j +j −1 +1 −1 +j +j −1 +1 −1 −j −j +1 −1 +1 +j |
| +j −1 +1 −1 −1 −j −j −1 +j −1 −j −j −1 +j +1 +j +j +1 −j −1 −j −j −1 +j +j +j −1 +1 −1 −j −j +1 −1 |
| +1 −j −j +1 −1 +1 −j −j +1 −1 +1 +1 +j +j +1 −j −1 −j −j −1 +j −1 −j −j −1 +j −1 −j −j −1 +j −1 |
| −1 −j +j −j −1 −1 −j +j −j −1 −1 −j +j −j +1 +1 +j −j +j −j +1 +1 −j −1 −j +1 +1 −j −1 −j +1 +1 −j |
| −1 +j −1 −1 +j +1 −1 −1 −j +j −j +1 +1 +j −j +j −1 −1 −j +j −j −1 −1 −j +j −j +j −1 −1 +j +1 −j |
| +1 +1 −j −1 +j −1 −1 +j +1 +j −1 −1 +j +1 +j −1 +1 +1 |
| The Sequence $Seq^{6}_{right,\ 804}(k)$, to be transmitted from left to right, up to down |
| −1 −j −j −1 +j +j −1 −1 +j +1 +1 +j +j +1 −j +j −1 −1 +j +1 −j +1 +1 −j −1 −1 −j −j −1 +j +j −1 |
| −1 +j +1 −1 −j −j −1 +j −1 −1 −j +j −j +j +j −1 +1 −1 −1 −1 −j +j −j −j −j +1 −1 +1 −j −j +1 −1 |
| +1 −1 −1 −j +j −j −j −j +1 −1 +1 +1 +1 +j −j +j −j +1 +1 −j −1 +1 +j +j +1 −j +j −1 −1 +j +1 |
| +1 +j +j +1 −j −1 −j −j −1 +j −j +1 +1 −j −1 +1 +j +j +1 −j −j +1 +1 −j −1 −j −j +1 −1 +1 +1 |
| +1 +j −j +j −j −j +1 −1 +1 −1 −1 −j +j −j −1 −1 −j +j −j −j −j +1 −1 +1 −1 −1 −j +j −j +j +j −1 +1 |
| −1 +j −1 −1 +j +1 +1 +j +j +1 −j −j +1 +1 −j −1 +1 +j +j +1 −j −1 −j −j −1 +j +j −1 −1 +j +1 |
| +1 +j +j +1 −j +j −1 −1 +j +1 +j +j −1 +1 −1 +1 +1 +j −j +j +j +j −1 +1 −1 −1 −1 −j +j −j −1 |
| −1 −j +j −j +j +j −1 +1 −1 −1 −1 −j +j −j −j −j +1 −1 +1 −1 −j −j −1 +j −j +1 +1 −j −1 +1 +j +j |
| +1 −j −j +1 +1 −j −1 +j −1 −1 +j +1 −1 −j −j −1 +j −j +1 +1 −j −1 −1 −j −j −1 +j −1 −1 −j +j −j −j |
| −j +1 −1 +1 −1 −1 −j +j −j +j +j −1 +1 −1 +j +j −1 +1 −1 −1 −1 −j +j −j +j +j −1 +1 −1 +1 +1 |
| +j −j +j +j −1 −1 +j +1 +1 +j +j +1 −j −j +1 +1 −j −1 +1 +j +j +1 −j −1 −j −j −1 +j +j −1 −1 +j |
| +1 +1 +j +j +1 −j +j −1 −1 +j +1 +j +j −1 +1 −1 +1 +1 +j −j +j +j +j −1 +1 −1 −1 −1 −j +j −j |
| −1 −1 −j +j −j +j +j −1 +1 −1 −1 −1 −j +j −j −j −j +1 −1 +1 −1 −j −j −1 +j −j +1 +1 −j −1 +1 +j |
| +j +1 −j −j +1 +1 −j −1 +j −1 −1 +j +1 −1 −j −j −1 +j −j +1 +1 −j −1 −1 −j −j −1 +j −1 −1 −j +j −j |
| −j −j +1 −1 +1 −1 −1 −j +j −j +j +j −1 +1 −1 +j +j −1 +1 −1 −1 −1 −j +j −j +j +j −1 +1 −1 +1 |
| +1 +j −j +j −1 −j −j −1 +j +j −1 −1 +j +1 +1 +j +j +1 −j +j −1 −1 +j +1 −j +1 +1 −j −1 −1 −j −j |
| −1 +j +j −1 −1 +j +1 −1 −j −j −1 +j −1 −1 −j +j −j +j +j −1 +1 −1 −1 −1 −j +j −j −j −j +1 −1 +1 −j |
| −j +1 −1 +1 −1 −1 −j +j −j −j −j +1 −1 +1 +1 +1 +j −j +j −j +1 +1 −j −1 +1 +j +j +1 −j +j −1 −1 |
| +j +1 +1 +j +j +1 −j −1 −j −j −1 +j −j +1 +1 −j −1 +1 +j +j +1 −j −j +1 +1 −j −1 −j −j +1 −1 |
| +1 +1 +1 +j −j +j −j −j +1 −1 +1 −1 −1 −j +j −j −1 −1 −j +j −j −j −j +1 −1 +1 −1 −1 −j +j −j +j |
| +j −1 +1 −1 −j +1 +1 −j −1 −1 −j −j −1 +j +j −1 −1 +j +1 −1 −j −j −1 +j +1 +j +j +1 −j −j +1 +1 |
| −j −1 −1 −j −j −1 +j −j +1 +1 −j −1 −j −j +1 −1 +1 −1 −1 −j +j −j −j −j +1 −1 +1 +1 +1 +j −j +j |
| +1 +1 +j −j +j −j −j +1 −1 +1 +1 +1 +j −j +j +j +j −1 +1 −1 +1 +j +j +1 −j +j −1 −1 +j +1 −1 |
| −j −j −1 +j +j −1 −1 +j +1 −j +1 +1 −j −1 +1 +j +j +1 −j +j −1 −1 +j +1 +1 +j +j +1 −j +1 |
| +1 +j −j +j +j +j −1 +1 −1 +1 +1 +j −j +j −j −j +1 −1 +1 −j −j +1 −1 +1 +1 +1 +j −j +j −j −j |
| +1 −1 +1 −1 −1 −j +j −j −1 −j +1 +1 |
| The Sequence $Seq^{7}_{right,\ 804}(k)$, to be transmitted from left to right, up to down |
| +j +j −1 +1 −1 −j −j +1 −1 +1 −j +1 +1 −j −1 −j +1 +1 −j −1 −1 −1 −j +j −j +1 +1 +j −j +j +1 |
| +j +j +1 −j +1 +j +j +1 −j −1 −1 −j +j −j +1 +1 +j −j +j +1 +j +j +1 −j +1 +j +j +1 −j +j +j −1 |
| +1 −1 −j −j +1 −1 +1 −j +1 +1 −j −1 −j +1 +1 −j −1 −1 −1 −j +j −j −1 −1 −j +j −j +1 +j +j +1 −j |
| −1 −j −j −1 +j +j +j −1 +1 −1 +j +j −1 +1 −1 −j +1 +1 −j −1 +j −1 −1 +j +1 −j −j +1 −1 +1 −j −j |
| +1 −1 +1 +j −1 −1 +j +1 −j +1 +1 −j −1 +1 +1 +j −j +j +1 +1 +j −j +j −1 −j −j −1 +j +1 +j |
| +j +1 −j +1 +1 +j −j +j −1 −1 −j +j −j −1 −j −j −1 +j −1 −j −j −1 +j +j +j −1 +1 −1 −j −j +1 −1 |
| +1 −j +1 +1 −j −1 −j +1 +1 −j −1 +j +j −1 +1 −1 −j −j +1 −1 +1 −j +1 +1 −j −1 −j +1 +1 −j −1 |
| +1 +1 +j −j +j −1 −1 −j +j −j −1 −j −j −1 +j −1 −j −j −1 +j +j +j −1 +1 −1 +j +j −1 +1 −1 −j +1 |
| +1 −j −1 +j −1 −1 +j +1 +1 +1 +j −j +j +1 +1 +j −j +j −1 −j −j −1 +j +1 +j +j +1 −j −1 −1 −j |
| +j −j −1 −1 −j +j −j +1 +j +j +1 −j −1 −j −j −1 +j −j −j +1 −1 +1 −j −j +1 −1 +1 +j −1 −1 +j +1 −j |

TABLE 10-continued

| The sequence $Seq^{iTX}_{right,\ 804}(k)$ |
|---|
| +1 +1 −j −1 −j −j +1 −1 +1 +j +j −1 +1 −1 +j −1 −1 +j +1 +j −1 −1 +j +1 +1 +1 +j −j +j −1 |
| −1 −j +j −j −1 −j −j −1 +j −1 −j −j −1 +j +1 +1 +j −j +j −1 −1 −j +j −j −1 −j −j −1 +j −1 −j −j −1 +j |
| −j −j +1 −1 +1 +j +j −1 +1 −1 +j −1 −1 +j +1 +j −1 −1 +j +1 +1 +1 +j −j +j +1 +1 +j −j +j −1 |
| −j −j −1 +j +1 +j +j +1 −j −j −j +1 −1 +1 −j −j +1 −1 +1 +j −1 −1 +j +1 −j +1 +1 −j −1 +j +j −1 |
| +1 −1 +j +j −1 +1 −1 −j +1 +1 −j −1 +j −1 −1 +j +1 −1 −1 −j +j −j −1 −1 −j +j −j +1 +j +j +1 −j |
| −1 −j −j −1 +j −j −j +1 −1 +1 +j +j −1 +1 −1 +j −1 −1 +j +1 +j −1 −1 +j +1 +1 +1 +j −j +j −1 −1 |
| −j +j −j −1 −j −j −1 +j −1 −j −j −1 +j +1 +1 +j −j +j −1 −1 −j +j −j −1 −j −j −1 +j −1 −j −j −1 +j −j |
| −j +1 −1 +1 +j +j −1 +1 −1 +j −1 −1 +j +1 +j −1 −1 +j +1 +1 +1 +j −j +j +1 +1 +j −j +j −1 |
| −j −j −1 +j +1 +j +j +1 −j −j −j +1 −1 +1 −j −j +1 −1 +1 +j −1 −1 +j +1 −j +1 +1 −j −1 +j +j −1 |
| +1 −1 +j +j −1 +1 −1 −j +1 +1 −j −1 +j −1 −1 +j +1 −1 −1 −j +j −j −1 −1 −j +j −j +1 +j +j +1 −j |
| −1 −j −j −1 +j +1 +1 +j −j +j −1 −1 −j +j −j −1 −j −j −1 +j −1 −j −j −1 +j +j +j −1 +1 −1 −j −j +1 |
| −1 +1 −j +1 +1 −j −1 −j +1 +1 −j −1 +j +j −1 +1 −1 −j −j +1 −1 +1 −j +1 +1 −j −1 −j +1 +1 −j −1 |
| +1 +1 +j −j +j −1 −1 −j +j −j −1 −j −j −1 +j −1 −j −j −1 +j +j +j −1 +1 −1 +j +j −1 +1 −1 −j |
| +1 +1 −j −1 +j −1 −1 +j +1 +1 +1 +j −j +j +1 +1 +j −j +j −1 −j −j −1 +j +1 +j +j +1 −j −1 −1 |
| −j +j −j −1 −1 −j +j −j +1 +j +j +1 −j −1 −j −j −1 +j −j −j +1 −1 +1 −j −j +1 −1 +1 +j −1 −1 +j |
| +1 −j +1 +1 −j −1 +j −j −1 −j |
| The Sequence $Seq^{8}_{right,\ 804}(k)$, to be transmitted from left to right, up to down |
| +1 +1 +j −j +j −j −j +1 −1 +1 +j +j −1 +1 −1 +1 +1 +j −j +j +1 +j +j +1 −j −j +1 +1 −j −1 +j |
| −1 −1 +j +1 +1 +j +j +1 −j +j +j −1 +1 −1 −1 −1 −j +j −j +1 +1 +j −j +j +j +j −1 +1 −1 +j −1 |
| −1 +j +1 −1 −j −j −1 +j +1 +j +j +1 −j +j −1 −1 +j +1 −1 −1 −j +j −j −j −j +1 −1 +1 −j −j +1 −1 |
| +1 +1 +1 +j −j +j +1 +j +j +1 −j +j −1 −1 +j +1 +j −1 −1 +j +1 −1 −j −j −1 +j −j −j +1 −1 +1 |
| −1 −1 −j +j −j −1 −1 −j +j −j +j +j −1 +1 −1 +j −1 −1 +j +1 +1 +j +j +1 −j +1 +j +j +1 −j −j +1 |
| +1 −j −1 −j −j +1 −1 +1 −1 −1 −j +j −j +1 +1 +j −j +j −j −j +1 −1 +1 −j +1 +1 −j −1 −1 −j −j −1 |
| +j +1 +j +j +1 −j −j +1 +1 −j −1 +1 +1 +j −j +j +j +j −1 +1 −1 −j −j +1 −1 +1 +1 +1 +j −j +j |
| +1 +j +j +1 −j +j −1 −1 +j +1 −j +1 +1 −j −1 +1 +j +j +1 −j +j +j −1 +1 −1 −1 −1 −j +j −j −1 −1 |
| −j +j −j −j −j +1 −1 +1 −j +1 +1 −j −1 +1 +j +j +1 −j +1 +j +j +1 −j +j −1 −1 +j +1 −1 −1 −j |
| +j −j +j +j −1 +1 −1 +j +j −1 +1 −1 +1 +1 +j −j +j +1 +j +j +1 −j −j +1 +1 −j −1 −j +1 +1 −j |
| −1 −1 −j −j −1 +j −1 −1 −j +j −j +j +j −1 +1 −1 −j −j +1 −1 +1 −1 −1 −j +j −j −1 −j −j −1 +j +j −1 |
| −1 +j +1 −j +1 +1 −j −1 −1 −j −j −1 +j −j −j +1 −1 +1 +1 +1 +j −j +j −1 −1 −j +j −j −j −j +1 −1 |
| +1 −j +1 +1 −j −1 +1 +j +j +1 −j −1 −j −j −1 +j −j +1 +1 −j −1 +1 +1 +j −j +j +j +j −1 +1 −1 |
| +j +j −1 +1 −1 −1 −1 −j +j −j −1 −j −j −1 +j −j +1 +1 −j −1 −j +1 +1 −j −1 +1 +j +j +1 −j +j +j |
| −1 +1 −1 +1 +1 +j −j +j +1 +1 +j −j +j −j −j +1 −1 +1 −j +1 +1 −j −1 −1 −j −j −1 +j −1 −j −j −1 |
| +j +j −1 −1 +j +1 −1 −1 −j +j −j +j +j −1 +1 −1 −j −j +1 −1 +1 −1 −1 −j +j −j −1 −j −j −1 +j +j −1 |
| −1 +j +1 −j +1 +1 −j −1 −1 −j −j −1 +j −j −j +1 −1 +1 +1 +1 +j −j +j −1 −1 −j +j −j −j −j +1 −1 |
| +1 −j +1 +1 −j −1 +1 +j +j +1 −j −1 −j −j −1 +j −j +1 +1 −j −1 +1 +1 +j −j +j +j +j −1 +1 −1 |
| +j +j −1 +1 −1 −1 −1 −j +j −j −1 −j −j −1 +j −j +1 +1 −j −1 −j +1 +1 −j −1 +1 +j +j +1 −j +j +j |
| −1 +1 −1 +1 +1 +j −j +j +1 +1 +j −j +j −j −j +1 −1 +1 −j +1 +1 −j −1 −1 −j −j −1 +j −1 −j −j −1 |
| +j +j −1 −1 +j +1 −j −j +1 −1 +1 −1 −1 −j +j −j +1 +1 +j −j +j −j −j +1 −1 +1 −j +1 +1 −j −1 −1 |
| −j −j −1 +j +1 +j +j +1 −j −j +1 +1 −j −1 +1 +1 +j −j +j +j +j −1 +1 −1 −j −j +1 −1 +1 +1 +1 |
| +j −j +j +1 +j +j +1 −j +j −1 −1 +j +1 −j +1 +1 −j −1 +1 +j +j +1 −j +j +j −1 +1 −1 −1 −1 −j |
| +j −j −1 −1 −j +j −j −j −j +1 −1 +1 −j +1 +1 −j −1 +1 +j +j +1 −j +1 +j +j +1 −j +j −1 −1 +j +1 |
| −1 −1 −j +j −j +j +j −1 +1 −1 +j +j −1 +1 −1 +1 +1 +j −j +j +1 +j +j +1 −j −j +1 +1 −j −1 −j |
| +1 +1 −j −1 −1 −j −j −1 +j −1 −1 +j −1 |

In another embodiment, the sequence pairs $Seq^{iSTS}_{left,N}$ and $Seq^{iSTS}_{right,N}$ of length N=176, 385, 595, and 804 may use, for example, {+1, −1, +j, −j} symbols alphabet, e.g., according to one or more of the following sequences:

TABLE 11

| The sequence $Seq^{iSTS}_{left,\ 176}(k)$ |
|---|
| The Sequence $Seq^{1}_{left,\ 176}(k)$, to be transmitted from left to right, up to down |
| −1 −j −j +1 +j −j +1 −1 +1 −j −1 +1 −1 +1 −j −1 −1 +j +j +j −1 −1 +1 +j +j −1 −j +j −1 +1 −1 |
| +j +1 +1 −1 +1 −j −1 −1 +j +j +j −1 −1 +j −1 −1 −j +1 −1 −j +j −j −1 +j −j +j −j −1 +j +j +1 +1 |
| +1 +j +j +j −1 −1 −j +1 −1 −j +j −j −1 +j +j −j +j +1 −j −j −1 −1 −1 −j −j +j −1 −1 −j +1 −1 −j +j |
| −j −1 +j −j +j −j −1 +j +j +1 +1 +1 +j +j −j +1 +1 +j −1 +1 +j −j +j +1 −j −j +j −j −1 +j +j +1 |
| +1 +1 +j +j −1 −j −j +1 +j −j +1 −1 +1 −j −1 +1 −1 +1 −j −1 −1 +j +j +j −1 −1 −1 −j −j +1 +j −j |
| +1 −1 +1 −j −1 −1 +1 −1 +j +1 +1 −j −j −j +1 +1 |
| The Sequence $Seq^{2}_{left,\ 176}(k)$, to be transmitted from left to right, up to down |
| +j −1 −1 −j +1 −1 −j +j −j −1 +j +1 −1 +1 −j −1 −1 +j +j +j −1 −1 +j −1 −1 −j +1 −1 −j +j −j −1 |
| +j −1 +1 −1 +j +1 +1 −j −j −j +1 +1 −1 −j −j +1 +j −j +1 −1 +1 −j −1 +j −j +j +1 −j −j −1 −1 −1 |
| −j −j +1 +j +j −1 −j +j −1 +1 −1 +j +1 +j −j +j +1 −j −j −1 −1 −1 −j −j +1 +j +j −1 −j +j −1 +1 −1 |
| +j +1 −j +j −j −1 +j +j +1 +1 +1 +j +j +1 +j +j −1 −j +j −1 +1 −1 +j +1 +j −j +j +1 −j −j −1 |
| −1 −1 −j −j −j +1 +1 +j −1 +1 +j −j +j +1 −j −1 +1 −1 +j +1 +1 −j −j −j +1 +1 +j −1 −1 −j +1 |
| −1 −j +j −j −1 +j −1 +1 −1 +j +1 +1 −j −j −j +1 +1 |
| The Sequence $Seq^{3}_{left,\ 176}(k)$, to be transmitted from left to right, up to down |
| −1 −j −j +1 +j −j +1 −1 +1 −j −1 +1 −1 +1 −j −1 −1 +j +j +j −1 −1 −j +1 +1 +j −1 +1 +j −j +j |
| +1 −j −j +j −j −1 +j +j +1 +1 +1 +j +j −1 −j −j +1 +j −j +1 −1 +1 −j −1 +1 −1 +1 −j −1 −1 +j |
| +j +j −1 −1 +j −1 −1 −j +1 −1 −j +j −j −1 +j +j −j +j +1 −j −j −1 −1 −1 −j −j +j −1 −1 −j +1 −1 −j |
| +j −j −1 +j −j +j −j −1 +j +j +1 +1 +1 +j +j −1 −j −j +1 +j −j +1 −1 +1 −j −1 −1 +1 −1 +j +1 |

TABLE 11-continued

| The sequence $Seq^{iSTS}_{left,\ 176}(k)$ |
|---|
| +1 −j −j −j +1 +1 −j +1 +1 +j −1 +1 +j −j +j +1 −j +j −j +j +1 −j −j −1 −1 −1 −j −j −1 −j −j +1 |
| +j −j +1 −1 +1 −j −1 −1 +1 −1 +j +1 +1 −j −j −j +1 +1 |
| The Sequence $Seq^{4}_{left,\ 176}(k)$, to be transmitted from left to right, up to down |
| −j +1 +1 +j −1 +1 +j −j +j +1 −j −j +j −j −1 +j +j +1 +1 +1 +j +j −j +1 +1 +j −1 +1 +j −j +j |
| +1 −j +j −j +j +1 −j −j −1 −1 −1 −j −j +j −1 −1 −j +1 −1 −j +j −j −1 +j +j −j +j +1 −j −j −1 −1 −1 −j |
| −j −j +1 +1 +j −1 +1 +j −j +j +1 −j +j −j +j +1 −j −j −1 −1 −1 −j −j −1 −j −j +1 +j −j +1 −1 +1 |
| −j −1 −1 +1 −1 +j +1 +1 −j −j −j +1 +1 −1 −j −j +1 +j −j +1 −1 +1 −j −1 +1 −1 +1 −j −1 −1 +j |
| +j +j −1 −1 −1 −j −j +1 +j −j +1 −1 +1 −j −1 −1 +1 −1 +j +1 +1 −j −j −j +1 +1 +1 +j +j −1 −j |
| +j −1 +1 −1 +j +1 −1 +1 −1 +j +1 +1 −j −j −j +1 +1 |
| The Sequence $Seq^{5}_{left,\ 176}(k)$, to be transmitted from left to right, up to down |
| −1 −j −j +1 +j −j +1 −1 +1 −j −1 +1 −1 +1 −j −1 −1 +j +j +j −1 −1 +j −1 −1 −j +1 −1 −j +j −j −1 |
| +j +j −j +j +1 −j −j −1 −1 −1 −j −j +1 +j +j −1 −j +j −1 +1 −1 +j +1 −1 +1 −1 +j +1 +1 −j −j −j |
| +1 +1 +j −1 −1 −j +1 −1 −j +j −j −1 +j +j −j +j +1 −j −j −1 −1 −1 −j −j +j −1 −1 −j +1 −1 −j +j −j |
| −1 +j −j +j −j −1 +j +j +1 +1 +1 +j +j +1 +j +j −1 −j +j −1 +1 −1 +j +1 +1 −1 +1 −j −1 −1 +j |
| +j +j −1 −1 +j −1 −1 −j +1 −1 −j +j −j −1 +j −j +j −j −1 +j +j +1 +1 +1 +j +j −1 −j −j +1 +j −j |
| +1 −1 +1 −j −1 −1 +1 −1 +j +1 +1 −j −j −j +1 +1 |
| The Sequence $Seq^{6}_{left,\ 176}(k)$, to be transmitted from left to right, up to down |
| −1 −j −j +1 +j −j +1 −1 +1 −j −1 −1 +1 −1 +j +1 +1 −j −j −j +1 +1 +j −1 −1 −j +1 −1 −j +j −j −1 |
| +j −j +j −j −1 +j +j +1 +1 +1 +j +j −1 −j −j +1 +j −j +1 −1 +1 −j −1 −1 +1 −1 +j +1 +1 −j −j −j |
| +1 +1 −j +1 +1 +j −1 +1 +j −j +j +1 −j +j −j +j +1 −j −j −1 −1 −1 −j −j +j −1 −1 −j +1 −1 −j +j |
| −j −1 +j +j −j +j +1 −j −j −1 −1 −1 −j −j +1 +j +j −1 −j +j −1 +1 −1 +j +1 −1 +1 −1 +j +1 +1 −j |
| −j −j +1 +1 −j +1 +1 +j −1 +1 +j −j +j +1 −j −j +j −j −1 +j +j +1 +1 +1 +j +j +1 +j +j −1 −j |
| +j −1 +1 −1 +j +1 −1 +1 −1 +j +1 +1 −j −j −j +1 +1 |
| The Sequence $Seq^{7}_{left,\ 176}(k)$, to be transmitted from left to right, up to down |
| −1 −j −j +1 +j −j +1 −1 +1 −j −1 −j +j −j −1 +j +j +1 +1 +1 +j +j −j +1 +1 +j −1 +1 +j −j +j |
| +1 −j −1 +1 −1 +j +1 +1 −j −j −j +1 +1 −j +1 +1 +j −1 +1 +j −j +j +1 −j +1 −1 +1 −j −1 −1 +j |
| +j +j −1 −1 −1 −j −j +1 +j −j +1 −1 +1 −j −1 +j −j +j +1 −j −j −1 −1 −1 −j −j +j −1 −1 −j +1 −1 −j |
| +j −j −1 +j −1 +1 −1 +j +1 +1 −j −j −j +1 +1 −1 −j −j +1 +j −j +1 −1 +1 −j −1 +j −j +j +1 −j −j |
| −1 −1 −1 −j −j +1 +j +j −1 −j +j −1 +1 −1 +j +1 +j −j +j +1 −j −j −1 −1 −1 −j −j −j +1 +1 +j −1 |
| +1 +j −j +j +1 −j −1 +1 −1 +j +1 +1 −j −j −j +1 +1 |
| The Sequence $Seq^{8}_{left,\ 176}(k)$, to be transmitted from left to right, up to down |
| +1 +j +j −1 −j +j −1 +1 −1 +j +1 −1 +1 −1 +j +1 +1 −j −j −j +1 +1 +1 +j +j −1 −j +j −1 +1 −1 |
| +j +1 +1 −1 +1 −j −1 −1 +j +j +j −1 −1 −j +1 +1 +j −1 +1 +j −j +j +1 −j +j −j +j +1 −j −j −1 −1 |
| −1 −j −j +j −1 −1 −j +1 −1 −j +j −j −1 +j +j −j +j +1 −j −j −1 −1 −1 −j −j −j +1 +1 +j −1 +1 +j −j |
| +j +1 −j +j −j +j +1 −j −j −1 −1 −1 −j −j −j +1 +1 +j −1 +1 +j −j +j +1 −j −j +j −j −1 +j +j +1 |
| +1 +1 +j +j +1 +j +j −1 −j +j −1 +1 −1 +j +1 −1 +1 −1 +j +1 +1 −j −j −j +1 +1 −1 −j −j +1 +j |
| −j +1 −1 +1 −j −1 −1 +1 −1 +j +1 +1 −j −j −j +1 +1 |

TABLE 12

| The sequence $Seq^{iSTS}_{right,\ 176}(k)$ |
|---|
| The Sequence $Seq^{1}_{right,\ 176}(k)$, to be transmitted from left to right, up to down |
| −1 −j −j +1 +j −j +1 −1 +1 −j −1 +1 −1 +1 −j −1 −1 +j +j +j −1 −1 +1 +j +j −1 −j +j −1 +1 −1 |
| +j +1 +1 −1 +1 −j −1 −1 +j +j +j −1 −1 +j −1 −1 −j +1 −1 −j +j −j −1 +j −j +j −j −1 +j +j +1 +1 |
| +1 +j +j +j −1 −1 −j +1 −1 −j +j −j −1 +j +j −j +j +1 −j −j −1 −1 −1 −j −j −j +1 +1 +j −1 +1 +j −j |
| +j +1 −j +j −j +j +1 −j −j −1 −1 −1 −j −j +j −1 −1 −j +1 −1 −j +j −j −1 +j +j −j +j +1 −j −j −1 −1 |
| −1 −j −j +1 +j +j −1 −j +j −1 +1 −1 +j +1 −1 +1 −1 +j +1 +1 −j −j −j +1 +1 +1 +j +j −1 −j +j −1 |
| +1 −1 +j +1 +1 −1 +1 −j −1 −1 +j +j +j −1 −1 |
| The Sequence $Seq^{2}_{right,\ 176}(k)$, to be transmitted from left to right, up to down |
| +j −1 −1 −j +1 −1 −j +j −j −1 +j +1 −1 +1 −j −1 −1 +j +j +j −1 −1 +j −1 −1 −j +1 −1 −j +j −j −1 |
| +j −1 +1 −1 +j +1 +1 −j −j −j +1 +1 −1 −j −j +1 +j −j +1 −1 +1 −j −1 +j −j +j +1 −j −j −1 −1 −1 |
| −j −j +1 +j +j −1 −j +j −1 +1 −1 +j +1 +j −j +j +1 −j −j −1 −1 −1 −j −j −1 −j −j +1 +j −j +1 −1 |
| +1 −j −1 +j −j +j +1 −j −j −1 −1 −1 −j −j −1 −j −j +1 +j −j +1 −1 +1 −j −1 −j +j −j −1 +j +j +1 +1 |
| +1 +j +j +j −1 −1 −j +1 −1 −j +j −j −1 +j +1 −1 +1 −j −1 −1 +j +j +j −1 −1 −j +1 +1 +j −1 +1 |
| +j −j +j +1 −j +1 −1 +1 −j −1 −1 +j +j +j −1 −1 |
| The Sequence $Seq^{3}_{right,\ 176}(k)$, to be transmitted from left to right, up to down |
| −1 −j −j +1 +j −j +1 −1 +1 −j −1 +1 −1 +1 −j −1 −1 +j +j +j −1 −1 −j +1 +1 +j −1 +1 +j −j +j |
| +1 −j −j +j −j −1 +j +j +1 +1 +1 +j +j −1 −j −j +1 +j −j +1 −1 +1 −j −1 +1 −1 +1 −j −1 −1 +j |
| +j +j −1 −1 +j −1 −1 −j +1 −1 −j +j −j −1 +j +j −j +j +1 −j −j −1 −1 −1 −j −j −j +1 +1 +j −1 +1 |
| +j −j +j +1 −j +j −j +j +1 −j −j −1 −1 −1 −j −j +1 +j +j −1 −j +j −1 +1 −1 +j +1 +1 −1 +1 −j −1 |
| −1 +j +j +j −1 −1 +j −1 −1 −j +1 −1 −j +j −j −1 +j −j +j −j −1 +j +j +1 +1 +1 +j +j +1 +j +j −1 |
| −j +j −1 +1 −1 +j +1 +1 −1 +1 −j −1 −1 +j +j +j −1 −1 |
| The Sequence $Seq^{4}_{right,\ 176}(k)$, to be transmitted from left to right, up to down |
| −j +1 +1 +j −1 +1 +j −j +j +1 −j −j +j −j −1 +j +j +1 +1 +1 +j +j −j +1 +1 +j −1 +1 +j −j +j |
| +1 −j +j −j +j +1 −j −j −1 −1 −1 −j −j +j −1 −1 −j +1 −1 −j +j −j −1 +j +j −j +j +1 −j −j −1 −1 −1 −j |
| −j −j +1 +1 +j −1 +1 +j −j +j +1 −j +j −j +j +1 −j −j −1 −1 −1 −j −j +1 +j +j −1 −j +j −1 +1 −1 |

TABLE 12-continued

| The sequence $Seq^{iSTS}_{right,\ 176}(k)$ |
|---|
| +j +1 +1 −1 +1 −j −1 −1 +j +j +j −1 −1 +1 +j +j −1 −j +j −1 +1 −1 +j +1 −1 +1 −1 +j +1 +1 −j |
| −j −j +1 +1 +1 +j +j −1 −j +j −1 +1 −1 +j +1 +1 −1 +1 −j −1 −1 +j +j +j −1 −1 −1 −j −j +1 +j |
| −j +1 −1 +1 −j −1 +1 −1 +1 −j −1 −1 +j +j +j −1 −1 |
| The Sequence $Seq^{5}_{right,\ 176}(k)$, to be transmitted from left to right, up to down |
| −1 −j −j +1 +j −j +1 −1 +1 −j −1 +1 −1 +1 −j −1 −1 +j +j +j −1 −1 +j −1 −1 −j +1 −1 −j +j −j −1 |
| +j +j −j +j +1 −j −j −1 −1 −1 −j −j +1 +j +j −1 −j +j −1 +1 −1 +j +1 −1 +1 −1 +j +1 +1 −j −j −j |
| +1 +1 +j −1 −1 −j +1 −1 −j +j −j −1 +j +j −j +j +1 −j −j −1 −1 −1 −j −j −j +1 +1 +j −1 +1 +j −j |
| +j +1 −j +j −j +j +1 −j −j −1 −1 −1 −j −j −1 −j −j +1 +j −j +1 −1 +1 −j −1 −1 +1 −1 +j +1 +1 −j −j |
| −j +1 +1 −j +1 +1 +j −1 +1 +j −j +j +1 −j +j −j +j +1 −j −j −1 −1 −1 −j −j +1 +j +j −1 −j +j −1 |
| +1 −1 +j +1 +1 −1 +1 −j −1 −1 +j +j +j −1 −1 |
| The Sequence $Seq^{6}_{right,\ 176}(k)$, to be transmitted from left to right, up to down |
| −1 −j −j +1 +j −j +1 −1 +1 −j −1 −1 +1 −1 +j +1 +1 −j −j −j +1 +1 +j −1 −1 −j +1 −1 −j +j −j −1 |
| +j −j +j −j −1 +j +j +1 +1 +1 +j +j −1 −j −j +1 +j −j +1 −1 +1 −j −1 −1 +1 −1 +j +1 +1 −j −j −j |
| +1 +1 −j +1 +1 +j −1 +1 +j −j +j +1 −j +j −j +j +1 −j −j −1 −1 −1 −j −j −j +1 +1 +j −1 +1 +j −j |
| +j +1 −j −j +j −j −1 +j +j +1 +1 +1 +j +j −1 −j −j +1 +j −j +1 −1 +1 −j −1 +1 −1 +1 −j −1 −1 |
| +j +j +j −1 −1 +j −1 −1 −j +1 −1 −j +j −j −1 +j +j −j +j +1 −j −j −1 −1 −1 −j −j −1 −j −j +1 +j −j |
| +1 −1 +1 −j −1 +1 −1 +1 −j −1 −1 +j +j +j −1 −1 |
| The Sequence $Seq^{7}_{right,\ 176}(k)$, to be transmitted from left to right, up to down |
| −1 −j −j +1 +j −j +1 −1 +1 −j −1 −j +j −j −1 +j +j +1 +1 +1 +j +j −j +1 +1 +j −1 +1 +j −j +j |
| +1 −j −1 +1 −1 +j +1 +1 −j −j −j +1 +1 −j +1 +1 +j −1 +1 +j −j +j +1 −j +1 −1 +1 −j −1 −1 +j |
| +j +j −1 −1 −1 −j −j +1 +j −j +1 −1 +1 −j −1 +j −j +j +1 −j −j −1 −1 −1 −j −j −j +1 +1 +j −1 +1 |
| +j −j +j +1 −j +1 −1 +1 −j −1 −1 +j +j +j −1 −1 +1 +j +j −1 −j +j −1 +1 −1 +j +1 −j +j −j −1 +j |
| +j +1 +1 +1 +j +j −1 −j −j +1 +j −j +1 −1 +1 −j −1 −j +j −j −1 +j +j +1 +1 +1 +j +j +j −1 −1 |
| −j +1 −1 −j +j −j −1 +j +1 −1 +1 −j −1 −1 +j +j +j −1 −1 |
| The Sequence $Seq^{8}_{right,\ 176}(k)$, to be transmitted from left to right, up to down |
| +1 +j +j −1 −j +j −1 +1 −1 +j +1 −1 +1 −1 +j +1 +1 −j −j −j +1 +1 +1 +j +j −1 −j +j −1 +1 −1 |
| +j +1 +1 −1 +1 −j −1 −1 +j +j +j −1 −1 −j +1 +1 +j −1 +1 +j −j +j +1 −j +j −j +j +1 −j −j −1 −1 |
| −1 −j −j +j −1 −1 −j +1 −1 −j +j −j −1 +j +j −j +j +1 −j −j −1 −1 −1 −j −j +j −1 −1 −j +1 −1 −j +j |
| −j −1 +j −j +j −j −1 +j +j +1 +1 +1 +j +j +j −1 −1 −j +1 −1 −j +j −j −1 +j +j −j +j +1 −j −j −1 −1 |
| −1 −j −j −1 −j −j +1 +j −j +1 −1 +1 −j −1 +1 −1 +1 −j −1 −1 +j +j +j −1 −1 +1 +j +j −1 −j +j −1 |
| +1 −1 +j +1 +1 −1 +1 −j −1 −1 +j +j +j −1 −1 |

TABLE 13

| The sequence $Seq^{iSTS}_{left,\ 385}(k)$ |
|---|
| The Sequence $Seq^{1}_{left,\ 385}(k)$, to be transmitted from left to right, up to down |
| +j +j −j −j −j +1 −j +j −j −j +j −1 +j +j −j −j −j +1 −j −j +j +j −j +1 −j −1 +1 +1 +1 +j +1 −1 +1 |
| +1 −1 −j −1 +1 −1 −1 −1 −j −1 −1 +1 +1 −1 −j −1 −j +j +j +j −1 +j −j +j +j −j +1 −j −j +j +j +j −1 |
| +j +j −j −j +j −1 +j −1 +1 +1 +1 +j +1 −1 +1 +1 −1 −j −1 +1 −1 −1 −1 −j −1 −1 +1 +1 −1 −j −1 |
| −1 +1 +1 +1 +j +1 −1 +1 +1 −1 −j −1 −1 +1 +1 +1 +j +1 +1 −1 −1 +1 +j +1 −j +j +j +j −1 |
| +j −j +j +j −j +1 −j +j −j −j −j +1 −j −j +j +j −j +1 −j −1 +1 +1 +1 +j +1 −1 +1 +1 −1 −j −1 −1 |
| +1 +1 +1 +j +1 +1 −1 −1 +1 +j +1 +j −j −j −j +1 −j +j −j −j +j −1 +j −j +j +j +j −1 +j +j −j −j |
| +j −1 +j +1 −1 −1 −1 −j −1 +1 −1 −1 +1 +j +1 +1 −1 −1 −1 −j −1 −1 +1 +1 −1 −j −1 +j −j −j −j |
| +1 −j +j −j −j +j −1 +j −j +j +j +j −1 +j +j −j −j +j −1 +j −1 +1 +1 +1 +j +1 −1 +1 +1 −1 −j −1 |
| −1 +1 +1 +1 +j +1 +1 −1 −1 +1 +j +1 +j −j −j −j +1 −j +j −j −j +j −1 +j −j +j +j +j −1 +j +j −j |
| −j +j −1 +j −j +j +j +j −1 +j −j +j +j −j +1 −j −j +j +j +j −1 +j +j −j −j +j −1 +j +1 −1 −1 −1 −j |
| −1 +1 −1 −1 +1 +j +1 −1 +1 +1 +1 +j +1 +1 −1 −1 +1 +j +1 −j +j +j +j −1 +j −j +j +j −j +1 |
| −j −j +j +j +j −1 +j +j −j −j +j −1 +j −1 +1 +1 +1 +j +1 −1 +1 +1 −1 −j −1 +1 −1 −1 −1 −j −1 −1 |
| +1 +1 −1 −j −1 |
| The Sequence $Seq^{2}_{left,\ 385}(k)$, to be transmitted from left to right, up to down |
| −j +1 −1 −1 −1 −j −1 +1 −1 −1 +1 +j +1 +1 −1 −1 −1 −j −1 −1 +1 +1 −1 −j −1 +1 −1 −1 −1 −j −1 |
| +1 −1 −1 +1 +j +1 −1 +1 +1 +1 +j +1 +1 −1 −1 +1 +j +1 −j +j +j +j −1 +j −j +j +j −j +1 −j −j |
| +j +j +j −1 +j +j −j −j +j −1 +j +j −j −j −j +1 −j +j −j −j +j −1 +j −j +j +j +j −1 +j +j −j −j +j −1 |
| +j −1 +1 +1 +1 +j +1 −1 +1 +1 −1 −j −1 −1 +1 +1 +1 +j +1 +1 −1 −1 +1 +j +1 −1 +1 +1 |
| +1 +j +1 −1 +1 +1 −1 −j −1 +1 −1 −1 −1 −j −1 −1 +1 +1 −1 −j −1 −j +j +j +j −1 +j −j +j +j −j |
| +1 −j −j +j +j +j −1 +j +j −j −j +j −1 +j +j −j −j −j +1 −j +j −j −j +j −1 +j −j +j +j +j −1 +j +j −j |
| −j +j −1 +j −j +j +j +j −1 +j −j +j +j −j +1 −j −j +j +j +j −1 +j +j −j −j +j −1 +j −j +j +j +j −1 |
| +j −j +j +j −j +1 −j +j −j −j −j +1 −j −j +j +j −j +1 −j −1 +1 +1 +1 +j +1 −1 +1 +1 −1 −j −1 −1 |
| +1 +1 +1 +j +1 +1 −1 −1 +1 +j +1 +1 −1 −1 −1 −j −1 +1 −1 −1 +1 +j +1 −1 +1 +1 +1 +j +1 |
| +1 −1 −1 +1 +j +1 −j +j +j +j −1 +j −j +j +j −j +1 −j −j +j +j +j −1 +j +j −j −j +j −1 +j −j +j |
| +j +j −1 +j −j +j +j −j +1 −j +j −j −j −j +1 −j −j +j +j −j +1 −j +1 −1 −1 −1 −j −1 +1 −1 −1 +1 +j |
| +1 +1 −1 −1 −1 −j −1 −1 +1 +1 −1 −j −1 −1 +1 +1 +1 +j +1 −1 +1 +1 −1 −j −1 +1 −1 −1 −1 −j −1 |
| −1 +1 +1 −1 −j −1 |
| The Sequence $Seq^{3}_{left,\ 385}(k)$, to be transmitted from left to right, up to down |
| +1 +1 −1 −1 −1 −j −1 +1 −1 −1 +1 +j +1 +1 −1 −1 −1 −j −1 −1 +1 +1 −1 −j −1 −j +j +j +j −1 +j |
| −j +j +j −j +1 −j +j −j −j −j +1 −j −j +j +j −j +1 −j +j −j −j −j +1 −j +j −j −j +j −1 +j +j −j −j −j |
| +1 −j −j +j +j −j +1 −j −1 +1 +1 +1 +j +1 −1 +1 +1 −1 −j −1 +1 −1 −1 −1 −j −1 −1 +1 +1 −1 −j |

TABLE 13-continued

| The sequence $Seq^{iSTS}_{left,\ 385}(k)$ |
| --- |
| −1 +j −j −j −j +1 −j +j −j −j +j −1 +j +j −j −j −j +1 −j −j +j +j −j +1 −j +1 −1 −1 −1 −j −1 +1 −1 −1<br>+1 +j +1 −1 +1 +1 +1 +j +1 +1 −1 −1 +1 +j +1 +1 −1 −1 −1 −j −1 +1 −1 −1 +1 +j +1 +1 −1<br>−1 −1 −j −1 −1 +1 +1 −1 −j −1 +j −j −j −j +1 −j +j −j −j +j −1 +j −j +j +j +j −1 +j +j −j −j +j −1<br>+j −j +j +j +j −1 +j −j +j +j −j +1 −j −j +j +j +j −1 +j +j −j −j +j −1 +j −1 +1 +1 +1 +j +1 −1<br>+1 +1 −1 −j −1 +1 −1 −1 −1 −j −1 −1 +1 +1 −1 −j −1 +1 −1 −1 −1 −j −1 +1 −1 −1 +1 +j +1 +1 −1<br>−1 −1 −j −1 −1 +1 +1 −1 −j −1 +j −j −j −j +1 −j +j −j −j +j −1 +j −j +j +j +j −1 +j +j −j −j +j −1<br>+j −1 +1 +1 +1 +j +1 −1 +1 +1 −1 −j −1 −1 +1 +1 +1 +j +1 +1 −1 −1 +1 +j +1 +j −j −j<br>+1 −j +j −j −j +j −1 +j −j +j +j +j −1 +j +j −j −j +j −1 +j +j −j −j −j +1 −j +j −j −j +j −1 +j +j −j<br>−j −j +1 −j −j +j +j −j +1 −j −1 +1 +1 +1 +j +1 −1 +1 +1 −1 −j −1 +1 −1 −1 −1 −j −1 −1 +1 +1<br>−1 −j −1 |
| The Sequence $Seq^{4}_{left,\ 385}(k)$, to be transmitted from left to right, up to down |
| −j −j +j +j +j −1 +j −j +j +j −j +1 −j −j +j +j +j −1 +j +j −j −j +j −1 +j −1 +1 +1 +1 +j +1 −1<br>+1 +1 −1 −j −1 +1 −1 −1 −1 −j −1 −1 +1 +1 −1 −j −1 −j +j +j +j −1 +j −j +j +j −j +1 −j −j +j +j<br>+j −1 +j +j −j −j +j −1 +j +1 −1 −1 −1 −j −1 +1 −1 −1 +1 +j +1 −1 +1 +1 +1 +j +1 +1 −1 −1<br>+1 +j +1 −1 +1 +1 +1 +j +1 −1 +1 +1 −1 −j −1 −1 +1 +1 +1 +j +1 +1 −1 −1 +1 +j +1 +j −j<br>−j −j +1 −j +j −j −j +j −1 +j −j +j +j +j −1 +j +j −j −j +j −1 +j +1 −1 −1 −1 −j −1 +1 −1 −1 +1 +j<br>+1 +1 −1 −1 −1 −j −1 −1 +1 +1 −1 −j −1 +j −j −j −j +1 −j +j −j −j +j −1 +j −j +j +j +j −1 +j +j −j<br>−j +j −1 +j −1 +1 +1 +1 +j +1 −1 +1 +1 −1 −j −1 −1 +1 +1 +1 +j +1 +1 −1 −1 +1 +j +1 +j −j<br>−j −j +1 −j +j −j −j +j −1 +j −j +j +j +j −1 +j +j −j −j +j −1 +j −1 +1 +1 +1 +j +1 −1 +1 +1 −1<br>−j −1 −1 +1 +1 +1 +j +1 +1 −1 −1 +1 +j +1 −j +j +j +j −1 +j −j +j +j −j +1 −j +j −j −j −j +1<br>−j −j +j +j −j +1 −j −j +j +j +j −1 +j −j +j +j −j +1 −j −j +j +j +j −1 +j +j −j −j +j −1 +j −1 +1<br>+1 +1 +j +1 −1 +1 +1 −1 −j −1 +1 −1 −1 −1 −j −1 −1 +1 +1 −1 −j −1 +j −j −j −j +1 −j +j −j −j +j<br>−1 +j +j −j −j −j +1 −j −j +j +j −j +1 −j −1 +1 +1 +1 +j +1 −1 +1 +1 −1 −j −1 +1 −1 −1 −1 −j −1<br>−1 +1 +1 −1 −j −1 |
| The Sequence $Seq^{5}_{left,\ 385}(k)$, to be transmitted from left to right, up to down |
| −j +1 −1 −1 −1 −j −1 +1 −1 −1 +1 +j +1 +1 −1 −1 −1 −j −1 −1 +1 +1 −1 −j −1 −1 +1 +1 +1 +j<br>+1 −1 +1 +1 −1 −j −1 +1 −1 −1 −1 −j −1 −1 +1 +1 −1 −j −1 −j +j +j +j −1 +j −j +j +j −j +1 −j −j<br>+j +j +j −1 +j +j −j −j +j −1 +j −j +j +j +j −1 +j −j +j +j −j +1 −j +j −j −j −j +1 −j −j +j +j −j<br>+1 −j +1 −1 −1 −1 −j −1 +1 −1 −1 +1 +j +1 +1 −1 −1 −1 −j −1 −1 +1 +1 −1 −j −1 −1 +1 +1 +1<br>+j +1 −1 +1 +1 −1 −j −1 +1 −1 −1 −1 −j −1 −1 +1 +1 −1 −j −1 +j −j −j −j +1 −j +j −j −j +j −1 +j<br>+j −j −j −j +1 −j −j +j +j −j +1 −j +j −j −j −j +1 −j +j −j −j +j −1 +j −j +j +j +j −1 +j +j −j −j +j −1<br>+j −j +j +j +j −1 +j −j +j +j −j +1 −j −j +j +j +j −1 +j +j −j −j +j −1 +j +j −j −j −j +1 −j +j −j<br>−j +j −1 +j −j +j +j +j −1 +j +j −j −j +j −1 +j −1 +1 +1 +1 +j +1 −1 +1 +1 −1 −j −1 −1 +1 +1<br>+1 +j +1 +1 −1 −1 +1 +j +1 −1 +1 +1 +1 +j +1 −1 +1 +1 −1 −j −1 +1 −1 −1 −1 −j −1 −1 +1<br>+1 −1 −j −1 +j −j −j −j +1 −j +j −j −j +j −1 +j +j −j −j −j +1 −j −j +j +j −j +1 −j −j +j +j +j −1 +j<br>−j +j +j −j +1 −j +j −j −j −j +1 −j −j +j +j −j +1 −j −1 +1 +1 +1 +j +1 −1 +1 +1 −1 −j −1 −1 +1<br>+1 +1 +j +1 +1 −1 −1 +1 +j +1 −1 +1 +1 +1 +j +1 −1 +1 +1 −1 −j −1 +1 −1 −1 −1 −j −1 −1<br>+1 +1 −1 −j −1 |
| The Sequence $Seq^{6}_{left,\ 385}(k)$, to be transmitted from left to right, up to down |
| −j +j −j −j −j +1 −j +j −j −j +j −1 +j +j −j −j −j +1 −j −j +j +j −j +1 −j +1 −1 −1 −1 −j −1 +1 −1 −1<br>+1 +j +1 −1 +1 +1 +1 +j +1 +1 −1 −1 +1 +j +1 −1 +1 +1 +1 +j +1 −1 +1 +1 −1 −j −1 −1<br>+1 +1 +1 +j +1 +1 −1 −1 +1 +j +1 −j +j +j +j −1 +j −j +j +j −j +1 −j +j −j −j −j +1 −j −j +j +j<br>−j +1 −j +j −j −j −j +1 −j +j −j −j +j −1 +j +j −j −j −j +1 −j −j +j +j −j +1 −j +1 −1 −1 −1 −j −1 +1<br>−1 −1 +1 +j +1 −1 +1 +1 +1 +j +1 +1 −1 −1 +1 +j +1 +1 −1 −1 −1 −j −1 +1 −1 −1 +1 +j +1<br>+1 −1 −1 −1 −j −1 −1 +1 +1 −1 −j −1 +j −j −j −j +1 −j +j −j −j +j −1 +j −j +j +j +j −1 +j +j −j −j<br>+j −1 +j +1 −1 −1 −1 −j −1 +1 −1 −1 +1 +j +1 +1 −1 −1 −1 −j −1 −1 +1 +1 −1 −j −1 −j +j +j +j<br>−1 +j −j +j +j −j +1 −j +j −j −j −j +1 −j −j +j +j −j +1 −j +j −j −j −j +1 −j +j −j −j +j −1 +j +j −j −j<br>−j +1 −j −j +j +j −j +1 −j −1 +1 +1 +1 +j +1 −1 +1 +1 −1 −j −1 +1 −1 −1 −1 −j −1 −1 +1 +1 −1<br>−j −1 −1 +1 +1 +1 +j +1 −1 +1 +1 −1 −j −1 −1 +1 +1 +1 +j +1 +1 −1 −1 +1 +j +1 +j −j −j<br>−j +1 −j +j −j −j +j −1 +j −j +j +j +j −1 +j +j −j −j +j −1 +j +j −j −j −j +1 −j +j −j −j +j −1 +j +j<br>−j −j −j +1 −j −j +j +j −j +1 −j −1 +1 +1 +1 +j +1 −1 +1 +1 −1 −j −1 +1 −1 −1 −1 −j −1 −1 +1<br>+1 −1 −j −1 |
| The Sequence $Seq^{7}_{left,\ 385}(k)$, to be transmitted from left to right, up to down |
| +1 +1 −1 −1 −1 −j −1 +1 −1 −1 +1 +j +1 +1 −1 −1 −1 −j −1 −1 +1 +1 −1 −j −1 +1 −1 −1 −1 −j −1<br>+1 −1 −1 +1 +j +1 −1 +1 +1 +1 +j +1 +1 −1 −1 +1 +j +1 −1 +1 +1 +1 +j +1 −1 +1 +1 −1 −j<br>−1 −1 +1 +1 +1 +j +1 +1 −1 −1 +1 +j +1 +1 −1 −1 −1 −j −1 +1 −1 −1 +1 +j +1 −1 +1 +1<br>+1 +j +1 +1 −1 −1 +1 +j +1 −j +j +j +j −1 +j −j +j +j −j +1 −j −j +j +j +j −1 +j +j −j −j +j −1<br>+j −j +j +j +j −1 +j −j +j +j −j +1 −j +j −j −j −j +1 −j −j +j +j −j +1 −j −j +j +j +j −1 +j −j +j +j<br>−j +1 −j −j +j +j +j −1 +j +j −j −j +j −1 +j +j −j −j −j +1 −j +j −j −j +j −1 +j −j +j +j +j −1 +j +j<br>−j −j +j −1 +j −j +j +j +j −1 +j −j +j +j −j +1 −j −j +j +j +j −1 +j +j −j −j +j −1 +j −j +j +j +j −1<br>+j −j +j +j −j +1 −j +j −j −j −j +1 −j −j +j +j −j +1 −j +j −j −j −j +1 −j +j −j −j +j −1 +j +j −j −j<br>−j +1 −j −j +j +j −j +1 −j −j +j +j +j −1 +j −j +j +j −j +1 −j +j −j −j −j +1 −j −j +j +j −j +1 −j +1<br>−1 −1 −1 −j −1 +1 −1 −1 +1 +j +1 +1 −1 −1 −1 −j −1 −1 +1 +1 −1 −j −1 +1 −1 −1 −1 −j −1 +1 −1<br>−1 +1 +j +1 −1 +1 +1 +1 +j +1 +1 −1 −1 +1 +j +1 +1 −1 −1 −1 −j −1 +1 −1 −1 +1 +j +1 +1<br>−1 −1 −1 −j −1 −1 +1 +1 −1 −j −1 −1 +1 +1 +1 +j +1 −1 +1 +1 −1 −j −1 +1 −1 −1 −1 −j −1 −1<br>+1 +1 −1 −j −1 |
| The Sequence $Seq^{8}_{left,\ 385}(k)$, to be transmitted from left to right, up to down |
| +j +1 −1 −1 −1 −j −1 +1 −1 −1 +1 +j +1 +1 −1 −1 −1 −j −1 −1 +1 +1 −1 −j −1 +j −j −j −j +1 −j<br>+j −j −j +j −1 +j −j +j +j +j −1 +j +j −j −j +j −1 +j +1 −1 −1 −1 −j −1 +1 −1 −1 +1 +j +1 +1 −1<br>−1 −1 −j −1 −1 +1 +1 −1 −j −1 −j +j +j +j −1 +j −j +j +j −j +1 −j +j −j −j −j +1 −j −j +j +j −j +1<br>−j +1 −1 −1 −1 −j −1 +1 −1 −1 +1 +j +1 +1 −1 −1 −1 −j −1 −1 +1 +1 −1 −j −1 +j −j −j −j +1 −j +j<br>−j −j +j −1 +j −j +j +j +j −1 +j +j −j −j +j −1 +j −1 +1 +1 +1 +j +1 −1 +1 +1 −1 −j −1 −1 +1<br>+1 +1 +j +1 +1 −1 −1 +1 +j +1 +j −j −j −j +1 −j +j −j −j +j −1 +j −j +j +j +j −1 +j +j −j −j +j |

TABLE 13-continued

| The sequence $Seq^{iSTS}_{left,\ 385}(k)$ |
| --- |
| −1 +j −j +j +j +j −1 +j −j +j +j −j +1 −j −j +j +j +j −1 +j +j −j −j +j −1 +j +1 −1 −1 −1 −j −1 +1 −1 −1 +1 +j +1 −1 +1 +1 +1 +j +1 +1 −1 −1 +1 +j +1 −j +j +j +j −1 +j −j +j +j −j +1 −j −j +j +j +j −1 +j +j −j −j +j −1 +j −1 +1 +1 +1 +j +1 −1 +1 +1 −1 −j −1 +1 −1 −1 −1 −j −1 −1 +1 +1 −1 −j −1 +j −j −j −j +1 −j +j −j −j +j −1 +j +j −j −j −j +1 −j −j +j +j −j +1 −j −1 +1 +1 +1 +j +1 −1 +1 +1 −1 −j −1 +1 −1 −1 −1 −j −1 −1 +1 +1 −1 −j −1 −1 +1 +1 −1 −j −1 −j +j +j +j −1 +j −j +j +j −j +1 −j −j +j +j +j −1 +j +j −j −j +j −1 +j −1 +1 +1 +1 +j +1 −1 +1 +1 −1 −j −1 +1 −1 −1 −1 −j −1 −1 +1 +1 −1 −j −1 |

TABLE 14

| The sequence $Seq^{iSTS}_{right,\ 385}(k)$ |
| --- |
| The Sequence $Seq^{1}_{right,\ 385}(k)$, to be transmitted from left to right, up to down |
| +j −j −j −j +1 −j +j −j −j +j −1 +j +j −j −j −j +1 −j −j +j +j −j +1 −j −1 +1 +1 +1 +j +1 −1 +1 +1 −1 −j −1 +1 −1 −1 −1 −j −1 −1 +1 +1 −1 −j −1 −j +j +j +j −1 +j −j +j +j −j +1 −j −j +j +j +j −1 +j +j −j −j +j −1 +j −1 +1 +1 +1 +j +1 −1 +1 +1 −1 −j −1 +1 −1 −1 −1 −j −1 −1 +1 +1 −1 −j −1 −1 +1 +1 +1 +j +1 −1 +1 +1 −1 −j −1 −1 +1 +1 +1 +j +1 +1 −1 −1 +1 +j +1 −j +j +j +j −1 +j −j +j +j −j +1 −j +j −j −j −j +1 −j −j +j +j −j +1 −j −1 +1 +1 +1 +j +1 −1 +1 +1 −1 −j −1 −1 +1 +1 +1 +j +1 +1 −1 −1 +1 +j +1 +j −j −j −j +1 −j +j −j −j +j −1 +j −j +j +j +j −1 +j +j −j −j +j −1 +j −1 +1 +1 +1 +j +1 −1 +1 +1 −1 −j −1 −1 +1 +1 +1 +j +1 +1 −1 −1 +1 +j +1 −j +j +j −1 +j −j +j +j −j +1 −j +j −j −j −j +1 −j −j +j +j −j +1 −j +1 −1 −1 −1 −j −1 +1 −1 −1 +1 +j +1 +1 −1 −1 −1 −j −1 −1 +1 +1 −1 −j −1 −j +j +j +j −1 +j −j +j +j −j +1 −j +j −j −j −j +1 −j −j +j +j −j +1 −j +j −j +1 −j +j −j −j +1 −j +j −j −j +j −1 +j +j −j −j −j +1 −j −j +j +j −j +1 −j −1 +1 +1 +1 +j +1 −1 +1 +1 −1 −j −1 +1 −1 −1 −1 −j −1 −1 +1 +1 −1 −j −1 +j −j −j −j +1 −j +j −j −j +j −1 +j +j −j −j −j +1 −j −j +j +j −j +1 −j +j −j −j +1 −j −j +j +j −j +1 −j +1 −1 −1 −1 −j −1 +1 −1 −1 +1 +j +1 −1 +1 +1 +1 +j +1 +1 −1 −1 +1 +j +1 +j |
| The Sequence $Seq^{2}_{right,\ 385}(k)$, to be transmitted from left to right, up to down |
| +1 −1 −1 −1 −j −1 +1 −1 −1 +1 +j +1 +1 −1 −1 −1 −j −1 −1 +1 +1 −1 −j −1 +1 −1 −1 −1 −j −1 +1 −1 −1 +1 +j +1 −1 +1 +1 +1 +j +1 +1 −1 −1 +1 +j +1 −j +j +j +j −1 +j −j +j +j −j +1 −j −j +j +j +j −1 +j +j −j −j +j −1 +j +j −j −j −j +1 −j +j −j −j +j −1 +j −j +j +j +j −1 +j +j −j −j +j −1 +j −1 +1 +1 +1 +j +1 −1 +1 +1 −1 −j −1 −1 +1 +1 +1 +j +1 +1 −1 −1 +1 +j +1 −1 +1 +1 +1 +j +1 −1 +1 +1 −1 −j −1 +1 −1 −1 −1 −j −1 −1 +1 +1 −1 −j −1 −j +j +j +j −1 +j −j +j +j −j +1 −j −j +j +j +j −1 +j +j −j −j +j −1 +j +j −j −j −j +1 −j +j −j −j +j −1 +j −j +j +j +j −1 +j +j −j −j +j −1 +j +j −j −j −j +1 −j +j −j −j +j −1 +j +j −j −j −j +1 −j −j +j +j −j +1 −j +j −j −j −j +1 −j +j −j −j +j −1 +j −j +j +j +j −1 +j +j −j −j +j −1 +j +1 −1 −1 −1 −j −1 +1 −1 −1 +1 +j +1 +1 −1 −1 −1 −j −1 −1 +1 +1 −1 −j −1 −1 +1 +1 +1 +j +1 −1 +1 +1 −1 −j −1 +1 −1 −1 −1 −j −1 −1 +1 +1 −1 −j −1 +j −j −j −j +1 −j +j −j −j +j −1 +j +j −j −j −j +1 −j −j +j +j −j +1 −j +j −j −j −j +1 −j +j −j −j +j −1 +j −j +j +j +j −1 +j +j −j −j +j −1 +j −1 +1 +1 +1 +j +1 −1 +1 +1 −1 −j −1 −1 +1 +1 +1 +j +1 +1 −1 −1 +1 +j +1 +1 −1 −1 −1 −j −1 +1 −1 −1 +1 +j +1 −1 +1 +1 +1 +j +1 +1 −1 −1 +1 +j +1 −1 |
| The Sequence $Seq^{3}_{right,\ 385}(k)$, to be transmitted from left to right, up to down |
| +1 −1 −1 −1 −j −1 +1 −1 −1 +1 +j +1 +1 −1 −1 −1 −j −1 −1 +1 +1 −1 −j −1 −j +j +j +j −1 +j −j +j +j −j +1 −j +j −j −j −j +1 −j −j +j +j −j +1 −j +j −j −j −j +1 −j +j −j −j +j −1 +j +j −j −j −j +1 −j −j +j +j −j −1 +1 +1 +1 +j +1 −1 +1 +1 −1 −j −1 +1 −1 −1 −1 −j −1 −1 +1 +1 −1 −j −1 +j −j −j −j +1 −j +j −j −j +j −1 +j +j −j −j −j +1 −j −j +j +j −j +1 −j +1 −1 −1 −1 −j −1 +1 −1 −1 +1 +j +1 −1 +1 +1 +1 +j +1 +1 −1 −1 +1 +j +1 +1 −1 −1 −1 −j −1 +1 −1 −1 +1 +j +1 +1 −1 −1 −1 −j −1 −1 +1 +1 −1 −j −1 +j −j −j −j +1 −j +j −j −j +j −1 +j −j +j +j +j −1 +j +j −j −j +j −1 +j +j −j −j −j +1 −j +j −j −j +j −1 +j +j −j −j −j +1 −j −j +j +j −j +1 −j +1 −1 −1 −1 −j −1 +1 −1 −1 +1 +j +1 −1 +1 +1 +1 +j +1 +1 −1 −1 +1 +j +1 −1 +1 +1 +1 +j +1 −1 +1 +1 −1 −j −1 −1 +1 +1 +1 +j +1 +1 −1 −1 +1 +j +1 −j +j +j +j −1 +j −j +j +j −j +1 −j +j −j −j −j +1 −j −j +j +j −j +1 −j +1 −j +1 −1 −1 −1 −j −1 +1 −1 −1 +1 +j +1 +1 −1 −1 −1 −j −1 −1 +1 +1 −1 −j −1 −j +j +j +j −1 +j −j +j +j −j +1 −j +j −j −j −j +1 −j −j +j +j −j +1 −j −j +j +j +j −1 +j −j +j +j −j +1 −j −j +j +j +j −1 +j +j −j −j +j −1 +j +1 −1 −1 −1 −j −1 +1 −1 −1 +1 +j +1 −1 +1 +1 +1 +j +1 +1 −1 −1 +1 +j +1 −j |
| The Sequence $Seq^{4}_{right,\ 385}(k)$, to be transmitted from left to right, up to down |
| −j +j +j +j −1 +j −j +j +j −j +1 −j −j +j +j +j −1 +j +j −j −j +j −1 +j −1 +1 +1 +1 +j +1 −1 +1 +1 −1 −j −1 +1 −1 −1 −1 −j −1 −1 +1 +1 −1 −j −1 −j +j +j +j −1 +j −j +j +j −j +1 −j −j +j +j +j −1 +j +j −j −j +j −1 +j +1 −1 −1 −1 −j −1 +1 −1 −1 +1 +j +1 −1 +1 +1 +1 +j +1 +1 −1 −1 +1 +j +1 −1 +1 +1 +1 +j +1 −1 +1 +1 −1 −j −1 −1 +1 +1 +1 +j +1 +1 −1 −1 +1 +j +1 +j −j −j −j +1 −j +j −j −j +j −1 +j −j +j +j +j −1 +j +j −j −j +j −1 +j +1 −1 −1 −1 −j −1 +1 −1 −1 +1 +j +1 +1 −1 −1 −1 −j −1 −1 +1 +1 −1 −j −1 +j −j −j −j +1 −j +j −j −j +j −1 +j −j +j +j +j −1 +j +j −j −j −j +j −1 +j +1 −1 −1 −1 −j −1 +1 −1 −1 +1 +j +1 +1 −1 −1 −1 −j −1 −1 +1 +1 −1 −j −1 −j +j +j −j +1 −j +j −j −j −j +1 −j −j +j +j −j +1 −j +1 −1 −1 −1 −j −1 +1 −1 −1 +1 +j +1 +1 −1 −1 −1 −j −1 −1 +1 +1 −1 −j −1 +j −j −j −j +1 −j +j −j −j +j −1 +j −j +j +j +j −1 +j +j −j −j +j −1 +j +j −j −j +j −1 +j +j −j −j −j +1 −j +j −j −j +j −1 +j +j −j −j −j +1 −j −j +j +j −j +1 −j +1 −1 −1 −1 −j −1 +1 −1 −1 +1 +j +1 −1 +1 +1 +1 +j +1 +1 −1 −1 +1 +j +1 −j +j +j +j −1 +j −j +j +j −j +1 −j −j +j +j +j −1 +j +j −j −j +j −1 +j +1 −1 −1 −1 −j −1 +1 −1 −1 +1 +j +1 −1 +1 +1 +1 +j +1 +1 −1 −1 +1 +j +1 −j |

TABLE 14-continued

| The sequence $Seq^{iSTS}_{right,\ 385}(k)$ |
|---|
| The Sequence $Seq^{5}_{right,\ 385}(k)$, to be transmitted from left to right, up to down |
| +1 −1 −1 −1 −j −1 +1 −1 −1 +1 +j +1 +1 −1 −1 −1 −j −1 −1 +1 +1 −1 −j −1 −1 +1 +1 +1 +j +1<br>−1 +1 +1 −1 −j −1 +1 −1 −1 −1 −j −1 −1 +1 +1 −1 −j −1 −j +j +j +j −1 +j −j +j +j −j +1 −j −j +j<br>+j +j −1 +j +j −j −j +j −1 +j −j +j +j +j −1 +j −j +j +j −j +1 −j +j −j −j −j +1 −j −j +j +j −j +1 −j<br>+1 −1 −1 −1 −j −1 +1 −1 −1 +1 +j +1 +1 −1 −1 −1 −j −1 −1 +1 +1 −1 −j −1 −1 +1 +1 +1 +j +1<br>−1 +1 +1 −1 −j −1 +1 −1 −1 −1 −j −1 −1 +1 +1 −1 −j −1 +j −j −j −j +1 −j +j −j −j +j −1 +j +j −j −j<br>−j +1 −j −j +j +j −j +1 −j +j −j −j −j +1 −j +j −j −j +j −1 +j −j +j +j +j −1 +j +j −j −j +j −1 +j +j<br>−j −j −j +1 −j +j −j −j +j −1 +j +j −j −j −j +1 −j −j +j +j −j +1 −j −j +j +j +j −1 +j −j +j +j −j +1<br>−j +j −j −j −j +1 −j −j +j +j −j +1 −j +1 −1 −1 −1 −j −1 +1 −1 −1 +1 +j +1 +1 −1 −1 −1 −j −1 −1<br>+1 +1 −1 −j −1 +1 −1 −1 −1 −j −1 +1 −1 −1 +1 +j +1 −1 +1 +1 +1 +j +1 +1 −1 −1 +1 +j +1 −j<br>+j +j +j −1 +j −j +j +j −j +1 −j −j +j +j +j −1 +j +j −j −j +j −1 +j +j −j −j −j +1 −j +j −j −j +j −1<br>+j −j +j +j +j −1 +j +j −j −j +j −1 +j +1 −1 −1 −1 −j −1 +1 −1 −1 +1 +j +1 +1 −1 −1 −1 −j −1 −1<br>+1 +1 −1 −j −1 +1 −1 −1 −1 −j −1 +1 −1 −1 +1 +j +1 −1 +1 +1 +1 +j +1 +1 −1 −1 +1 +j +1 −1 |
| The Sequence $Seq^{6}_{right,\ 385}(k)$, to be transmitted from left to right, up to down |
| +j −j −j −j +1 −j +j −j −j +j −1 +j +j −j −j −j +1 −j −j +j +j −j +1 −j +1 −1 −1 −1 −j −1 +1 −1 −1<br>+1 +j +1 −1 +1 +1 +1 +j +1 +1 −1 −1 +1 +j +1 −1 +1 +1 +1 +j +1 −1 +1 +1 −1 −j −1 −1<br>+1 +1 +1 +j +1 +1 −1 −1 +1 +j +1 −j +j +j +j −1 +j −j +j +j −j +1 −j +j −j −j −j +1 −j −j +j +j<br>−j +1 −j +j −j −j −j +1 −j +j −j −j +j −1 +j +j −j −j −j +1 −j −j +j +j −j +1 −j +1 −1 −1 −1 −j −1 +1<br>−1 −1 +1 +j +1 −1 +1 +1 +1 +j +1 +1 −1 −1 +1 +j +1 +1 −1 −1 −1 −j −1 +1 −1 −1 +1 +j +1<br>+1 −1 −1 −1 −j −1 −1 +1 +1 −1 −j −1 +j −j −j −j +1 −j +j −j −j +j −1 +j −j +j +j +j −1 +j +j −j −j<br>+j −1 +j −1 +1 +1 +1 +j +1 −1 +1 +1 −1 −j −1 −1 +1 +1 +1 +j +1 +1 −1 −1 +1 +j +1 +j −j −j<br>−j +1 −j +j −j −j +j −1 +j −j +j +j +j −1 +j +j −j −j +j −1 +j −j +j +j +j −1 +j −j +j +j −j +1 −j<br>−j +j +j +j −1 +j +j −j −j +j −1 +j +1 −1 −1 −1 −j −1 +1 −1 −1 +1 +j +1 −1 +1 +1 +1 +j +1 +1<br>−1 −1 +1 +j +1 +1 −1 −1 −1 −j −1 +1 −1 −1 +1 +j +1 +1 −1 −1 −1 −j −1 −1 +1 +1 −1 −j −1 −j +j<br>+j +j −1 +j −j +j +j −j +1 −j +j −j −j −j +1 −j −j +j +j −j +1 −j −j +j +j +j −1 +j −j +j +j −j +1 −j<br>−j +j +j +j −1 +j +j −j −j +j −1 +j +1 −1 −1 −1 −j −1 +1 −1 −1 +1 +j +1 −1 +1 +1 +1 +j +1 +1<br>−1 −1 +1 +j +1 −1 |
| The Sequence $Seq^{7}_{right,\ 385}(k)$, to be transmitted from left to right, up to down |
| +1 −1 −1 −1 −j −1 +1 −1 −1 +1 +j +1 +1 −1 −1 −1 −j −1 −1 +1 +1 −1 −j −1 +1 −1 −1 −1 −j −1 +1<br>−1 −1 +1 +j +1 −1 +1 +1 +1 +j +1 +1 −1 −1 +1 +j +1 −1 +1 +1 +1 +j +1 −1 +1 +1 −1 −j −1<br>−1 +1 +1 +1 +j +1 +1 −1 −1 +1 +j +1 +1 −1 −1 −1 −j −1 +1 −1 −1 +1 +j +1 −1 +1 +1 +1 +j<br>+1 +1 −1 −1 +1 +j +1 −j +j +j +j −1 +j −j +j +j −j +1 −j −j +j +j +j −1 +j +j −j −j +j −1 +j −j<br>+j +j +j −1 +j −j +j +j −j +1 −j +j −j −j −j +1 −j −j +j +j −j +1 −j −j +j +j +j −1 +j −j +j +j −j<br>+1 −j −j +j +j +j −1 +j +j −j −j +j −1 +j +j −j −j −j +1 −j +j −j −j +j −1 +j −j +j +j +j −1 +j +j −j<br>−j +j −1 +j +j −j −j −j +1 −j +j −j −j +j −1 +j +j −j −j −j +1 −j −j +j +j −j +1 −j +j −j −j −j +1 −j<br>+j −j −j +j −1 +j −j +j +j +j −1 +j +j −j −j +j −1 +j −j +j +j +j −1 +j −j +j +j −j +1 −j −j +j +j<br>+j −1 +j +j −j −j +j −1 +j +j −j −j −j +1 −j +j −j −j +j −1 +j −j +j +j +j −1 +j +j −j −j +j −1 +j −1<br>+1 +1 +1 +j +1 −1 +1 +1 −1 −j −1 −1 +1 +1 +1 +j +1 +1 −1 −1 +1 +j +1 −1 +1 +1 +1 +j<br>+1 −1 +1 +1 −1 −j −1 +1 −1 −1 −1 −j −1 −1 +1 +1 −1 −j −1 −1 +1 +1 +1 +j +1 −1 +1 +1 −1 −j<br>−1 −1 +1 +1 +1 +j +1 +1 −1 −1 +1 +j +1 +1 −1 −1 −1 −j −1 +1 −1 −1 +1 +j +1 −1 +1 +1 +1<br>+j +1 +1 −1 −1 +1 +j +1 −1 |
| The Sequence $Seq^{8}_{right,\ 385}(k)$, to be transmitted from left to right, up to down |
| +1 −1 −1 −1 −j −1 +1 −1 −1 +1 +j +1 +1 −1 −1 −1 −j −1 −1 +1 +1 −1 −j −1 +j −j −j −j +1 −j +j −j<br>−j +j −1 +j −j +j +j +j −1 +j +j −j −j +j −1 +j +1 −1 −1 −1 −j −1 +1 −1 −1 +1 +j +1 +1 −1 −1 −1<br>−j −1 −1 +1 +1 −1 −j −1 −j +j +j +j −1 +j −j +j +j −j +1 −j +j −j −j −j +1 −j −j +j +j −j +1 −j +1<br>−1 −1 −1 −j −1 +1 −1 −1 +1 +j +1 +1 −1 −1 −1 −j −1 −1 +1 +1 −1 −j −1 +j −j −j −j +1 −j +j −j −j<br>+j −1 +j −j +j +j +j −1 +j +j −j −j +j −1 +j −1 +1 +1 +1 +j +1 −1 +1 +1 −1 −j −1 −1 +1 +1 +1<br>+j +1 +1 −1 −1 +1 +j +1 +j −j −j −j +1 −j +j −j −j +j −1 +j −j +j +j +j −1 +j +j −j −j +j −1 +j<br>+j −j −j −j +1 −j +j −j −j +j −1 +j +j −j −j −j +1 −j −j +j +j −j +1 −j −1 +1 +1 +1 +j +1 −1 +1<br>+1 −1 −j −1 +1 −1 −1 −1 −j −1 −1 +1 +1 −1 −j −1 +j −j −j −j +1 −j +j −j −j +j −1 +j +j −j −j −j +1<br>−j −j +j +j −j +1 −j +1 −1 −1 −1 −j −1 +1 −1 −1 +1 +j +1 −1 +1 +1 +1 +j +1 +1 −1 −1 +1 +j<br>+1 −j +j +j +j −1 +j −j +j +j −j +1 −j −j +j +j +j −1 +j +j −j −j +j −1 +j +1 −1 −1 −1 −j −1 +1 −1<br>−1 +1 +j +1 −1 +1 +1 +1 +j +1 +1 −1 −1 +1 +j +1 +j −j −j −j +1 −j +j −j −j +j −1 +j +j −j −j<br>−j +1 −j −j +j +j −j +1 −j +1 −1 −1 −1 −j −1 +1 −1 −1 +1 +j +1 −1 +1 +1 +1 +j +1 +1 −1 −1<br>+1 +j +1 −j |

TABLE 15

| The sequence $Seq^{iSTS}_{left,\ 595}(k)$ |
|---|
| The Sequence $Seq^{1}_{left,\ 595}(k)$, to be transmitted from left to right, up to down |
| −1 +1 −1 −1 −1 −j −j −1−j −1 −1 +j −j −j −j +1 −j −j +j +j −j −j −j +1 −j +j −j −j +j −1 +j +1 −1 −1<br>−1 −j −1 −1 +1 +1 −1 −j −1 −1 +1 +1 +1 +j +1 −1 +1 +1 −1 −j −1 −j +j +j +j −1 +j +j −j −j +j −1<br>+j +j −j −j −j +1 −j +j −j −j +j −1 +j +1 −1 −1 −1 −j −1 −1 +1 +1 −1 −j −1 +1 −1 −1 −1 −j −1 +1<br>−1 −1 +1 +j +1 +j −j −j −j +1 −j −j +j +j −j +1 −j +1 −1 −1 −1 −j −1 +1 −1 −1 +1 +j +1 −j +j +j<br>+j −1 +j +j −j −j +j −1 +j +j −j −j −j +1 −j +j −j −j +j −1 +j −1 +1 +1 +1 +j +1 +1 −1 −1 +1 +j<br>+1 −1 +1 +1 +1 +j +1 −1 +1 +1 −1 −j −1 +j −j −j −j +1 −j −j +j +j −j +1 −j +j −j −j −j +1 −j +j<br>−j −j +j −1 +j −1 +1 +1 +1 +j +1 +1 −1 −1 +1 +j +1 −1 +1 +1 +1 +j +1 −1 +1 +1 −1 −j −1<br>+j −j −j −j +1 −j −j +j +j −j +1 −j −j +j +j +j −1 +j −j +j +j −j +1 −j +1 −1 −1 −1 −j −1 −1 +1 +1<br>−1 −j −1 −1 +1 +1 +1 +j +1 −1 +1 +1 −1 −j −1 +j −j −j −j +1 −j −j +j +j −j +1 −j +j −j −j −j +1 |

TABLE 15-continued

| The sequence $Seq^{iSTS}_{left,\ 595}(k)$ |
|---|
| −j +j −j −j +j −1 +j −1 +1 +1 +1 +j +1 +1 −1 −1 +1 +j +1 +j −j −j −j +1 −j +j −j −j +j −1 +j +1 |
| −1 −1 −1 −j −1 −1 +1 +1 −1 −j −1 −1 +1 +1 +1 +j +1 −1 +1 +1 −1 −j −1 −j +j +j +j −1 +j +j −j |
| −j +j −1 +j −j +j +j +j −1 +j −j +j +j −j +1 −j −1 +1 +1 +1 +j +1 +1 −1 −1 +1 +j +1 −1 +1 |
| +1 +1 +j +1 −1 +1 +1 −1 −j −1 −j +j +j +j −1 +j +j −j −j +j −1 +j +j −j −j −j +1 −j +j −j −j +j |
| −1 +j +1 −1 −1 −1 −j −1 −1 +1 +1 −1 −j −1 −1 +1 +1 +1 +j +1 −1 +1 +1 −1 −j −1 −j +j +j +j −1 |
| +j +j −j −j +j −1 +j +j −j −j −j +1 −j +j −j −j +j −1 +j +1 −1 −1 −1 −j −1 −1 +1 +1 −1 −j −1 +1 −1 |
| −1 −1 −j −1 +1 −1 −1 +1 +j +1 +j −j −j −j +1 −j −j +j +j −j +1 −j +1 −1 −1 −1 −j −1 +1 −1 −1 +1 |
| +j +1 −j +j +j +j −1 +j +j −j −j +j −1 +j +j −j −j −j +1 −j +j −j −j +j −1 +j −1 +1 +1 +1 +j +1 |
| +1 −1 −1 +1 +j +1 −1 +1 +1 +1 +j +1 −1 +1 +1 −1 −j −1 +j −j −j −j +1 −j −j +j +j −j +1 −j +j |
| −j −j −j +1 −j +j −j −j +j −1 +j −1 +1 +1 +1 +j +1 +1 −1 −1 +1 +j +1 |
| The Sequence $Seq^{2}_{left,\ 595}(k)$, to be transmitted from left to right, up to down |
| −j −j −1 +j +1 −j −1 +1 +j +1 +j +1 +j −1 −j −1 −1 +j +1 +1 −1 −1 −1 −j −1 +1 −1 −1 +1 +j +1 |
| +1 −1 −1 −1 −j −1 −1 +1 +1 −1 −j −1 +j −j −j −j +1 −j +j −j −j +j −1 +j −j +j +j +j −1 +j +j −j −j |
| +j −1 +j +1 −1 −1 −1 −j −1 +1 −1 −1 +1 +j +1 +1 −1 −1 −1 −j −1 −1 +1 +1 −1 −j −1 −j +j +j +j |
| −1 +j −j +j +j −j +1 −j +j −j −j −j +1 −j −j +j +j −j +1 −j −j +j +j +j −1 +j −j +j +j −j +1 −j −j +j |
| +j +j −1 +j +j −j −j +j −1 +j +1 −1 −1 −1 −j −1 +1 −1 −1 +1 +j +1 −1 +1 +1 +1 +j +1 +1 −1 |
| −1 +1 +j +1 +j −j −j −j +1 −j +j −j −j +j −1 +j +j −j −j −j +1 −j −j +j +j −j +1 −j +1 −1 −1 −1 −j −1 |
| +1 −1 −1 +1 +j +1 −1 +1 +1 +1 +j +1 +1 −1 −1 +1 +j +1 +j −j −j −j +1 −j +j −j −j +j −1 +j +j |
| −j −j −j +1 −j −j +j +j −j +1 −j −1 +1 +1 +1 +j +1 −1 +1 +1 −1 −j −1 +1 −1 −1 −1 −j −1 −1 +1 |
| +1 −1 −j −1 +j −j −j −j +1 −j +j −j −j +j −1 +j +j −j −j −j +1 −j −j +j +j −j +1 −j +1 −1 −1 −1 −j −1 |
| +1 −1 −1 +1 +j +1 −1 +1 +1 +1 +j +1 +1 −1 −1 +1 +j +1 +1 −1 −1 −1 −j −1 +1 −1 −1 +1 +j |
| +1 +1 −1 −1 −1 −j −1 −1 +1 +1 −1 −j −1 +j −j −j −j +1 −j +j −j −j +j −1 +j −j +j +j +j −1 +j +j −j |
| −j +j −1 +j −1 +1 +1 +1 +j +1 −1 +1 +1 −1 −j −1 −1 +1 +1 +1 +j +1 +1 −1 −1 +1 +j +1 +j |
| −j −j −j +1−j +j −j −j +j −1 +j −j +j +j +j −1 +j +j −j −j +j −1 +j +1 −1 −1 −1 −j −1 +1 −1 −1 +1 |
| +j +1 +1 −1 −1 −1 −j −1 −1 +1 +1 −1 −j −1 +j −j −j −j +1 −j +j −j −j +j −1 +j −j +j +j +j −1 +j |
| +j −j −j +j −1 +j +1 −1 −1 −1 −j −1 +1 −1 −1 +1 +j +1 +1 −1 −1 −1 −j −1 −1 +1 +1 −1 −j −1 −j |
| +j +j +j −1 +j −j +j +j −j +1 −j +j −j −j −j +1 −j −j +j +j −j +1 −j −j +j +j +j −1 +j −j +j +j −j |
| +1 −j −j +j +j +j −1 +j +j −j −j +j −1 +j +1 −1 −1 −1 −j −1 +1 −1 −1 +1 +j +1 −1 +1 +1 +1 +j |
| +1 +1 −1 −1 +1 +j +1 +j −j −j −j +1 −j +j −j −j +j −1 +j +j −j −j −j +1 −j −j +j +j −j +1 −j +1 −1 |
| −1 −1 −j −1 +1 −1 −1 +1 +j +1 −1 +1 +1 +1 +j +1 +1 −1 −1 +1 +j +1 |
| The Sequence $Seq^{3}_{left,\ 595}(k)$, to be transmitted from left to right, up to down |
| +j +1 −1 −j +j +j −j −1 −1 +1 +j −j −1 +j −j −j +1 −1 +j −j +j +j +j −1 +j −j +j +j −j +1 −j +j −j |
| −j −j +1 −j −j +j +j −j +1 −j −1 +1 +1 +1 +j +1 −1 +1 +1 −1 −j −1 −1 +1 +1 +1 +j +1 +1 −1 |
| −1 +1 +j +1 +1 −1 −1 −1 −j −1 +1 −1 −1 +1 +j +1 −1 +1 +1 +1 +j +1 +1 −1 −1 +1 +j +1 +j −j |
| −j −j +1 −j +j −j −j +j −1 +j +j −j −j −j +1 −j −j +j +j −j +1 −j −1 +1 +1 +1 +j +1 −1 +1 +1 −1 |
| −j −1 +1 −1 −1 −1 −j −1 −1 +1 +1 −1 −j −1 +j −j −j −j +1 −j +j −j −j +j −1 +j +j −j −j −j +1−j −j +j |
| +j −j +1 −j +j −j −j −j +1 −j +j −j −j +j −1 +j −j +j +j +j −1 +j +j −j −j +j −1 +j −1 +1 +1 +1 +j |
| +1 −1 +1 +1 −1 −j −1 −1 +1 +1 +1 +j +1 +1 −1 −1 +1 +j +1 +1 −1 −1 −1 −j −1 +1 −1 −1 +1 |
| +j +1 −1 +1 +1 +1 +j +1 +1 −1 −1 +1 +j +1 −j +j +j +j −1 +j −j +j +j −j +1 −j −j +j +j +j −1 |
| +j +j −j −j +j −1 +j +j −j −j −j +1 −j +j −j −j +j −1 +j −j +j +j +j −1 +j +j −j −j +j −1 +j −1 +1 |
| +1 +1 +j +1 −1 +1 +1 −1 −j −1 −1 +1 +1 +1 +j +1 +1 −1 −1 +1 +j +1 −j +j +j +j −1 +j −j +j |
| +j −j +1 −j +j −j −j −j +1 −j −j +j +j −j +1 −j −1 +1 +1 +1 +j +1 −1 +1 +1 −1 −j −1 −1 +1 +1 |
| +1 +j +1 +1 −1 −1 +1 +j +1 −1 +1 +1 +1 +j +1 −1 +1 +1 −1 −j −1 +1 −1 −1 −1 −j −1 −1 +1 |
| +1 −1 −j −1 −j +j +j +j −1 +j −j +j +j −j +1 −j +j +j +j −1 +j +j −j −j +j −1 +j −j +j +j +j −1 |
| +j −j +j +j −j +1 −j +j −j −j −j +1 −j −j +j +j −j +1 −j −1 +1 +1 +1 +j +1 −1 +1 +1 −1 −j −1 −1 |
| +1 +1 +1 +j +1 +1 −1 −1 +1 +j +1 +1 −1 −1 −1 −j −1 +1 −1 −1 +1 +j +1 −1 +1 +1 +1 +j +1 |
| +1 −1 −1 +1 +j +1 +j −j −j −j +1 −j +j −j −j +j −1 +j +j −j −j −j +1 −j −j +j +j −j +1 −j −1 +1 +1 |
| +1 +j +1 −1 +1 +1 −1 −j −1 +1 −1 −1 −1 −j −1 −1 +1 +1 −1 −j −1 +j −j −j −j +1 −j +j −j −j +j −1 |
| +j +j −j −j −j +1 −j −j +j +j −j +1 −j +j −j −j −j +1 −j +j −j −j +j −1 +j −j +j +j +j −1 +j +j −j −j |
| +j −1 +j −1 +1 +1 +1 +j +1 −1 +1 +1 −1 −j −1 −1 +1 +1 +1 +j +1 +1 −1 −1 +1 +j +1 |
| The Sequence $Seq^{4}_{left,\ 595}(k)$, to be transmitted from left to right, up to down |
| −j +j +1 +j −1 +1 +1 −1 +1 −j +1 +j −1 −1 +j +j +1 +1 +1 +j −j −j −j +1 −j +j −j −j +j −1 +j −j |
| +j +j +j −1 +j +j −j −j +j −1 +j +j −j −j −j +1 −j +j −j −j +j −1 +j +j −j −j −j +1 −j −j +j +j −j +1 |
| −j −j +j +j +j −1 +j −j +j +j −j +1 −j +j −j −j −j +1 −j −j +j +j −j +1 −j +j −j −j −j +1 −j +j −j −j |
| +j −1 +j +j −j −j −j +1 −j −j +j +j −j +1 −j +1 −1 −1 −1 −j −1 +1 −1 −1 +1 +j +1 −1 +1 +1 +1 |
| +j +1 +1 −1 −1 +1 +j +1 +1 −1 −1 −1 −j −1 +1 −1 −1 +1 +j +1 +1 −1 −1 −1 −j −1 −1 +1 +1 −1 |
| −j −1 +1 −1 −1 −1 −j −1 +1 −1 −1 +1 +j +1 −1 +1 +1 +1 +j +1 +1 −1 −1 +1 +j +1 −1 +1 +1 |
| +1 +j +1 −1 +1 +1 −1 −j −1 −1 +1 +1 +1 +j +1 +1 −1 −1 +1 +j +1 −1 +1 +1 +1 +j +1 −1 |
| +1 +1 −1 −j −1 +1 −1 −1 −1 −j −1 −1 +1 +1 −1 −j −1 −1 +1 +1 +1 +j +1 −1 +1 +1 −1 −j −1 −1 |
| +1 +1 +1 +j +1 +1 −1 −1 +1 +j +1 +1 −1 −1 −1 −j −1 +1 −1 −1 +1 +j +1 −1 +1 +1 +1 +j +1 |
| +1 −1 −1 +1 +j +1 −1 +1 +1 +1 +j +1 −1 +1 +1 −1 −j −1 −1 +1 +1 +1 +j +1 +1 −1 −1 +1 +j |
| +1 +j −j −j −j +1 −j +j −j −j +j −1 +j −j +j +j +j −1 +j +j −j −j +j −1 +j +j −j −j −j +1 −j +j −j −j |
| +j −1 +j +j −j −j −j +1 −j −j +j +j −j +1 −j +j −j −j −j +1 −j +j −j −j +j −1 +j −j +j +j +j −1 +j +j |
| −j −j +j −1 +j −j +j +j +j −1 +j −j +j +j −j +1 −j −j +j +j +j −1 +j +j −j −j +j −1 +j +j −j −j −j +1 |
| −j +j −j −j +j −1 +j −j +j +j +j −1 +j +j −j −j +j −1 +j +j −j −j −j +1−j +j −j −j +j −1 +j +j −j −j −j +1 |
| −j +j −j −j +j −1 +j −j +j +j +j −1 +j +j −j −j +j −1 +j +j −j −j −j +1 −j +j −j −j +j −1 +j +j −j −j |
| −j −j −j +1 −j +j −j −j +j −1 +j +j −j −j −j +1 −j −j +j +j −j +1 −j +1 −1 −1 −1 −j −1 +1 −1 −1 +1 +j |
| +1 −1 +1 +1 +1 +j +1 +1 −1 −1 +1 +j +1 +1 −1 −1 −1 −j −1 +1 −1 −1 +1 +j +1 +1 −1 −1 −1 |
| −j −1 −1 +1 +1 −1 −j −1 +1 −1 −1 −1 −j −1 +1 −1 −1 +1 +j +1 −1 +1 +1 +1 +j +1 +1 −1 −1 +1 |
| +j +1 −1 +1 +1 +1 +j +1 −1 +1 +1 −1 −j −1 −1 +1 +1 +1 +j +1 +1 −1 −1 +1 +j +1 |
| The Sequence $Seq^{5}_{left,\ 595}(k)$, to be transmitted from left to right, up to down |
| +j −1 −j −1 −j +j +j −1 +j −1 −1 +1 −j +1 +1 −1 −1 −j −j +1 −1 −1 −1 −j −1 +1 −1 −1 +1 +j +1 |
| −1 +1 +1 +1 +j +1 +1 −1 −1 +1 +j +1 −1 +1 +1 +1 +j +1 −1 +1 +1 −1 −j −1 −1 +1 +1 +1 +j |
| +1 +1 −1 −1 +1 +j +1 +j −j −j −j +1 −j +j −j −j +j −1 +j −j +j +j +j −1 +j +j −j −j +j −1 +j +j −j |

TABLE 15-continued

| The sequence $Seq^{iSTS}_{left,\ 595}(k)$ |
|---|
| −j −j +1 −j +j −j −j +j −1 +j +j −j −j −j +1 −j −j +j +j −j +1 −j −j +j +j +j −1 +j −j +j +j −j +1 −j |
| +j −j −j −j +1 −j −j +j +j −j +1 −j +j −j −j −j +1 −j +j −j −j +j −1 +j +j −j −j −j +1 −j −j +j +j −j |
| +1 −j −1 +1 +1 +1 +j +1 −1 +1 +1 −1 −j −1 +1 −1 −1 −1 −j −1 −1 +1 +1 −1 −j −1 −1 +1 +1 +1 |
| +j +1 −1 +1 +1 −1 −j −1 −1 +1 +1 +1 +j +1 +1 −1 −1 +1 +j +1 +j −j −j −j +1 −j +j −j −j +j −1 |
| +j −j +j +j +j −1 +j +j −j −j +j −1 +j −j +j +j +j −1 +j −j +j +j −j +1 −j −j +j +j +j −1 +j +j −j |
| −j +j −1 +j −1 +1 +1 +1 +j +1 −1 +1 +1 −1 −j −1 +1 −1 −1 −1 −j −1 −1 +1 +1 −1 −j −1 −1 +1 |
| +1 +1 +j +1 −1 +1 +1 −1 −j −1 −1 +1 +1 +1 +j +1 +1 −1 −1 +1 +j +1 +1 −1 −1 −1 −j −1 +1 |
| −1 −1 +1 +j +1 −1 +1 +1 +1 +j +1 +1 −1 −1 +1 +j +1 −1 +1 +1 +1 +j +1 −1 +1 +1 −1 −j −1 |
| −1 +1 +1 +1 +j +1 +1 −1 −1 +1 +j +1 −j +j +j +j −1 +j −j +j +j −j +1 −j +j −j −j −j +1 −j −j +j |
| +j −j +1 −j −j +j +j +j −1 +j −j +j +j −j +1 −j −j +j +j +j −1 +j +j −j −j +j −1 +j +1 −1 −1 −1 −j |
| −1 +1 −1 −1 +1 +j +1 −1 +1 +1 +1 +j +1 +1 −1 −1 +1 +j +1 −1 +1 +1 +1 +j +1 −1 +1 +1 |
| −1 −j −1 −1 +1 +1 +1 +j +1 +1 −1 −1 +1 +j +1 +j −j −j −j +1 −j +j −j −j +j −1 +j −j +j +j +j −1 |
| +j +j −j −j +j −1 +j +j −j −j −j +1 −j +j −j −j +j −1 +j +j −j −j −j +1 −j −j +j +j −j +1 −j −j +j +j |
| +j −1 +j −j +j +j −j +1 −j +j −j −j −j +1 −j −j +j +j −j +1 −j +j −j −j −j +1 −j +j −j −j +j −1 +j +j |
| −j −j −j +1 −j −j +j +j −j +1 −j −1 +1 +1 +1 +j +1 −1 +1 +1 −1 −j −1 +1 −1 −1 −1 −j −1 −1 +1 |
| +1 −1 −j −1 −1 +1 +1 +1 +j +1 −1 +1 +1 −1 −j −1 −1 +1 +1 +1 +j +1 +1 −1 −1 +1 +j +1 |
| The Sequence $Seq^{6}_{left,\ 595}(k)$, to be transmitted from left to right, up to down |
| +1 +j +j +j −j −j −1 −1 −1 +j +j −j +j +j +1 −1 −j +j −j −1 +1 +1 +1 +j +1 −1 +1 +1 −1 −j −1 |
| −j +j +j +j −1 +j +j −j −j +j −1 +j −1 +1 +1 +1 +j +1 −1 +1 +1 −1 −j −1 +j −j −j −j +1 −j −j +j |
| +j −j +1 −j +1 −1 −1 −1 −j −1 +1 −1 −1 +1 +j +1 +j −j −j −j +1 −j −j +j +j −j +1 −j −1 +1 +1 +1 |
| +j +1 −1 +1 +1 −1 −j −1 +j −j −j −j +1 −j −j +j +j −j +1 −j +j −j −j −j +1 −j +j −j −j +j −1 +j −1 |
| +1 +1 +1 +j +1 +1 −1 −1 +1 +j +1 +j −j −j −j +1 −j +j −j −j +j −1 +j +1 −1 −1 −1 −j −1 −1 +1 |
| +1 −1 −j −1 +j −j −j −j +1 −j +j −j −j +j −1 +j −1 +1 +1 +1 +j +1 +1 −1 −1 +1 +j +1 −j +j +j |
| +j −1 +j −j +j +j −j +1 −j −1 +1 +1 +1 +j +1 +1 −1 −1 +1 +j +1 −j +j +j +j −1 +j −j +j +j −j |
| +1 −j +1 −1 −1 −1 −j −1 −1 +1 +1 −1 −j −1 −j +j +j +j −1 +j −j +j +j −j +1 −j −1 +1 +1 +1 +j |
| +1 +1 −1 −1 +1 +j +1 +j −j −j −j +1 −j +j −j −j +j −1 +j −1 +1 +1 +1 +j +1 +1 −1 −1 +1 +j |
| +1 −j +j +j +j −1 +j −j +j +j −j +1 −j −1 +1 +1 +1 +j +1 +1 −1 −1 +1 +j +1 −1 +1 +1 +1 +j |
| +1 −1 +1 +1 −1 −j −1 −j +j +j +j −1 +j +j −j −j +j −1 +j −1 +1 +1 +1 +j +1 −1 +1 +1 −1 −j −1 |
| +j −j −j −j +1 −j −j +j +j −j +1 −j −1 +1 +1 +1 +j +1 −1 +1 +1 −1 −j −1 −j +j +j +j −1 +j +j −j |
| −j +j −1 +j +1 −1 −1 −1 −j −1 +1 −1 −1 +1 +j +1 −j +j +j +j −1 +j +j −j −j +j −1 +j −1 +1 +1 |
| +1 +j +1 −1 +1 +1 −1 −j −1 −j +j +j +j −1 +j +j −j −j +j −1 +j −1 +1 +1 +1 +j +1 −1 +1 +1 |
| −1 −j −1 +j −j −j −j +1 −j −j +j +j −j +1 −j +1 −1 −1 −1 −j −1 +1 −1 −1 +1 +j +1 +j −j −j −j +1 −j |
| −j +j +j −j +1 −j −1 +1 +1 +1 +j +1 −1 +1 +1 −1 −j −1 +j −j −j −j +1 −j −j +j +j −j +1 −j +j −j −j |
| −j +1 −j +j −j −j +j −1 +j −1 +1 +1 +1 +j +1 +1 −1 −1 +1 +j +1 +j −j −j −j +1 −j +j −j −j +j −1 |
| +j +1 −1 −1 −1 −j −1 −1 +1 +1 −1 −j −1 +j −j −j −j +1 −j +j −j −j +j −1 +j −1 +1 +1 +1 +j +1 |
| +1 −1 −1 +1 +j +1 −j +j +j +j −1 +j −j +j +j −j +1 −j −1 +1 +1 +1 +j +1 +1 −1 −1 +1 +j +1 |
| The Sequence $Seq^{7}_{left,\ 595}(k)$, to be transmitted from left to right, up to down |
| +1 −1 +j +1 +1 −j +1 +j −1 −1 −1 −1 +1 +1 +1 −1 −1 +j −1 −j +j +j +j −1 +j −j +j +j −j +1 −j |
| +1 −1 −1 −1 −j −1 −1 +1 +1 −1 −j −1 −j +j +j +j −1 +j −j +j +j −j +1 −j −1 +1 +1 +1 +j +1 +1 |
| −1 −1 +1 +j +1 +1 −1 −1 −1 −j −1 +1 −1 −1 +1 +j +1 +j −j −j −j +1 −j −j +j +j −j +1 −j −1 +1 |
| +1 +1 +j +1 −1 +1 +1 −1 −j −1 +j −j −j −j +1 −j −j +j +j −j +1 −j −1 +1 +1 +1 +j +1 −1 +1 +1 |
| −1 −j −1 −j +j +j +j −1 +j +j −j −j +j −1 +j −1 +1 +1 +1 +j +1 −1 +1 +1 −1 −j −1 +j −j −j −j +1 |
| −j −j +j +j −j +1 −j +j −j −j −j +1 −j +j −j −j +j −1 +j −1 +1 +1 +1 +j +1 +1 −1 −1 +1 +j +1 −j |
| +j +j +j −1 +j −j +j +j −j +1 −j −1 +1 +1 +1 +j +1 +1 −1 −1 +1 +j +1 +1 −1 −1 −1 −j −1 +1 |
| −1 −1 +1 +j +1 +j −j −j −j +1 −j −j +j +j −j +1 −j +1 −1 −1 −1 −j −1 +1 −1 −1 +1 +j +1 −j +j +j |
| +j −1 +j +j −j −j +j −1 +j +j −j −j −j +1 −j +j −j −j +j −1 +j −1 +1 +1 +1 +j +1 +1 −1 −1 +1 +j |
| +1 −j +j +j +j −1 +j −j +j +j −j +1 −j −1 +1 +1 +1 +j +1 +1 −1 −1 +1 +j +1 −j +j +j +j −1 +j |
| −j +j +j −j +1 −j +1 −1 −1 −1 −j −1 −1 +1 +1 −1 −j −1 −j +j +j +j −1 +j −j +j +j −j +1 −j −1 +1 |
| +1 +1 +j +1 +1 −1 −1 +1 +j +1 −1 +1 +1 +1 +j +1 −1 +1 +1 −1 −j −1 −j +j +j +j −1 +j +j −j |
| −j +j −1 +j +1 −1 −1 −1 −j −1 −j +1 −1 −1 +1 +j +1 −j +j +j +j −1 +j +j −j −j +j −1 +j −j +j +j +j |
| −1 +j −j +j +j −j +1 −j +1 −1 −1 −1 −j −1 −1 +1 +1 −1 −j −1 −j +j +j +j −1 +j −j +j +j −j +1 −j |
| −1 +1 +1 +1 +j +1 +1 −1 −1 +1 +j +1 +1 +1 −1 −1 −1 −j −1 +1 −1 −1 +1 +j +1 +j −j −j −j +1 −j −j |
| +j +j −j +1 −j −1 +1 +1 +1 +j +1 −1 +1 +1 −1 −j −1 +j −j −j −j +1 −j −j +j +j −j +1 −j −1 +1 |
| +1 +1 +j +1 −1 +1 +1 −1 −j −1 −j +j +j +j −1 +j +j −j −j +j −1 +j −1 +1 +1 +1 +j +1 −1 +1 |
| +1 −1 −j −1 +j −j −j −j +1 −j −j +j +j −j +1 −j +j −j −j −j +1 −j +j −j −j +j −1 +j −1 +1 +1 +1 +j |
| +1 +1 −1 −1 +1 +j +1 −j +j +j +j −1 +j −j +j +j −j +1 −j −1 +1 +1 +1 +j +1 +1 −1 −1 +1 +j +1 |
| The Sequence $Seq^{8}_{left,\ 595}(k)$, to be transmitted from left to right, up to down |
| −j −j +1 +1 −1 −j −j +j −j +1 −j −1 +j −j −1 −1 −j −j +j +1 −1 −1 −1 −j −1 +1 −1 −1 +1 +j +1 −1 |
| +1 +1 +1 +j +1 +1 −1 −1 +1 +j +1 −j +j +j +j −1 +j −j +j +j −j +1 −j −j +j +j +j −1 +j +j −j |
| −j +j −1 +j +1 −1 −1 −1 −j −1 +1 −1 −1 +1 +j +1 −1 +1 +1 +1 +j +1 +1 −1 −1 +1 +j +1 +j −j |
| −j −j +1−j +j −j −j +j −1 +j +j −j −j −j +1 −j −j +j +j −j +1 −j −j +j +j +j −1 +j −j +j +j −j +1 −j |
| +j −j −j −j +1 −j −j +j +j −j +1 −j −1 +1 +1 +1 +j +1 −1 +1 +1 −1 −j −1 −1 +1 +1 +1 +j +1 +1 |
| −1 −1 +1 +j +1 +j −j −j −j +1 −j +j −j −j +j −1 +j −j +j +j +j −1 +j +j −j −j +j −1 +j −1 +1 +1 |
| +1 +j +1 −1 +1 +1 −1 −j −1 −1 +1 +1 +1 +j +1 +1 −1 −1 +1 +j +1 +j −j −j −j +1 −j +j −j −j +j |
| −1 +j −j +j +j +j −1 +j +j −j −j +j −1 +j +1 −1 −1 −1 −j −1 +1 −1 −1 +1 +j +1 +1 −1 −1 −1 −j −1 |
| −1 +1 +1 −1 −j −1 +j −j −j −j +1 −j +j −j −j +j −1 +j −j +j +j +j −1 +j +j −j −j +j −1 +j −1 +1 +1 |
| +1 +j +1 −1 +1 +1 −1 −j −1 −1 +1 +1 +1 +j +1 +1 −1 −1 +1 +j +1 +1 −1 −1 −1 −j −1 +1 −1 |
| −1 +1 +j +1 −1 +1 +1 +1 +j +1 +1 −1 −1 +1 +j +1 −j +j +j +j −1 +j −j +j +j −j +1 −j −j +j +j |
| +j −1 +j +j −j −j +j −1 +j −1 +1 +1 +1 +j +1 −1 +1 +1 −1 −j −1 +1 −1 −1 −1 −j −1 −1 +1 +1 −1 |
| −j −1 −j +j +j +j −1 +j −j +j +j −j +1 −j −j +j +j +j −1 +j +j −j −j +j −1 +j +1 −1 −1 −1 −j −1 +1 |
| −1 −1 +1 +j +1 −1 +1 +1 +1 +j +1 +1 −1 −1 +1 +j +1 −j +j +j +j −1 +j −j +j +j −j +1 −j −j |
| +j +j +j −1 +j +j −j −j +j −1 +j +1 −1 −1 −1 −j −1 +1 −1 −1 +1 +j +1 −1 +1 +1 +1 +j +1 +1 |
| −1 −1 +1 +j +1 +j −j −j −j +1 −j +j −j −j +j −1 +j +j −j −j −j +1 −j −j +j +j −j +1 −j −j +j +j +j −1 |
| +j −j +j +j −j +1 −j +j −j −j −j +1 −j −j +j +j −j +1 −j −1 +1 +1 +1 +j +1 −1 +1 +1 −1 −j −1 −1 |

TABLE 15-continued

| The sequence $Seq^{iSTS}_{left,\ 595}(k)$ |
|---|
| +1 +1 +1 +j +1 +1 −1 −1 +1 +j +1 +j −j −j −j +1 −j +j −j −j +j −1 +j −j +j +j +j −1 +j +j −j −j |
| +j −1 +j −1 +1 +1 +1 +j +1 −1 +1 +1 −1 −j −1 −1 +1 +1 +1 +j +1 +1 −1 −1 +1 +j +1 |

TABLE 16

| The sequence $Seq^{iSTS}_{right,\ 595}(k)$ |
|---|
| The Sequence $Seq^{1}_{right,\ 595}(k)$, to be transmitted from left to right, up to down |
| −j +j +j +j −1 +j −j +j +j −j +1 −j −1 +1 +1 +1 +j +1 +1 −1 −1 +1 +j +1 +1 −1 −1 −1 −j −1 +1 |
| −1−1 +1 +j +1 +j −j −j −j +1 −j −j +j +j −j +1 −j −j +j +j +j −1 +j −j +j +j −j +1 −j −1 +1 +1 |
| +1 +j +1 +1 −1 −1 +1 +j +1 −1 +1 +1 +1 +j +1 −1 +1 +1 −1 −j −1 −j +j +j +j −1 +j +j −j −j |
| +j −1 +j +1 −1 −1 −1 −j −1 +1 −1 −1 +1 +j +1 −j +j +j +j −1 +j +j −j −j +j −1 +j +j −j −j −j +1 |
| −j +j −j −j +j −1 +j −1 +1 +1 +1 +j +1 +1 −1 −1 +1 +j +1 −1 +1 +1 +1 +j +1 −1 +1 +1 −1 −j |
| −1 +j −j −j −j +1 −j −j +j +j −j +1 −j +j −j −j −j +1 −j +j −j −j +j −1 +j −1 +1 +1 +1 +j +1 +1 −1 |
| −1 +1 +j +1 +j −j −j −j +1 −j +j −j −j +j −1 +j +1 −1 −1 −1 −j −1 −1 +1 +1 −1 −j −1 −1 +1 +1 |
| +1 +j +1 −1 +1 +1 −1 −j −1 −j +j +j +j −1 +j +j −j −j +j −1 +j +j −j −j −j +1 −j +j −j −j +j −1 +j |
| +1 −1 −1 −1 −j −1 −1 +1 +1 −1 −j −1 +1 −1 −1 −1 −j −1 +1 −1 −1 +1 +j +1 +j −j −j −j +1 −j −j +j |
| +j −j +1 −j −1 +1 +1 +1 +j +1 −1 +1 +1 −1 −j −1 +j −j −j −j +1 −j −j +j +j −j +1 −j −j +j +j +j |
| −1 +j −j +j +j −j +1 −j +1 −1 −1 −1 −j −1 −1 +1 +1 −1 −j −1 +1 −1 −1 −1 −j −1 +1 −1 −1 +1 +j |
| +1 −j +j +j +j −1 +j +j −j −j +j −1 +j −j +j +j +j −1 +j −j +j +j −j +1 −j +1 −1 −1 −1 −j −1 −1 |
| +1 +1 −1 −j −1 +j −j −j −j +1 −j +j −j −j +j −1 +j +1 −1 −1 −1 −j −1 −1 +1 +1 −1 −j −1 −1 +1 +1 |
| +1 +j +1 −1 +1 +1 −1 −j −1 −j +j +j +j −1 +j +j −j −j +j −1 +j +j −j −j −j +1 −j +j −j −j +j −1 +j |
| +1 −1 −1 −1 −j −1 −1 +1 +1 −1 −j −1 +1 −1 −1 −1 −j −1 +1 −1 −1 +1 +j +1 +j −j −j −j +1 −j −j +j |
| +j −j +1 −j −1 +1 +1 +1 +j +1 −1 +1 +1 −1 −j −1 +j −j −j −j +1 −j −j +j +j −j +1 −j −j +j +j +j |
| −1 +j −j +j +j −j +1 −j +1 −1 −1 −1 −j −1 −1 +1 +1 −1 −j −1 +1 −1 −1 −1 −j −1 +1 −1 −1 +1 +j |
| +1 −j +j +j +j −1 +j +j −j −j +j −1 +j −j +j +j +j −1 +j −j +j +j −j +1 −j +1 −1 −1 −1 −j −1 −1 |
| +1 +1 −1 −j −1 −1 +1 +j −1 +j +j +j +1 −1 +1 −j +1 −1 −1 −1 +1 −1 −1 +1 |
| The Sequence $Seq^{2}_{right,\ 595}(k)$, to be transmitted from left to right, up to down |
| −1 +1 +1 +1 +j +1 −1 +1 +1 −1 −j −1 −1 +1 +1 +1 +j +1 +1 −1 −1 +1 +j +1 −j +j +j +j −1 |
| +j −j +j +j −j +1 −j +j −j −j −j +1 −j −j +j +j −j +1 −j +1 −j −1 +1 +1 +1 +j +1 −1 +1 +1 −1 −j −1 −1 |
| +1 +1 +1 +j +1 +1 −1 −1 +1 +j +1 +j −j −j −j +1 −j +j −j −j +j −1 +j −j +j +j +j −1 +j +j −j −j |
| +j −1 +j −j +j +j +j −1 +j −j +j +j −j +1 −j −j +j +j +j −1 +j +j −j −j +j −1 +j +1 −1 −1 −1 −j −1 |
| +1 −1 −1 +1 +j +1 −1 +1 +1 +1 +j +1 +1 −1 −1 +1 +j +1 +j −j −j −j +1 −j +j −j −j +j −1 +j +j |
| −j −j −j +1 −j −j +j +j −j +1 −j +1 −1 −1 −1 −j −1 +1 −1 −1 +1 +j +1 −1 +1 +1 +1 +j +1 +1 −1 |
| −1 +1 +j +1 +1 −1 −1 −1 −j −1 +1 −1 −1 +1 +j +1 +1 −1 −1 −1 −j −1 −1 +1 +1 −1 −j −1 +j −j −j |
| −j +1 −j +j −j −j +j −1 +j −j +j +j +j −1 +j +j −j −j +j −1 +j +1 −1 −1 −1 −j −1 +1 −1 −1 +1 +j |
| +1 +1 −1 −1 −1 −j −1 −1 +1 +1 −1 −j −1 −j +j +j +j −1 +j −j +j +j −j +1 −j +j −j −j −j +1 −j −j +j |
| +j −j +1 −j +j −j −j −j +1 −j +j −j −j +j −1 +j +j −j −j −j +1 −j −j +j +j −j +1 −j −1 +1 +1 +1 +j |
| +1 −1 +1 +1 −1 −j −1 +1 −1 −1 −1 −j −1 −1 +1 +1 −1 −j −1 −j +j +j +j −1 +j −j +j +j −j +1 −j −j |
| +j +j +j −1 +j +j −j −j +j −1 +j −1 +1 +1 +1 +j +1 −1 +1 +1 −1 −j −1 +1 −1 −1 −1 −j −1 −1 +1 |
| +1 −1 −j −1 +1 −1 −1 −1 −j −1 +1 −1 −1 +1 +j +1 +1 −1 −1 −1 −j −1 −1 +1 +1 −1 −j −1 +j −j −j |
| −j +1 −j +j −j −j +j −1 +j −j +j +j +j −1 +j +j −j −j +j −1 +j +1 −1 −1 −1 −j −1 +1 −1 −1 +1 +j |
| +1 +1 −1 −1 −1 −j −1 −1 +1 +1 −1 −j −1 −j +j +j +j −1 +j −j +j +j −j +1 −j +j −j −j −j +1 −j −j +j |
| +j −j +1 −j +j −j −j −j +1 −j +j −j −j +j −1 +j +j −j −j −j +1 −j −j +j +j −j +1 −j −1 +1 +1 +1 +j |
| +1 −1 +1 +1 −1 −j −1 +1 −1 −1 −1 −j −1 −1 +1 +1 −1 −j −1 −j +j +j +j −1 +j −j +j +j −j +1 −j −j |
| +j +j +j −1 +j +j −j −j +j −1 +j −1 +1 +1 +1 +j +1 −1 +1 +1 −1 −j −1 +1 −1 −1 −1 −j −1 −1 +1 |
| +1 −1 −j −1 +1 +j +j +j +1 −1 +1 +j −1 −j +1 −1 +1 +1 −1 +1 −j +1 −1 |
| The Sequence $Seq^{3}_{right,\ 595}(k)$, to be transmitted from left to right, up to down |
| +j −j −j −j +1 −j +j −j −j +j −1 +j −j +j +j +j −1 +j +j −j −j +j −1 +j +1 −1 −1 −1 −j −1 +1 −1 −1 |
| +1 +j +1 +1 −1 −1 −1 −j −1 −1 +1 +1 −1 −j −1 −1 +1 +1 +1 +j +1 −1 +1 +1 −1 −j −1 +1 −1 −1 |
| −1 −j −1 −1 +1 +1 −1 −j −1 −j +j +j +j −1 +j −j +j +j −j +1 −j −j +j +j +j −1 +j +j −j −j +j −1 +j |
| −1 +1 +1 +1 +j +1 −1 +1 +1 −1 −j −1 +1 −1 −1 −1 −j −1 −1 +1 +1 −1 −j −1 +j −j −j −j +1 −j +j |
| −j −j +j −1 +j +j −j −j −j +1 −j −j +j +j −j +1 −j +j −j −j −j +1 −j +j −j −j +j −1 +j −j +j +j +j −1 |
| +j +j −j −j +j −1 +j −1 +1 +1 +1 +j +1 −1 +1 +1 −1 −j −1 −1 +1 +1 +1 +j +1 +1 −1 −1 +1 +j |
| +1 −j +j +j +j −1 +j −j +j +j −j +1 −j +j −j −j −j +1 −j −j +j +j −j +1 −j −1 +1 +1 +1 +j +1 −1 |
| +1 +1 −1 −j −1 −1 +1 +1 +1 +j +1 +1 −1 −1 +1 +j +1 +1 −1 −1 −1 −j −1 +1 −1 −1 +1 +j +1 |
| −1 +1 +1 +1 +j +1 +1 −1 −1 +1 +j +1 +j −j −j −j +1 −j +j −j −j +j −1 +j +j −j −j −j +1 −j −j +j |
| +j −j +1 −j +1 −1 −1 −1 −j −1 +1 −1 −1 +1 +j +1 −1 +1 +1 +1 +j +1 +1 −1 −1 +1 +j +1 −j +j |
| +j +j −1 +j −j +j +j −j +1 −j −j +j +j +j −1 +j +j −j −j +j −1 +j −j +j +j +j −1 +j −j +j +j −j +1 |
| −j +j −j −j −j +1 −j −j +j +j −j +1 −j +1 −1 −1 −1 −j −1 +1 −1 −1 +1 +j +1 +1 −1 −1 −1 −j −1 −1 |
| +1 +1 −1 −j −1 −j +j +j +j −1 +j −j +j +j −j +1 −j +j −j −j −j +1 −j −j +j +j −j +1 −j −1 +1 +1 |
| +1 +j +1 −1 +1 +1 −1 −j −1 −1 +1 +1 +1 +j +1 +1 −1 −1 +1 +j +1 +1 −1 −1 −1 −j −1 +1−1 |
| −1 +1 +j +1 −1 +1 +1 +1 +j +1 +1 −1 −1 +1 +j +1 +j −j −j −j +1 −j +j −j −j +j −1 +j +j −j −j −j |
| +1 −j −j +j +j −j +1 −j +1 −1 −1 −1 −j −1 +1 −1 −1 +1 +j +1 −1 +1 +1 +1 +j +1 +1 −1 −1 +1 |
| +j +1 −j +j +j +j −1 +j −j +j +j −j +1 −j −j +j +j +j −1 +j +j −j −j +j −1 +j −j +j +j +j −1 +j −j |
| +j +j −j +1 −j +j −j −j −j +1 −j −j +j +j −j +1 −j +1 −1 −1 −1 −j −1 +1 −1 −1 +1 +j +1 +1 −1 −1 |
| −1 −j −1 −1 +1 +1 −1 −j −1 +j −j −j −j −j +j −j +j +j +j −j +1 +1 +1 −j +1 +j +1 +j |
| The Sequence $Seq^{4}_{right,\ 595}(k)$, to be transmitted from left to right, up to down |
| −j +j +j +j −1 +j −j +j +j −j +1 −j +j −j −j −j +1 −j −j +j +j −j +1 −j −j +j +j +j −1 +j −j +j +j −j |
| +1 −j −j +j +j +j −1 +j +j −j −j +j −1 +j +j −j −j −j +1 −j +j −j −j +j −1 +j −j +j +j +j −1 +j +j −j |
| −j +j −1 +j −j +j +j +j −1 +j −j +j +j −j +1 −j −j +j +j +j −1 +j +j −j −j +j −1 +j +1 −1 −1 −1 −j |

TABLE 16-continued

| The sequence $Seq^{iSTS}_{right,\ 595}(k)$ |
| --- |
| −1 +1 −1 −1 +1 +j +1 −1 +1 +1 +1 +j +1 +1 −1 −1 +1 +j +1 +1 −1 −1 −1 −j −1 +1 −1 −1 +1<br>+j +1 +1 −1 −1 −1 −j −1 −1 +1 +1 −1 −j −1 +1 −1 −1 −1 −j −1 +1 −1 −1 +1 +j +1 −1 +1 +1 +1<br>+j +1 +1 −1 −1 +1 +j +1 −1 +1 +1 +1 +j +1 −1 +1 +1 −1 −j −1 −1 +1 +1 +1 +j +1 +1 −1 −1<br>+1 +j +1 +j −j −j −j +1 −j +j −j −j +j −1 +j −j +j +j +j −1 +j +j −j −j +j −1 +j +j −j −j −j +1 −j<br>+j −j −j +j −1 +j +j −j −j −j +1 −j −j +j +j −j +1 −j −j +j +j +j −1 +j −j +j +j −j +1 −j +j −j −j −j<br>+1 −j −j +j +j −j +1 −j +j −j −j −j +1 −j +j −j −j +j −1 +j +j −j −j −j +1 −j −j +j +j −j +1 −j −1 +1<br>+1 +1 +j +1 −1 +1 +1 −1 −j −1 +1 −1 −1 −1 −j −1 −1 +1 +1 −1 −j −1 −1 +1 +1 +1 +j +1 −1 +1<br>+1 −1 −j −1 −1 +1 +1 +1 +j +1 +1 −1 −1 +1 +j +1 −1 +1 +1 +1 +j +1 −1 +1 +1 −1 −j −1 +1<br>−1 −1 −1 −j −1 −1 +1 +1 −1 −j −1 +1 −1 −1 −1 −j −1 +1 −1 −1 +1 +j +1 +1 −1 −1 −1 −j −1 −1 +1<br>+1 −1 −j −1 +j −j −j −j +1 −j +j −j −j +j −1 +j −j +j +j +j −1 +j +j −j −j +j −1 +j +j −j −j −j +1 −j<br>+j −j −j +j −1 +j +j −j −j −j +1 −j −j +j +j −j +1 −j −j +j +j +j −1 +j −j +j +j −j +1 −j +j −j −j −j<br>+1 −j −j +j +j −j +1 −j +j −j −j −j +1 −j +j −j −j +j −1 +j +j −j −j −j +1 −j −j +j +j −j +1 −j −1 +1<br>+1 +1 +j +1 −1 +1 +1 −1 −j −1 +1 −1 −1 −1 −j −1 −1 +1 +1 −1 −j −1 −1 +1 +1 +1 +j +1 −1 +1<br>+1 −1 −j −1 −1 +1 +1 +1 +j +1 +1 −1 −1 +1 +j +1 −1 +1 +1 +1 +j +1 −1 +1 +1 −1 −j −1 +1<br>−1 −1 −1 −j −1 −1 +1 +1 −1 −j −1 +1 −1 −1 −1 −j −1 +1 −1 −1 +1 +j +1 +1 −1 −1 −1 −j −1 −1 +1<br>+1 −1 −j −1 +1 −1 +1 +1 −1 −j +1 −j −1 +1 −j −j −1 +1 −1 −1 +1 +j −1 |
| The Sequence $Seq^{5}_{right,\ 595}(k)$, to be transmitted from left to right, up to down |
| −1 +1 +1 +1 +j +1 −1 +1 +1 −1 −j −1 +1 −1 −1 −1 −j −1 −1 +1 +1 −1 −j −1 +1 −1 −1 −1 −j −1<br>+1 −1 −1 +1 +j +1 +1 −1 −1 −1 −j −1 −1 +1 +1 −1 −j −1 −j +j +j +j −1 +j −j +j +j −j +1 −j +j −j<br>−j −j +1 −j −j +j +j −j +1 −j −j +j +j +j −1 +j −j +j +j −j +1 −j −j +j +j +j −1 +j +j −j −j +j −1 +j<br>−j +j +j +j −1 +j −j +j +j −j +1 −j +j −j −j −j +1 −j −j +j +j −j +1 −j +j −j −j −j +1 −j +j −j −j +j<br>−1 +j +j −j −j −j +1 −j −j +j +j −j +1 −j −1 +1 +1 +1 +j +1 −1 +1 +1 −1 −j −1 +1 −1 −1 −1 −j −1<br>−1 +1 +1 −1 −j −1 −1 +1 +1 +1 +j +1 −1 +1 +1 −1 −j −1 −1 +1 +1 +1 +j +1 +1 −1 −1 +1 +j<br>+1 +1 −1 −1 −1 −j −1 +1 −1 −1 +1 +j +1 −1 +1 +1 +1 +j +1 +1 −1 −1 +1 +j +1 −1 +1 +1 +1<br>+j +1 −1 +1 +1 −1 −j −1 −1 +1 +1 +1 +j +1 +1 −1 −1 +1 +j +1 +j −j −j −j +1 −j +j −j −j +j −1<br>+j −j +j +j +j −1 +j +j −j −j +j −1 +j +j −j −j −j +1 −j +j −j −j +j −1 +j +j −j −j −j +1 −j −j +j +j<br>−j +1 −j +j −j −j −j +1 −j +j −j −j +j −1 +j −j +j +j +j −1 +j +j −j −j +j −1 +j −j +j +j +j −1 +j −j<br>+j +j −j +1 −j −j +j +j +j −1 +j +j −j −j +j −1 +j +1 −1 −1 −1 −j −1 +1 −1 −1 +1 +j +1 −1 +1<br>+1 +1 +j +1 +1 −1 −1 +1 +j +1 +1 −1 −1 −1 −j −1 +1 −1 −1 +1 +j +1 +1 −1 −1 −1 −j −1 −1 +1<br>+1 −1 −j −1 +1 −1 −1 −1 −j −1 +1 −1 −1 +1 +j +1 −1 +1 +1 +1 +j +1 +1 −1 −1 +1 +j +1 −1<br>+1 +1 +1 +j +1 −1 +1 +1 −1 −j −1 −1 +1 +1 +1 +j +1 +1 −1 −1 +1 +j +1 +j −j −j −j +1 −j +j<br>−j −j +j −1 +j −j +j +j +j −1 +j +j −j −j +j −1 +j +j −j −j −j +1 −j +j −j −j +j −1 +j +j −j −j −j +1<br>−j −j +j +j −j +1 −j +j −j −j −j +1 −j +j −j −j +j −1 +j −j +j +j +j −1 +j +j −j −j +j −1 +j −j +j +j<br>+j −1 +j −j +j +j −j +1 −j −j +j +j +j −1 +j +j −j −j +j −1 +j +1 −1 −1 −1 −j −1 +1 −1 −1 +1 +j<br>+1 −1 +1 +1 +1 +j +1 +1 −1 −1 +1 +j +1 +1 −1 −1 −1 −j −1 +1 −1 −1 +1 +j +1 +1 −1 −1 −1<br>−j −1 −1 +1 +1 −1 −j −1 −j +j −1 −j −j −j −1 +1 −j +j +j −j +j +j −j −1 +j +j −j |
| The Sequence $Seq^{6}_{right,\ 595}(k)$, to be transmitted from left to right, up to down |
| +1 −1 −1 −1 −j −1 +1 −1 −1 +1 +j +1 +j −j −j −j +1 −j −j +j +j −j +1 −j +1 −1 −1 −1 −j −1 +1 −1<br>−1 +1 +j +1 −j +j +j +j −1 +j +j −j −j +j −1 +j −1 +1 +1 +1 +j +1 −1 +1 +1 −1 −j −1 −j +j +j<br>+j −1 +j +j −j −j +j −1 +j +1 −1 −1 −1 −j −1 +1 −1 −1 +1 +j +1 −j +j +j +j −1 +j +j −j −j +j −1<br>+j +j −j −j −j +1 −j +j −j −j +j −1 +j −1 +1 +1 +1 +j +1 +1 −1 −1 +1 +j +1 +j −j −j −j +1 −j +j<br>−j −j +j −1 +j +1 −1 −1 −1 −j −1 +1 +1 −1 −j −1 +j −j −j −j +1 −j +j −j −j +j −1 +j −1 +1 +1<br>+1 +j +1 +1 −1 −1 +1 +j +1 −j +j +j +j −1 +j −j +j +j −j +1 −j −1 +1 +1 +1 +j +1 +1 −1 −1<br>+1 +j +1 −1 +1 +1 +1 +j +1 −1 +1 +1 −1 −j −1 −j +j +j +j −1 +j +j −j −j +j −1 +j −1 +1 +1<br>+1 +j +1 −1 +1 +1 −1 −j −1 +j −j −j −j +1 −j −j +j +j −j +1 −j +1 −1 −1 −1 −j −1 +1 −1 −1 +1 +j<br>+1 +j −j −j −j +1 −j −j +j +j −j +1 −j −1 +1 +1 +1 +j +1 −1 +1 +1 −1 −j −1 +j −j −j −j +1 −j −j<br>+j +j −j +1 −j −j +j +j +j −1 +j −j +j +j −j +1 −j +1 −1 −1 −1 −j −1 −1 +1 +1 −1 −j −1 −j +j +j<br>+j −1 +j −j +j +j −j +1 −j −1 +1 +1 +1 +j +1 +1 −1 −1 +1 +j +1 −j +j +j +j −1 +j −j +j +j −j<br>+1 −j +1 −1 −1 −1 −j −1 −1 +1 +1 −1 −j −1 +j −j −j −j +1 −j +j −j −j +j −1 +j +1 −1 −1 −1 −j −1<br>−1 +1 +1 −1 −j −1 −1 +1 +1 +1 +j +1 −1 +1 +1 −1 −j −1 −j +j +j +j −1 +j +j −j −j +j −1 +j −1<br>+1 +1 +1 +j +1 −1 +1 +1 −1 −j −1 +j −j −j −j +1 −j −j +j +j −j +1 −j +1 −1 −1 −1 −j −1 +1 −1<br>−1 +1 +j +1 +j −j −j −j +1 −j −j +j +j −j +1 −j −1 +1 +1 +1 +j +1 −1 +1 +1 −1 −j −1 +j −j −j −j<br>+1 −j −j +j +j −j +1 −j −j +j +j +j −1 +j −j +j +j −j +1 −j +1 −1 −1 −1 −j −1 −1 +1 +1 −1 −j −1 −j<br>+j +j +j −1 +j −j +j +j −j +1 −j −1 +1 +1 +1 +j +1 +1 −1 −1 +1 +j +1 −j +j +j +j −1 +j −j +j<br>+j −j +1 −j +1 −1 −1 −1 −j −1 −1 +1 +1 −1 −j −1 +j −j −j −j +1 −j +j −j −j +j −1 +j +1 −1 −1 −1 −j<br>−1 −1 +1 +1 −1 −j −1 −1 −1 +1 +1 −1 +j −j −1 +1 +1 −j −j −1 −j −j +j −j −j +j |
| The Sequence $Seq^{7}_{right,\ 595}(k)$, to be transmitted from left to right, up to down |
| +j −j −j −j +1 −j +j −j −j +j −1 +j −1 +1 +1 +1 +j +1 +1 −1 −1 +1 +j +1 +j −j −j −j +1 −j +j −j<br>−j +j −1 +j +1 −1 −1 −1 −j −1 −1 +1 +1 −1 −j −1 −1 +1 +1 +1 +j +1 −1 +1 +1 −1 −j −1 −j +j +j<br>+j −1 +j +j −j −j +j −1 +j +1 −1 −1 −1 −j −1 +1 −1 −1 +1 +j +1 −j +j +j +j −1 +j +j −j −j +j −1<br>+j −1 +1 +1 +1 +j +1 −1 +1 +1 −1 −j −1 −j +j +j +j −1 +j +j −j −j +j −1 +j −1 +1 +1 +1 +j<br>+1 −1 +1 +1 −1 −j −1 +j −j −j −j +1 −j −j +j +j −j +1 −j +j −j −j −j +1 −j +j −j −j +j −1 +j −1 +1<br>+1 +1 +j +1 +1 −1 −1 +1 +j +1 −j +j +j +j −1 +j −j +j +j −j +1 −j −1 +1 +1 +1 +j +1 +1 −1<br>−1 +1 +j +1 −j +j +j +j −1 +j −j +j +j −j +1 −j +1 −1 −1 −1 −j −1 −1 +1 +1 −1 −j −1 −j +j +j +j<br>−1 +j −j +j +j −j +1 −j −1 +1 +1 +1 +j +1 +1 −1 −1 +1 +j +1 +1 −1 −1 −1 −j −1 +1 −1 −1 +1<br>+j +1 +j −j −j −j +1 −j −j +j +j −j +1 −j −1 +1 +1 +1 +j +1 −1 +1 +1 −1 −j −1 +j −j −j −j +1 −j<br>−j +j +j −j +1 −j +1 −1 −1 −1 −j −1 +1 −1 −1 +1 +j +1 +j −j −j −j +1 −j −j +j +j −j +1 −j +1 −1<br>−1 −1 −j −1 +1 −1 −1 +1 +j +1 −j +j +j +j −1 +j +j −j −j +j −1 +j −j +j +j +j −1 +j −j +j +j −j<br>+1 −j +1 −1 −1 −1 −j −1 −1 +1 +1 −1 −j −1 +j −j −j −j +1 −j +j −j −j +j −1 +j +1 −1 −1 −1 −j −1<br>−1 +1 +1 −1 −j −1 −j +j +j +j −1 +j −j +j +j −j +1 −j +1 −1 −1 −1 −j −1 −1 +1 +1 −1 −j −1 −j +j<br>+j +j −1 +j −j +j +j −j +1 −j −1 +1 +1 +1 +j +1 +1 −1 −1 +1 +j +1 +1 −1 −1 −1 −j −1 +1 −1<br>−1 +1 +j +1 +j −j −j −j +1 −j −j +j +j −j +1 −j −1 +1 +1 +1 +j +1 −1 +1 +1 −1 −j −1 +j −j −j −j<br>+1 −j −j +j +j −j +1 −j +1 −1 −1 −1 −j −1 +1 −1 −1 +1 +j +1 +j −j −j −j +1 −j −j +j +j −j +1 −j<br>+1 −1 −1 −1 −j −1 +1 −1 −1 +1 +j +1 −j +j +j +j −1 +j +j −j −j +j −1 +j −j +j +j +j −1 +j −j +j |

TABLE 16-continued

| The sequence $Seq^{iSTS}_{right, 595}(k)$ |
|---|
| +j −j +1 −j +1 −1 −1 −1 −j −1 −1 +1 +1 −1 −j −1 +j −j −j −j +1 −j +j −j −j +j −1 +j +1 −1 −1 −1 −j<br>−1 −1 +1 +1 −1 −j −1 +1 +j +j −j −1 +j +1 +j −j +1 −1 +1 +1 −j +1 +1 −j −1 +1 |
| The Sequence $Seq^{8}_{right, 595}(k)$, to be transmitted from left to right, up to down |
| −1 +1 +1 +1 +j +1 −1 +1 +1 −1 −j −1 +1 −1 −1 −1 −j −1 −1 +1 +1 −1 −j −1 +j −j −j −j +1 −j +j<br>−j −j +j −1 +j +j −j −j −j +1 −j −j +j +j −j +1 −j −1 +1 +1 +1 +j +1 −1 +1 +1 −1 −j −1 +1 −1 −1<br>−1 −j −1 −1 +1 +1 −1 −j −1 −j +j +j +j −1 +j −j +j +j −j +1 −j −j +j +j +j −1 +j +j −j −j +j −1 +j<br>−j +j +j +j −1 +j −j +j +j −j +1 −j +j −j −j −j +1 −j −j +j +j −j +1 −j −1 +1 +1 +1 +j +1 −1 +1<br>+1 −1 −j −1 −1 +1 +1 +1 +j +1 +1 −1 −1 +1 +j +1 +j −j −j −j +1 −j +j −j −j +j −1 +j −j +j +j<br>+j −1 +j +j −j −j +j −1 +j −1 +1 +1 +1 +j +1 −1 +1 +1 −1 −j −1 −1 +1 +1 +1 +j +1 +1 −1 −1<br>+1 +j +1 +1 −1 −1 −1 −j −1 +1 −1 −1 +1 +j +1 −1 +1 +1 +1 +j +1 +1 −1 −1 +1 +j +1 −j +j<br>+j +j −1 +j −j +j +j −j +1 −j −j +j +j +j −1 +j +j −j −j +j −1 +j +1 −1 −1 −1 −j −1 +1 −1 −1 +1<br>+j +1 −1 +1 +1 +1 +j +1 +1 −1 −1 +1 +j +1 +j −j −j −j +1 −j +j −j −j +j −1 +j +j −j −j −j +1 −j<br>−j +j +j −j +1 −j +j −j −j −j +1 −j +j −j −j +j −1 +j −j +j +j +j −1 +j +j −j −j +j −1 +j +1 −1 −1<br>−1 −j −1 +1 −1 −1 +1 +j +1 +1 −1 −1 −1 −j −1 −1 +1 +1 −1 −j −1 −j +j +j +j −1 +j −j +j +j −j +1<br>−j +j −j −j −j +1 −j −j +j +j −j +1 −j +1 −1 −1 −1 −j −1 +1 −1 −1 +1 +j +1 +1 −1 −1 −1 −j −1 −1<br>+1 +1 −1 −j −1 +1 −1 −1 −1 −j −1 +1 −1 −1 +1 +j +1 −1 +1 +1 +1 +j +1 +1 −1 −1 +1 +j +1 −j<br>+j +j +j −1 +j −j +j +j −j +1 −j −j +j +j +j −1 +j +j −j −j +j −1 +j +1 −1 −1 −1 −j −1 +1 −1 −1<br>+1 +j +1 −1 +1 +1 +1 +j +1 +1 −1 −1 +1 +j +1 +j −j −j −j +1 −j +j −j −j +j −1 +j +j −j −j −j<br>+1 −j −j +j +j −j +1 −j +j −j −j −j +1 −j +j −j −j +j −1 +j −j +j +j +j −1 +j +j −j −j +j −1 +j +1<br>−1 −1 −1 −j −1 +1 −1 −1 +1 +j +1 +1 −1 −1 −1 −j −1 −1 +1 +1 −1 −j −1 −j +j +j +j −1 +j −j +j +j<br>−j +1 −j +j −j −j −j +1 −j −j +j +j −j +1 −j +1 −1 −1 −1 −j −1 +1 −1 −1 +1 +j +1 +1 −1 −1 −1 −j<br>−1 −1 +1 +1 −1 −j −1 −j +1 −j +j −1 −1 +j +j +1 +j +1 −1 +1 +j +1 +1 +j −j +j |

TABLE 17

| The sequence $Seq^{iSTS}_{left, 804}(k)$ |
|---|
| The Sequence $Seq^{1}_{left, 804}(k)$, to be transmitted from left to right, up to down |
| −1 −j −1 +1 +j +j +1 −1 +1 +j +1 +1 +j −1 −j −j −1 +1 −1 +j +1 +1 +j −1 +j +j +1 −1 +1 +j<br>+1 +1 +j −1 +j +j +1 −1 +1 −j −1 −1 −j +1 −j −j −1 +1 −1 −j −1 −1 −j +1 +j +j +1 −1 +1 −j −1<br>−1 −j +1 +j +j +1 −1 +1 +j +1 +1 +j −1 +j +j +1 −1 +1 −j −1 −1 −j +1 +1 +1 −j +j −j +1 −j −j<br>+1 +j −1 −1 +j −j +j +1 −j −j +1 +j +1 +1 −j +j −j +1 −j −j +1 +j +1 +1 −j +j −j −1 +j +j −1 −j<br>+1 +1 −j +j −j +1 −j −j +1 +j −1 −1 +j −j +j +1 −j −j +1 +j −1 −1 +j −j +j −1 +j +j −1 −j −1 −1<br>+j −j +j +1 −j −j +1 +j +1 +1 −j +j −j +1 −j −j +1 +j −1 −1 +j −j +j +1 −j −j +1 +j +1 +1 −j +j<br>−j +1 −j −j +1 +j +1 +1 −j +j −j −1 +j +j −1 −j −1 −1 +j −j +j −1 +j +j −1 −j +1 +1 −j +j −j −1<br>+j +j −1 −j +1 +1 −j +j −j +1 −j −j +1 +j +1 +1 −j +j −j −1 +j +j −1 −j −j −j −1 +1 −1 −j −1 −1 −j<br>+1 +j +j +1 −1 +1 −j −1 −1 −j +1 −j −j −1 +1 −1 −j −1 −1 −j +1 −j −j −1 +1 −1 +j +1 +1 +j −1 −j<br>−j −1 +1 −1 −j −1 −1 −j +1 +j +j +1 −1 +1 −j −1 −1 −j +1 +j +j +1 −1 +1 +j +1+1 +j −1 +j +j<br>+1 −1 +1 −j −1 −1 −j +1 +1 +1 −j +j −j +1 −j −j +1 +j −1 −1 +j −j +j +1 −j −j +1 +j +1 +1 −j<br>+j −j +1 −j −j +1 +j +1 +1 −j +j −j −1 +j +j −1 −j −1 −1 +j −j +j −1 +j +j −1 −j +1 +1 −j +j −j<br>−1 +j +j −1 −j +1 +1 −j +j −j +1 −j −j +1 +j +1 +1 −j +j −j −1 +j +j −1 −j −j −j −1 +1 −1 −j −1 −1<br>−j +1 +j +j +1 −1 +1 −j −1 −1 −j +1 −j −j −1 +1 −1 −j −1 −1 −j +1 −j −j −1 +1 −1 +j +1 +1 +j −1<br>−j −j −1 +1 −1 −j −1 −1 −j +1 +j +j +1 −1 +1 −j −1 −1 −j +1 +j +j +1 −1 +1 +j +1 +1 +j −1 +j<br>+j +1 −1 +1 −j −1 −1 −j +1 +j +j +1 −1 +1 +j +1 +1 +j −1 −j −j −1 +1 −1 +j +1 +1 +j −1 +j<br>+j +1 −1 +1 +j +1 +1 +j −1 +j +j +1 −1 +1 −j −1 −1 −j +1 −j −j −1 +1 −1 −j −1 −1 −j +1 +j +j<br>+1 −1 +1 −j −1 −1 −j +1 +j +j +1 −1 +1 +j +1 +1 +j −1 +j +j +1 −1 +1 −j −1 −1 −j +1 +1 +1<br>−j +j −j +1 −j −j +1 +j −1 −1 +j −j +j +1 −j −j +1 +j +1 +1 −j +j −j +1 −j −j +1 +j +1 +1 −j +j<br>−j −1 +j +j −1 −j +1 +1 −j +j −j +1 −j −j +1 +j −1 −1 +j −j +j +1 −j −j +1 +j −1 −1 +j −j +j −1<br>+j +j −1 −j −1 −1 +j −j +j +1 −j −j +1 +j −1 −1 +j −j +j −1 +j +j −1 −j +1 +1 −j +j −j −1 +j +j<br>−1 −j −1 −1 +j −j +j −1 +j +j −1 −j −1 −1 +j −j +j +1 −j −j +1 +j +1 +1 −j +j −j +1 −j −j +1 +j −1<br>−1 +j −j +j +1 −j −j +1 +j −1 −1 +j −j +j −1 +j +j −1 −j −1 −1 +j −j +j +1 −j −j +1 +j +j +j +1<br>−1 +1 +j +1 +1 +j −1 −j −j −1 +1 −1 +j +1 +1 +j −1 +j +j +1 −1 +1 +j +1 +1 +j −1 +j +j +1<br>−1 +1 −j −1 −1 −j +1 +j +j +1 −1 +1 +j +1 +1 +j −1 −j −j −1 +1 −1 +j +1 +1 +j −1 −j −j −1 +1<br>−1 −j −1 −1 −j +1 −j −j −1 +1 −1 +j +1 +1 +j −1 |
| The Sequence $Seq^{2}_{left, 804}(k)$, to be transmitted from left to right, up to down |
| −1 −1 +1 +j +1 +1 −j +j −j +1 −j −j +1 +j +1 +1 −j +j −j −1 +j +j −1 −j −1 −1 +j −j +j −1 +j +j<br>−1 −j +1 +1 −j +j −j −1 +j +j −1 −j −j −j −1 +1 −1 −j −1 −1 −j +1 −j −j −1 +1 −1 +j +1 +1 +j −1<br>−j −j −1 +1 −1 −j −1 −1 −j +1 +j +j +1 −1 +1 −j −1 −1 −j +1 −j −j −1 +1 −1 −j −1 −1 −j +1 −j −j −1<br>+1 −1 +j +1 +1 +j −1 +j +j +1 −1 +1 +j +1 +1 +j −1 −j −j −1 +1 −1 +j +1 +1 +j −1 +1 +1 −j<br>+j −j +1 −j −j +1 +j +1 +1 −j +j −j −1 +j +j −1 −j +1 +1 −j +j −j +1 −j −j +1 +j −1 −1 +j −j +j<br>+1 −j −j +1 +j −j −j −1 +1 −1 −j −1 −1 −j +1 −j −j −1 +1 −1 +j +1 +1 +j −1 +j +j +1 −1 +1 +j<br>+1 +1 +j −1 −j −j −1 +1 −1 +j +1 +1 +j −1 −1 −1 +j −j +j −1 +j +j −1 −j −1 −1 +j −j +j +1 −j −j<br>+1 +j −1 −1 +j −j +j −1 +j +j −1 −j +1 +1 −j +j −j −1 +j +j −1 −j −1 −1 +j −j +j −1 +j +j −1 −j<br>−1 −1 +j −j +j +1 −j −j +1 +j +1 +1 −j +j −j +1 −j −j +1 +j −1 −1 +j −j +j +1 −j −j +1 +j −j −j −1<br>+1 −1 −j −1 −1 −j +1 −j −j −1 +1 −1 +j +1 +1 +j −1 −j −j −1 +1 −1 −j −1 −1 −j +1 +j +j +1 −1<br>+1 −j −1 −1 −j +1 −j −j −1 +1 −1 −j −1 −1 −j +1 −j −j −1 +1 −1 +j +1 +1 +j −1 +j +j +1 −1 +1<br>+j +1 +1 +j −1 −j −j −1 +1 −1 +j +1 +1 +j −1 −1 −1 +j −j +j −1 +j +j −1 −j −1 −1 +j −j +j +1 −j<br>−j +1 +j −1 −1 +j −j +j −1 +j +j −1 −j +1 +1 −j +j −j −1 +j +j −1 −j −1 −1 +j −j +j −1 +j +j −1 −j<br>−1 −1 +j −j +j +1 −j −j +1 +j +1 +1 −j +j −j +1 −j −j +1 +j −1 −1 +j −j +j +1 −j −j +1 +j −j −j<br>−1 +1 −1 −j −1 −1 −j +1 −j −j −1 +1 −1 +j +1 +1 +j −1 −j −j −1 +1 −1 −j −1 −1 −j +1 +j +j +1 −1<br>+1 −j −1 −1 −j +1 +1 +1 −j +j −j +1 −j −j +1 +j +1 +1 −j +j −j −1 +j +j −1 −j −1 −1 +j −j +j −1<br>+j +j −1 −j +1 +1 −j +j −j −1 +j +j −1 −j −j −j −1 +1 −1 −j −1 −1 −j +1 −j −j −1 +1 −1 +j +1 +1 |

TABLE 17-continued

| The sequence $Seq^{iSTS}_{left,\ 804}(k)$ |
|---|
| +j −1 −j −j −1 +1 −1 −j −1 −1 −j +1 +j +j +1 −1 +1 −j −1 −1 −j +1 −j −j −1 +1 −1 −j −1 −1 −j +1 |
| −j −j −1 +1 −1 +j +1 +1 +j −1 +j +j +1 −1 +1 +j +1 +1 +j −1 −j −j −1 +1 −1 +j +1 +1 +j −1 |
| +1 +1 −j +j −j +1 −j −j +1 +j +1 +1 −j +j −j −1 +j +j −1 −j +1 +1 −j +j −j +1 −j −j +1 +j −1 −1 |
| +j −j +j +1 −j −j +1 +j +j +j +1 −1 +1 +j +1 +1 +j −1 +j +j +1 −1 +1 −j −1 −1 −j +1 −j −j −1 |
| +1 −1 −j −1 −1 −j +1 +j +j +1 −1 +1 −j −1 −1 −j +1 +1 +1 −j +j −j +1 −j −j +1 +j +1 +1 −j +j |
| −j −1 +j +j −1 −j +1 +1 −j +j −j +1 −j −j +1 +j −1 −1 +j −j +j +1 −j −j +1 +j +1 +1 −j +j −j +1 |
| −j −j +1 +j +1 +1 −j +j −j −1 +j +j −1 −j −1 −1 +j −j +j −1 +j +j −1 −j +1 +1 −j +j −j −1 +j +j −1 |
| −j +j +j +1 −1 +1 +j +1 +1 +j −1 +j +j +1 −1 +1 −j −1 −1 −j +1 +j +j +1 −1 +1 +j +1 +1 +j |
| −1 −j −j −1 +1 −1 +j +1 +1 +j −1 |

| The Sequence $Seq^{3}_{left,\ 804}(k)$, to be transmitted from left to right, up to down |
|---|
| +j +1 −j +1 +1 +1 −j +j −j +1 −j −j +1 +j −1 −1 +j −j +j +1 −j −j +1 +j −j −j −1 +1 −1 −j −1 −1 |
| −j +1 −j −j −1 +1 −1 +j +1 +1 +j −1 +1 +1 −j +j −j +1 −j −j +1 +j −1 −1 +j −j +j +1 −j −j +1 +j |
| +j +j +1 −1 +1 +j +1 +1 +j −1 +j +j +1 −1 +1 −j −1 −1 −j +1 −j −j −1 +1 −1 −j −1 −1 −j +1 +j |
| +j +1 −1 +1 −j −1 −1 −j +1 −1 −1 +j −j +j −1 +j +j −1 −j −1 −1 +j −j +j +1 −j −j +1 +j +j +j +1 |
| −1 +1 +j +1 +1 +j −1 −j −j −1 +1 −1 +j +1 +1 +j −1 −1 −1 +j −j +j −1 +j +j −1 −j −1 −1 +j −j |
| +j +1 −j −j +1 +j −j −j −1 +1 −1 −j −1 −1 −j +1 +j +j +1 −1 +1 −j −1 −1 −j +1 −1 −1 +j −j +j −1 |
| +j +j −1 −j −1 −1 +j −j +j +1 −j −j +1 +j −j −j −1 +1 −1 −j −1 −1 −j +1 +j +j +1 −1 +1 −j −1 −1 |
| −j +1 +1 +1 −j +j −j +1 −j −j +1 +j +1 +1 −j +j −j −1 +j +j −1 −j −1 −1 +j −j +j −1 +j +j −1 −j |
| +1 +1 −j +j −j −1 +j +j −1 −j +j +j +1 −1 +1 +j +1 +1 +j −1 +j +j +1 −1 +1 −j −1 −1 −j +1 +1 |
| +1 −j +j −j +1 −j −j +1 +j −1 −1 +j −j +j +1 −j −j +1 +j +j +j +1 −1 +1 +j +1 +1 +j −1 +j +j |
| +1 −1 +1 −j −1 −1 −j +1 −j −j −1 +1 −1 −j −1 −1 −j +1 +j +j +1 −1 +1 −j −1 −1 −j +1 −1 −1 +j −j |
| +j −1 +j +j −1 −j −1 −1 +j −j +j +1 −j −j +1 +j −j −j −1 +1 −1 −j −1 −1 −j +1 +j +j +1 −1 +1 −j |
| −1 −1 −j +1 +1 +1 −j +j −j +1 −j −j +1 +j +1 +1 −j +j −j −1 +j +j −1 −j −1 −1 +j −j +j −1 +j +j |
| −1 −j +1 +1 −j +j −j −1 +j +j −1 −j +j +j +1 −1 +1 +j +1 +1 +j −1 +j +j +1 −1 +1 −j −1 −1 −j |
| +1 +1 +1 −j +j −j +1 −j −j +1 +j −1 −1 +j −j +j +1 −j −j +1 +j +j +j +1 −1 +1 +j +1 +1 +j −1 |
| +j +j +1 −1 +1 −j −1 −1 −j +1 +1 +1 −j +j −j +1 −j −j +1 +j −1 −1 +j −j +j +1 −j −j +1 +j −j −j |
| −1 +1 −1 −j −1 −1 −j +1 −j −j −1 +1 −1 +j +1 +1 +j −1 +1 +1 −j +j −j +1 −j −j +1 +j −1 −1 +j −j |
| +j +1 −j −j +1 +j +j +j +1 −1 +1 +j +1 +1 +j −1 +j +j +1 −1 +1 −j −1 −1 −j +1 −j −j −1 +1 −1 |
| −j −1 −1 −j +1 +j +j +1 −1 +1 −j −1 −1 −j +1 −1 −1 +j −j +j −1 +j +j −1 −j −1 −1 +j −j +j +1 −j |
| −j +1 +j +j +j +1 −1 +1 +j +1 +1 +j −1 −j −j −1 +1 −1 +j +1 +1 +j −1 −1 −1 +j −j +j −1 +j +j |
| −1 −j −1 −1 +j −j +j +1 −j −j +1 +j +j +j +1 −1 +1 +j +1 +1 +j −1 −j −j −1 +1 −1 +j +1 +1 +j |
| −1 +1 +1 −j +j −j +1 −j −j +1 +j +1 +1 −j +j −j −1 +j +j −1 −j +j +j +1 −1 +1 +j +1 +1 +j −1 |
| −j −j −1 +1 −1 +j +1 +1 +j −1 −1 −1 +j −j +j −1 +j +j −1 −j −1 −1 +j −j +j +1 −j −j +1 +j +1 +1 |
| −j +j −j +1 −j −j +1 +j −1 −1 +j −j +j +1 −j −j +1 +j −j −j −1 +1 −1 −j −1 −1 −j +1 −j −j −1 +1 −1 |
| +j +1 +1 +j −1 −1 −1 +j −j +j −1 +j +j −1 −j +1 +1 −j +j −j −1 +j +j −1 −j −j −j −1 +1 −1 −j −1 |
| −1 −j +1 −j −j −1 +1 −1 +j +1 +1 +j −1 |

| The Sequence $Seq^{4}_{left,\ 804}(k)$, to be transmitted from left to right, up to down |
|---|
| −j +j +1 +1 +1 +1 −j +j −j +1 −j −j +1 +j +j +j +1 −1 +1 −j −1 −1 −j +1 +1 +1 −j +j −j +1 −j |
| −j +1 +j −j −j −1 +1 −1 +j +1 +1 +j −1 +1 +1 −j +j −j +1 −j −j +1 +j +j +j +1 −1 +1 −j −1 −1 −j |
| +1 −1 −1 +j −j +j −1 +j +j −1 −j +j +j +1 −1 +1 −j −1 −1 −j +1 −j −j −1 +1 −1 −j −1 −1 −j +1 +1 |
| +1 −j +j −j −1 +j +j −1 −j −j −j −1 +1 −1 −j −1 −1 −j +1 −1 −1 +j −j +j +1 −j −j +1 +j +j +j +1 |
| −1 +1 +j +1 +1 +j −1 −1 −1 +j −j +j +1 −j −j +1 +j −j −j −1 +1 −1 −j −1 −1 −j +1 −1 −1 +j −j +j |
| +1 −j −j +1 +j −j −j −1 +1 −1 −j −1 −1 −j +1 +1 +1 −j +j −j −1 +j +j −1 −j −j −j −1 +1 −1 −j −1 −1 |
| −j +1 −1 −1 +j −j +j +1 −j −j +1 +j −j −j −1 +1 −1 −j −1 −1 −j +1 +1 +1 −j +j −j −1 +j +j −1 −j |
| +j +j +1 −1 +1 +j +1 +1 +j −1 +1 +1 −j +j −j −1 +j +j −1 −j −1 −1 +j −j +j −1 +j +j −1 −j −j −j |
| −1 +1 −1 +j +1 +1 +j −1 −1 −1 +j −j +j −1 +j +j −1 −j +j +j +1 −1 +1 −j −1 −1 −j +1 +1 +1 −j |
| +j −j +1 −j −j +1 +j +j +j +1 −1 +1 −j −1 −1 −j +1 −1 −1 +j −j +j −1 +j +j −1 −j +j +j +1 −1 +1 |
| −j −1 −1 −j +1 −j −j −1 +1 −1 −j −1 −1 −j +1 +1 +1 −j +j −j −1 +j +j −1 −j −j −j −1 +1 −1 −j −1 −1 |
| −j +1 −1 −1 +j −j +j +1 −j −j +1 +j −j −j −1 +1 −1 −j −1 −1 −j +1 +1 +1 −j +j −j −1 +j +j −1 −j |
| +j +j +1 −1 +1 +j +1 +1 +j −1 +1 +1 −j +j −j −1 +j +j −1 −j −1 −1 +j −j +j −1 +j +j −1 −j −j −j |
| −1 +1 −1 +j +1 +1 +j −1 −1 −1 +j −j +j −1 +j +j −1 −j +j +j +1 −1 +1 −j −1 −1 −j +1 +1 +1 −j |
| +j −j +1 −j −j +1 +j +j +j +1 −1 +1 −j −1 −1 −j +1 −1 −1 +j −j +j −1 +j +j −1 −j +j +j +1 −1 +1 |
| −j −1 −1 −j +1 +1 +1 −j +j −j +1 −j −j +1 +j +j +j +1 −1 +1 −j −1 −1 −j +1 +1 +1 −j +j −j +1 −j |
| −j +1 +j −j −j −1 +1 −1 +j +1 +1 +j −1 +1 +1 −j +j −j +1 −j −j +1 +j +j +j +1 −1 +1 −j −1 −1 |
| −j +1 −1 −1 +j −j +j −1 +j +j −1 −j +j +j +1 −1 +1 −j −1 −1 −j +1 −j −j −1 +1 −1 −j −1 −1 −j +1 |
| +1 +1 −j +j −j −1 +j +j −1 −j −j −j −1 +1 −1 −j −1 −1 −j +1 −1 −1 +j −j +j +1 −j −j +1 +j +j +j |
| +1 −1 +1 +j +1 +1 +j −1 −1 −1 +j −j +j +1 −j −j +1 +j −j −j −1 +1 −1 −j −1 −1 −j +1 −1 −1 +j −j |
| +j +1 −j −j +1 +j +j +j +1 −1 +1 +j +1 +1 +j −1 −1 −1 +j −j +j +1 −j −j +1 +j +j +j +1 −1 |
| +1 +j +1 +1 +j −1 +1 +1 −j +j −j −1 +j +j −1 −j +j +j +1 −1 +1 +j +1 +1 +j −1 −1 −1 +j −j |
| +j +1 −j −j +1 +j −j −j −1 +1 −1 −j −1 −1 −j +1 −1 −1 +j −j +j +1 −j −j +1 +j +1 +1 −j +j −j +1 |
| −j −j +1 +j +j +j +1 −1 +1 −j −1 −1 −j +1 +1 +1 −j +j −j +1 −j −j +1 +j −j −j −1 +1 −1 +j +1 |
| +1 +j −1 −1 −1 +j −j +j −1 +j +j −1 −j −j −j −1 +1 −1 +j +1 +1 +j −1 +1 +1 −j +j −j +1 −j −j +1 |
| +j −j −j −1 +1 −1 +j +1 +1 +j −1 |

| The Sequence $Seq^{5}_{left,\ 804}(k)$, to be transmitted from left to right, up to down |
|---|
| +1 +j −j +1 +j +j +1 −1 +1 +j +1 +1 +j −1 +1 +1 −j +j −j −1 +j +j −1 −j −1 −1 +j −j +j −1 +j |
| +j −1 −j −j −j −1 +1 −1 +j +1 +1 +j −1 +j +j +1 −1 +1 +j +1 +1 +j −1 +1 +1 −j +j −j −1 +j +j |
| −1 −j +1 +1 −j +j −j +1 −j −j +1 +j +j +j +1 −1 +1 −j −1 −1 −j +1 +1 +1 −j +j −j +1 −j −j +1 +j |
| −j −j −1 +1 −1 +j +1 +1 +j −1 +j +j +1 −1 +1 +j +1 +1 +j −1 −1 −1 +j −j +j +1 −j −j +1 +j −1 |
| −1 +j −j +j −1 +j +j −1 −j +j +j +1 −1 +1 −j −1 −1 −j +1 +j +j +1 −1 +1 +j +1 +1 +j −1 −1 −1 |
| +j −j +j +1 −j −j +1 +j +1 +1 −j +j −j +1 −j −j +1 +j −j −j −1 +1 −1 +j +1 +1 +j −1 +j +j +1 |
| −1 +1 +j +1 +1 +j −1 −1 −1 +j −j +j +1 −j −j +1 +j +1 +1 −j +j −j +1 −j −j +1 +j −j −j −1 +1 −1 |
| +j +1 +1 +j −1 −j −j −1 +1 −1 −j −1 −1 −j +1 +1 +1 −j +j −j −1 +j +j −1 −j −j −j −1 +1 −1 −j −1 |
| −1 −j +1 −1 −1 +j −j +j +1 −j −j +1 +j +1 +1 −j +j −j +1 −j −j +1 +j +j +j +1 −1 +1 −j −1 −1 −j |
| +1 +j +j +1 −1 +1 +j +1 +1 +j −1 +1 +1 −j +j −j −1 +j +j −1 −j +1 +1 −j +j −j +1 −j −j +1 +j |
| +j +j +1 −1 +1 −j −1 −1 −j +1 +1 +1 −j +j −j +1 −j −j +1 +j −j −j −1 +1 −1 +j +1 +1 +j −1 +j |

TABLE 17-continued

| The sequence $Seq^{iSTS}_{left,\ 804}(k)$ |
|---|
| +j +1 −1 +1 +j +1 +1 +j −1 −1 −1 +j −j +j +1 −j −j +1 +j +1 +1 −j +j −j +1 −j −j +1 +j −j −j |
| −1 +1 −1 +j +1 +1 +j −1 −j −j −1 +1 −1 −j −1 −1 −j +1 +1 +1 −j +j −j −1 +j +j −1 −j −j −j −1 +1 |
| −1 −j −1 −1 −j +1 −1 −1 +j −j +j +1 −j −j +1 +j +1 +1 −j +j −j +1 −j −j +1 +j +j +j +1 −1 +1 −j |
| −1 −1 −j +1 +j +j +1 −1 +1 +j +1 +1 +j −1 +1 +1 −j +j −j −1 +j +j −1 −j +1 +1 −j +j −j +1 −j |
| −j +1 +j +j +j +1 −1 +1 −j −1 −1 −j +1 +j +j +1 −1 +1 +j +1 +1 +j −1 +1 +1 −j +j −j −1 +j +j |
| −1 −j −1 −1 +j −j +j −1 +j +j −1 −j −j −j −1 +1 −1 +j +1 +1 +j −1 +j +j +1 −1 +1 +j +1 +1 +j |
| −1 +1 +1 −j +j −j −1 +j +j −1 −j +1 +1 −j +j −j +1 −j −j +1 +j +j +j +1 −1 +1 −j −1 −1 −j +1 +1 |
| +1 −j +j −j +1 −j −j +1 +j −j −j −1 +1 −1 +j +1 +1 +j −1 +j +j +1 −1 +1 +j +1 +1 +j −1 −1 −1 |
| +j −j +j +1 −j −j +1 +j −1 −1 +j −j +j −1 +j +j −1 −j +j +j +1 −1 +1 −j −1 −1 −j +1 +j +j +1 −1 |
| +1 +j +1+1 +j −1 −1 −1 +j −j +j +1 −j −j +1 +j −1 −1 +j −j +j −1 +j +j −1 −j +j +j +1 −1 +1 |
| −j −1 −1 −j +1 −j −j −1 +1 −1 −j −1 −1 −j +1 +1 +1 −j +j −j −1 +j +j −1 −j −1 −1 +j −j +j −1 +j +j |
| −1 −j +j +j +1 −1 +1 −j −1 −1 −j +1 +j +j +1 −1 +1 +j +1 +1 +j −1 −1 −1 +j −j +j +1 −j −j +1 |
| +j +j +j +1 −1 +1 +j +1 +1 +j −1 +1 +1 −j +j −j −1 +j +j −1 −j −1 −1 +j −j +j −1 +j +j −1 −j −j |
| −j −1 +1 −1 +j +1 +1 +j −1 −j −j −1 +1 −1 −j −1 −1 −j +1 −1 −1 +j −j +j +1 −j −j +1 +j −1 −1 +j |
| −j +j −1 +j +j −1 −j −j −j −1 +1 −1 +j +1 +1 +j −1 |
| The Sequence $Seq^{6}_{left,\ 804}(k)$, to be transmitted from left to right, up to down |
| +1 −j +j +1 +1 +1 −j +j −j +1 −j −j +1 +j −1 −1 +j −j +j +1 −j −j +1 +j −1 −1 +j −j +j −1 +j +j |
| −1 −j −1 −1 +j −j +j +1 −j −j +1 +j +j +j +1 −1 +1 +j +1 +1 +j −1 −j −j −1 +1 −1 +j +1 +1 +j |
| −1 +j +j +1 −1 +1 +j +1 +1 +j −1 +j +j +1 −1 +1 −j −1 −1 −j +1 −j −j −1 +1 −1 −j −1 −1 −j +1 |
| +j +j +1 −1 +1 −j −1 −1 −j +1 +j +j +1 −1 +1 +j +1 +1 +j −1 +j +j +1 −1 +1 −j −1 −1 −j +1 |
| −1 −1 +j −j +j −1 +j +j −1 −j +1 +1 −j +j −j −1 +j +j −1 −j −1 −1 +j −j +j −1 +j +j −1 −j −1 −1 +j |
| −j +j +1 −j −j +1 +j −j −j −1 +1 −1 −j −1 −1 −j +1 +j +j +1 −1 +1 −j −1 −1 −j +1 +j +j +1 −1 +1 |
| +j +1 +1 +j −1 +j +j +1 −1 +1 −j −1 −1 −j +1 +1 +1 −j +j −j +1 −j −j +1 +j −1 −1 +j −j +j +1 |
| −j −j +1 +j +1 +1 −j +j −j +1 −j −j +1 +j +1 +1 −j +j −j −1 +j +j −1 −j −1 −1 +j −j +j −1 +j +j |
| −1 −j +1 +1 −j +j −j −1 +j +j −1 −j +1 +1 −j +j −j +1 −j −j +1 +j +1 +1 −j +j −j −1 +j +j −1 −j |
| +j +j +1 −1 +1 +j +1 +1 +j −1 −j −j −1 +1 −1 +j +1 +1 +j −1 +j +j +1 −1 +1 +j +1 +1 +j −1 |
| +j +j +1 −1 +1 −j −1 −1 −j +1 −j −j −1 +1 −1 −j −1 −1 −j +1 +j +j +1 −1 +1 −j −1 −1 −j +1 +j +j |
| +1 −1 +1 +j +1 +1 +j −1 +j +j +1 −1 +1 −j −1 −1 −j +1 +1 +1 −j +j −j +1 −j −j +1 +j −1 −1 +j |
| −j +j +1 −j −j +1 +j +1 +1 −j +j −j +1 −j −j +1 +j +1 +1 −j +j −j −1 +j +j −1 −j −1 −1 +j −j +j |
| −1 +j +j −1 −j +1 +1 −j +j −j −1 +j +j −1 −j +1 +1 −j +j −j +1 −j −j +1 +j +1 +1 −j +j −j −1 +j |
| +j −1 −j +j +j +1 −1 +1 +j +1 +1 +j −1 −j −j −1 +1 −1 +j +1 +1 +j −1 +j +j +1 −1 +1 +j +1 |
| +1 +j −1 +j +j +1 −1 +1 −j −1 −1 −j +1 +1 +1 −j +j −j +1 −j −j +1 +j −1 −1 +j −j +j +1 −j −j |
| +1 +j −1 −1 +j −j +j −1 +j +j −1 −j −1 −1 +j −j +j +1 −j −j +1 +j +j +j +1 −1 +1 +j +1 +1 +j |
| −1 −j −j −1 +1 −1 +j +1 +1 +j −1 +j +j +1 −1 +1 +j +1 +1 +j −1 +j +j +1 −1 +1 −j −1 −1 −j +1 |
| −j −j −1 +1 −1 −j −1 −1 −j +1 +j +j +1 −1 +1 −j −1 −1 −j +1 +j +j +1 −1 +1 +j +1 +1 +j −1 +j |
| +j +1 −1 +1 −j −1 −1 −j +1 −1 −1 +j −j +j −1 +j +j −1 −j +1 +1 −j +j −j −1 +j +j −1 −j −1 −1 +j |
| −j +j −1 +j +j −1 −j −1 −1 +j −j +j +1 −j −j +1 +j +j +j +1 −1 +1 +j +1 +1 +j −1 −j −j −1 +1 −1 |
| +j +1 +1 +j −1 −j −j −1 +1 −1 −j −1 −1 −j +1 −j −j −1 +1 −1 +j +1 +1 +j −1 −1 −1 +j −j +j −1 +j |
| +j −1 −j +1 +1 −j +j −j −1 +j +j −1 −j −1 −1 +j −j +j −1 +j +j −1 −j −1 −1 +j −j +j +1 −j −j +1 +j |
| +1 +1 −j +j −j +1 −j −j +1 +j −1 −1 +j −j +j +1 −j −j +1 +j −1 −1 +j −j +j −1 +j +j −1 −j −1 −1 |
| +j −j +j +1 −j −j +1 +j −j −j −1 +1 −1 −j −1 −1 −j +1 +j +j +1 −1 +1 −j −1 −1 −j +1 −j −j −1 +1 |
| −1 −j −1 −1 −j +1 −j −j −1 +1 −1 +j +1 +1 +j −1 |
| The Sequence $Seq^{7}_{left,\ 804}(k)$, to be transmitted from left to right, up to down |
| −1 +j +1 −1 +1 +1 −j +j −j +1 −j −j +1 +j −j −j −1 +1 −1 +j +1 +1 +j −1 +j +j +1 −1 +1 +j +1 |
| +1 +j −1 −1 −1 +j −j +j +1 −j −j +1 +j +j +j +1 −1 +1 +j +1 +1 +j −1 +1 +1 −j +j −j −1 +j +j |
| −1 −j +1 +1 −j +j −j +1 −j −j +1 +j +j +j +1 −1 +1 −j −1 −1 −j +1 −j −j −1 +1 −1 −j −1 −1 −j +1 |
| −1 −1 +j −j +j +1 −j −j +1 +j +1 +1 −j +j −j +1 −j −j +1 +j +j +j +1 −1 +1 −j −1 −1 −j +1 −1 −1 |
| +j −j +j −1 +j +j −1 −j +j +j +1 −1 +1 −j −1 −1 −j +1 +j +j +1 −1 +1 +j +1 +1 +j −1 −1 −1 +j |
| −j +j +1 −j −j +1 +j −j −j −1 +1 −1 −j −1 −1 −j +1 −1 −1 +j −j +j +1 −j −j +1 +j +1 +1 −j +j −j |
| +1 −j −j +1 +j +j +j +1 −1 +1 −j −1 −1 −j +1 +1 +1 −j +j −j +1 −j −j +1 +j −j −j −1 +1 −1 +j |
| +1 +1 +j −1 −j −j −1 +1 −1 −j −1 −1 −j +1 +1 +1 −j +j −j −1 +j +j −1 −j −1 −1 +j −j +j −1 +j +j |
| −1 −j +j +j +1 −1 +1 −j −1 −1 −j +1 −j −j −1 +1 −1 −j −1 −1 −j +1 +1 +1 −j +j −j −1 +j +j −1 −j |
| +j +j +1 −1 +1 +j +1 +1 +j −1 +1 +1 −j +j −j −1 +j +j −1 −j +1 +1 −j +j −j +1 −j −j +1 +j +j |
| +j +1 −1 +1 −j −1 −1 −j +1 −j −j −1 +1 −1 −j −1 −1 −j +1 −1 −1 +j −j +j +1 −j −j +1 +j +1 +1 −j |
| +j −j +1 −j −j +1 +j +j +j +1 −1 +1 −j −1 −1 −j +1 +1 +1 −j +j −j +1 −j −j +1 +j −j −j −1 +1 −1 |
| +j +1 +1 +j −1 −j −j −1 +1 −1 −j −1 −1 −j +1 +1 +1 −j +j −j −1 +j +j −1 −j −1 −1 +j −j +j −1 +j |
| +j −1 −j +j +j +1 −1 +1 −j −1 −1 −j +1 −j −j −1 +1 −1 −j −1 −1 −j +1 +1 +1 −j +j −j −1 +j +j −1 |
| −j +j +j +1 −1 +1 +j +1 +1 +j −1 +1 +1 −j +j −j −1 +j +j −1 −j +1 +1 −j +j −j +1 −j −j +1 +j |
| +j +j +1 −1 +1 −j −1 −1 −j +1 +1 +1 −j +j −j +1 −j −j +1 +j −j −j −1 +1 −1 +j +1 +1 +j −1 +j |
| +j +1 −1 +1 +j +1 +1 +j −1 −1 −1 +j −j +j +1 −j −j +1 +j +j +j +1 −1 +1 +j +1 +1 +j −1+1 |
| +1 −j +j −j −1 +j +j −1 −j +1 +1 −j +j −j +1 −j −j +1 +j +j +j +1 −1 +1 −j −1 −1 −j +1 −j −j −1 |
| +1 −1 −j −1 −1 −j +1 −1 −1 +j −j +j +1 −j −j +1 +j +1 +1 −j +j −j +1 −j −j +1 +j +j +j +1 −1 |
| +1 −j −1 −1 −j +1 −1 −1 +j −j +j −1 +j +j −1 −j +j +j +1 −1 +1 −j −1 −1 −j +1 +j +j +1 −1 +1 |
| +j +1 +1 +j −1 −1 −1 +j −j +j +1 −j −j +1 +j +j +j +1 −1 +1 +j +1 +1 +j −1 +1 +1 −j +j −j |
| −1 +j +j −1 −j −1 −1 +j −j +j −1 +j +j −1 −j −j −j −1 +1 −1 +j +1 +1 +j −1 −1 −1 +j −j +j −1 +j |
| +j −1−j +j +j +1 −1 +1 −j −1 −1 −j +1 +j +j +1 −1 +1 +j +1 +1 +j −1 −1 −1 +j −j +j +1 −j −j |
| +1 +j +1 +1 −j +j −j +1 −j −j +1 +j −j −j −1 +1 −1 +j +1 +1 +j −1 +j +j +1 −1 +1 +j +1 +1 |
| +j −1 −1 −1 +j −j +j +1 −j −j +1 +j −j −j −1 +1 −1 −j −1 −1 −j +1 −1 −1 +j −j +j +1 −j −j +1 +j |
| −1 −1 +j −j +j −1 +j +j −1 −j −j −j −1 +1 −1 +j +1 +1 +j −1 |
| The Sequence $Seq^{8}_{left,\ 804}(k)$, to be transmitted from left to right, up to down |
| +j −j +j +1 −j −j −1 +1 −1 −j −1 −1 −j +1 −1 −1 +j −j +j +1 −j −j +1 +j −j −j −1 +1 −1 −j −1 −1 −j |
| +1 +1 +1 −j +j −j −1 +j +j −1 −j −1 −1 +j −j +j −1 +j +j −1 −j +j +j +1 −1 +1 −j −1 −1 −j +1 +1 |
| +1 −j +j −j +1 −j −j +1 +j +j +j +1 −1 +1 −j −1 −1 −j +1 −1 −1 +j −j +j −1 +j +j −1 −j +j +j +1 |
| −1 +1 −j −1 −1 −j +1 −1 −1 +j −j +j −1 +j +j −1 −j −j −j −1 +1 −1 +j +1 +1 +j −1 −j −j −1 +1 −1 |
| −j −1 −1 −j +1 −1 −1 +j −j +j +1 −j −j +1 +j +j +j +1 −1 +1 +j +1 +1 +j −1 −1 −1 +j −j +j +1 |

TABLE 17-continued

| The sequence $Seq^{iSTS}_{left,\ 804}(k)$ |
|---|
| −j −j +1 +j −1 −1 +j −j +j −1 +j +j −1 −j +j +j +1 −1 +1 −j −1 −1 −j +1 −1 −1 +j −j +j −1 +j +j |
| −1 −j −j −j −1 +1 −1 +j +1 +1 +j −1 +j +j +1 −1 +1 +j +1 +1 +j −1 +1 +1 −j +j −j −1 +j +j −1 |
| −j −j −j −1 +1 −1 −j −1 −1 −j +1 +1 +1 −j +j −j −1 +j +j −1 −j +j +j +1 −1 +1 +j +1 +1 +j −1 |
| +1 +1 −j +j −j −1 +j +j −1 −j +j +j +1 −1 +1 +j +1 +1 +j −1 −1 −1 +j −j +j +1 −j −j +1 +j −1 |
| −1 +j −j +j −1 +j +j −1 −j +j +j +1 −1 +1 −j −1 −1 −j +1 +1 +1 −j +j −j +1 −j −j +1 +j +j +j +1 |
| −1 +1 −j −1 −1 −j +1 −1 −1 +j −j +j −1 +j +j −1 −j +j +j +1 −1 +1 −j −1 −1 −j +1 −1 −1 +j −j +j |
| −1 +j +j −1 −j −j −j −1 +1 −1 +j +1 +1 +j −1 +j +j +1 −1 +1 +j +1 +1 +j −1 +1 +1 −j +j −j −1 |
| +j +j −1 −j −j −j −1 +1 −1 −j −1 −1 −j +1 +1 +1 −j +j −j −1 +j +j −1 −j +j +j +1 −1 +1 +j +1 +1 |
| +j −1 +1 +1 −j +j −j −1 +j +j −1 −j +j +j +1 −1 +1 +j +1 +1 +j −1 −1 −1 +j −j +j +1 −j −j +1 |
| +j −1 −1 +j −j +j −1 +j +j −1 −j +j +j +1 −1 +1 −j −1 −1 −j +1 +1 +1 −j +j −j +1 −j −j +1 +j +j |
| +j +1 −1 +1 −j −1 −1 −j +1 −j −j −1 +1 −1 −j −1 −1 −j +1 −1 −1 +j −j +j +1 −j −j +1 +j −j −j −1 |
| +1 −1 −j −1 −1 −j +1 +1 +1 −j +j −j −1 +j +j −1 −j −1 −1 +j −j +j −1 +j +j −1 −j +j +j +1 −1 +1 |
| −j −1 −1 −j +1 +1 +1 −j +j −j +1 −j −j +1 +j +j +j +1 −1 +1 −j −1 −1 −j +1 −1 −1 +j −j +j −1 +j |
| +j − 1 −j +j +j +1 −1 +1 −j −1 −1 −j +1 −1 −1 +j −j +j −1 +j +j −1 −j −j −j −1 +1 −1 +j +1 +1 +j |
| −1 −j −j −1 +1 −1 −j −1 −1 −j +1 −1 −1 +j −j +j +1 −j −j +1 +j +j +j +1 −1 +1 +j +1 +1 +j −1 |
| −1 −1 +j −j +j +1 −j −j +1 +j +1 +1 −j +j −j +1 −j −j +1 +j −j −j −1 +1 −1 +j +1 +1 +j −1 +1 |
| +1 −j +j −j +1 −j −j +1 +j +j +j +1 −1 +1 −j −1 −1 −j +1 −j −j −1 +1 −1 −j −1 −1 −j +1 −1 −1 +j |
| −j +j +1 −j −j +1 +j +j +j +1 −1 +1 +j +1 +1 +j −1 −1 −1 +j −j +j +1 −j −j +1 +j −j −j −1 +1 |
| −1 −j −1 −1 −j +1 −1 −1 +j −j +j +1 −j −j +1 +j −j −j −1 +1 −1 −j −1 −1 −j +1 +1 +1 −j +j −j −1 +j |
| +j −1 −j +1 +1 −j +j −j +1 −j −j +1 +j −j −j −1 +1 −1 +j +1 +1 +j −1 −1 −1 +j −j +j −1 +j +j −1 |
| −j −j −j −1 +1 −1 +j +1 +1 +j −1 |

TABLE 18

| The sequence $Seq^{iSTS}_{right,\ 804}(k)$ |
|---|
| The Sequence $Seq^{1}_{right,\ 804}(k)$, to be transmitted from left to right, up to down |
| +j +j +1 −1 +1 +j +1 +1 +j −1 −j −j −1 +1 −1 +j +1 +1 +j −1 +j +j +1 −1 +1 +j +1 +1 +j −1 |
| +j +j +1 −1 +1 −j −1 −1 −j +1 −j −j −1 +1 −1 −j −1 −1 −j +1 +j +j +1 −1 +1 −j −1 −1 −j +1 +j +j |
| +1 −1 +1 +j +1 +1 +j −1 +j +j +1 −1 +1 −j −1 −1 −j +1 −1 −1 +j −j +j −1 +j +j −1 −j +1 +1 −j |
| +j −j −1 +j +j −1 −j −1 −1 +j −j +j −1 +j +j −1−j −1 −1 +j −j +j +1 −j −j +1 +j −1 −1 +j −j +j −1 |
| +j +j −1 −j +1 +1 −j +j −j −1 +j +j −1 −j +1 +1 −j +j −j +1 −j −j +1 +j +1 +1 −j +j −j −1 +j +j |
| −1 −j +j +j +1 −1 +1 +j +1 +1 +j −1 −j −j −1 +1 −1 +j +1 +1 +j −1 +j +j +1 −1 +1 +j +1 +1 |
| +j −1 +j +j +1 −1 +1 −j −1 −1 −j +1 −j −j −1 +1 −1 −j −1 −1 −j +1 +j +j +1 −1 +1 −j −1 −1 −j +1 |
| +j +j +1 −1 +1 +j +1 +1 +j −1 +j +j +1 −1 +1 −j −1 −1 −j +1 −1 −1 +j −j +j −1 +j +j −1 −j +1 |
| +1 −j +j −j −1 +j +j −1 −j −1 −1 +j −j +j −1 +j +j −1 −j −1 −1 +j −j +j +1 −j −j +1 +j −1 −1 +j −j |
| +j −1 +j +j −1 −j +1 +1 −j +j −j −1 +j +j −1 −j +1 +1 −j +j −j +1 −j −j +1 +j +1 +1 −j +j −j −1 |
| +j +j −1 −j +1 +1 −j +j −j +1 −j −j +1 +j −1 −1 +j −j +j +1 −j −j +1 +j +1 +1 −j +j −j +1 −j −j |
| +1 +j +1 +1 −j +j −j −1 +j +j −1 −j −1 −1 +j −j +j −1 +j +j −1 −j +1 +1 −j +j −j −1 +j +j −1 −j |
| +1 +1 −j +j −j +1 −j −j +1 +j +1 +1 −j +j −j −1 +j +j −1 −j +j +j +1 −1 +1 +j +1 +1 +j −1 −j |
| −j −1 +1 −1 +j +1 +1 +j −1 +j +j +1 −1 +1 +j +1 +1 +j −1 +j +j +1 −1 +1 −j −1 −1 −j +1 +j |
| +j +1 −1 +1 +j +1 +1 +j −1 −j −j −1 +1 −1 +j +1 +1 +j −1 −j −j −1 +1 −1 −j −1 −1 −j +1 −j −j |
| −1 +1 −1 +j +1 +1 +j −1 −1 −1 +j −j +j −1 +j +j −1 −j +1 +1 −j +j −j −1 +j +j −1 −j −1 −1 +j −j |
| +j −1 +j +j −1 −j −1 −1 +j −j +j +1 −j −j +1 +j +1 +1 −j +j −j +1 −j −j +1 +j −1 −1 +j −j +j +1 |
| −j −j +1 +j −1 −1 +j −j +j −1 +j +j −1 −j −1 −1 +j −j +j +1 −j −j +1 +j −j −j −1 +1 −1 −j −1 −1 −j |
| +1 +j +j +1 −1 +1 −j −1 −1 −j +1 −j −j −1 +1 −1 −j −1 −1 −j +1 −j −j −1 +1 −1 +j +1 +1 +j −1 −j |
| −j −1 +1 −1 −j −1 −1 −j +1 +j +j +1 −1 +1 −j −1 −1 −j +1 +j +j +1 −1 +1 +j +1 +1 +j −1 +j +j |
| +1 −1 +1 −j −1 −1 −j +1 +1 +1 −j +j −j +1 −j −j +1 +j −1 −1 +j −j +j +1 −j −j +1 +j +1 +1 −j |
| +j −j +1 −j −j +1 +j +1 +1 −j +j −j −1 +j +j −1 −j −1 −1 +j −j +j −1 +j +j −1 −j +1 +1 −j +j −j |
| −1 +j +j −1 −j +1 +1 −j +j −j +1 −j −j +1 +j +1 +1 −j +j −j −1 +j +j −1 −j +j +j +1 −1 +1 +j +1 |
| +1 +j −1 −j −j −1 +1 −1 +j +1 +1 +j −1 +j +j +1 −1 +1 +j +1 +1 +j −1 +j +j +1 −1 +1 −j −1 |
| −1 −j +1 +j +j +1 −1 +1 +j +1 +1 +j −1 −j −j −1 +1 −1 +j +1 +1 +j −1 −j −j −1 +1 −1 −j −1 −1 |
| −j +1 −j −j −1 +1 −1 +j +1 +1 +j −1 +1 −1 −j +j |
| The Sequence $Seq^{2}_{right,\ 804}(k)$, to be transmitted from left to right, up to down |
| +1 +1 −j +j −j +1 −j −j +1 +j +1 +1 −j +j −j −1 +j +j −1 −j −1 −1 +j −j +j −1 +j +j −1 −j +1 +1 |
| −j +j −j −1 +j +j −1 −j −j −j −1 +1 −1 −j −1 −1 −j +1 −j −j −1 +1 −1 +j +1 +1 +j −1 −j −j −1 +1 −1 |
| −j −1 −1 −j +1 +j +j +1 −1 +1 −j −1 −1 −j +1 +j +j +1 −1 +1 +j +1 +1 +j −1 +j +j +1 −1 +1 −j |
| −1 −1 −j +1 −j −j −1 +1 −1 −j −1 −1 −j +1 +j +j +1 −1 +1 −j −1 −1 −j +1 −1 −1 +j −j +j −1 +j +j |
| −1 −j −1 −1 +j −j +j +1 −j −j +1 +j −1 −1 +j −j +j −1 +j +j −1 −j +1 +1 −j +j −j −1 +j +j −1 −j |
| +1 +1 −j +j −j +1 −j −j +1 +j +1 +1 −j +j −j −1 +j +j −1 −j −1 −1 +j −j +j −1 +j +j −1 −j +1 +1 |
| −j +j −j −1 +j +j −1 −j −j −j −1 +1 −1 −j −1 −1 −j +1 −j −j −1 +1 −1 +j +1 +1 +j −1 −j −j −1 +1 −1 |
| −j −1 −1 −j +1 +j +j +1 −1 +1 −j −1 −1 −j +1 +j +j +1 −1 +1 +j +1 +1 +j −1 +j +j +1 −1 +1 −j |
| −1 −1 −j +1 −j −j −1 +1 −1 −j −1 −1 −j +1 +j +j +1 −1 +1 −j −1 −1 −j +1 −1 −1 +j −j +j −1 +j +j |
| −1 −j −1 −1 +j −j +j +1 −j −j +1 +j −1 −1 +j −j +j −1 +j +j −1 −j +1 +1 −j +j −j −1 +j +j −1 −j −j |
| −j −1 +1 −1 −j −1 −1 −j +1 +j −j −1 +1 −1 +j +1 +1 +j −1 +j +j +1 −1 +1 +j +1 +1 +j −1 −j −j |
| −1 +1 −1 +j +1 +1 +j −1 −1 −1 +j −j +j −1 +j +j −1 −j −1 −1 +j −j +j +1 −j −j +1 +j −1 −1 +j −j |
| +j −1 +j +j −1 −j +1 +1 −j +j −j −1 +j +j −1 −j +1 +1 −j +j −j +1 −j −j +1 +j +1 +1 −j +j −j −1 |
| +j +j −1 −j −1 −1 +j −j +j −1 +j +j −1 −j +1 +1 −j +j −j −1 +j +j −1 −j +j +j +1 −1 +1 +j +1 +1 |
| +j −1 +j +j +1 −1 +1 −j −1 −1 −j +1 +j +j +1 −1 +1 +j +1 +1 +j −1 −j −j −1 +1 −1 +j +1 +1 |
| +j −1 +j +j +1 −1 +1 +j +1 +1 +j −1 +j +j +1 −1 +1 −j −1 −1 −j +1 −j −j −1 +1 −1 −j −1 −1 −j |
| +1 +j +j +1 −1 +1 −j −1 −1 −j +1 +1 +1 −j +j −j +1 −j −j +1 +j +j +1 +1 −j +j −j −1 +j +j −1 −j |
| +1 +1 −j +j −j +1 −j −j +1 +j −1 −1 +j −j +j +1 −j −j +1 +j −1 −1 +j −j +j −1 +j +j −1 −j −1 −1 |
| +j −j +j +1 −j −j +1 +j +1 +1 −j +j −j +1 −j −j +1 +j −1 −1 +j −j +j +1 −j −j +1 +j −j −j −1 +1 |

TABLE 18-continued

| The sequence $Seq^{iSTS}_{right,\ 804}(k)$ |
| --- |
| −1 −j −1 −1 −j +1 −j −j −1 +1 −1 +j +1 +1 +j −1 −j −j −1 +1 −1 −j −1 −1 −j +1 +j +j +1 −1 +1 −j |
| −1 −1 −j +1 −j −j −1 +1 −1 −j −1 −1 −j +1 −j −j −1 +1 −1 +j +1 +1 +j −1 +j +j +1 −1 +1 +j +1 |
| +1 +j −1 −j −j −1 +1 −1 +j +1 +1 +j −1 −1 −1 +j −j +j −1 +j +j −1 −j −1 −1 +j −j +j +1 −j −j +1 |
| +j −1 −1 +j −j +j −1 +j +j −1 −j +1 +1 −j +j −j −1 +j +j −1 −j +1 +1 −j +j −j +1 −j −j +1 +j +1 |
| +1 −j +j −j −1 +j +j −1 −j −1 −1 +j −j +j −1 +j +j −1 −j +1 +1 −j +j −j −1 +j +j −1 −j +j +j +1 |
| −1 +1 +j +1 +1 +j −1 +j +j +1 −1 +1 −j −1 −1 −j +1 +j +j +1 −1 +1 +j +1 +1 +j −1 −j −j −1 |
| +1 −1 +j +1 +1 +j −1 −j +1 +1 +j |
| The Sequence $Seq^{3}_{right,\ 804}(k)$, to be transmitted from left to right, up to down |
| +1 +1 −j +j −j +1 −j −j +1 +j −1 −1 +j −j +j +1 −j −j +1 +j −j −j −1 +1 −1 −j −1 −1 −j +1 −j −j −1 |
| +1 −1 +j +1 +1 +j −1 +1 +1 −j +j −j +1 −j −j +1 +j −1 −1 +j −j +j +1 −j −j +1 +j +j +j +1 −1 |
| +1 +j +1 +1 +j −1 +j +j +1 −1 +1 −j −1 −1 −j +1 +j +j +1 −1 +1 +j +1 +1 +j −1 −j −j −1 +1 |
| −1 +j +1 +1 +j −1 +1 +1 −j +j −j +1 −j −j +1 +j +1 +1 −j +j −j −1 +j +j −1 −j −j −j −1 +1 −1 −j |
| −1 −1 −j +1 +j +j +1 −1 +1 −j −1 −1 −j +1 +1 +1 −j +j −j +1 −j −j +1 +j +1 +1 −j +j −j −1 +j +j |
| −1 −j +1 +1 −j +j −j +1 −j −j +1 +j −1 −1 +j −j +j +1 −j −j +1 +j −j −j −1 +1 −1 −j −1 −1 −j +1 −j |
| −j −1 +1 −1 +j +1 +1 +j −1 +1 +1 −j +j −j +1 −j −j +1 +j −1 −1 +j −j +j +1 −j −j +1 +j +j +j |
| +1 −1 +1 +j +1 +1 +j −1 +j +j +1 −1 +1 −j −1 −1 −j +1 +j +j +1 −1 +1 +j +1 +1 +j −1 −j −j |
| −1 +1 −1 +j +1 +1 +j −1 +1 +1 −j +j −j +1 −j −j +1 +j +1 +1 −j +j −j −1 +j +j −1 −j −j −j −1 +1 |
| −1 −j −1 −1 −j +1 +j +j +1 −1 +1 −j −1 −1 −j +1 +1 +1 −j +j −j +1 −j −j +1 +j +1 +1 −j +j −j −1 |
| +j +j −1 −j −j −j −1 +1 −1 −j −1 −1 −j +1 +j +j +1 −1 +1 −j −1 −1 −j +1 −1 −1 +j −j +j −1 +j +j |
| −1 −j −1 −1 +j −j +j +1 −j −j +1 +j −j −j −1 +1 −1 −j −1 −1 −j +1 +j +j +1 −1 +1 −j −1 −1 −j +1 |
| +1 +1 −j +j −j +1 −j −j +1 +j +1 +1 −j +j −j −1 +j +j −1 −j +1 +1 −j +j −j +1 −j −j +1 +j −1 −1 |
| +j −j +j +1 −j −j +1 +j −j −j −1 +1 −1 −j −1 −1 −j +1 −j −j −1 +1 −1 +j +1 +1 +j −1 −1 −1 +j −j |
| +j −1 +j +j −1 −j +1 +1 −j +j −j −1 +j +j −1 −j −j −j −1 +1 −1 −j −1 −1 −j +1 −j −j −1 +1 −1 +j |
| +1 +1 +j −1 +j +j +1 −1 +1 +j +1 +1 +j −1 −j −j −1 +1 −1 +j +1 +1 +j −1 +1 +1 −j +j −j +1 |
| −j −j +1 +j +1 +1 −j +j −j −1 +j +j −1 −j +j +j +1 −1 +1 +j +1 +1 +j −1 −j −j −1 +1 −1 +j +1 |
| +1 +j −1 −1 −1 +j −j +j −1 +j +j −1 −j −1 −1 +j −j +j +1 −j −j +1 +j −1 −1 +j −j +j −1 +j +j −1 |
| −j +1 +1 −j +j −j −1 +j +j −1 −j +j +j +1 −1 +1 +j +1 +1 +j −1 +j +j +1 −1 +1 −j −1 −1 −j +1 |
| +1 +1 −j +j −j +1 −j −j +1 +j −1 −1 +j −j +j +1 −j −j +1 +j +j +j +1 −1 +1 +j +1 +1 +j −1 +j |
| +j +1 −1 +1 −j −1 −1 −j +1 −j −j −1 +1 −1 −j −1 −1 −j +1 +j +j +1 −1 +1 −j −1 −1 −j +1 −1 −1 +j |
| −j +j −1 +j +j −1 −j −1 −1 +j −j +j +1 −j −j +1 +j −j −j −1 +1 −1 −j −1 −1 −j +1 +j +j +1 −1 +1 |
| −j −1 −1 −j +1 +1 +1 −j +j −j +1 −j −j +1 +j +1 +1 −j +j −j −1 +j +j −1 −j +1 +1 −j +j −j +1 −j |
| −j +1 +j −1 −1 +j −j +j +1 −j −j +1 +j −j −j −1 +1 −1 −j −1 −1 −j +1 −j −j −1 +1 −1 +j +1 +1 +j |
| −1 −1 −1 +j −j +j −1 +j +j −1 −j +1 +1 −j +j −j −1 +j +j −1 −j −j −j −1 +1 −1 −j −1 −1 −j +1 −j −j |
| −1 +1 −1 +j +1 +1 +j −1 +j −j +j −1 |
| The Sequence $Seq^{4}_{right,\ 804}(k)$, to be transmitted from left to right, up to down |
| +1 +1 −j +j −j +1 −j −j +1 +j +j +j +1 −1 +1 −j −1 −1 −j +1 +1 +1 −j +j −j +1 −j −j +1 +j −j −j |
| −1 +1 −1 +j +1 +1 +j −1 +1 +1 −j +j −j +1 −j −j +1 +j +j +j +1 −1 +1 −j −1 −1 −j +1 −1 −1 +j |
| −j +j −1 +j +j −1 −j +j +j +1 −1 +1 −j −1 −1 −j +1 +j +j +1 −1 +1 +j +1 +1 +j −1 −1 −1 +j −j |
| +j +1 −j −j +1 +j +j +j +1 −1 +1 +j +1 +1 +j −1 +1 +1 −j +j −j −1 +j +j −1 −j −j −j −1 +1 −1 |
| −j −1 −1 −j +1 +1 +1 −j +j −j −1 +j +j −1 −j +j +j +1 −1 +1 +j +1 +1 +j −1 +1 +1 −j +j −j −1 |
| +j +j −1 −j +1 +1 −j +j −j +1 −j −j +1 +j +j +j +1 −1 +1 −j −1 −1 −j +1 +1 +1 −j +j −j +1 −j −j |
| +1 +j −j −j −1 +1 −1 +j +1 +1 +j −1 +1 +1 −j +j −j +1 −j −j +1 +j +j +j +1 −1 +1 −j −1 −1 −j |
| +1 −1 −1 +j −j +j −1 +j +j −1 −j +j +j +1 −1 +1 −j −1 −1 −j +1 +j +j +1 −1 +1 +j +1 +1 +j −1 |
| −1 −1 +j −j +j +1 −j −j +1 +j +j +j +1 −1 +1 +j +1 +1 +j −1 +1 +1 −j +j −j −1 +j +j −1 −j −j −j |
| −1 +1 −1 −j −1 −1 −j +1 +1 +1 −j +j −j −1 +j +j −1 −j +j +j +1 −1 +1 +j +1 +1 +j −1 +1 +1 −j |
| +j −j −1 +j +j −1 −j −j −j −1 +1 −1 −j −1 −1 −j +1 +1 +1 −j +j −j −1 +j +j −1 −j −j −j −1 +1 −1 −j |
| −1 −1 −j +1 −1 −1 +j −j +j +1 −j −j +1 +j −j −j −1 +1 −1 −j −1 −1 −j +1 +1 +1 −j +j −j −1 +j +j |
| −1 −j +j +j +1 −1 +1 +j +1 +1 +j −1 +1 +1 −j +j −j −1 +j +j −1 −j +1 +1 −j +j −j +1 −j −j +1 |
| +j +j +j +1 −1 +1 −j −1 −1 −j +1 +1 +1 −j +j −j +1 −j −j +1 +j −j −j −1 +1 −1 +j +1 +1 +j −1 |
| −1 −1 +j −j +j −1 +j +j −1 −j −j −j −1 +1 −1 +j +1 +1 +j −1 +1 +1 −j +j −j +1 −j −j +1 +j −j −j |
| −1 +1 −1 +j +1 +1 +j −1 +j +j +1 −1 +1 +j +1 +1 +j −1 −1 −1 +j −j +j +1 −j −j +1 +j +j +j |
| +1 −1 +1 +j +1 +1 +j −1 +1 +1 −j +j −j −1 +j +j −1 −j +j +j +1 −1 +1 +j +1 +1 +j −1 −1 −1 |
| +j −j +j +1 −j −j +1 +j −j −j −1 +1 −1 −j −1 −1 −j +1 −1 −1 +j −j +j +1 −j −j +1 +j −1 −1 +j −j +j |
| −1 +j +j −1 −j −j −j −1 +1 −1 +j +1 +1 +j −1 −1 −1 +j −j +j −1 +j +j −1 −j +j +j +1 −1 +1 −j −1 |
| −1 −j +1 +1 +1 −j +j −j +1 −j −j +1 +j +j +j +1 −1 +1 −j −1 −1 −j +1 −1 −1 +j −j +j −1 +j +j −1 |
| −j +j +j +1 −1 +1 −j −1 −1 −j +1 −j −j −1 +1 −1 −j −1 −1 −j +1 +1 +1 −j +j −j −1 +j +j −1 −j −j −j |
| −1 +1 −1 −j −1 −1 −j +1 −1 −1 +j −j +j +1 −j −j +1 +j −j −j −1 +1 −1 −j −1 −1 −j +1 +1 +1 −j +j |
| −j −1 +j +j −1 −j +j +j +1 −1 +1 +j +1 +1 +j −1 +1 +1 −j +j −j −1 +j +j −1 −j +1 +1 −j +j −j |
| +1 −j −j +1 +j +j +j +1 −1 +1 −j −1 −1 −j +1 +1 +1 −j +j −j +1 −j −j +1 +j −j −j −1 +1 −1 +j |
| +1 +1 +j −1 −1 −1 +j −j +j −1 +j +j −1 −j −j −j −1 +1 −1 +j +1 +1 +j −1 +1 +1 −j +j −j +1 −j −j |
| +1 +j −j −j −1 +1 −1 +j +1 +1 +j −1 −1 −j +j −j |
| The Sequence $Seq^{5}_{right,\ 804}(k)$, to be transmitted from left to right, up to down |
| +j +j +1 −1 +1 +j +1 +1 +j −1 +1 +1 −j +j −j −1 +j +j −1 −j −1 −1 +j −j +j −1 +j +j −1 −j −j −j |
| −1 +1 −1 +j +1 +1 +j −1 +j +j +1 −1 +1 +j +1 +1 +j −1 +1 +1 −j +j −j −1 +j +j −1 −j +1 +1 |
| −j +j −j +1 −j −j +1 +j +j +j +1 −1 +1 −j −1 −1 −j +1 −1 −1 +j −j +j −1 +j +j −1 −j +j +j +1 −1 |
| +1 −j −1 −1 −j +1 −j −j −1 +1 −1 −j −1 −1 −j +1 +1 +1 −j +j −j −1 +j +j −1 −j +1 +1 −j +j −j +1 |
| −j −j +1 +j −j −j −1 +1 −1 +j +1 +1 +j −1 −j −j −1 +1 −1 −j −1 −1 −j +1 +1 +1 −j +j −j −1 +j +j |
| −1 −j +j +j +1 −1 +1 +j +1 +1 +j −1 +1 +1 −j +j −j −1 +j +j −1 −j −1 −1 +j −j +j −1 +j +j −1 −j |
| −j −j −1 +1 −1 +j +1 +1 +j −1 +j +j +1 −1 +1 +j +1 +1 +j −1 +1 +1 −j +j −j −1 +j +j −1 −j +1 |
| +1 −j +j −j +1 −j −j +1 +j +j +j +1 −1 +1 −j −1 −1 −j +1 −1 −1 +j −j +j −1 +j +j −1 −j +j +j +1 |
| −1 +1 −j −1 −1 −j +1 −j −j −1 +1 −1 −j −1 −1 −j +1 +1 +1 −j +j −j −1 +j +j −1 −j +1 +1 −j +j −j |
| +1 −j −j +1 +j −j −j −1 +1 −1 +j +1 +1 +j −1 −j −j −1 +1 −1 −j −1 −1 −j +1 +1 +1 −j +j −j −1 +j |
| +j −1 −j +1 +1 −j +j −j +1 −j −j +1 +j −j −j −1 +1 −1 +j +1 +1 +j −1 +j +j +1 −1 +1 +j +1 +1 |
| +j −1 −1 −1 +j −j +j +1 −j −j +1 +j +1 +1 −j +j −j +1 −j −j +1 +j −j −j −1 +1 −1 +j +1 +1 +j −1 |
| −j −j −1 +1 −1 −j −1 −1 −j +1 +1 +1 −j +j −j −1 +j +j −1 −j +j +j +1 −1 +1 +j +1 +1 +j −1 +1 |

TABLE 18-continued

| The sequence $Seq^{iSTS}_{right,\ 804}(k)$ |
| --- |
| +1 −j +j −j −1 +j +j −1 −j −1 −1 +j −j +j −1 +j +j −1 −j −j −j −1 +1 −1 +j +1 +1 +j −1 −j −j −1 |
| +1 −1 −j −1 −1 −j +1 −1 −1 +j −j +j +1 −j −j +1 +j −1 −1 +j −j +j −1 +j +j −1 −j −j −j −1 +1 −1 |
| +j +1 +1 +j −1 −1 −1 +j −j +j −1 +j +j −1 −j +j +j +1 −1 +1 −j −1 −1 −j +1 −j −j −1 +1 −1 −j −1 |
| −1 −j +1 +1 +1 −j +j −j −1 +j +j −1 −j −1 −1 +j −j +j −1 +j +j −1 −j +j +j +1 −1 +1 −j −1 −1 −j |
| +1 +j +j +1 −1 +1 +j +1 +1 +j −1 −1 −1 +j −j +j +1 −j −j +1 +j −j −j −1 +1 −1 −j −1 −1 −j +1 |
| −1 −1 +j −j +j +1 −j −j +1 +j +1 +1 −j +j −j +1 −j −j +1 +j +j +j +1 −1 +1 −j −1 −1 −j +1 +j +j |
| +1 −1 +1 +j +1 +1 +j −1 +1 +1 −j +j −j −1 +j +j −1 −j +1 +1 −j +j −j +1 −j −j +1 +j +j +j +1 |
| −1 +1 −j −1 −1 −j +1 +1 +1 −j +j −j +1 −j −j +1 +j −j −j −1 +1 −1 +j +1 +1 +j −1 +j +j +1 −1 |
| +1 +j +1 +1 +j −1 −1 −1 +j −j +j +1 −j −j +1 +j +1 +1 −j +j −j +1 −j −j +1 +j −j −j −1 +1 −1 |
| +j +1 +1 +j −1 −j −j −1 +1 −1 −j −1 −1 −j +1 +1 +1 −j +j −j −1 +j +j −1 −j +j +j +1 −1 +1 +j |
| +1 +1 +j −1 +1 +1 −j +j −j −1 +j +j −1 −j −1 −1 +j −j +j −1 +j +j −1 −j −j −j −1 +1 −1 +j +1 +1 |
| +j −1 −j −j −1 +1 −1 −j −1 −1 −j +1 −1 −1 +j −j +j +1 −j −j +1 +j −1 −1 +j −j +j −1 +j +j −1 −j −j |
| −j −1 +1 −1 +j +1 +1 +j −1 +j −j +j +1 |
| The Sequence $Seq^{6}_{right,\ 804}(k)$, to be transmitted from left to right, up to down |
| +1 +1 −j +j −j +1 −j −j +1 +j −1 −1 +j −j +j +1 −j −j +1 +j −1 −1 +j −j +j −1 +j +j −1 −j −1 −1 |
| +j −j +j +1 −j −j +1 +j +j +j +1 −1 +1 +j +1 +1 +j −1 −j −j −1 +1 −1 +j +1 +1 +j −1 +j +j |
| +1 −1 +1 +j +1 +1 +j −1 +j +j +1 −1 +1 −j −1 −1 −j +1 +j +j +1 −1 +1 +j +1 +1 +j −1 −j −j |
| −1 +1 −1 +j +1 +1 +j −1 −j −j −1 +1 −1 −j −1 −1 −j +1 −j −j −1 +1 −1 +j +1 +1 +j −1 +1 +1 −j |
| +j −j +1 −j −j +1 +j −1 −1 +j −j +j +1 −j −j +1 +j +1 +1 −j +j −j +1 −j −j +1 +j +1 +1 −j +j −j |
| −1 +j +j −1 −j +1 +1 −j +j −j +1 −j −j +1 +j −1 −1 +j −j +j +1 −j −j +1 +j −1 −1 +j −j +j −1 +j |
| +j −1 −j −1 −1 +j −j +j +1 −j −j +1 +j +j +j +1 −1 +1 +j +1 +1 +j −1 −j −j −1 +1 −1 +j +1 +1 |
| +j −1 +j +j +1 −1 +1 +j +1 +1 +j −1 +j +j +1 −1 +1 −j −1 −1 −j +1 +j +j +1 −1 +1 +j +1 +1 |
| +j −1 −j −j −1 +1 −1 +j +1 +1 +j −1 −j −j −1 +1 −1 −j −1 −1 −j +1 −j −j −1 +1 −1 +j +1 +1 +j −1 |
| +1 +1 −j +j −j +1 −j −j +1 +j −1 −1 +j −j +j +1 −j −j +1 +j +1 +1 −j +j −j +1 −j −j +1 +j +1 |
| +1 −j +j −j −1 +j +j −1 −j −j −j −1 +1 −1 −j −1 −1 −j +1 +j +j +1 −1 +1 −j −1 −1 −j +1 +j +j +1 |
| −1 +1 +j +1 +1 +j −1 +j +j +1 −1 +1 −j −1 −1 −j +1 +1 +1 −j +j −j +1 −j −j +1 +j −1 −1 +j −j |
| +j +1 −j −j +1 +j +1 +1 −j +j −j +1 −j −j +1 +j +1 +1 −j +j −j −1 +j +j −1 −j +1 +1 −j +j −j +1 |
| −j −j +1 +j −1 −1 +j −j +j +1 −j −j +1 +j −1 −1 +j −j +j −1 +j +j −1 −j −1 −1 +j −j +j +1 −j −j +1 |
| +j −j −j −1 +1 −1 −j −1 −1 −j +1 +j +j +1 −1 +1 −j −1 −1 −j +1 −j −j −1 +1 −1 −j −1 −1 −j +1 −j −j |
| −1 +1 −1 +j +1 +1 +j −1 +j +j +1 −1 +1 +j +1 +1 +j −1 −j −j −1 +1 −1 +j +1 +1 +j −1 −j −j |
| −1 +1 −1 −j −1 −1 −j +1 −j −j −1 +1 −1 +j +1 +1 +j −1 −1 −1 +j −j +j −1 +j +j −1 −j +1 +1 −j +j |
| −j −1 +j +j −1 −j −1 −1 +j −j +j −1 +j +j −1 −j −1 −1 +j −j +j +1 −j −j +1 +j −1 −1 +j −j +j −1 +j |
| +j −1 −j +1 +1 −j +j −j −1 +j +j −1 −j +1 +1 −j +j −j +1 −j −j +1 +j +1 +1 −j +j −j −1 +j +j −1 |
| −j +j +j +1 −1 +1 +j +1 +1 +j −1 −j −j −1 +1 −1 +j +1 +1 +j −1 +j +j +1 −1 +1 +j +1 +1 +j |
| −1 +j +j +1 −1 +1 −j −1 −1 −j +1 −j −j −1 +1 −1 −j −1 −1 −j +1 +j +j +1 −1 +1 −j −1 −1 −j +1 +j |
| +j +1 −1 +1 +j +1 +1 +j −1 +j +j +1 −1 +1 −j −1 −1 −j +1 +1 +1 −j +j −j +1 −j −j +1 +j −1 −1 |
| +j −j +j +1 −j −j +1 +j +1 +1 −j +j −j +1 −j −j +1 +j +1 +1 −j +j −j −1 +j +j −1 −j +1 +1 −j +j |
| −j +1 −j −j +1 +j −1 −1 +j −j +j +1 −j −j +1 +j −1 −1 +j −j +j −1 +j +j −1 −j −1 −1 +j −j +j +1 −j |
| −j +1 +j −j −j −1 +1 −1 −j −1 −1 −j +1 +j +j +1 −1 +1 −j −1 −1 −j +1 −j −j −1 +1 −1 −j −1 −1 −j |
| +1 −j −j −1 +1 −1 +j +1 +1 +j −1 +1 −j +1 +1 |
| The Sequence $Seq^{7}_{right,\ 804}(k)$, to be transmitted from left to right, up to down |
| +1 +1 −j +j −j +1 −j −j +1 +j −j −j −1 +1 −1 +j +1 +1 +j −1 +j +j +1 −1 +1 +j +1 +1 +j −1 −1 |
| −1 +j −j +j +1 −j −j +1 +j +j +j +1 −1 +1 +j +1 +1 +j −1 +1 +1 −j +j −j −1 +j +j −1 −j +1 +1 |
| −j +j −j +1 −j −j +1 +j +j +j +1 −1 +1 −j −1 −1 −j +1 +j +j +1 −1 +1 +j +1 +1 +j −1 +1 +1 −j |
| +j −j −1 +j +j −1 −j −1 −1 +j −j +j −1 +j +j −1 −j −j −j −1 +1 −1 +j +1 +1 +j −1 +1 +1 −j +j −j |
| +1 −j −j +1 +j −j −j −1 +1 −1 +j +1 +1 +j −1 −j −j −1 +1 −1 −j −1 −1 −j +1 +1 +1 −j +j −j −1 +j |
| +j −1 −j +1 +1 −j +j −j +1 −j −j +1 +j −j −j −1 +1 −1 +j +1 +1 +j −1 +j +j +1 −1 +1 +j +1 +1 |
| +j −1 −1 −1 +j −j +j +1 −j −j +1 +j +j +j +1 −1 +1 +j +1 +1 +j −1 +1 +1 −j +j −j −1 +j +j −1 |
| −j +1 +1 −j +j −j +1 −j −j +1 +j +j +j +1 −1 +1 −j −1 −1 −j +1 +j +j +1 −1 +1 +j +1 +1 +j −1 |
| +1 +1 −j +j −j −1 +j +j −1 −j −1 −1 +j −j +j −1 +j +j −1 −j −j −j −1 +1 −1 +j +1 +1 +j −1 +1 +1 |
| −j +j −j +1 −j −j +1 +j −j −j −1 +1 −1 +j +1 +1 +j −1 −j −j −1 +1 −1 −j −1 −1 −j +1 +1 +1 −j +j |
| −j −1 +j +j −1 −j −j −j −1 +1 −1 −j −1 −1 −j +1 −1 −1 +j −j +j +1 −j −j +1 +j +1 +1 −j +j −j +1 −j |
| −j +1 +j +j +j +1 −1 +1 −j −1 −1 −j +1 +1 +1 −j +j −j +1 −j −j +1 +j −j −j −1 +1 −1 +j +1 +1 |
| +j −1 −j −j −1 +1 −1 −j −1 −1 −j +1 +1 +1 −j +j −j −1 +j +j −1 −j +1 +1 −j +j −j +1 −j −j +1 +j |
| −j −j −1 +1 −1 +j +1 +1 +j −1 +j +j +1 −1 +1 +j +1 +1 +j −1 −1 −1 +j −j +j +1 −j −j +1 +j −j |
| −j −1 +1 −1 −j −1 −1 −j +1 −1 −1 +j −j +j +1 −j −j +1 +j −1 −1 +j −j +j −1 +j +j −1 −j −j −j −1 +1 |
| −1 +j +1 +1 +j −1 +j +j +1 −1 +1 +j +1 +1 +j −1 +1 +1 −j +j −j −1 +j +j −1 −j −1 −1 +j −j +j |
| −1 +j +j −1 −j −j −j −1 +1 −1 +j +1 +1 +j −1 −1 −1 +j −j +j −1 +j +j −1 −j +j +j +1 −1 +1 −j −1 |
| −1 −j +1 +j +j +1 −1 +1 +j +1 +1 +j −1 −1 −1 +j −j +j +1 −j −j +1 +j −1 −1 +j −j +j −1 +j +j |
| −1 −j +j +j +1 −1 +1 −j −1 −1 −j +1 −j −j −1 +1 −1 −j −1 −1 −j +1 +1 +1 −j +j −j −1 +j +j −1 −j +j |
| +j +1 −1 +1 +j +1 +1 +j −1 +1 +1 −j +j −j −1 +j +j −1 −j +1 +1 −j +j −j +1 −j −j +1 +j +j +j |
| +1 −1 +1 −j −1 −1 −j +1 −j −j −1 +1 −1 −j −1 −1 −j +1 −1 −1 +j −j +j +1 −j −j +1 +j +1 +1 −j +j |
| −j +1 −j −j +1 +j +j +j +1 −1 +1 −j −1 −1 −j +1 +1 +1 −j +j −j +1 −j −j +1 +j −j −j −1 +1 −1 +j |
| +1 +1 +j −1 −j −j −1 +1 −1 −j −1 −1 −j +1 +1 +1 −j +j −j −1 +j +j −1 −j +1 +1 −j +j −j +1 −j −j |
| +1 +j −j −j −1 +1 −1 +j +1 +1 +j −1 +j +j +1 −1 +1 +j +1 +1 +j −1 −1 −1 +j −j +j +1 −j −j +1 |
| +j −j −j −1 +1 −1 −j −1 −1 −j +1 −1 −1 +j −j +j +1 −j −j +1 +j −1 −1 +j −j +j −1 +j +j −1 −j −j −j |
| −1 +1 −1 +j +1 +1 +j −1 +j +j +1 −j |
| The Sequence $Seq^{8}_{right,\ 804}(k)$, to be transmitted from left to right, up to down |
| −j −j −1 +1 −1 −j −1 −1 −j +1 −1 −1 +j −j +j +1 −j −j +1 +j −j −j −1 +1 −1 −j −1 −1 −j +1 +1 +1 |
| −j +j −j −1 +j +j −1 −j −1 −1 +j −j +j −1 +j +j −1 −j +j +j +1 −1 +1 −j −1 −1 −j +1 +1 +1 −j +j −j |
| +1 −j −j +1 +j +j +j +1 −1 +1 −j −1 −1 −j +1 +1 +1 −j +j −j +1 −j −j +1 +j −j −j −1 +1 −1 +j |
| +1 +1 +j −1 +1 +1 −j +j −j +1 −j −j +1 +j +j +j +1 −1 +1 −j −1 −1 −j +1 +j +j +1 −1 +1 +j |
| +1 +1 +j −1 +1 +1 −j +j −j −1 +j +j −1 −j −j −j −1 +1 −1 −j −1 −1 −j +1 +1 +1 −j +j −j −1 +j +j |
| −1 −j −j −j −1 +1 −1 −j −1 −1 −j +1 −1 −1 +j −j +j +1 −j −j +1 +j −j −j −1 +1 −1 −j −1 −1 −j +1 +1 |
| +1 −j +j −j −1 +j +j −1 −j −1 −1 +j −j +j −1 +j +j −1 −j +j +j +1 −1 +1 −j −1 −1 −j +1 +1 +1 −j |

TABLE 18-continued

| The sequence $Seq^{iSTS}_{right,\ 804}(k)$ |
|---|
| +j −j +1 −j −j +1 +j +j +j +1 −1 +1 −j −1 −1 −j +1 +1 +1 −j +j −j +1 −j −j +1 +j −j −j −1 +1 −1 |
| +j +1 +1 +j −1 +1 +1 −j +j −j +1 −j −j +1 +j +j +j +1 −1 +1 −j −1 −1 −j +1 +j +j +1 −1 +1 |
| +j +1 +1 +j −1 +1 +1 −j +j −j −1 +j +j −1 −j −j −j −1 +1 −1 −j −1 −1 −j +1 +1 +1 −j +j −j −1 +j |
| +j −1 −j −1 −1 +j −j +j −1 +j +j −1 −j +j +j +1 −1 +1 −j −1 −1 −j +1 −1 −1 +j −j +j −1 +j +j −1 |
| −j −j −j −1 +1 −1 +j +1 +1 +j −1 +j +j +1 −1 +1 +j +1 +1 +j −1 +1 +1 −j +j −j −1 +j +j −1 −j |
| −j −j −1 +1 −1 −j −1 −1 −j +1 +1 +1 −j +j −j −1 +j +j −1 −j −j −j −1 +1 −1 −j −1 −1 −j +1 −1 −1 +j |
| −j +j +1 −j −j +1 +j −j −j −1 +1 −1 −j −1 −1 −j +1 +1 +1 −j +j −j −1 +j +j −1 −j +1 +1 −j +j −j |
| +1 −j −j +1 +j −j −j −1 +1 −1 +j +1 +1 +j −1 −1 −1 +j −j +j −1 +j +j −1 −j −j −j −1 +1 −1 +j +1 |
| +1 +j −1 +1 +1 −j +j −j +1 −j −j +1 +j −j −j −1 +1 −1 +j +1 +1 +j −1 +1 +1 −j +j −j +1 −j −j |
| +1 +j +j +j +1 −1 +1 −j −1 −1 −j +1 −j −j −1 +1 −1 −j −1 −1 −j +1 −1 −1 +j −j +j +1 −j −j +1 +j |
| +j +j +1 −1 +1 +j +1 +1 +j −1 −1 −1 +j −j +j +1 −j −j +1 +j +j +j +1 −1 +1 +j +1 +1 +j −1 |
| +1 +1 −j +j −j −1 +j +j −1 −j +j +j +1 −1 +1 +j +1 +1 +j −1 −1 −1 +j −j +j +1 −j −j +1 +j −1 |
| −1 +j −j +j −1 +j +j −1 −j +j +j +1 −1 +1 −j −1 −1 −j +1 +1 +1 −j +j −j +1 −j −j +1 +j +j +j +1 |
| −1 +1 −j −1 −1 −j +1 −1 −1 +j −j +j −1 +j +j −1 −j +j +j +1 −1 +1 −j −1 −1 −j +1 −1 −1 +j −j +j |
| −1 +j +j −1 −j −j −j −1 +1 −1 +j +1 +1 +j −1 +j +j +1 −1 +1 +j +1 +1 +j −1 +1 +1 −j +j −j −1 |
| +j +j −1 −j −j −j −1 +1 −1 −j −1 −1 −j +1 +1 +1 −j +j −j −1 +j +j −1 −j −j −j −1 +1 −1 −j −1 −1 −j |
| +1 −1 −1 +j −j +j +1 −j −j +1 +j −j −j −1 +1 −1 −j −1 −1 −j +1 +1 +1 −j +j −j −1 +j +j −1 −j +1 |
| +1 −j +j −j +1 −j −j +1 +j −j −j −1 +1 −1 +j +1 +1 +j −1 −1 −1 +j −j +j −1 +j +j −1 −j −j −j −1 |
| +1 −1 +j +1 +1 +j −1 −1 +j −1 −j |

In some demonstrative embodiments, some or all of the sequences of Tables 3-18, and/or any other additional or alternative sequences may be used.

In some demonstrative embodiments, a device, e.g., device 102 and/or 140, may be configured to utilize some or all of the sequences defined above and/or one or more additional or alternative sequences.

In some demonstrative embodiments, devices 102 and/or 140 may be configured to transmit one or more OFDM transmissions including one or more pilot sequences, for example, according to a pilot sequence definition, which may be configured, for example, for OFDM PHY, e.g., as described below.

In some demonstrative embodiments, the pilot sequences may be transmitted, for example, as part of a data field, e.g., data field 218 (FIG. 2), of an EDMG PPDU, e.g., EDMG PPDU 200 (FIG. 2).

In some demonstrative embodiments, devices 102 and/or 140 may be configured to transmit one or more OFDM transmissions including one or more pilot sequences, which may be configured, for example, for transmission over a channel, e.g., a bonded channel, having a channel bandwidth including a plurality of channels, e.g., a plurality of 2.16 GHz channels, e.g., as described below.

In some demonstrative embodiments, devices 102 and/or 140 may be configured to transmit one or more OFDM transmissions including one or more pilot sequences, which may be configured, for example, for a channel bonding transmission with a channel bonding factor of, for example, $N_{CB}$=1, 2, 3, or 4, and/or for MIMO transmission with the number of space-time streams of up to $N_{STS}$=8, e.g., as described below.

In other embodiments, pilot sequences may be configured for any other type of transmission over any other channel bandwidth, channel bonding factor, and/or number of streams.

In some demonstrative embodiments, device 102 may be configured to transmit one or more OFDM transmissions including one or more pilot sequences, which may be configured, for example, to provide a technical solution, for example, to allow at least efficient and/or improved SISO and/or MIMO channel estimation and/or tracking, common phase error estimation, sampling frequency estimation, phase noise realization estimation, and/or one or more additional or alternative solutions and/or benefits.

An OFDM pilot sequence may be defined, for example, in accordance with an IEEE 802.11ad Standard. For example, 16 pilots may be uniformly distributed over an OFDM signal spectrum, for example, with an equidistant step equal to 20 subcarriers. According to this example, the pilot sequence may, for example, depend on a k-th subcarrier index and an n-th OFDM symbol number.

In one example, a pilot sequence may be defined, e.g., as follows:

$$P(k,n)=P_{16}(k)*W(n) \tag{4}$$

wherein:

$P_{16}$=[−1, +1, −1, +1, +1, −1, −1, −1, −1, −1, +1, +1, +1, −1, +1, +1];

W(n)=2*p(n)−1, wherein p(n) denotes a value generated by a shift register of a random generator (scrambler), for example, p(n) defines a bit coming from a scrambler, initialized to all ones at first OFDM symbol;

Alternatively, W(n) may be defined equal to the exponent:

$$W(n)=-\exp(-j*\pi*p(n));$$

Pilot tones may have fixed locations with indexes:

p_idx=[−150:20:150].

For example, according to this pilot definition, the pilot sequence may be, for example, kept unchanged over the OFDM symbols, for example, except for a common phase defined by a W(n) multiplier, e.g., which may flip from 0 to π.

In some demonstrative embodiments, devices 102 and/or 140 may be configured to generate a pilot sequence, for example, an OFDM pilot sequence, which may be configured, for example, for communication of the EDMG PPDU, for example, EDMG PPDU 200 (FIG. 2), e.g., in accordance with a future IEEE 802.11ay Standard.

In some demonstrative embodiments, devices 102 and/or 140 may be configured to generate a pilot sequence, for example, based on one or more OFDM parameters, e.g., as described below.

In some demonstrative embodiments, controller 124 may be configured to cause, trigger, and/or control the wireless station implemented by device 102 to generate at least one pilot sequence corresponding to at least one respective space-time stream for the EDMG PPDU, for example, EDMG PPDU 200 (FIG. 2), e.g., as described below.

In some demonstrative embodiments, the pilot sequence may include a plurality of pilot values, a pilot value of the plurality of pilot values may be based on a space-time stream number of the space-time stream, an OFDM symbol number, and a subcarrier index, e.g., as described below.

In some demonstrative embodiments, controller 124 may be configured to cause, trigger, and/or control the wireless station implemented by device 102 to transmit an OFDM mode transmission of the EDMG PPDU including the at least one pilot sequence, e.g., as described below.

In some demonstrative embodiments, controller 124 may be configured to cause, trigger, and/or control the wireless station implemented by device 102 to insert the plurality of pilot values at a plurality of pilot subcarrier indexes, which are frequency-channel dependent, and are independent of the space-time stream number and the OFDM symbol number, e.g., as described below.

In some demonstrative embodiments, controller 124 may be configured to cause, trigger, and/or control the wireless station implemented by device 102 to transmit the OFDM mode transmission over a channel bandwidth of 2.16 GHz, 4.32 GHz, 6.48 GHz, or 8.64 GHz.

In other embodiments, device 102 may transmit the OFDM mode transmission over any other channel bandwidth.

In some demonstrative embodiments, controller 124 may be configured to cause, trigger, and/or control the wireless station implemented by device 102 to determine the pilot value by applying a phase shift to a predefined pilot value, e.g., as described below.

In some demonstrative embodiments, the phase shift may be based on the space-time stream number and the OFDM symbol number, e.g., as described below.

In other embodiments, the phase shift may be based on any other additional or alternative parameter.

In some demonstrative embodiments, the predefined pilot value may be based on the space-time stream number and the subcarrier index, e.g., as described below.

In other embodiments, the pilot value may be based on any other additional or alternative parameter.

In some demonstrative embodiments, the phase shift may include a product of a deterministic shift and a random shift, e.g., as described below.

In some demonstrative embodiments, the deterministic shift may be based on the space-time stream number and the OFDM symbol number, e.g., as described below.

In some demonstrative embodiments, the random shift may be based on a scrambler output corresponding to the OFDM symbol number, e.g., as described below.

In some demonstrative embodiments, the deterministic shift mat be repeated over time with a period equal to a total count of the at least one space-time stream, e.g., as described below.

In some demonstrative embodiments, the deterministic shift, denoted $W(i_{STS}, n)$, may be defined, for example, in accordance with the following definition:

$$W(i_{STS}, n) = \exp\left(-j\frac{2\pi}{N_{STS}} \cdot (i_{STS} - 1) \cdot (n - 1)\right), \quad (5)$$

$$i_{STS} = 1, 2, \ldots, N_{STS}; n = 1, 2, \ldots, N_{STS}$$

wherein n denotes the OFDM symbol number, $i_{STS}$ denotes the space-time stream number, and $N_{STS}$ denotes a total count of the at least one space-time stream.

In some demonstrative embodiments, the phase shift may include a common phase shift, which is common over subcarriers, e.g., as described below.

In some demonstrative embodiments, controller 124 may be configured to cause, trigger, and/or control the wireless station implemented by device 102 to determine the predefined pilot value according to a predefined pilot sequence corresponding to the space-time stream number, e.g., as described below.

In some demonstrative embodiments, the predefined pilot sequence corresponding to the space-time stream number may be based, for example, on a count of one or more 2.16 GHz channels for transmission of the EDMG PPDU, e.g., as described below.

In other embodiments, the predefined pilot sequence corresponding to the space-time stream number may be based on any other additional or alternative parameter.

In some demonstrative embodiments, the predefined pilot sequence corresponding to the space-time stream number may include a first predefined pilot sequence, denoted $P_{16}(i_{STS}, :)$, including sixteen pilot values, for example, when the count of the one or more 2.16 GHz channels is one e.g., as described below.

In some demonstrative embodiments, the predefined pilot sequence corresponding to the space-time stream number may include a second predefined pilot sequence, denoted $P_{36}(i_{STS}, :)$, including thirty-six pilot values, for example, when the count of the one or more 2.16 GHz channels is two e.g., as described below.

In some demonstrative embodiments, the predefined pilot sequence corresponding to the space-time stream number may include a third predefined pilot sequence, denoted $P_{56}(i_{STS}, :)$, including fifty-six pilot values, for example, when the count of the one or more 2.16 GHz channels is three e.g., as described below.

In some demonstrative embodiments, the predefined pilot sequence corresponding to the space-time stream number may include a fourth predefined pilot sequence, denoted $P_{76}(i_{STS}, :)$, including include seventy-six pilot values, for example, when the count of the one or more 2.16 Gigahertz (GHz) channels is four e.g., as described below.

In other embodiments, any other additional or alternative predefined pilot sequences may be used.

In some demonstrative embodiments, the predefined pilot sequence corresponding to the space-time stream number may include at least one repetition of the predefined pilot sequence $P_{16}(i_{STS}, :)$, e.g., as described below.

In some demonstrative embodiments, the pilot sequence $P_{16}(i_{STS}, :)$ may be defined based on the space-time stream number, denoted $i_{STS}$, e.g., as follows:

TABLE 19

| Pilot sequence $P_{16}(i_{STS}, :)$ | |
|---|---|
| $i_{STS}$ | $P_{16}(i_{STS}, :)$ |
| 1 | [+1 +1 +1 −1 +1 +1 −1 +1 +1 +1 +1 −1 −1 −1 +1 −1] |
| 2 | [−1 −1 −1 +1 −1 −1 +1 −1 +1 +1 +1 −1 −1 −1 +1 −1] |
| 3 | [−1 −1 −1 +1 +1 +1 −1 +1 −1 −1 −1 +1 −1 −1 +1 −1] |
| 4 | [+1 +1 +1 −1 −1 −1 +1 −1 −1 −1 −1 +1 −1 −1 +1 −1] |
| 5 | [−1 −1 +1 −1 −1 −1 −1 +1 −1 −1 +1 −1 +1 +1 +1 −1] |
| 6 | [+1 +1 −1 +1 +1 +1 +1 −1 −1 −1 +1 −1 +1 +1 +1 −1] |
| 7 | [+1 +1 −1 +1 −1 −1 −1 +1 +1 +1 −1 +1 +1 +1 +1 −1] |
| 8 | [−1 −1 +1 −1 +1 +1 +1 −1 +1 +1 −1 +1 +1 +1 +1 −1] |

In some demonstrative embodiments, devices 102 and/or 140 may be configured to generate a pilot sequence, for example, based on a number, denoted $N_{SR}$, of subcarriers occupying half of an overall bandwidth (BW) of an EDMG OFDM signal, for example, to be transmitted over a channel BW of 2.16 GHz, 4.32 GHz, 6.48 GHz, 8.64 GHz, and/or any other channel BW.

In one example, the number $N_{SR}$ may have, for example, a value of 177, e.g., for $N_{CB}$=1, a value of 386, e.g., for $N_{CB}$=2, a value of 596, e.g., for $N_{CB}$=3, a value of 805, e.g., for $N_{CB}$=4, and/or any other value.

In some demonstrative embodiments, devices 102 and/or 140 may be configured to generate a pilot sequence, for example, by inserting a sequence of zeros corresponding to tones ($-N_{SR}$) to ($N_{SR}$), e.g., as described below.

In some demonstrative embodiments, the pilots may then be inserted, for example, at tone indexes, which may be defined, for example, in a frequency-channel dependent manner, and/or, e.g., but, independent on the space-time stream and/or OFDM symbol number.

In some demonstrative embodiments, for example, a pilot value, denoted $P_{NSP}(i_{STS}, n, k)$, may depend, for example, on an $i_{STS}$-th space-time stream number, an n-th OFDM symbol number, and/or a k-th subcarrier index, e.g., as described below.

In some demonstrative embodiments, the pilot value $P_{NSP}(k, i_{STS}, n)$ may be defined, for example, as follows:

$$P_{NSP}(i_{STS},n,k)=W(i_{STS},\mathrm{mod}(n-1,N_{STS})+1)*(2*p(n)-1)*P_{NSP}(i_{STS},k) \quad (6)$$

wherein:

$P_{NSP}(i_{STS}, k)$ defines a pilot for $i_{STS}$-th space-time stream and k-th subcarrier;

$W(i_{STS}, n)*(2*p(n)-1)$ defines a common phase shift (over subcarriers) for the $i_{STS}$-th space-time stream, and the n-th OFDM symbol. For example, p(n) may define a bit coming from a scrambler, e.g., in accordance with Section 20.5.3.2.2 of IEEE 802.11-2016, for example, with a shift register $x_1, x_2, \ldots, x_7$ initialized to all ones at the first OFDM symbol;

$N_{STS}$ defines the total number of space-time streams; and/or mod(x, N) defines a modulo N operation.

In some demonstrative embodiments, the common phase shift may be, for example, composed as a product of a deterministic shift $W(i_{STS}, n)$ repeated, for example, with a period of $N_{STS}$, for example, over the time and random shift, e.g., defined by $(2*p(n)-1)$, which may be scrambler output dependent. The random component may depend, for example, on the n-th OFDM symbol number, e.g., only on the n-th OFDM symbol number, and not depending on the particular $i_{STS}$-th space-time stream number.

In some demonstrative embodiments, the deterministic component of common phase shift $W(i_{STS}, n)$ may be, defined, for example, as described above with respect to Equation 5.

In some demonstrative embodiments, the space-time matrix W may be defined, for example, as any orthogonal matrix, for example, as a Hadamard matrix. For example, in Equation 5, the matrix W may be defined, for example, in the form of a Direct Fourier Transform (DFT) matrix.

In other embodiments, the space-time matrix W may be defined as any other type of matrix.

In some demonstrative embodiments, the pilot sequence $P_{NSP}(i_{STS}, :)$ may be defined, for example, based on a channel bonding factor $N_{CB}$. For example, the pilot sequence $P_{NSP}(i_{STS}, :)$ may be defined, for example, for a given channel bonding factor $N_{CB}$, e.g., as follows:

TABLE 20

| Pilot sequence $P_{NSP}(i_{STS}, :)$ definition | |
|---|---|
| $N_{CB}$ | $P_{NSP}(i_{STS}, :)$ |
| 1 | $P_{16}(i_{STS}, :)$ |
| 2 | $P_{36}(i_{STS}, :) = [P_{16}(i_{STS}, :), P_4(i_{STS}, :), P_{16}(i_{STS}, :)]$ |
| 3 | $P_{56}(i_{STS}, :) = [P_{16}(i_{STS}, :), P_4(i_{STS}, :), P_{16}(i_{STS}, :), P_4(i_{STS}, :), P_{16}(i_{STS}, :)]$ |
| 4 | $P_{76}(i_{STS}, :) = [P_{16}(i_{STS}, :), P_4(i_{STS}, :), P_{16}(i_{STS}, :), P_4(i_{STS}, :), P_{16}(i_{STS}, :), P_4(i_{STS}, :), P_{16}(i_{STS}, :)]$ |

In some demonstrative embodiments, devices 102 and/or 140 may be configured to generate, transmit, receive and/or process one ore more transmissions, e.g., OFDM transmissions, including one or more pilot sequences according to Table 20.

In some demonstrative embodiments, devices 102 and/or 140 may be configured to implement some or all of the pilot sequences defined in Table 20 and/or one or more additional or alternative pilot sequences.

In some demonstrative embodiments, the pilot sequences $P_{16}(i_{STS}, :)$ and/or $P_4(i_{STS}, :)$ may be defined, for example, based on the space-time stream number, e.g., as follows:

TABLE 21

| Pilot sequences $P_{16}(i_{STS}, :)$ and $P_4(i_{STS}, :)$ definition | | |
|---|---|---|
| $i_{STS}$ | $P_{16}(i_{STS}, :)$ | $P_4(i_{STS}, :)$ |
| 1 | [+1 +1 +1 −1 +1 +1 −1 +1 +1 +1 +1 −1 −1 −1 +1 −1] | [+1 +1 +1 −1] |
| 2 | [−1 −1 −1 +1 −1 −1 +1 −1 +1 +1 +1 −1 −1 −1 +1 −1] | [−1 −1 +1 −1] |
| 3 | [−1 −1 −1 +1 +1 +1 −1 +1 −1 −1 −1 +1 −1 −1 +1 −1] | [−1 +1 −1 −1] |
| 4 | [+1 +1 +1 −1 −1 −1 +1 −1 −1 −1 −1 +1 −1 −1 +1 −1] | [+1 −1 −1 −1] |
| 5 | [−1 −1 +1 −1 −1 −1 −1 +1 −1 −1 +1 −1 +1 +1 +1 −1] | [+1 +1 −1 +1] |
| 6 | [+1 +1 −1 +1 +1 +1 +1 −1 −1 −1 +1 −1 +1 +1 +1 −1] | [−1 −1 −1 +1] |
| 7 | [+1 +1 −1 +1 −1 −1 −1 +1 +1 +1 −1 +1 +1 +1 +1 −1] | [−1 +1 +1 +1] |
| 8 | [−1 −1 +1 −1 +1 +1 +1 −1 +1 +1 −1 +1 +1 +1 +1 −1] | [+1 −1 +1 +1] |

In some demonstrative embodiments, devices 102 and/or 140 may be configured to implement some or all of the pilot sequences defined in Table 21 and/or one or more additional or alternative pilot sequences.

In some demonstrative embodiments, for example, all of the sequences $P_{16}(i_{STS}, :)$, e.g., according to Tables 19 and/or 21, may be mutually orthogonal and/or may have a relatively low Peak to Average Power Ratio (PAPR) in a time domain.

In some demonstrative embodiments, for example, the sequences $P_4(i_{STS}, :)$, e.g., according to Table 21, may be mutually orthogonal, for example, in the group of $i_{STS}$=1, 2, 3, 4 and $i_{STS}$=5, 6, 7, 8, and/or may have a relatively low PAPR in the time domain.

In some demonstrative embodiments, device 140 may be configured to receive an OFDM mode transmission of an EDMG PPDU including at least one pilot sequence, e.g., as described below.

In some demonstrative embodiments, controller 154 may be configured to cause, trigger, and/or control a wireless station implemented by device 140, e.g., an EDMG STA, to receive from device 102 the OFDM mode transmission of the EDMG PPDU, for example, EDMG PPDU 200 (FIG. 2).

In one example, device 140 may receive the OFDM mode transmission over a channel bandwidth of 2.16 GHz, 4.32 GHz, 6.48 GHz, or 8.64 GHz.

In another example, device 140 may receive the OFDM mode transmission over any other channel bandwidth.

In some demonstrative embodiments, controller 154 may be configured to cause, trigger, and/or control the wireless station implemented by device 140 to process the OFDM mode transmission of the EDMG PPDU based on at least one pilot sequence corresponding to at least one respective space-time stream, e.g., as described below.

In some demonstrative embodiments, the pilot sequence may include a plurality of pilot values, a pilot value of the plurality of pilot values may be based on a space-time stream number of the space-time stream, an OFDM symbol number, and a subcarrier index, e.g., as described above.

In some demonstrative embodiments, controller 154 may be configured to cause, trigger, and/or control the wireless station implemented by device 140 to determine the pilot value by applying a phase shift to a predefined pilot value, e.g., as described below.

In some demonstrative embodiments, the phase shift may be based on the space-time stream number and the OFDM symbol number, and the predefined pilot value may be based on the space-time stream number and the subcarrier index, e.g., as described above.

In some demonstrative embodiments, the phase shift may include a product of a deterministic shift and a random shift, e.g., as described above.

For example, the deterministic shift may be based on the space-time stream number and the OFDM symbol number, and the random shift may be based on a scrambler output corresponding to the OFDM symbol number.

In some demonstrative embodiments, the deterministic shift may include the deterministic shift $W(i_{STS}, n)$, which may be defined, for example, according to Equation 5, e.g., as described above.

In some demonstrative embodiments, the phase shift may include a common phase shift, which is common over subcarriers, e.g., as described above.

In some demonstrative embodiments, controller 154 may be configured to cause, trigger, and/or control the wireless station implemented by device 140 to determine the predefined pilot value according to a predefined pilot sequence corresponding to the space-time stream number, e.g., as described below.

In some demonstrative embodiments, the predefined pilot sequence corresponding to the space-time stream number may be based on a count of one or more 2.16 GHz channels for reception of the EDMG PPDU, e.g., as described above.

In some demonstrative embodiments, the predefined pilot sequence corresponding to the space-time stream number may include the predefined pilot sequence $P_{16}(i_{STS}, :)$, for example, when the count of the one or more 2.16 GHz channels is one, e.g., as described above.

In some demonstrative embodiments, the predefined pilot sequence corresponding to the space-time stream number may include the predefined pilot sequence, denoted $P_{36}(i_{STS}, :)$, for example, when the count of the one or more 2.16 GHz channels is two, e.g., as described above.

In some demonstrative embodiments, the predefined pilot sequence corresponding to the space-time stream number may include the predefined pilot sequence, denoted $P_{56}(i_{STS}, :)$, for example, when the count of the one or more 2.16 GHz channels is three, e.g., as described above.

In some demonstrative embodiments, the predefined pilot sequence corresponding to the space-time stream number may include the predefined pilot sequence, denoted $P_{76}(i_{STS}, :)$, for example, when the count of the one or more 2.16 GHz channels is four, e.g., as described above.

In some demonstrative embodiments, the predefined pilot sequence corresponding to the space-time stream number may include at least one repetition of the predefined pilot sequence $P_{16}(i_{STS}, :)$, e.g., as described above.

In some demonstrative embodiments, controller 154 may be configured to cause, trigger, and/or control the wireless station implemented by device 140 to detect the plurality of pilot values at a plurality of pilot subcarrier indexes, which are frequency-channel dependent, and are independent of the space-time stream number and the OFDM symbol number.

Figure 3:
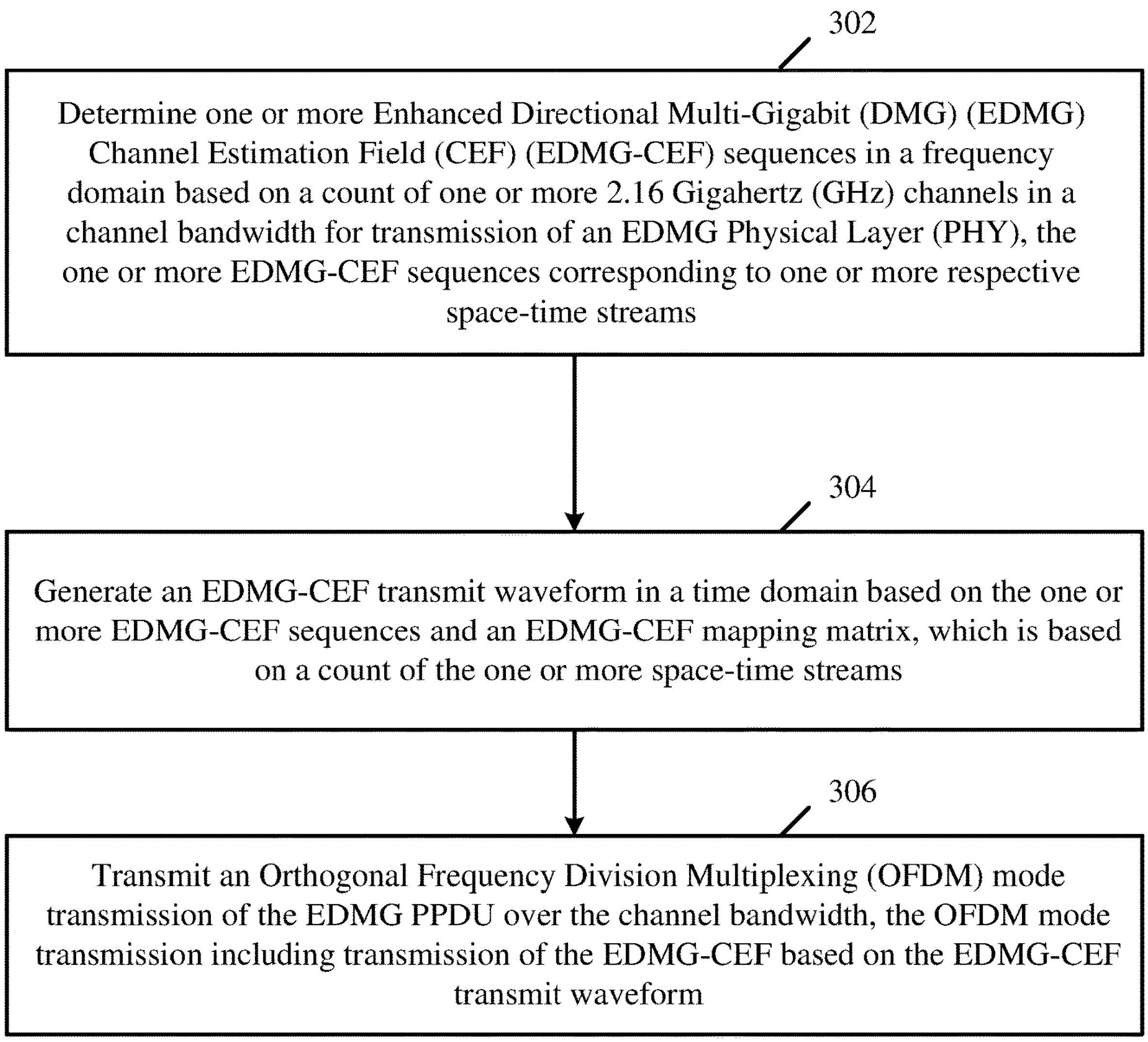
FIG. 3 is a schematic flow-chart illustration of a method of communicating an EDMG PPDU with a Channel Estimation Field (CEF), in accordance with some demonstrative embodiments.

Reference is made to FIG. 3, which schematically illustrates a method of communicating an EDMG PPDU with a CEF, in accordance with some demonstrative embodiments. For example, one or more of the operations of the method of FIG. 3 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 302, the method may include determining one or more EDMG-CEF sequences in a frequency domain based on a count of one or more 2.16 GHz channels in a channel bandwidth for transmission of an EDMG PPDU including an EDMG-CEF. For example, the one or more EDMG-CEF sequences may correspond to one or more respective space-time streams, e.g., as described above.

For example, controller 124 (FIG. 1) may be configured to cause, trigger, and/or control the wireless station implemented by device 102 (FIG. 1) to determine the one or more EDMG-CEF sequences in the frequency domain for transmission of the EDMG PPDU 200 (FIG. 2) including the EDMG-CEF 214 (FIG. 2), e.g., as described above.

As indicated at block 304, the method may include generating an EDMG-CEF transmit waveform in a time domain based on the one or more EDMG-CEF sequences and an EDMG-CEF mapping matrix, which may be based on a count of the one or more space-time streams. For example, controller 124 (FIG. 1) may be configured to cause, trigger, and/or control the wireless station implemented by device 102 (FIG. 1) to generate the EDMG-CEF transmit waveform in the time domain based on the EDMG-CEF sequences and an EDMG-CEF mapping matrix, e.g., as described above.

As indicated at block 306, the method may include transmitting an OFDM mode transmission of the EDMG PPDU over the channel bandwidth. For example, the OFDM mode transmission may include transmission of the EDMG-CEF based on the EDMG-CEF transmit waveform, e.g., as described above. For example, controller 124 (FIG. 1) may be configured to cause, trigger, and/or control the wireless station implemented by device 102 (FIG. 1) to transmit the OFDM mode transmission of the EDMG PPDU over the channel bandwidth, e.g., as described above.

Figure 4:
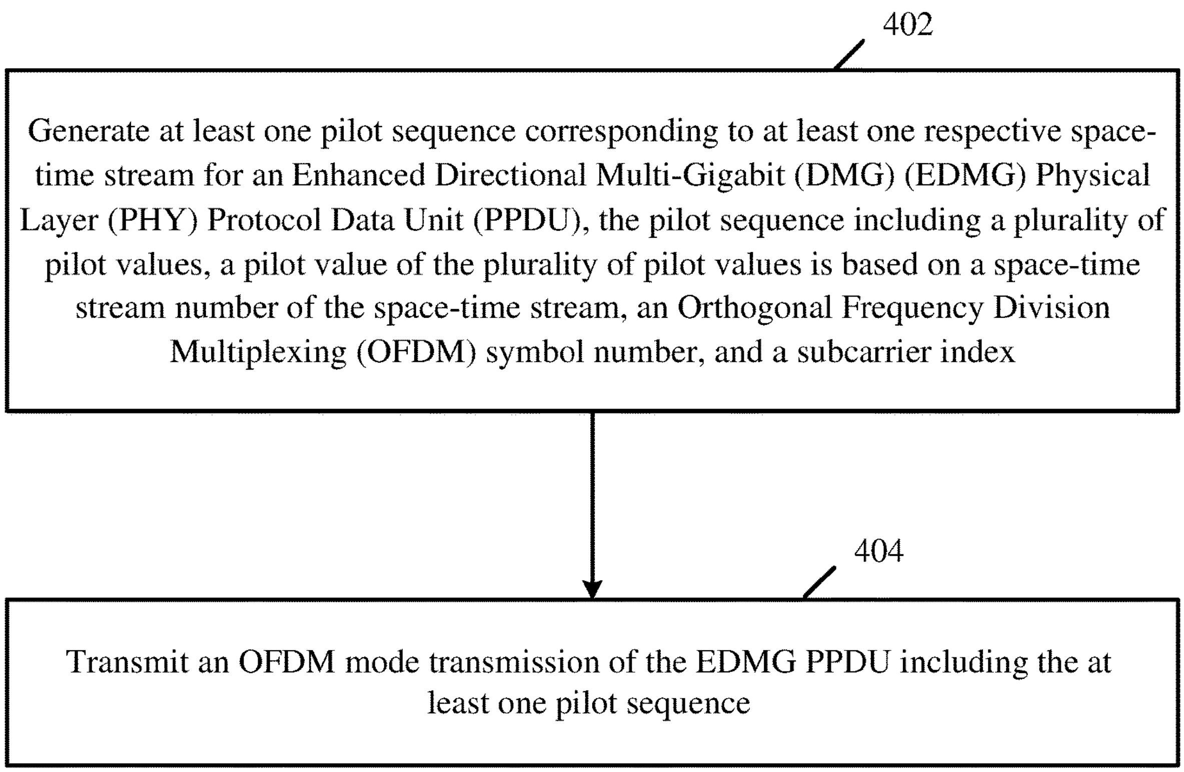
FIG. 4 is a schematic flow-chart illustration of a method of communicating an Orthogonal Frequency Division Multiplexing (OFDM) transmission with one or more pilot sequences, in accordance with some demonstrative embodiments.

Reference is made to FIG. 4, which schematically illustrates a method of communicating an OFDM transmission with one or more pilot sequences, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 402, the method may include generating at least one pilot sequence corresponding to at least one respective space-time stream for an EDMG PPDU. For example, controller 124 (FIG. 1) may be configured to cause, trigger, and/or control the wireless station implemented by device 102 (FIG. 1) to generate the at least one pilot sequence corresponding to the at least one respective space-time stream for the EDMG PPDU, e.g., as described above.

In some demonstrative embodiments, the pilot sequence may include a plurality of pilot values, a pilot value of the plurality of pilot values may be based on a space-time stream number of the space-time stream, an OFDM symbol number, and a subcarrier index, e.g., as described above.

As indicated at block 404, the method may include transmitting an OFDM mode transmission of the EDMG PPDU including the at least one pilot sequence. For example, controller 124 (FIG. 1) may be configured to cause, trigger, and/or control the wireless station implemented by device 102 (FIG. 1) to transmit the OFDM mode transmission of the EDMG PPDU including the at least one pilot sequence, e.g., as described above.

Figure 5:
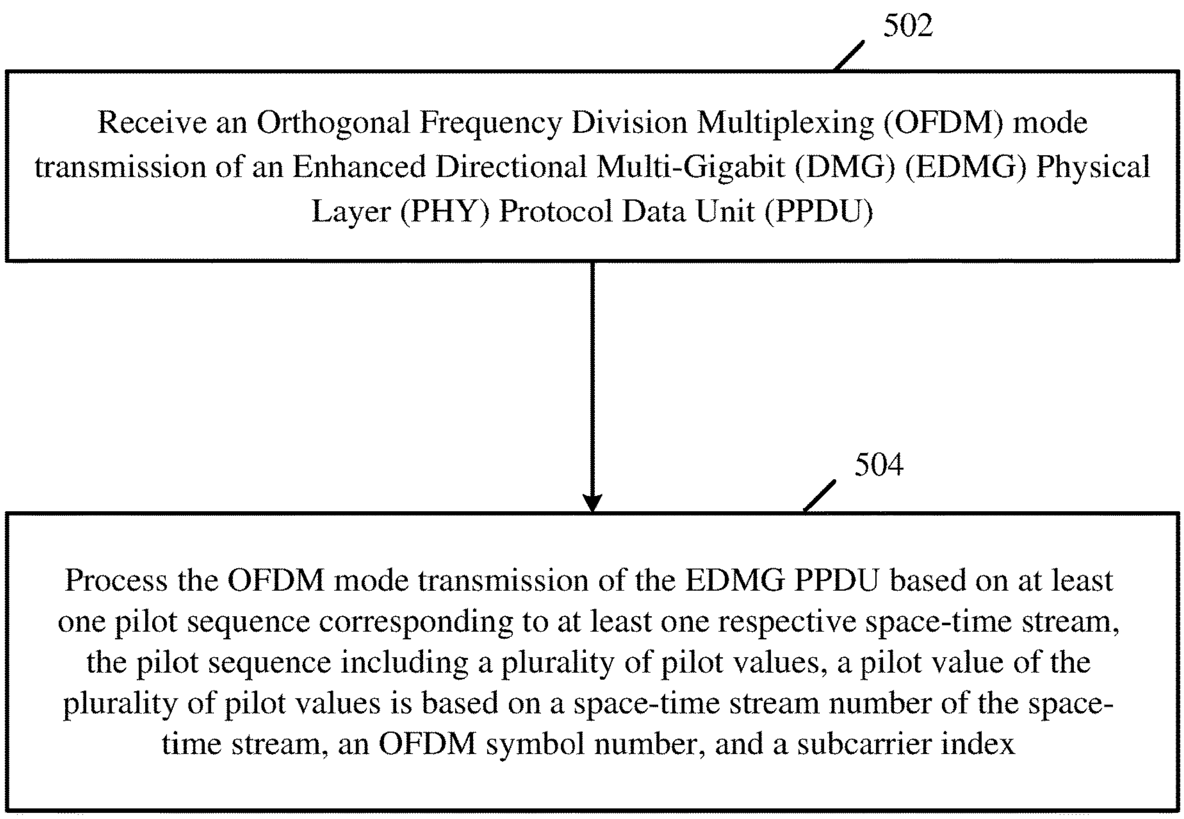
FIG. 5 is a schematic flow-chart illustration of a method of communicating an OFDM transmission with one or more pilot sequences, in accordance with some demonstrative embodiments.

Reference is made to FIG. 5, which schematically illustrates a method of communicating an OFDM transmission with one or more pilot sequences, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 502, the method may include receiving an OFDM mode transmission of an EDMG PPDU. For example, controller 154 (FIG. 1) may be configured to cause, trigger, and/or control the wireless station implemented by device 140 (FIG. 1) to receive from device 102 (FIG. 1) the OFDM mode transmission of the EDMG PPDU, e.g., as described above.

As indicated at block 504, the method may include processing the OFDM mode transmission of the EDMG PPDU based on at least one pilot sequence corresponding to at least one respective space-time stream. For example, controller 154 (FIG. 1) may be configured to cause, trigger, and/or control the wireless station implemented by device 140 (FIG. 1) to process the OFDM mode transmission of the EDMG PPDU based on the at least one pilot sequence corresponding to the at least one respective space-time stream, e.g., as described above.

In some demonstrative embodiments, the pilot sequence may include a plurality of pilot values, a pilot value of the plurality of pilot values may be based on a space-time stream number of the space-time stream, an OFDM symbol number, and a subcarrier index, e.g., as described above.

Figure 6:
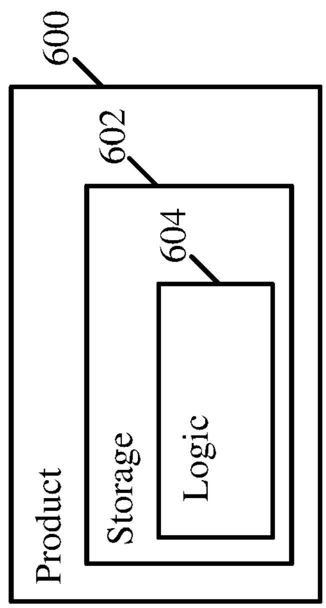
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include one or more tangible computer-readable ("machine-readable") non-transitory storage media 602, which may include computer-executable instructions, e.g., implemented by logic 604, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1) to perform, trigger and/or implement one or more operations and/or functionalities, and/or to perform, trigger and/or implement one or more operations and/or functionalities described with reference to the FIGS. 1, 2, 3, 4, and/or 5, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative embodiments, product 600 and/or machine readable storage media 602 may include one or more types of computer-readable storage media capable of storing data, including volatile memory, non-volatile memory, removable or non-removable memory, erasable or non-erasable memory, writeable or re-writeable memory, and the like. For example, machine readable storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause an Enhanced Directional Multi-Gigabit (DMG) (EDMG) wireless communication station (STA) to determine one or more EDMG Channel Estimation Field (CEF) (EDMG-CEF) sequences in a frequency domain based on a count of one or more 2.16 Gigahertz (GHz) channels in a channel bandwidth for transmission of an EDMG Physical Layer (PHY) Protocol Data Unit (PPDU) comprising an EDMG-CEF, the one or more EDMG-CEF sequences corresponding to one or more respective space-time streams; generate an EDMG-CEF transmit waveform in a time domain based on the one or more EDMG-CEF sequences and an EDMG-CEF mapping matrix, which is based on a count of the one or more space-time streams; and transmit an Orthogonal Frequency Division Multiplexing (OFDM) mode transmission of the EDMG PPDU over the channel bandwidth, the OFDM mode transmission comprising transmission of the EDMG-CEF based on the EDMG-CEF transmit waveform.

Example 2 includes the subject matter of Example 1, and optionally, wherein an EDMG-CEF sequence of the one or more EDMG-CEF sequences comprises first and second predefined sequences corresponding to an index of a space-time stream of the one or more space-time streams.

Example 3 includes the subject matter of Example 2, and optionally, wherein the EDMG-CEF sequence comprises the first predefined sequence followed by three zeros, which are followed by the second predefined sequence.

Example 4 includes the subject matter of Example 2 or 3, and optionally, wherein the first and second predefined sequences have a same length.

Example 5 includes the subject matter of any one of Examples 2-4, and optionally, wherein each of the first and second predefined sequences comprises a predefined sequence of symbols, each symbol of the sequence of symbols is +1, −1, +j, or −j.

Example 6 includes the subject matter of any one of Examples 1-5, and optionally, wherein the apparatus is configured to cause the EDMG STA to determine the one or more EDMG-CEF sequences according to one of the following definitions:

$\text{EDMG-CEF}^{iSTS}_{-177,\ 177}=[\text{Seq}^{iSTS}_{left,\ 176}, 0, 0, 0, \text{Seq}^{iSTS}_{right,\ 176}]$, for $i_{STS}$=1, 2, 3, 4, 5, 6, 7, 8, when the channel bandwidth comprises a 2.16 GHz channel, wherein $i_{STS}$ denotes a space-time stream index, $\text{EDMG-CEF}^{iSTS}_{-177,\ 177}$ denotes an EDMG-CEF sequence for the 2.16 GHz channel and the space-time stream index $i_{STS}$, $\text{Seq}^{iSTS}_{left,\ 176}$ denotes a first predefined sequence of length 176 corresponding to the space-time stream index $i_{STS}$, and $\text{Seq}^{iSTS}_{right,\ 176}$ denotes a second predefined sequence of length 176 corresponding to the space-time stream index $i_{STS}$;

$\text{EDMG-CEF}^{iSTS}_{-386,\ 386}=[\text{Seq}^{iSTS}_{left,\ 385}, 0, 0, 0, \text{Seq}^{iSTS}_{right,\ 385}]$, for $i_{STS}$=1, 2, 3, 4, 5, 6, 7, 8, when the channel bandwidth comprises a 4.32 GHz channel, wherein $\text{EDMG-CEF}^{iSTS}_{-386,\ 386}$ denotes an EDMG-CEF sequence for the 4.32 GHz channel and the space-time stream index $i_{STS}$, $\text{Seq}^{iSTS}_{left,\ 385}$ denotes a first predefined sequence of length 385 corresponding to the space-time stream index $i_{STS}$, and $\text{Seq}^{iSTS}_{right,\ 385}$ denotes a second predefined sequence of length 385 corresponding to the space-time stream index $i_{STS}$;

$\text{EDMG-CEF}^{iSTS}_{-596,\ 596}=[\text{Seq}^{iSTS}_{left,\ 595}, 0, 0, 0, \text{Seq}^{iSTS}_{right,\ 595}]$, for $i_{STS}$=1, 2, 3, 4, 5, 6, 7, 8, when the channel bandwidth comprises a 6.48 GHz channel, wherein $\text{EDMG-CEF}^{iSTS}_{-596,\ 596}$ denotes an EDMG-CEF sequence for the 6.48 GHz channel and the space-time stream index $i_{STS}$, $\text{Seq}^{iSTS}_{left,\ 595}$ denotes a first predefined sequence of length 595 corresponding to the space-time stream index $i_{STS}$, and $\text{Seq}^{iSTS}_{right,\ 595}$ denotes a second predefined sequence of length 595 corresponding to the space-time stream index $i_{STS}$; and $\text{EDMG-CEF}^{iSTS}_{-805,\ 805}=[\text{Seq}^{iSTS}_{left,\ 804}, 0, 0, 0, \text{Seq}^{iSTS}_{right,\ 804}]$, for $i_{STS}$=1, 2, 3, 4, 5, 6, 7, 8, when the channel bandwidth comprises a 8.64 GHz channel, wherein $\text{EDMG-CEF}^{iSTS}_{-805,\ 805}$ denotes an EDMG-CEF sequence for the 8.64 GHz channel and the space-time stream index $i_{STS}$, $\text{Seq}^{iSTS}_{left,\ 804}$ denotes a first predefined sequence of length 804 corresponding to the space-time stream index $i_{STS}$, and $\text{Seq}^{iSTS}_{right,\ 804}$ denotes a second predefined sequence of length 804 corresponding to the space-time stream index $i_{STS}$.

Example 7 includes the subject matter of any one of Examples 1-6, and optionally, wherein a length of each of the one or more EDMG-CEF sequences is based on the count of one or more 2.16 GHz channels.

Example 8 includes the subject matter of any one of Examples 1-7, and optionally, wherein the count of the one or more space-time streams is 1, 2, 3, 4, 5, 6, 7, or 8.

Example 9 includes the subject matter of any one of Examples 1-8, and optionally, wherein the EDMG-CEF mapping matrix, denoted $P_{EDMG\text{-}CEF}$, is based on the count of the one or more space time streams, denoted $N_{STS}$, as follows:

$$P_{EDMG-CEF}=[+1\ \ -1],\ \text{for}\ N_{STS}=1$$

$$P_{EDMG-CEF}=\begin{bmatrix}+1 & -1\\ +1 & +1\end{bmatrix},\ \text{for}\ N_{STS}=2$$

$$P_{EDMG-CEF}=\begin{bmatrix}+1 & -1 & +1\\ +1 & -w_3^1 & w_3^2\\ +1 & -w_3^2 & w_3^4\end{bmatrix},\ w_3=\exp(-j2\pi/3),\ \text{for}\ N_{STS}=3$$

$$P_{EDMG-CEF}=P_{4\times4}=\begin{bmatrix}+1 & -1 & +1 & +1\\ +1 & +1 & -1 & +1\\ +1 & +1 & +1 & -1\\ -1 & +1 & +1 & +1\end{bmatrix},\ \text{for}\ N_{STS}=4$$

$$P_{EDMG-CEF}=\begin{bmatrix}+1 & -1 & +1 & +1 & +1 & -1\\ +1 & -w_6^1 & w_6^2 & w_6^3 & w_6^4 & -w_6^5\\ +1 & -w_6^2 & w_6^4 & w_6^6 & w_6^8 & -w_6^{10}\\ +1 & -w_6^3 & w_6^6 & w_6^9 & w_6^{12} & -w_6^{15}\\ +1 & -w_6^4 & w_6^8 & w_6^{12} & w_6^{16} & -w_6^{20}\\ +1 & -w_6^5 & w_6^{10} & w_6^{15} & w_6^{20} & -w_6^{25}\end{bmatrix},$$

$$w_6=\exp(-j2\pi/6),\ \text{for}\ N_{STS}=5\ \text{or}\ 6$$

$$P_{EDMG-CEF}=\begin{bmatrix}P_{4\times4} & P_{4\times4}\\ P_{4\times4} & -P_{4\times4}\end{bmatrix},\ \text{for}\ N_{STS}=7\ \text{or}\ 8$$

Example 10 includes the subject matter of any one of Examples 1-9, and optionally, wherein the apparatus is configured to cause the EDMG STA to generate the EDMG-CEF transmit waveform based on a number of OFDM symbols in the EDMG-CEF, the number of OFDM symbols in the EDMG-CEF is based on the count of the one or more space time streams.

Example 11 includes the subject matter of Example 10, and optionally, wherein the number of OFDM symbols in the EDMG-CEF, denoted $N_{EDMG\text{-}CEF}^{N_{STS}}$, is based on the count of the one or more space time streams, denoted $N_{STS}$, as follows:

$N_{EDMG\text{-}CEF}^{N_{STS}}=2$, for $N_{STS}=1$ $N_{EDMG\text{-}CEF}^{N_{STS}}=2$, for $N_{STS}=2$ $N_{EDMG\text{-}CEF}^{N_{STS}}=3$, for $N_{STS}=3$ $N_{EDMG\text{-}CEF}^{N_{STS}}=4$, for $N_{STS}=4$ $N_{EDMG\text{-}CEF}^{N_{STS}}=6$, for $N_{STS}=5$ or 6

$N_{EDMG\text{-}CEF}^{N_{STS}}=8$, for $N_{STS}=7$ or 8

Example 12 includes the subject matter of any one of Examples 1-11, and optionally, wherein the apparatus is configured to cause the EDMG STA to generate the EDMG-CEF transmit waveform, denoted $r_{EDMG\text{-}CEF}^{n,i_{TX}}(qT_s)$, as follows:

$$r_{EDMG-CEF}^{n,i_{TX}}(qT_s) = \frac{1}{\sqrt{N_{STS}\cdot N_{Tones}}}w(qT_s)\cdot \sum_{k=-N_{SR}}^{N_{SR}}\sum_{i_{STS}=1}^{N_{STS}}[Q_k]_{i_{TX},i_{STS}}[P_{EDMG-CEF}]_{i_{STS},n} EDMG-CEF_k^{i_{STS}}\exp(j2\pi k\Delta_F(qT_s - T_{GI\ long})),$$

$$1 \le n \le N_{EDMG-CEF}^{N_{STS}}$$

wherein:

$N_{Tones}=N_{ST}-N_{DC}$ denotes total number of active tones;

$Q_k$ denotes a spatial mapping matrix per k-th subcarrier;

$P_{EDMG\text{-}CEF}$ denotes the EDMG-CEF mapping matrix;

$N_{EDMG\text{-}CEF}^{N_{STS}}$ denotes a number of OFDM symbols in the EDMG-CEF for the count of space-time streams, denoted $N_{STS}$;

$[\ ]_{m,n}$ denotes a matrix element from m-th row and n-th column; and $w(qT_s)$ denotes a window function to smooth transitions between consecutive OFDM symbols.

Example 13 includes the subject matter of any one of Examples 1-12, and optionally, wherein the channel bandwidth is 2.16 GHz, 4.32 GHz, 6.48 GHz, or 8.64 GHz.

Example 14 includes the subject matter of any one of Examples 1-13, and optionally, comprising a radio.

Example 15 includes the subject matter of any one of Examples 1-14, and optionally, comprising one or more antennas.

Example 16 includes a system of wireless communication comprising an Enhanced Directional Multi-Gigabit (DMG) (EDMG) wireless communication station (STA), the EDMG STA comprising a radio; a memory; a processor; one or more antennas; and a controller configured to cause the EDMG STA to determine one or more EDMG Channel Estimation Field (CEF) (EDMG-CEF) sequences in a frequency domain based on a count of one or more 2.16 Gigahertz (GHz) channels in a channel bandwidth for transmission of an EDMG Physical Layer (PHY) Protocol Data Unit (PPDU) comprising an EDMG-CEF, the one or more EDMG-CEF sequences corresponding to one or more respective space-time streams; generate an EDMG-CEF transmit waveform in a time domain based on the one or more EDMG-CEF sequences and an EDMG-CEF mapping matrix, which is based on a count of the one or more space-time streams; and transmit an Orthogonal Frequency Division Multiplexing (OFDM) mode transmission of the EDMG PPDU over the channel bandwidth, the OFDM mode transmission comprising transmission of the EDMG-CEF based on the EDMG-CEF transmit waveform.

Example 17 includes the subject matter of Example 16, and optionally, wherein an EDMG-CEF sequence of the one or more EDMG-CEF sequences comprises first and second predefined sequences corresponding to an index of a space-time stream of the one or more space-time streams.

Example 18 includes the subject matter of Example 17, and optionally, wherein the EDMG-CEF sequence comprises the first predefined sequence followed by three zeros, which are followed by the second predefined sequence.

Example 19 includes the subject matter of Example 17 or 18, and optionally, wherein the first and second predefined sequences have a same length.

Example 20 includes the subject matter of any one of Examples 17-19, and optionally, wherein each of the first and second predefined sequences comprises a predefined sequence of symbols, each symbol of the sequence of symbols is +1, −1, +j, or −j.

Example 21 includes the subject matter of any one of Examples 17-20, and optionally, wherein the controller is configured to cause the EDMG STA to determine the one or more EDMG-CEF sequences according to one of the following definitions:

$EDMG\text{-}CEF^{iSTS}_{-177,\ 177}=[Seq^{iSTS}_{left,\ 176}, 0, 0, 0, Seq^{iSTS}_{right,\ 176}]$, for $i_{STS}=1, 2, 3, 4, 5, 6, 7, 8$, when the channel bandwidth comprises a 2.16 GHz channel, wherein $i_{STS}$ denotes a space-time stream index, $EDMG\text{-}CEF^{iSTS}_{-177,\ 177}$ denotes an EDMG-CEF sequence for the 2.16 GHz channel and the space-time stream index $i_{STS}$, $Seq^{iSTS}_{left,\ 176}$ denotes a first predefined sequence of length 176 corresponding to the space-time stream index $i_{STS}$, and $Seq^{iSTS}_{right,\ 176}$ denotes a second predefined sequence of length 176 corresponding to the space-time stream index $i_{STS}$;

$EDMG\text{-}CEF^{iSTS}_{-386,\ 386}=[Seq^{iSTS}_{left,\ 385}, 0, 0, 0, Seq^{iSTS}_{right,\ 385}]$, for $i_{STS}=1, 2, 3, 4, 5, 6, 7, 8$, when the channel bandwidth comprises a 4.32 GHz channel, wherein $EDMG\text{-}CEF^{iSTS}_{-386,\ 386}$ denotes an EDMG-CEF sequence for the 4.32 GHz channel and the space-time stream index $i_{STS}$, $Seq^{iSTS}_{left,\ 385}$ denotes a first predefined sequence of length 385 corresponding to the space-time stream index $i_{STS}$, and $Seq^{iSTS}_{right,\ 385}$ denotes a second predefined sequence of length 385 corresponding to the space-time stream index $i_{STS}$;

$EDMG\text{-}CEF^{iSTS}_{-596,\ 596}=[Seq^{iSTS}_{left,\ 595}, 0, 0, 0, Seq^{iSTS}_{right,\ 595}]$, for $i_{STS}=1, 2, 3, 4, 5, 6, 7, 8$, when the channel bandwidth comprises a 6.48 GHz channel, wherein $EDMG\text{-}CEF^{iSTS}_{-596,\ 596}$ denotes an EDMG-CEF sequence for the 6.48 GHz channel and the space-time stream index $i_{STS}$, $Seq^{iSTS}_{left,\ 595}$ denotes a first predefined sequence of length 595 corresponding to the space-time stream index $i_{STS}$, and $Seq^{iSTS}_{right,\ 595}$ denotes a second predefined sequence of length 595 corresponding to the space-time stream index $i_{STS}$; and $EDMG\text{-}CEF^{iSTS}_{-805,\ 805}=[Seq^{iSTS}_{left,\ 804}, 0, 0, 0, Seq^{iSTS}_{right,\ 804}]$, for $i_{STS}=1, 2, 3, 4, 5, 6, 7, 8$, when the channel bandwidth comprises a 8.64 GHz channel, wherein $EDMG\text{-}CEF^{iSTS}_{-805,\ 805}$ denotes an EDMG-CEF sequence for the 8.64 GHz channel and the space-time stream index $i_{STS}$, $Seq^{iSTS}_{left,\ 804}$ denotes a first predefined sequence of length 804 corresponding to the space-time stream index $i_{STS}$, and $Seq^{iSTS}_{right,\ 804}$ denotes a second predefined sequence of length 804 corresponding to the space-time stream index $i_{STS}$.

Example 22 includes the subject matter of any one of Examples 16-21, and optionally, wherein a length of each of the one or more EDMG-CEF sequences is based on the count of one or more 2.16 GHz channels.

Example 23 includes the subject matter of any one of Examples 16-22, and optionally, wherein the count of the one or more space-time streams is 1, 2, 3, 4, 5, 6, 7, or 8.

Example 24 includes the subject matter of any one of Examples 16-23, and optionally, wherein the EDMG-CEF mapping matrix, denoted $P_{EDMG\text{-}CEF}$, is based on the count of the one or more space time streams, denoted $N_{STS}$, as follows:

$$P_{EDMG-CEF} = [+1 \ \ -1], \text{ for } N_{STS} = 1$$

$$P_{EDMG-CEF} = \begin{bmatrix} +1 & -1 \\ +1 & +1 \end{bmatrix}, \text{ for } N_{STS} = 2$$

$$P_{EDMG-CEF} = \begin{bmatrix} +1 & -1 & +1 \\ +1 & -w_3^1 & w_3^2 \\ +1 & -w_3^2 & w_3^4 \end{bmatrix}, w_3 = \exp(-j2\pi/3), \text{ for } N_{STS} = 3$$

$$P_{EDMG-CEF} = P_{4\times4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix}, \text{ for } N_{STS} = 4$$

$$P_{EDMG-CEF} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix},$$

$$w_6 = \exp(-j2\pi/6), \text{ for } N_{STS} = 5 \text{ or } 6$$

$$P_{EDMG-CEF} = \begin{bmatrix} P_{4\times4} & P_{4\times4} \\ P_{4\times4} & -P_{4\times4} \end{bmatrix}, \text{ for } N_{STS} = 7 \text{ or } 8$$

Example 25 includes the subject matter of any one of Examples 16-24, and optionally, wherein the controller is configured to cause the EDMG STA to generate the EDMG-CEF transmit waveform based on a number of OFDM symbols in the EDMG-CEF, the number of OFDM symbols in the EDMG-CEF is based on the count of the one or more space time streams.

Example 26 includes the subject matter of Example 25, and optionally, wherein the number of OFDM symbols in the EDMG-CEF, denoted $N_{EDMG\text{-}CEF}^{N_{STS}}$, is based on the count of the one or more space time streams, denoted $N_{STS}$, as follows:

$N_{EDMG\text{-}CEF}^{N_{STS}}=2$, for $N_{STS}=1$ $N_{EDMG\text{-}CEF}^{N_{STS}}=2$, for $N_{STS}=2$ $N_{EDMG\text{-}CEF}^{N_{STS}}=3$, for $N_{STS}=3$ $N_{EDMG\text{-}CEF}^{N_{STS}}=4$, for $N_{STS}=4$ $N_{EDMG\text{-}CEF}^{N_{STS}}=6$, for $N_{STS}=5$ or 6

$N_{EDMG\text{-}CEF}^{N_{STS}}=8$, for $N_{STS}=7$ or 8

Example 27 includes the subject matter of any one of Examples 16-26, and optionally, wherein the controller is configured to cause the EDMG STA to generate the EDMG-CEF transmit waveform, denoted $r_{EDMG\text{-}CEF}^{n,i_{TX}}(qT_s)$, as follows:

$$r_{EDMG-CEF}^{n,i_{TX}}(qT_s) = \frac{1}{\sqrt{N_{STS} \cdot N_{Tones}}} w(qT_s) \cdot \sum_{k=-N_{SR}}^{N_{SR}} \sum_{i_{STS}=1}^{N_{STS}} [Q_k]_{i_{TX},i_{STS}} [P_{EDMG-CEF}]_{i_{STS},n} EDMG-CEF_k^{i_{STS}} \exp(j2\pi k\Delta_F(qT_s - T_{GI\ long})),$$

$$1 \le n \le N_{EDMG-CEF}^{N_{STS}}$$

wherein:

$N_{Tones}=N_{ST}-N_{DC}$ denotes total number of active tones;

$Q_k$ denotes a spatial mapping matrix per k-th subcarrier;

$P_{EDMG\text{-}CEF}$ denotes the EDMG-CEF mapping matrix;

$N_{EDMG\text{-}CEF}^{N_{STS}}$ denotes a number of OFDM symbols in the EDMG-CEF for the count of space-time streams, denoted $N_{STS}$;

$[\ ]_{m,n}$ denotes a matrix element from m-th row and n-th column; and $w(qT_s)$ denotes a window function to smooth transitions between consecutive OFDM symbols.

Example 28 includes the subject matter of any one of Examples 16-27, and optionally, wherein the channel bandwidth is 2.16 GHz, 4.32 GHz, 6.48 GHz, or 8.64 GHz.

Example 29 includes a method to be performed at an Enhanced Directional Multi-Gigabit (DMG) (EDMG) wireless communication station (STA), the method comprising determining one or more EDMG Channel Estimation Field (CEF) (EDMG-CEF) sequences in a frequency domain based on a count of one or more 2.16 Gigahertz (GHz) channels in a channel bandwidth for transmission of an EDMG Physical Layer (PHY) Protocol Data Unit (PPDU) comprising an EDMG-CEF, the one or more EDMG-CEF sequences corresponding to one or more respective space-time streams; generating an EDMG-CEF transmit waveform in a time domain based on the one or more EDMG-CEF sequences and an EDMG-CEF mapping matrix, which is based on a count of the one or more space-time streams; and transmitting an Orthogonal Frequency Division Multiplexing (OFDM) mode transmission of the EDMG PPDU over the channel bandwidth, the OFDM mode transmission comprising transmission of the EDMG-CEF based on the EDMG-CEF transmit waveform.

Example 30 includes the subject matter of Example 29, and optionally, wherein an EDMG-CEF sequence of the one or more EDMG-CEF sequences comprises first and second predefined sequences corresponding to an index of a space-time stream of the one or more space-time streams.

Example 31 includes the subject matter of Example 30, and optionally, wherein the EDMG-CEF sequence comprises the first predefined sequence followed by three zeros, which are followed by the second predefined sequence.

Example 32 includes the subject matter of Example 30 or 31, and optionally, wherein the first and second predefined sequences have a same length.

Example 33 includes the subject matter of any one of Examples 30-32, and optionally, wherein each of the first and second predefined sequences comprises a predefined sequence of symbols, each symbol of the sequence of symbols is +1, −1, +j, or −j.

Example 34 includes the subject matter of any one of Examples 29-33, and optionally, comprising determining the one or more EDMG-CEF sequences according to one of the following definitions:

$EDMG\text{-}CEF^{iSTS}$=[$Seq^{iSTS}_{left,\ 176}$, 0, 0, 0, $Seq^{iSTS}_{right,\ 176}$], for $i_{STS}$=1, 2, 3, 4, 5, 6, 7, 8, when the channel bandwidth comprises a 2.16 GHz channel, wherein $i_{STS}$ denotes a space-time stream index, $EDMG\text{-}CEF^{iSTS}_{-177,\ 177}$ denotes an EDMG-CEF sequence for the 2.16 GHz channel and the space-time stream index $i_{STS}$, $Seq^{iSTS}_{left,\ 176}$ denotes a first predefined sequence of length 176 corresponding to the space-time stream index $i_{STS}$, and $Seq^{iSTS}_{right,\ 176}$ denotes a second predefined sequence of length 176 corresponding to the space-time stream index $i_{STS}$;

$EDMG\text{-}CEF^{iSTS}_{-386,\ 386}$=[$Seq^{iSTS}_{left,\ 385}$, 0, 0, 0, $Seq^{iSTS}_{right,\ 385}$], for $i_{STS}$=1, 2, 3, 4, 5, 6, 7, 8, when the channel bandwidth comprises a 4.32 GHz channel, wherein $EDMG\text{-}CEF^{iSTS}_{-386,\ 386}$ denotes an EDMG-CEF sequence for the 4.32 GHz channel and the space-time stream index $i_{STS}$, $Seq^{iSTS}_{left,\ 385}$ denotes a first predefined sequence of length 385 corresponding to the space-time stream index $i_{STS}$, and $Seq^{iSTS}_{right,\ 385}$ denotes a second predefined sequence of length 385 corresponding to the space-time stream index $i_{STS}$;

$EDMG\text{-}CEF^{iSTS}_{-596,\ 596}$=[$Seq^{iSTS}_{left,\ 595}$, 0, 0, 0, $Seq^{iSTS}_{right,\ 595}$], for $i_{STS}$=1, 2, 3, 4, 5, 6, 7, 8, when the channel bandwidth comprises a 6.48 GHz channel, wherein $EDMG\text{-}CEF^{iSTS}_{-596,\ 596}$ denotes an EDMG-CEF sequence for the 6.48 GHz channel and the space-time stream index $i_{STS}$, $Seq^{iSTS}_{left,\ 595}$ denotes a first predefined sequence of length 595 corresponding to the space-time stream index $i_{STS}$, and $Seq^{iSTS}_{right,\ 595}$ denotes a second predefined sequence of length 595 corresponding to the space-time stream index $i_{STS}$; and $EDMG\text{-}CEF^{iSTS}_{-805,\ 805}$=[$Seq^{iSTS}_{left,\ 804}$, 0, 0, 0, $Seq^{iSTS}_{right,\ 804}$], for $i_{STS}$=1, 2, 3, 4, 5, 6, 7, 8, when the channel bandwidth comprises a 8.64 GHz channel, wherein $EDMG\text{-}CEF^{iSTS}_{-805,\ 805}$ denotes an EDMG-CEF sequence for the 8.64 GHz channel and the space-time stream index $i_{STS}$, $Seq^{iSTS}_{left,\ 804}$ denotes a first predefined sequence of length 804 corresponding to the space-time stream index $i_{STS}$, and $Seq^{iSTS}_{right,\ 804}$ denotes a second predefined sequence of length 804 corresponding to the space-time stream index $i_{STS}$.

Example 35 includes the subject matter of any one of Examples 29-34, and optionally, wherein a length of each of the one or more EDMG-CEF sequences is based on the count of one or more 2.16 GHz channels.

Example 36 includes the subject matter of any one of Examples 29-35, and optionally, wherein the count of the one or more space-time streams is 1, 2, 3, 4, 5, 6, 7, or 8.

Example 37 includes the subject matter of any one of Examples 29-36, and optionally, wherein the EDMG-CEF mapping matrix, denoted $P_{EDMG\text{-}CEF}$, is based on the count of the one or more space time streams, denoted $N_{STS}$, as follows:

$$P_{EDMG-CEF} = [+1\ \ -1], \text{ for } N_{STS} = 1$$

$$P_{EDMG-CEF} = \begin{bmatrix} +1 & -1 \\ +1 & +1 \end{bmatrix}, \text{ for } N_{STS} = 2$$

$$P_{EDMG-CEF} = \begin{bmatrix} +1 & -1 & +1 \\ +1 & -w_3^1 & w_3^2 \\ +1 & -w_3^2 & w_3^4 \end{bmatrix}, w_3 = \exp(-j2\pi/3), \text{ for } N_{STS} = 3$$

$$P_{EDMG-CEF} = P_{4\times4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix}, \text{ for } N_{STS} = 4$$

-continued $$P_{EDMG-CEF} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix},$$

$$w_6 = \exp(-j2\pi/6), \text{ for } N_{STS} = 5 \text{ or } 6$$

$$P_{EDMG-CEF} = \begin{bmatrix} P_{4\times4} & P_{4\times4} \\ P_{4\times4} & -P_{4\times4} \end{bmatrix}, \text{ for } N_{STS} = 7 \text{ or } 8$$

Example 38 includes the subject matter of any one of Examples 29-37, and optionally, comprising generating the EDMG-CEF transmit waveform based on a number of OFDM symbols in the EDMG-CEF, the number of OFDM symbols in the EDMG-CEF is based on the count of the one or more space time streams.

Example 39 includes the subject matter of Example 38, and optionally, wherein the number of OFDM symbols in the EDMG-CEF, denoted $N_{EDMG\text{-}CEF}^{N_{STS}}$, is based on the count of the one or more space time streams, denoted $N_{STS}$, as follows:

$N_{EDMG\text{-}CEF}^{NSTS}$=2, for $N_{STS}$=1

$N_{EDMG\text{-}CEF}^{NSTS}$=2, for $N_{STS}$=2

$N_{EDMG\text{-}CEF}^{NSTS}$=3, for $N_{STS}$=3

$N_{EDMG\text{-}CEF}^{NSTS}$=4, for $N_{STS}$=4

$N_{EDMG\text{-}CEF}^{NSTS}$=6, for $N_{STS}$=5 or 6

$N_{EDMG\text{-}CEF}^{NSTS}$=8, for $N_{STS}$=7 or 8

Example 40 includes the subject matter of any one of Examples 29-39, and optionally, comprising generating the EDMG-CEF transmit waveform, denoted $N_{EDMG\text{-}CEF}^{n,i_{TX}}(qT_s)$ as follows:

$$r^{n,i_{TX}}_{EDMG-CEF}(qT_s) = \frac{1}{\sqrt{N_{STS}\cdot N_{Tones}}} w(qT_s)\cdot \sum_{k=-N_{SR}}^{N_{SR}} \sum_{i_{STS}=1}^{N_{STS}} [Q_k]_{i_{TX},i_{STS}} [P_{EDMG-CEF}]_{i_{STS},n} EDMG-CEF_k^{i_{STS}} \exp(j2\pi k\Delta_F(qT_s - T_{GI\ long})),$$

$$1 \le n \le N^{N_{STS}}_{EDMG-CEF}$$

wherein:

$N_{Tones}$=$N_{ST}$− $N_{DC}$ denotes total number of active tones;

$Q_k$ denotes a spatial mapping matrix per k-th subcarrier;

$P_{EDMG\text{-}CEF}$ denotes the EDMG-CEF mapping matrix;

$N_{EDMG\text{-}CEF}^{N_{STS}}$ denotes a number of OFDM symbols in the EDMG-CEF for the count of space-time streams, denoted $N_{STS}$;

$[\ ]_{m,n}$ denotes a matrix element from m-th row and n-th column; and $w(qT_s)$ denotes a window function to smooth transitions between consecutive OFDM symbols.

Example 41 includes the subject matter of any one of Examples 29-40, and optionally, wherein the channel bandwidth is 2.16 GHz, 4.32 GHz, 6.48 GHz, or 8.64 GHz.

Example 42 includes a product comprising one or more tangible computer-readable non-transitory storage media comprising computer-executable instructions operable to, when executed by at least one processor, enable the at least one processor to cause an Enhanced Directional Multi-Gigabit (DMG) (EDMG) wireless communication station (STA) to determine one or more EDMG Channel Estimation Field (CEF) (EDMG-CEF) sequences in a frequency domain based on a count of one or more 2.16 Gigahertz (GHz) channels in a channel bandwidth for transmission of an EDMG Physical Layer (PHY) Protocol Data Unit (PPDU) comprising an EDMG-CEF, the one or more EDMG-CEF sequences corresponding to one or more respective space-time streams; generate an EDMG-CEF transmit waveform in a time domain based on the one or more EDMG-CEF sequences and an EDMG-CEF mapping matrix, which is based on a count of the one or more space-time streams; and transmit an Orthogonal Frequency Division Multiplexing (OFDM) mode transmission of the EDMG PPDU over the channel bandwidth, the OFDM mode transmission comprising transmission of the EDMG-CEF based on the EDMG-CEF transmit waveform.

Example 43 includes the subject matter of Example 42, and optionally, wherein an EDMG-CEF sequence of the one or more EDMG-CEF sequences comprises first and second predefined sequences corresponding to an index of a space-time stream of the one or more space-time streams.

Example 44 includes the subject matter of Example 43, and optionally, wherein the EDMG-CEF sequence comprises the first predefined sequence followed by three zeros, which are followed by the second predefined sequence.

Example 45 includes the subject matter of Example 43 or 44, and optionally, wherein the first and second predefined sequences have a same length.

Example 46 includes the subject matter of any one of Examples 43-45, and optionally, wherein each of the first and second predefined sequences comprises a predefined sequence of symbols, each symbol of the sequence of symbols is +1, −1, +j, or −j.

Example 47 includes the subject matter of any one of Examples 42-46, and optionally, wherein the instructions, when executed, cause the EDMG STA to determine the one or more EDMG-CEF sequences according to one of the following definitions:

EDMG-CEF$^{iSTS}$1=[Seq$^{iSTS}_{left,\ 176}$, 0, 0, 0, Seq$^{iSTS}_{right,\ 176}$], for $i_{STS}$=1, 2, 3, 4, 5, 6, 7, 8, when the channel bandwidth comprises a 2.16 GHz channel, wherein $i_{STS}$ denotes a space-time stream index, EDMG-CEF$^{iSTS}_{-177,\ 177}$ denotes an EDMG-CEF sequence for the 2.16 GHz channel and the space-time stream index $i_{STS}$, Seq$^{iSTS}_{left,\ 176}$ denotes a first predefined sequence of length 176 corresponding to the space-time stream index $i_{STS}$, and Seq$^{iSTS}_{right,\ 176}$ denotes a second predefined sequence of length 176 corresponding to the space-time stream index $i_{STS}$;

EDMG-CEF$^{iSTS}_{-386,\ 386}$=[Seq$^{iSTS}_{left,\ 385}$, 0, 0, 0, Seq$^{iSTS}_{right,\ 385}$], for $i_{STS}$=1, 2, 3, 4, 5, 6, 7, 8, when the channel bandwidth comprises a 4.32 GHz channel, wherein EDMG-CEF$^{iSTS}_{-386,\ 386}$ denotes an EDMG-CEF sequence for the 4.32 GHz channel and the space-time stream index $i_{STS}$, Seq$^{iSTS}_{left,\ 385}$ denotes a first predefined sequence of length 385 corresponding to the space-time stream index $i_{STS}$, and Seq$^{iSTS}_{right,\ 385}$ denotes a second predefined sequence of length 385 corresponding to the space-time stream index $i_{STS}$;

EDMG-CEF$^{iSTS}_{-596,\ 596}$=[Seq$^{iSTS}_{left,\ 595}$, 0, 0, 0, Seq$^{iSTS}_{right,\ 595}$], for $i_{STS}$=1, 2, 3, 4, 5, 6, 7, 8, when the channel bandwidth comprises a 6.48 GHz channel, wherein EDMG-CEF$^{iSTS}_{-596,\ 596}$ denotes an EDMG-CEF sequence for the 6.48 GHz channel and the space-time stream index $i_{STS}$, Seq$^{iSTS}_{left,\ 595}$ denotes a first predefined sequence of length 595 corresponding to the space-time stream index $i_{STS}$, and Seq$^{iSTS}_{right,\ 595}$ denotes a second predefined sequence of length 595 corresponding to the space-time stream index $i_{STS}$; and EDMG-CEF$^{iSTS}_{-805,\ 805}$=[Seq$^{iSTS}_{left,\ 804}$, 0, 0, 0, Seq$^{iSTS}_{right,\ 804}$], for $i_{STS}$=1, 2, 3, 4, 5, 6, 7, 8, when the channel bandwidth comprises a 8.64 GHz channel, wherein EDMG-CEF$^{iSTS}_{-805,\ 805}$ denotes an EDMG-CEF sequence for the 8.64 GHz channel and the space-time stream index $i_{STS}$, Seq$^{iSTS}_{left,\ 804}$ denotes a first predefined sequence of length 804 corresponding to the space-time stream index $i_{STS}$, and Seq$^{iSTS}_{right,\ 804}$ denotes a second predefined sequence of length 804 corresponding to the space-time stream index $i_{STS}$.

Example 48 includes the subject matter of any one of Examples 42-47, and optionally, wherein a length of each of the one or more EDMG-CEF sequences is based on the count of one or more 2.16 GHz channels.

Example 49 includes the subject matter of any one of Examples 42-48, and optionally, wherein the count of the one or more space-time streams is 1, 2, 3, 4, 5, 6, 7, or 8.

Example 50 includes the subject matter of any one of Examples 42-49, and optionally, wherein the EDMG-CEF mapping matrix, denoted $P_{EDMG-CEF}$, is based on the count of the one or more space time streams, denoted $N_{STS}$, as follows:

$$P_{EDMG-CEF} = [+1\ -1],\ \text{for } N_{STS} = 1$$

$$P_{EDMG-CEF} = \begin{bmatrix} +1 & -1 \\ +1 & +1 \end{bmatrix},\ \text{for } N_{STS} = 2$$

$$P_{EDMG-CEF} = \begin{bmatrix} +1 & -1 & +1 \\ +1 & -w_3^1 & w_3^2 \\ +1 & -w_3^2 & w_3^4 \end{bmatrix},\ w_3 = \exp(-j2\pi/3),\ \text{for } N_{STS} = 3$$

$$P_{EDMG-CEF} = P_{4x4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix},\ \text{for } N_{STS} = 4$$

$$P_{EDMG-CEF} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix},$$

$$w_6 = \exp(-j2\pi/6),\ \text{for } N_{STS} = 5 \text{ or } 6$$

$$P_{EDMG-CEF} = \begin{bmatrix} P_{4x4} & P_{4x4} \\ P_{4x4} & -P_{4x4} \end{bmatrix},\ \text{for } N_{STS} = 7 \text{ or } 8$$

Example 51 includes the subject matter of any one of Examples 42-50, and optionally, wherein the instructions, when executed, cause the EDMG STA to generate the EDMG-CEF transmit waveform based on a number of OFDM symbols in the EDMG-CEF, the number of OFDM symbols in the EDMG-CEF is based on the count of the one or more space time streams.

Example 52 includes the subject matter of Example 51, and optionally, wherein the number of OFDM symbols in the EDMG-CEF, denoted $N_{EDMG-CEF}^{N_{STS}}$, is based on the count of the one or more space time streams, denoted $N_{STS}$, as follows:

$$N_{EDMG\text{-}CEF}^{N_{STS}}=2,\ \text{for}\ N_{STS}=1$$

$$N_{EDMG\text{-}CEF}^{N_{STS}}=2,\ \text{for}\ N_{STS}=2$$

$$N_{EDMG\text{-}CEF}^{N_{STS}}=3,\ \text{for}\ N_{STS}=3$$

$$N_{EDMG\text{-}CEF}^{N_{STS}}=4,\ \text{for}\ N_{STS}=4$$

$$N_{EDMG\text{-}CEF}^{N_{STS}}=6,\ \text{for}\ N_{STS}=5\ \text{or}\ 6$$

$$N_{EDMG\text{-}CEF}^{N_{STS}}=8,\ \text{for}\ N_{STS}=7\ \text{or}\ 8$$

Example 53 includes the subject matter of any one of Examples 42-52, and optionally, wherein the instructions, when executed, cause the EDMG STA to generate the EDMG-CEF transmit waveform, denoted $r_{EDMG\text{-}CEF}^{n,i_{TX}}(qT_s)$, as follows:

$$r_{EDMG-CEF}^{n,i_{TX}}(qT_s) = \frac{1}{\sqrt{N_{STS}\cdot N_{Tones}}}w(qT_s)\cdot \sum_{k=-N_{SR}}^{N_{SR}}\sum_{i_{STS}=1}^{N_{STS}}[Q_k]_{i_{TX},i_{STS}}[P_{EDMG-CEF}]_{i_{STS},n}EDMG-CEF_k^{i_{STS}}\exp(j2\pi k\Delta_F(qT_s-T_{GIlong})),$$

$$1\le n\le N_{EDMG-CEF}^{N_{STS}}$$

wherein.

$N_{Tones}=N_{ST}-N_{DC}$ denotes total number of active tones;

$Q_k$ denotes a spatial mapping matrix per k-th subcarrier;

$P_{EDMG\text{-}CEF}$ denotes the EDMG-CEF mapping matrix;

$N_{EDMG\text{-}CEF}^{N_{STS}}$ denotes a number of OFDM symbols in the EDMG-CEF for the count of space-time streams, denoted $N_{STS}$;

$[\ ]_{m,n}$ denotes a matrix element from m-th row and n-th column; and $w(qT_s)$ denotes a window function to smooth transitions between consecutive OFDM symbols.

Example 54 includes the subject matter of any one of Examples 42-53, and optionally, wherein the channel bandwidth is 2.16 GHz, 4.32 GHz, 6.48 GHz, or 8.64 GHz.

Example 55 includes an apparatus of wireless communication by an Enhanced Directional Multi-Gigabit (DMG) (EDMG) wireless communication station (STA), the apparatus comprising means for determining one or more EDMG Channel Estimation Field (CEF) (EDMG-CEF) sequences in a frequency domain based on a count of one or more 2.16 Gigahertz (GHz) channels in a channel bandwidth for transmission of an EDMG Physical Layer (PHY) Protocol Data Unit (PPDU) comprising an EDMG-CEF, the one or more EDMG-CEF sequences corresponding to one or more respective space-time streams; means for generating an EDMG-CEF transmit waveform in a time domain based on the one or more EDMG-CEF sequences and an EDMG-CEF mapping matrix, which is based on a count of the one or more space-time streams; and means for transmitting an Orthogonal Frequency Division Multiplexing (OFDM) mode transmission of the EDMG PPDU over the channel bandwidth, the OFDM mode transmission comprising transmission of the EDMG-CEF based on the EDMG-CEF transmit waveform.

Example 56 includes the subject matter of Example 55, and optionally, wherein an EDMG-CEF sequence of the one or more EDMG-CEF sequences comprises first and second predefined sequences corresponding to an index of a space-time stream of the one or more space-time streams.

Example 57 includes the subject matter of Example 56, and optionally, wherein the EDMG-CEF sequence comprises the first predefined sequence followed by three zeros, which are followed by the second predefined sequence.

Example 58 includes the subject matter of Example 56 or 57, and optionally, wherein the first and second predefined sequences have a same length.

Example 59 includes the subject matter of any one of Examples 56-58, and optionally, wherein each of the first and second predefined sequences comprises a predefined sequence of symbols, each symbol of the sequence of symbols is +1, −1, +j, or −j.

Example 60 includes the subject matter of any one of Examples 55-59, and optionally, comprising means for determining the one or more EDMG-CEF sequences according to one of the following definitions:

$EDMG\text{-}CEF^{iSTS}1=[Seq^{iSTS}_{left,\ 176}, 0, 0, 0, Seq^{iSTS}_{right,\ 176}]$, for $i_{STS}=1, 2, 3, 4, 5, 6, 7, 8$, when the channel bandwidth comprises a 2.16 GHz channel, wherein $i_{STS}$ denotes a space-time stream index, $EDMG\text{-}CEF^{iSTS}_{-177,\ 177}$ denotes an EDMG-CEF sequence for the 2.16 GHz channel and the space-time stream index $i_{STS}$, $Seq^{iSTS}_{left,\ 176}$ denotes a first predefined sequence of length 176 corresponding to the space-time stream index $i_{STS}$, and $Seq^{iSTS}_{right,\ 176}$ denotes a second predefined sequence of length 176 corresponding to the space-time stream index $i_{STS}$;

$EDMG\text{-}CEF^{iSTS}_{-386,\ 386}=[Seq^{iSTS}_{left,\ 385}, 0, 0, 0, Seq^{iSTS}_{right,\ 385}]$, for $i_{STS}=1, 2, 3, 4, 5, 6, 7, 8$, when the channel bandwidth comprises a 4.32 GHz channel, wherein $EDMG\text{-}CEF^{iSTS}_{-386,\ 386}$ denotes an EDMG-CEF sequence for the 4.32 GHz channel and the space-time stream index $i_{STS}$, $Seq^{iSTS}_{left,\ 385}$ denotes a first predefined sequence of length 385 corresponding to the space-time stream index $i_{STS}$, and $Seq^{iSTS}_{right,\ 385}$ denotes a second predefined sequence of length 385 corresponding to the space-time stream index $i_{STS}$;

$EDMG\text{-}CEF^{iSTS}_{-596,\ 596}=[Seq^{iSTS}_{left,\ 595}, 0, 0, 0, Seq^{iSTS}_{right,\ 595}]$, for $i_{STS}=1, 2, 3, 4, 5, 6, 7, 8$, when the channel bandwidth comprises a 6.48 GHz channel, wherein $EDMG\text{-}CEF^{iSTS}_{-596,\ 596}$ denotes an EDMG-CEF sequence for the 6.48 GHz channel and the space-time stream index $i_{STS}$, $Seq^{iSTS}_{left,\ 595}$ denotes a first predefined sequence of length 595 corresponding to the space-time stream index $i_{STS}$, and $Seq^{iSTS}_{right,\ 595}$ denotes a second predefined sequence of length 595 corresponding to the space-time stream index $i_{STS}$; and $EDMG\text{-}CEF^{iSTS}_{-805,\ 805}=[Seq^{iSTS}_{left,\ 804}, 0, 0, 0, Seq^{iSTS}_{right,\ 804}]$, for $i_{STS}=1, 2, 3, 4, 5, 6, 7, 8$, when the channel bandwidth comprises a 8.64 GHz channel, wherein $EDMG\text{-}CEF^{iSTS}_{-805,\ 805}$ denotes an EDMG-CEF sequence for the 8.64 GHz channel and the space-time stream index $i_{STS}$, $Seq^{iSTS}_{left,\ 804}$ denotes a first predefined sequence of length 804 corresponding to the space-time stream index $i_{STS}$, and $Seq^{iSTS}_{right,\ 804}$ denotes a second predefined sequence of length 804 corresponding to the space-time stream index $i_{STS}$.

Example 61 includes the subject matter of any one of Examples 55-60, and optionally, wherein a length of each of the one or more EDMG-CEF sequences is based on the count of one or more 2.16 GHz channels.

Example 62 includes the subject matter of any one of Examples 55-59, and optionally, wherein the count of the one or more space-time streams is 1, 2, 3, 4, 5, 6, 7, or 8.

Example 63 includes the subject matter of any one of Examples 55-60, and optionally, wherein the EDMG-CEF mapping matrix, denoted $P_{EDMG-CEF}$, is based on the count of the one or more space time streams, denoted $N_{STS}$, as follows:

$$P_{EDMG-CEF} = [+1\ -1],\ \text{for}\ N_{STS} = 1$$

$$P_{EDMG-CEF} = \begin{bmatrix} +1 & -1 \\ +1 & +1 \end{bmatrix},\ \text{for}\ N_{STS} = 2$$

$$P_{EDMG-CEF} = \begin{bmatrix} +1 & -1 & +1 \\ +1 & -w_3^1 & w_3^2 \\ +1 & -w_3^2 & w_3^4 \end{bmatrix},\ w_3 = \exp(-j2\pi/3),\ \text{for}\ N_{STS} = 3$$

$$P_{EDMG-CEF} = P_{4x4} = \begin{bmatrix} +1 & -1 & +1 & +1 \\ +1 & +1 & -1 & +1 \\ +1 & +1 & +1 & -1 \\ -1 & +1 & +1 & +1 \end{bmatrix},\ \text{for}\ N_{STS} = 4$$

$$P_{EDMG-CEF} = \begin{bmatrix} +1 & -1 & +1 & +1 & +1 & -1 \\ +1 & -w_6^1 & w_6^2 & w_6^3 & w_6^4 & -w_6^5 \\ +1 & -w_6^2 & w_6^4 & w_6^6 & w_6^8 & -w_6^{10} \\ +1 & -w_6^3 & w_6^6 & w_6^9 & w_6^{12} & -w_6^{15} \\ +1 & -w_6^4 & w_6^8 & w_6^{12} & w_6^{16} & -w_6^{20} \\ +1 & -w_6^5 & w_6^{10} & w_6^{15} & w_6^{20} & -w_6^{25} \end{bmatrix},$$

$$w_6 = \exp(-j2\pi/6),\ \text{for}\ N_{STS} = 5\ \text{or}\ 6$$

$$P_{EDMG-CEF} = \begin{bmatrix} P_{4x4} & P_{4x4} \\ P_{4x4} & -P_{4x4} \end{bmatrix},\ \text{for}\ N_{STS} = 7\ \text{or}\ 8$$

Example 64 includes the subject matter of any one of Examples 55-63, and optionally, comprising means for generating the EDMG-CEF transmit waveform based on a number of OFDM symbols in the EDMG-CEF, the number of OFDM symbols in the EDMG-CEF is based on the count of the one or more space time streams.

Example 65 includes the subject matter of Example 64, and optionally, wherein the number of OFDM symbols in the EDMG-CEF, denoted $N_{EDMG-CEF}^{N_{STS}}$, is based on the count of the one or more space time streams, denoted $N_{STS}$, as follows:

$N_{EDMG-CEF}^{NSTS}=2$, for $N_{STS}=1$ $N_{EDMG-CEF}^{NSTS}=2$, for $N_{STS}=2$ $N_{EDMG-CEF}^{NSTS}=3$, for $N_{STS}=3$ $N_{EDMG-CEF}^{NSTS}=4$, for $N_{STS}=4$ $N_{EDMG-CEF}^{NSTS}=6$, for $N_{STS}=5$ or 6

$N_{EDMG-CEF}^{NSTS}=8$, for $N_{STS}=7$ or 8

Example 66 includes the subject matter of any one of Examples 55-65, and optionally, comprising means for generating the EDMG-CEF transmit waveform, denoted $r_{EDMG-CEF}^{n,i_{TX}}(qT_s)$, as follows:

$$r_{EDMG-CEF}^{n,i_{TX}}(qT_s) = \frac{1}{\sqrt{N_{STS} \cdot N_{Tones}}} w(qT_s) \cdot \sum_{k=-N_{SR}}^{N_{SR}} \sum_{i_{STS}=1}^{N_{STS}} [Q_k]_{i_{TX},i_{STS}} [P_{EDMG-CEF}]_{i_{STS},n} EDMG-CEF_k^{i_{STS}} \exp(j2\pi k\Delta_F(qT_s - T_{GIlong})),$$

-continued $$1 \le n \le N_{EDMG-CEF}^{N_{STS}}$$

wherein:

$N_{Tones}=N_{ST}-N_{DC}$ denotes total number of active tones;

$Q_k$ denotes a spatial mapping matrix per k-th subcarrier;

$P_{EDMG-CEF}$ denotes the EDMG-CEF mapping matrix;

$N_{EDMG-CEF}^{N_{STS}}$ denotes a number of OFDM symbols in the EDMG-CEF for the count of space-time streams, denoted $N_{STS}$;

$[\ ]_{m,n}$ denotes a matrix element from m-th row and n-th column; and $w(qT_s)$ denotes a window function to smooth transitions between consecutive OFDM symbols.

Example 67 includes the subject matter of any one of Examples 55-66, and optionally, wherein the channel bandwidth is 2.16 GHz, 4.32 GHz, 6.48 GHz, or 8.64 GHz.

Example 68 includes an apparatus comprising logic and circuitry configured to cause an Enhanced Directional Multi-Gigabit (DMG) (EDMG) wireless communication station (STA) to generate at least one pilot sequence corresponding to at least one respective space-time stream for an EDMG Physical Layer (PHY) Protocol Data Unit (PPDU), the pilot sequence comprising a plurality of pilot values, a pilot value of the plurality of pilot values is based on a space-time stream number of the space-time stream, an Orthogonal Frequency Division Multiplexing (OFDM) symbol number, and a subcarrier index; and transmit an OFDM mode transmission of the EDMG PPDU comprising the at least one pilot sequence.

Example 69 includes the subject matter of Example 68, and optionally, wherein the apparatus is configured to cause the EDMG STA to determine the pilot value by applying a phase shift to a predefined pilot value, the phase shift is based on the space-time stream number and the OFDM symbol number, the predefined pilot value is based on the space-time stream number and the subcarrier index.

Example 70 includes the subject matter of Example 69, and optionally, wherein the phase shift comprises a product of a deterministic shift and a random shift, the deterministic shift is based on the space-time stream number and the OFDM symbol number, the random shift is based on a scrambler output corresponding to the OFDM symbol number.

Example 71 includes the subject matter of Example 70, and optionally, wherein the deterministic shift is repeated over time with a period equal to a total count of the at least one space-time stream.

Example 72 includes the subject matter of Example 70 or 71, and optionally, wherein the deterministic shift, denoted $W(i_{STS}, n)$, is in accordance with the following definition:

$$W(i_{STS}, n) = \exp\left(-j\frac{2\pi}{N_{STS}} \cdot (i_{STS} - 1) \cdot (n - 1)\right),$$

$$i_{STS} = 1, 2, \ldots, N_{STS};\ n = 1, 2, \ldots, N_{STS}$$

wherein n denotes the OFDM symbol number, $i_{STS}$ denotes the space-time stream number, and $N_{STS}$ denotes a total count of the at least one space-time stream.

Example 73 includes the subject matter of any one of Examples 69-72, and optionally, wherein the phase shift comprises a common phase shift, which is common over subcarriers.

Example 74 includes the subject matter of any one of Examples 69-73, and optionally, wherein the apparatus is configured to cause the EDMG STA to determine the predefined pilot value according to a predefined pilot sequence corresponding to the space-time stream number.

Example 75 includes the subject matter of Example 74, and optionally, wherein the predefined pilot sequence corresponding to the space-time stream number is based on a count of one or more 2.16 Gigahertz (GHz) channels for transmission of the EDMG PPDU.

Example 76 includes the subject matter of Example 75, and optionally, wherein:

the predefined pilot sequence corresponding to the space-time stream number comprises a first predefined pilot sequence, denoted $P_{16}(i_{STS}, :)$, comprising sixteen pilot values, when the count of the one or more 2.16 Gigahertz (GHz) channels is one, the predefined pilot sequence corresponding to the space-time stream number comprises a second predefined pilot sequence, denoted $P_{36}(i_{STS}, :)$, comprising thirty-six pilot values, when the count of the one or more 2.16 Gigahertz (GHz) channels is two, the predefined pilot sequence corresponding to the space-time stream number comprises a third predefined pilot sequence, denoted $P_{56}(i_{STS}, :)$, comprising fifty-six pilot values, when the count of the one or more 2.16 Gigahertz (GHz) channels is three, and the predefined pilot sequence corresponding to the space-time stream number comprises a fourth predefined pilot sequence, denoted $P_{76}(i_{STS}, :)$, comprising seventy-six pilot values, when the count of the one or more 2.16 Gigahertz (GHz) channels is four.

Example 77 includes the subject matter of any one of Examples 74-76, and optionally, wherein the predefined pilot sequence corresponding to the space-time stream number comprises at least one repetition of a predefined pilot sequence, denoted $P_{16}(i_{STS}, :)$, comprising sixteen pilot values.

Example 78 includes the subject matter of Example 77, and optionally, wherein the pilot sequence $P_{16}(i_{STS}, :)$ is defined based on the space-time stream number, denoted $i_{STS}$, as follows:

| $i_{STS}$ | $P_{16}(i_{STS}, :)$ |
|---|---|
| 1 | [+1 +1 +1 −1 +1 +1 −1 +1 +1 +1 +1 −1 −1 −1 +1 −1] |
| 2 | [−1 −1 −1 +1 −1 −1 +1 −1 +1 +1 +1 −1 −1 −1 +1 −1] |
| 3 | [−1 −1 −1 +1 +1 +1 −1 +1 −1 −1 −1 +1 −1 −1 +1 −1] |
| 4 | [+1 +1 +1 −1 −1 −1 +1 −1 −1 −1 −1 +1 −1 −1 +1 −1] |
| 5 | [−1 −1 +1 −1 −1 −1 −1 +1 −1 −1 +1 −1 +1 +1 +1 −1] |
| 6 | [+1 +1 −1 +1 +1 +1 +1 −1 −1 −1 +1 −1 +1 +1 +1 −1] |
| 7 | [+1 +1 −1 +1 −1 −1 −1 +1 +1 +1 −1 +1 +1 +1 +1 −1] |
| 8 | [−1 −1 +1 −1 +1 +1 +1 −1 +1 +1 −1 +1 +1 +1 +1 −1] |

Example 79 includes the subject matter of any one of Examples 68-78, and optionally, wherein the apparatus is configured to cause the EDMG STA to insert the plurality of pilot values at a plurality of pilot subcarrier indexes, which are frequency-channel dependent, and are independent of the space-time stream number and the OFDM symbol number.

Example 80 includes the subject matter of any one of Examples 68-79, and optionally, wherein the apparatus is configured to cause the EDMG STA to transmit the OFDM mode transmission over a channel bandwidth of 2.16 Gigahertz (GHz), 4.32 GHz, 6.48 GHz, or 8.64 GHz.

Example 81 includes the subject matter of any one of Examples 68-80, and optionally, comprising a radio.

Example 82 includes the subject matter of any one of Examples 68-81, and optionally, comprising one or more antennas.

Example 83 includes a system of wireless communication comprising an Enhanced Directional Multi-Gigabit (DMG) (EDMG) wireless communication station (STA), the EDMG STA comprising a radio; a memory; a processor; one or more antennas; and a controller configured to cause the EDMG STA to generate at least one pilot sequence corresponding to at least one respective space-time stream for an EDMG Physical Layer (PHY) Protocol Data Unit (PPDU), the pilot sequence comprising a plurality of pilot values, a pilot value of the plurality of pilot values is based on a space-time stream number of the space-time stream, an Orthogonal Frequency Division Multiplexing (OFDM) symbol number, and a subcarrier index; and transmit an OFDM mode transmission of the EDMG PPDU comprising the at least one pilot sequence.

Example 84 includes the subject matter of Example 83, and optionally, wherein the controller is configured to cause the EDMG STA to determine the pilot value by applying a phase shift to a predefined pilot value, the phase shift is based on the space-time stream number and the OFDM symbol number, the predefined pilot value is based on the space-time stream number and the subcarrier index.

Example 85 includes the subject matter of Example 84, and optionally, wherein the phase shift comprises a product of a deterministic shift and a random shift, the deterministic shift is based on the space-time stream number and the OFDM symbol number, the random shift is based on a scrambler output corresponding to the OFDM symbol number.

Example 86 includes the subject matter of Example 85, and optionally, wherein the deterministic shift is repeated over time with a period equal to a total count of the at least one space-time stream.

Example 87 includes the subject matter of Example 85 or 86, and optionally, wherein the deterministic shift, denoted $W(i_{STS}, n)$, is in accordance with the following definition:

$$W(i_{STS}, n) = \exp\left(-j\frac{2\pi}{N_{STS}}\cdot(i_{STS}-1)\cdot(n-1)\right),$$
$$i_{STS} = 1, 2, \ldots, N_{STS};\ n = 1, 2, \ldots, N_{STS}$$

wherein n denotes the OFDM symbol number, $i_{STS}$ denotes the space-time stream number, and $N_{STS}$ denotes a total count of the at least one space-time stream.

Example 88 includes the subject matter of any one of Examples 84-87, and optionally, wherein the phase shift comprises a common phase shift, which is common over subcarriers.

Example 89 includes the subject matter of any one of Examples 84-88, and optionally, wherein the controller is configured to cause the EDMG STA to determine the predefined pilot value according to a predefined pilot sequence corresponding to the space-time stream number.

Example 90 includes the subject matter of Example 89, and optionally, wherein the predefined pilot sequence corresponding to the space-time stream number is based on a count of one or more 2.16 Gigahertz (GHz) channels for transmission of the EDMG PPDU.

Example 91 includes the subject matter of Example 90, and optionally, wherein:

the predefined pilot sequence corresponding to the space-time stream number comprises a first predefined pilot sequence, denoted $P_{16}(i_{STS}, :)$, comprising sixteen pilot values, when the count of the one or more 2.16 Gigahertz (GHz) channels is one, the predefined pilot sequence corresponding to the space-time stream number comprises a second predefined pilot sequence, denoted $P_{36}(i_{STS}, :)$, comprising thirty-six pilot values, when the count of the one or more 2.16 Gigahertz (GHz) channels is two, the predefined pilot sequence corresponding to the space-time stream number comprises a third predefined pilot sequence, denoted $P_{56}(i_{STS}, :)$, comprising fifty-six pilot values, when the count of the one or more 2.16 Gigahertz (GHz) channels is three, and the predefined pilot sequence corresponding to the space-time stream number comprises a fourth predefined pilot sequence, denoted $P_{76}(i_{STS}, :)$, comprising seventy-six pilot values, when the count of the one or more 2.16 Gigahertz (GHz) channels is four.

Example 92 includes the subject matter of any one of Examples 89-91, and optionally, wherein the predefined pilot sequence corresponding to the space-time stream number comprises at least one repetition of a predefined pilot sequence, denoted $P_{16}(i_{STS}, :)$, comprising sixteen pilot values.

Example 93 includes the subject matter of Example 92, and optionally, wherein the pilot sequence $P_{16}(i_{STS}, :)$ is defined based on the space-time stream number, denoted $i_{STS}$, as follows:

| $i_{STS}$ | $P_{16}(i_{STS}, :)$ |
|---|---|
| 1 | [+1 +1 +1 −1 +1 +1 −1 +1 +1 +1 +1 −1 −1 −1 +1 −1] |
| 2 | [−1 −1 −1 +1 −1 −1 +1 −1 +1 +1 +1 −1 −1 −1 +1 −1] |
| 3 | [−1 −1 −1 +1 +1 +1 −1 +1 −1 −1 −1 +1 −1 −1 +1 −1] |
| 4 | [+1 +1 +1 −1 −1 −1 +1 −1 −1 −1 −1 +1 −1 −1 +1 −1] |
| 5 | [−1 −1 +1 −1 −1 −1 −1 +1 −1 −1 +1 −1 +1 +1 +1 −1] |
| 6 | [+1 +1 −1 +1 +1 +1 +1 −1 −1 −1 +1 −1 +1 +1 +1 −1] |
| 7 | [+1 +1 −1 +1 −1 −1 −1 +1 +1 +1 −1 +1 +1 +1 +1 −1] |
| 8 | [−1 −1 +1 −1 +1 +1 +1 −1 +1 +1 −1 +1 +1 +1 +1 −1] |

Example 94 includes the subject matter of any one of Examples 83-93, and optionally, wherein the controller is configured to cause the EDMG STA to insert the plurality of pilot values at a plurality of pilot subcarrier indexes, which are frequency-channel dependent, and are independent of the space-time stream number and the OFDM symbol number.

Example 95 includes the subject matter of any one of Examples 83-94, and optionally, wherein the controller is configured to cause the EDMG STA to transmit the OFDM mode transmission over a channel bandwidth of 2.16 Gigahertz (GHz), 4.32 GHz, 6.48 GHz, or 8.64 GHz.

Example 96 includes a method to be performed at an Enhanced Directional Multi-Gigabit (DMG) (EDMG) wireless communication station (STA), the method comprising generating at least one pilot sequence corresponding to at least one respective space-time stream for an EDMG Physical Layer (PHY) Protocol Data Unit (PPDU), the pilot sequence comprising a plurality of pilot values, a pilot value of the plurality of pilot values is based on a space-time stream number of the space-time stream, an Orthogonal Frequency Division Multiplexing (OFDM) symbol number, and a subcarrier index; and transmitting an OFDM mode transmission of the EDMG PPDU comprising the at least one pilot sequence.

Example 97 includes the subject matter of Example 96, and optionally, comprising determining the pilot value by applying a phase shift to a predefined pilot value, the phase shift is based on the space-time stream number and the OFDM symbol number, the predefined pilot value is based on the space-time stream number and the subcarrier index.

Example 98 includes the subject matter of Example 97, and optionally, wherein the phase shift comprises a product of a deterministic shift and a random shift, the deterministic shift is based on the space-time stream number and the OFDM symbol number, the random shift is based on a scrambler output corresponding to the OFDM symbol number.

Example 99 includes the subject matter of Example 98, and optionally, wherein the deterministic shift is repeated over time with a period equal to a total count of the at least one space-time stream.

Example 100 includes the subject matter of Example 98 or 99, and optionally, wherein the deterministic shift, denoted $W(i_{STS}, n)$, is in accordance with the following definition:

$$W(i_{STS}, n) = \exp\left(-j\frac{2\pi}{N_{STS}} \cdot (i_{STS} - 1) \cdot (n - 1)\right),$$
$$i_{STS} = 1, 2, \ldots, N_{STS}; n = 1, 2, \ldots, N_{STS}$$

wherein n denotes the OFDM symbol number, $i_{STS}$ denotes the space-time stream number, and $N_{STS}$ denotes a total count of the at least one space-time stream.

Example 101 includes the subject matter of any one of Examples 97-100, and optionally, wherein the phase shift comprises a common phase shift, which is common over subcarriers.

Example 102 includes the subject matter of any one of Examples 97-101, and optionally, comprising determining the predefined pilot value according to a predefined pilot sequence corresponding to the space-time stream number.

Example 103 includes the subject matter of Example 102, and optionally, wherein the predefined pilot sequence corresponding to the space-time stream number is based on a count of one or more 2.16 Gigahertz (GHz) channels for transmission of the EDMG PPDU.

Example 104 includes the subject matter of Example 103, and optionally, wherein:

the predefined pilot sequence corresponding to the space-time stream number comprises a first predefined pilot sequence, denoted $P_{16}(i_{STS}, :)$, comprising sixteen pilot values, when the count of the one or more 2.16 Gigahertz (GHz) channels is one, the predefined pilot sequence corresponding to the space-time stream number comprises a second predefined pilot sequence, denoted $P_{36}(i_{STS}, :)$, comprising thirty-six pilot values, when the count of the one or more 2.16 Gigahertz (GHz) channels is two, the predefined pilot sequence corresponding to the space-time stream number comprises a third predefined pilot sequence, denoted $P_{56}(i_{STS}, :)$, comprising fifty-six pilot values, when the count of the one or more 2.16 Gigahertz (GHz) channels is three, and the predefined pilot sequence corresponding to the space-time stream number comprises a fourth predefined pilot sequence, denoted $P_{76}(i_{STS}, :)$, comprising seventy-six pilot values, when the count of the one or more 2.16 Gigahertz (GHz) channels is four.

Example 105 includes the subject matter of any one of Examples 102-104, and optionally, wherein the predefined pilot sequence corresponding to the space-time stream number comprises at least one repetition of a predefined pilot sequence, denoted $P_{16}(i_{STS}, :)$, comprising sixteen pilot values.

Example 106 includes the subject matter of Example 105, and optionally, wherein the pilot sequence $P_{16}(i_{STS}, :)$ is defined based on the space-time stream number, denoted $i_{STS}$, as follows:

| $i_{STS}$ | $P_{16}(i_{STS}, :)$ |
|---|---|
| 1 | [+1 +1 +1 −1 +1 +1 −1 +1 +1 +1 +1 −1 −1 −1 +1 −1] |
| 2 | [−1 −1 −1 +1 −1 −1 +1 −1 +1 +1 +1 −1 −1 −1 +1 −1] |
| 3 | [−1 −1 −1 +1 +1 +1 −1 +1 −1 −1 −1 +1 −1 −1 +1 −1] |
| 4 | [+1 +1 +1 −1 −1 −1 +1 −1 −1 −1 −1 +1 −1 −1 +1 −1] |
| 5 | [−1 −1 +1 −1 −1 −1 −1 +1 −1 −1 +1 −1 +1 +1 +1 −1] |
| 6 | [+1 +1 −1 +1 +1 +1 +1 −1 −1 −1 +1 −1 +1 +1 +1 −1] |
| 7 | [+1 +1 −1 +1 −1 −1 −1 +1 +1 +1 −1 +1 +1 +1 +1 −1] |
| 8 | [−1 −1 +1 −1 +1 +1 +1 −1 +1 +1 −1 +1 +1 +1 +1 −1] |

Example 107 includes the subject matter of any one of Examples 97-106, and optionally, comprising inserting the plurality of pilot values at a plurality of pilot subcarrier indexes, which are frequency-channel dependent, and are independent of the space-time stream number and the OFDM symbol number.

Example 108 includes the subject matter of any one of Examples 96-107, and optionally, comprising transmitting the OFDM mode transmission over a channel bandwidth of 2.16 Gigahertz (GHz), 4.32 GHz, 6.48 GHz, or 8.64 GHz.

Example 109 includes a product comprising one or more tangible computer-readable non-transitory storage media comprising computer-executable instructions operable to, when executed by at least one processor, enable the at least one processor to cause an Enhanced Directional Multi-Gigabit (DMG) (EDMG) wireless communication station (STA) to generate at least one pilot sequence corresponding to at least one respective space-time stream for an EDMG Physical Layer (PHY) Protocol Data Unit (PPDU), the pilot sequence comprising a plurality of pilot values, a pilot value of the plurality of pilot values is based on a space-time stream number of the space-time stream, an Orthogonal Frequency Division Multiplexing (OFDM) symbol number, and a subcarrier index; and transmit an OFDM mode transmission of the EDMG PPDU comprising the at least one pilot sequence.

Example 110 includes the subject matter of Example 109, and optionally, wherein the instructions, when executed, cause the EDMG STA to determine the pilot value by applying a phase shift to a predefined pilot value, the phase shift is based on the space-time stream number and the OFDM symbol number, the predefined pilot value is based on the space-time stream number and the subcarrier index.

Example 111 includes the subject matter of Example 110, and optionally, wherein the phase shift comprises a product of a deterministic shift and a random shift, the deterministic shift is based on the space-time stream number and the OFDM symbol number, the random shift is based on a scrambler output corresponding to the OFDM symbol number.

Example 112 includes the subject matter of Example 111, and optionally, wherein the deterministic shift is repeated over time with a period equal to a total count of the at least one space-time stream.

Example 113 includes the subject matter of Example 111 or 112, and optionally, wherein the deterministic shift, denoted $W(i_{STS}, n)$, is in accordance with the following definition:

$$W(i_{STS}, n) = \exp\left(-j\frac{2\pi}{N_{STS}} \cdot (i_{STS} - 1) \cdot (n - 1)\right),$$

$$i_{STS} = 1, 2, \ldots, N_{STS}; n = 1, 2, \ldots, N_{STS}$$

wherein n denotes the OFDM symbol number, $i_{STS}$ denotes the space-time stream number, and $N_{STS}$ denotes a total count of the at least one space-time stream.

Example 114 includes the subject matter of any one of Examples 110-113, and optionally, wherein the phase shift comprises a common phase shift, which is common over subcarriers.

Example 115 includes the subject matter of any one of Examples 110-114, and optionally, wherein the instructions, when executed, cause the EDMG STA to determine the predefined pilot value according to a predefined pilot sequence corresponding to the space-time stream number.

Example 116 includes the subject matter of Example 115, and optionally, wherein the predefined pilot sequence corresponding to the space-time stream number is based on a count of one or more 2.16 Gigahertz (GHz) channels for transmission of the EDMG PPDU.

Example 117 includes the subject matter of Example 116, and optionally, wherein:

the predefined pilot sequence corresponding to the space-time stream number comprises a first predefined pilot sequence, denoted $P_{16}(i_{STS}, :)$, comprising sixteen pilot values, when the count of the one or more 2.16 Gigahertz (GHz) channels is one, the predefined pilot sequence corresponding to the space-time stream number comprises a second predefined pilot sequence, denoted $P_{36}(i_{STS}, :)$, comprising thirty-six pilot values, when the count of the one or more 2.16 Gigahertz (GHz) channels is two, the predefined pilot sequence corresponding to the space-time stream number comprises a third predefined pilot sequence, denoted $P_{56}(i_{STS}, :)$, comprising fifty-six pilot values, when the count of the one or more 2.16 Gigahertz (GHz) channels is three, and the predefined pilot sequence corresponding to the space-time stream number comprises a fourth predefined pilot sequence, denoted $P_{76}(i_{STS}, :)$, comprising seventy-six pilot values, when the count of the one or more 2.16 Gigahertz (GHz) channels is four.

Example 118 includes the subject matter of any one of Examples 115-117, and optionally, wherein the predefined pilot sequence corresponding to the space-time stream number comprises at least one repetition of a predefined pilot sequence, denoted $P_{16}(i_{STS}, :)$, comprising sixteen pilot values.

Example 119 includes the subject matter of Example 118, and optionally, wherein the pilot sequence $P_{16}(i_{STS}, :)$ is defined based on the space-time stream number, denoted $i_{STS}$, as follows:

| $i_{STS}$ | $P_{16}(i_{STS}, :)$ |
|---|---|
| 1 | [+1 +1 +1 −1 +1 +1 −1 +1 +1 +1 +1 −1 −1 −1 +1 −1] |
| 2 | [−1 −1 −1 +1 −1 −1 +1 −1 +1 +1 +1 −1 −1 −1 +1 −1] |
| 3 | [−1 −1 −1 +1 +1 +1 −1 +1 −1 −1 −1 +1 −1 −1 +1 −1] |
| 4 | [+1 +1 +1 −1 −1 −1 +1 −1 −1 −1 −1 +1 −1 −1 +1 −1] |
| 5 | [−1 −1 +1 −1 −1 −1 −1 +1 −1 −1 +1 −1 +1 +1 +1 −1] |
| 6 | [+1 +1 −1 +1 +1 +1 +1 −1 −1 −1 +1 −1 +1 +1 +1 −1] |
| 7 | [+1 +1 −1 +1 −1 −1 −1 +1 +1 +1 −1 +1 +1 +1 +1 −1] |
| 8 | [−1 −1 +1 −1 +1 +1 +1 −1 +1 +1 −1 +1 +1 +1 +1 −1] |

Example 120 includes the subject matter of any one of Examples 109-119, and optionally, wherein the instructions, when executed, cause the EDMG STA to insert the plurality of pilot values at a plurality of pilot subcarrier indexes, which are frequency-channel dependent, and are independent of the space-time stream number and the OFDM symbol number.

Example 121 includes the subject matter of any one of Examples 109-120, and optionally, wherein the instructions, when executed, cause the EDMG STA to transmit the OFDM mode transmission over a channel bandwidth of 2.16 Gigahertz (GHz), 4.32 GHz, 6.48 GHz, or 8.64 GHz.

Example 122 includes an apparatus of wireless communication by an Enhanced Directional Multi-Gigabit (DMG) (EDMG) wireless communication station (STA), the apparatus comprising means for generating at least one pilot sequence corresponding to at least one respective space-time stream for an EDMG Physical Layer (PHY) Protocol Data Unit (PPDU), the pilot sequence comprising a plurality of pilot values, a pilot value of the plurality of pilot values is based on a space-time stream number of the space-time stream, an Orthogonal Frequency Division Multiplexing (OFDM) symbol number, and a subcarrier index; and means for transmitting an OFDM mode transmission of the EDMG PPDU comprising the at least one pilot sequence.

Example 123 includes the subject matter of Example 122, and optionally, comprising means for determining the pilot value by applying a phase shift to a predefined pilot value, the phase shift is based on the space-time stream number and the OFDM symbol number, the predefined pilot value is based on the space-time stream number and the subcarrier index.

Example 124 includes the subject matter of Example 123, and optionally, wherein the phase shift comprises a product of a deterministic shift and a random shift, the deterministic shift is based on the space-time stream number and the OFDM symbol number, the random shift is based on a scrambler output corresponding to the OFDM symbol number.

Example 125 includes the subject matter of Example 124, and optionally, wherein the deterministic shift is repeated over time with a period equal to a total count of the at least one space-time stream.

Example 126 includes the subject matter of Example 124 or 125, and optionally, wherein the deterministic shift, denoted $W(i_{STS}, n)$, is in accordance with the following definition:

$$W(i_{STS}, n) = \exp\left(-j\frac{2\pi}{N_{STS}} \cdot (i_{STS} - 1) \cdot (n - 1)\right),$$

$$i_{STS} = 1, 2, \ldots , N_{STS}; n = 1, 2, \ldots , N_{STS}$$

wherein n denotes the OFDM symbol number, $i_{STS}$ denotes the space-time stream number, and $N_{STS}$ denotes a total count of the at least one space-time stream.

Example 127 includes the subject matter of any one of Examples 123-126, and optionally, wherein the phase shift comprises a common phase shift, which is common over subcarriers.

Example 128 includes the subject matter of any one of Examples 123-127, and optionally, comprising means for determining the predefined pilot value according to a predefined pilot sequence corresponding to the space-time stream number.

Example 129 includes the subject matter of Example 128, and optionally, wherein the predefined pilot sequence corresponding to the space-time stream number is based on a count of one or more 2.16 Gigahertz (GHz) channels for transmission of the EDMG PPDU.

Example 130 includes the subject matter of Example 129, and optionally, wherein:

the predefined pilot sequence corresponding to the space-time stream number comprises a first predefined pilot sequence, denoted $P_{16}(i_{STS}, :)$, comprising sixteen pilot values, when the count of the one or more 2.16 Gigahertz (GHz) channels is one, the predefined pilot sequence corresponding to the space-time stream number comprises a second predefined pilot sequence, denoted $P_{36}(i_{STS}, :)$, comprising thirty-six pilot values, when the count of the one or more 2.16 Gigahertz (GHz) channels is two, the predefined pilot sequence corresponding to the space-time stream number comprises a third predefined pilot sequence, denoted $P_{56}(i_{STS}, :)$, comprising fifty-six pilot values, when the count of the one or more 2.16 Gigahertz (GHz) channels is three, and the predefined pilot sequence corresponding to the space-time stream number comprises a fourth predefined pilot sequence, denoted $P_{76}(i_{STS}, :)$, comprising seventy-six pilot values, when the count of the one or more 2.16 Gigahertz (GHz) channels is four.

Example 131 includes the subject matter of any one of Examples 128-130, and optionally, wherein the predefined pilot sequence corresponding to the space-time stream number comprises at least one repetition of a predefined pilot sequence, denoted $P_{16}(i_{STS}, :)$, comprising sixteen pilot values.

Example 132 includes the subject matter of Example 131, and optionally, wherein the pilot sequence $P_{16}(i_{STS}, :)$ is defined based on the space-time stream number, denoted $i_{STS}$, as follows:

| $i_{STS}$ | $P_{16}(i_{STS}, :)$ |
|---|---|
| 1 | [+1 +1 +1 −1 +1 +1 −1 +1 +1 +1 +1 −1 −1 −1 +1 −1] |
| 2 | [−1 −1 −1 +1 −1 −1 +1 −1 +1 +1 +1 −1 −1 −1 +1 −1] |
| 3 | [−1 −1 −1 +1 +1 +1 −1 +1 −1 −1 −1 +1 −1 −1 +1 −1] |
| 4 | [+1 +1 +1 −1 −1 −1 +1 −1 −1 −1 −1 +1 −1 −1 +1 −1] |
| 5 | [−1 −1 +1 −1 −1 −1 −1 +1 −1 −1 +1 −1 +1 +1 +1 −1] |
| 6 | [+1 +1 −1 +1 +1 +1 +1 −1 −1 −1 +1 −1 +1 +1 +1 −1] |
| 7 | [+1 +1 −1 +1 −1 −1 −1 +1 +1 +1 −1 +1 +1 +1 +1 −1] |
| 8 | [−1 −1 +1 −1 +1 +1 +1 −1 +1 +1 −1 +1 +1 +1 +1 −1] |

Example 133 includes the subject matter of any one of Examples 122-132, and optionally, comprising means for inserting the plurality of pilot values at a plurality of pilot subcarrier indexes, which are frequency-channel dependent, and are independent of the space-time stream number and the OFDM symbol number.

Example 134 includes the subject matter of any one of Examples 122-133, and optionally, comprising means for transmitting the OFDM mode transmission over a channel bandwidth of 2.16 Gigahertz (GHz), 4.32 GHz, 6.48 GHz, or 8.64 GHz.

Example 135 includes an apparatus comprising logic and circuitry configured to cause an Enhanced Directional Multi-Gigabit (DMG) (EDMG) wireless communication station (STA) to receive an Orthogonal Frequency Division Multiplexing (OFDM) mode transmission of an EDMG Physical Layer (PHY) Protocol Data Unit (PPDU); and process the OFDM mode transmission of the EDMG PPDU based on at least one pilot sequence corresponding to at least one respective space-time stream, the pilot sequence comprising a plurality of pilot values, a pilot value of the plurality of pilot values is based on a space-time stream number of the space-time stream, an Orthogonal Frequency Division Multiplexing (OFDM) symbol number, and a subcarrier index.

Example 136 includes the subject matter of Example 135, and optionally, wherein the apparatus is configured to cause the EDMG STA to determine the pilot value by applying a phase shift to a predefined pilot value, the phase shift is based on the space-time stream number and the OFDM symbol number, the predefined pilot value is based on the space-time stream number and the subcarrier index.

Example 137 includes the subject matter of Example 136, and optionally, wherein the phase shift comprises a product of a deterministic shift and a random shift, the deterministic shift is based on the space-time stream number and the OFDM symbol number, the random shift is based on a scrambler output corresponding to the OFDM symbol number.

Example 138 includes the subject matter of Example 137, and optionally, wherein the deterministic shift is repeated over time with a period equal to a total count of the at least one space-time stream.

Example 139 includes the subject matter of Example 137 or 138, and optionally, wherein the deterministic shift, denoted $W(i_{STS}, n)$, is in accordance with the following definition:

$$W(i_{STS}, n) = \exp\left(-j\frac{2\pi}{N_{STS}} \cdot (i_{STS} - 1) \cdot (n - 1)\right),$$
$$i_{STS} = 1, 2, \ldots , N_{STS}; n = 1, 2, \ldots , N_{STS}$$

wherein n denotes the OFDM symbol number, $i_{STS}$ denotes the space-time stream number, and $N_{STS}$ denotes a total count of the at least one space-time stream.

Example 140 includes the subject matter of any one of Examples 136-139, and optionally, wherein the phase shift comprises a common phase shift, which is common over subcarriers.

Example 141 includes the subject matter of any one of Examples 136-140, and optionally, wherein the apparatus is configured to cause the EDMG STA to determine the predefined pilot value according to a predefined pilot sequence corresponding to the space-time stream number.

Example 142 includes the subject matter of Example 141, and optionally, wherein the predefined pilot sequence corresponding to the space-time stream number is based on a count of one or more 2.16 Gigahertz (GHz) channels for reception of the EDMG PPDU.

Example 143 includes the subject matter of Example 142, and optionally, wherein:

the predefined pilot sequence corresponding to the space-time stream number comprises a first predefined pilot sequence, denoted $P_{16}(i_{STS}, :)$, comprising sixteen pilot values, when the count of the one or more 2.16 Gigahertz (GHz) channels is one, the predefined pilot sequence corresponding to the space-time stream number comprises a second predefined pilot sequence, denoted $P_{36}(i_{STS}, :)$, comprising thirty-six pilot values, when the count of the one or more 2.16 Gigahertz (GHz) channels is two, the predefined pilot sequence corresponding to the space-time stream number comprises a third predefined pilot sequence, denoted $P_{56}(i_{STS}, :)$, comprising fifty-six pilot values, when the count of the one or more 2.16 Gigahertz (GHz) channels is three, and the predefined pilot sequence corresponding to the space-time stream number comprises a fourth predefined pilot sequence, denoted $P_{76}(i_{STS}, :)$, comprising seventy-six pilot values, when the count of the one or more 2.16 Gigahertz (GHz) channels is four.

Example 144 includes the subject matter of any one of Examples 141-143, and optionally, wherein the predefined pilot sequence corresponding to the space-time stream number comprises at least one repetition of a predefined pilot sequence, denoted $P_{16}(i_{STS}, :)$, comprising sixteen pilot values.

Example 145 includes the subject matter of Example 144, and optionally, wherein the pilot sequence $P_{16}(i_{STS}, :)$ is defined based on the space-time stream number, denoted $i_{STS}$, as follows:

| $i_{STS}$ | $P_{16}(i_{STS}, :)$ |
|---|---|
| 1 | [+1 +1 +1 −1 +1 +1 −1 +1 +1 +1 +1 −1 −1 −1 +1 −1] |
| 2 | [−1 −1 −1 +1 −1 −1 +1 −1 +1 +1 +1 −1 −1 −1 +1 −1] |
| 3 | [−1 −1 −1 +1 +1 +1 −1 +1 −1 −1 −1 +1 −1 −1 +1 −1] |
| 4 | [+1 +1 +1 −1 −1 −1 +1 −1 −1 −1 −1 +1 −1 −1 +1 −1] |
| 5 | [−1 −1 +1 −1 −1 −1 −1 +1 −1 −1 +1 −1 +1 +1 +1 −1] |
| 6 | [+1 +1 −1 +1 +1 +1 +1 −1 −1 −1 +1 −1 +1 +1 +1 −1] |
| 7 | [+1 +1 −1 +1 −1 −1 −1 +1 +1 +1 −1 +1 +1 +1 +1 −1] |
| 8 | [−1 −1 +1 −1 +1 +1 +1 −1 +1 +1 −1 +1 +1 +1 +1 −1] |

Example 146 includes the subject matter of any one of Examples 135-145, and optionally, wherein the apparatus is configured to cause the EDMG STA to detect the plurality of pilot values at a plurality of pilot subcarrier indexes, which are frequency-channel dependent, and are independent of the space-time stream number and the OFDM symbol number.

Example 147 includes the subject matter of any one of Examples 135-146, and optionally, wherein the apparatus is configured to cause the EDMG STA to receive the OFDM mode transmission over a channel bandwidth of 2.16 Gigahertz (GHz), 4.32 GHz, 6.48 GHz, or 8.64 GHz.

Example 148 includes the subject matter of any one of Examples 135-147, and optionally, comprising a radio.

Example 149 includes the subject matter of any one of Examples 135-148, and optionally, comprising one or more antennas.

Example 150 includes a system of wireless communication comprising an Enhanced Directional Multi-Gigabit (DMG) (EDMG) wireless communication station (STA), the EDMG STA comprising a radio; a memory; a processor; one or more antennas; and a controller configured to cause the EDMG STA to receive an Orthogonal Frequency Division Multiplexing (OFDM) mode transmission of an EDMG Physical Layer (PHY) Protocol Data Unit (PPDU); and process the OFDM mode transmission of the EDMG PPDU based on at least one pilot sequence corresponding to at least one respective space-time stream, the pilot sequence comprising a plurality of pilot values, a pilot value of the plurality of pilot values is based on a space-time stream number of the space-time stream, an Orthogonal Frequency Division Multiplexing (OFDM) symbol number, and a subcarrier index.

Example 151 includes the subject matter of Example 150, and optionally, wherein the controller is configured to cause the EDMG STA to determine the pilot value by applying a phase shift to a predefined pilot value, the phase shift is based on the space-time stream number and the OFDM symbol number, the predefined pilot value is based on the space-time stream number and the subcarrier index.

Example 152 includes the subject matter of Example 151, and optionally, wherein the phase shift comprises a product of a deterministic shift and a random shift, the deterministic shift is based on the space-time stream number and the OFDM symbol number, the random shift is based on a scrambler output corresponding to the OFDM symbol number.

Example 153 includes the subject matter of Example 152, and optionally, wherein the deterministic shift is repeated over time with a period equal to a total count of the at least one space-time stream.

Example 154 includes the subject matter of Example 152 or 153, and optionally, wherein the deterministic shift, denoted $W(i_{STS}, n)$, is in accordance with the following definition:

$$W(i_{STS}, n) = \exp\left(-j\frac{2\pi}{N_{STS}}\cdot(i_{STS}-1)\cdot(n-1)\right),$$
$$i_{STS} = 1, 2, \ldots, N_{STS}; n = 1, 2, \ldots, N_{STS}$$

wherein n denotes the OFDM symbol number, $i_{STS}$ denotes the space-time stream number, and $N_{STS}$ denotes a total count of the at least one space-time stream.

Example 155 includes the subject matter of any one of Examples 151-154, and optionally, wherein the phase shift comprises a common phase shift, which is common over subcarriers.

Example 156 includes the subject matter of any one of Examples 151-155, and optionally, wherein the controller is configured to cause the EDMG STA to determine the predefined pilot value according to a predefined pilot sequence corresponding to the space-time stream number.

Example 157 includes the subject matter of Example 156, and optionally, wherein the predefined pilot sequence corresponding to the space-time stream number is based on a count of one or more 2.16 Gigahertz (GHz) channels for reception of the EDMG PPDU.

Example 158 includes the subject matter of Example 157, and optionally, wherein:

the predefined pilot sequence corresponding to the space-time stream number comprises a first predefined pilot sequence, denoted $P_{16}(i_{STS}, :)$, comprising sixteen pilot values, when the count of the one or more 2.16 Gigahertz (GHz) channels is one, the predefined pilot sequence corresponding to the space-time stream number comprises a second predefined pilot sequence, denoted $P_{36}(i_{STS}, :)$, comprising thirty-six pilot values, when the count of the one or more 2.16 Gigahertz (GHz) channels is two, the predefined pilot sequence corresponding to the space-time stream number comprises a third predefined pilot sequence, denoted $P_{56}(i_{STS}, :)$, comprising fifty-six pilot values, when the count of the one or more 2.16 Gigahertz (GHz) channels is three, and the predefined pilot sequence corresponding to the space-time stream number comprises a fourth predefined pilot sequence, denoted $P_{76}(i_{STS}, :)$, comprising seventy-six pilot values, when the count of the one or more 2.16 Gigahertz (GHz) channels is four.

Example 159 includes the subject matter of any one of Examples 156-158, and optionally, wherein the predefined pilot sequence corresponding to the space-time stream number comprises at least one repetition of a predefined pilot sequence, denoted $P_{16}(i_{STS}, :)$, comprising sixteen pilot values.

Example 160 includes the subject matter of Example 159, and optionally, wherein the pilot sequence $P_{16}(i_{STS}, :)$ is defined based on the space-time stream number, denoted $i_{STS}$, as follows:

| $i_{STS}$ | $P_{16}(i_{STS}, :)$ |
|---|---|
| 1 | [+1 +1 +1 −1 +1 +1 −1 +1 +1 +1 +1 −1 −1 −1 +1 −1] |
| 2 | [−1 −1 −1 +1 −1 −1 +1 −1 +1 +1 +1 −1 −1 −1 +1 −1] |
| 3 | [−1 −1 −1 +1 +1 +1 −1 +1 −1 −1 −1 +1 −1 −1 +1 −1] |
| 4 | [+1 +1 +1 −1 −1 −1 +1 −1 −1 −1 −1 +1 −1 −1 +1 −1] |
| 5 | [−1 −1 +1 −1 −1 −1 −1 +1 −1 −1 +1 −1 +1 +1 +1 −1] |
| 6 | [+1 +1 −1 +1 +1 +1 +1 −1 −1 −1 +1 −1 +1 +1 +1 −1] |
| 7 | [+1 +1 −1 +1 −1 −1 −1 +1 +1 +1 −1 +1 +1 +1 +1 −1] |
| 8 | [−1 −1 +1 −1 +1 +1 +1 −1 +1 +1 −1 +1 +1 +1 +1 −1] |

Example 161 includes the subject matter of any one of Examples 150-160, and optionally, wherein the controller is configured to cause the EDMG STA to detect the plurality of pilot values at a plurality of pilot subcarrier indexes, which are frequency-channel dependent, and are independent of the space-time stream number and the OFDM symbol number.

Example 162 includes the subject matter of any one of Examples 150-161, and optionally, wherein the controller is configured to cause the EDMG STA to receive the OFDM mode transmission over a channel bandwidth of 2.16 Gigahertz (GHz), 4.32 GHz, 6.48 GHz, or 8.64 GHz.

Example 163 includes a method to be performed at an Enhanced Directional Multi-Gigabit (DMG) (EDMG) wireless communication station (STA), the method comprising receiving an Orthogonal Frequency Division Multiplexing (OFDM) mode transmission of an EDMG Physical Layer (PHY) Protocol Data Unit (PPDU); and processing the OFDM mode transmission of the EDMG PPDU based on at least one pilot sequence corresponding to at least one respective space-time stream, the pilot sequence comprising a plurality of pilot values, a pilot value of the plurality of pilot values is based on a space-time stream number of the space-time stream, an Orthogonal Frequency Division Multiplexing (OFDM) symbol number, and a subcarrier index.

Example 164 includes the subject matter of Example 163, and optionally, comprising determining the pilot value by applying a phase shift to a predefined pilot value, the phase shift is based on the space-time stream number and the OFDM symbol number, the predefined pilot value is based on the space-time stream number and the subcarrier index.

Example 165 includes the subject matter of Example 164, and optionally, wherein the phase shift comprises a product of a deterministic shift and a random shift, the deterministic shift is based on the space-time stream number and the OFDM symbol number, the random shift is based on a scrambler output corresponding to the OFDM symbol number.

Example 166 includes the subject matter of Example 165, and optionally, wherein the deterministic shift is repeated over time with a period equal to a total count of the at least one space-time stream.

Example 167 includes the subject matter of Example 165 or 166, and optionally, wherein the deterministic shift, denoted $W(i_{STS}, n)$, is in accordance with the following definition:

$$W(i_{STS}, n) = \exp\left(-j\frac{2\pi}{N_{STS}} \cdot (i_{STS} - 1) \cdot (n - 1)\right),$$
$$i_{STS} = 1, 2, \ldots, N_{STS};\ n = 1, 2, \ldots, N_{STS}$$

wherein n denotes the OFDM symbol number, $i_{STS}$ denotes the space-time stream number, and $N_{STS}$ denotes a total count of the at least one space-time stream.

Example 168 includes the subject matter of any one of Examples 164-167, and optionally, wherein the phase shift comprises a common phase shift, which is common over subcarriers.

Example 169 includes the subject matter of any one of Examples 164-168, and optionally, comprising determining the predefined pilot value according to a predefined pilot sequence corresponding to the space-time stream number.

Example 170 includes the subject matter of Example 169, and optionally, wherein the predefined pilot sequence corresponding to the space-time stream number is based on a count of one or more 2.16 Gigahertz (GHz) channels for reception of the EDMG PPDU.

Example 171 includes the subject matter of Example 170, and optionally, wherein:

the predefined pilot sequence corresponding to the space-time stream number comprises a first predefined pilot sequence, denoted $P_{16}(i_{STS}, :)$, comprising sixteen pilot values, when the count of the one or more 2.16 Gigahertz (GHz) channels is one, the predefined pilot sequence corresponding to the space-time stream number comprises a second predefined pilot sequence, denoted $P_{36}(i_{STS}, :)$, comprising thirty-six pilot values, when the count of the one or more 2.16 Gigahertz (GHz) channels is two, the predefined pilot sequence corresponding to the space-time stream number comprises a third predefined pilot sequence, denoted $P_{56}(i_{STS}, :)$, comprising fifty-six pilot values, when the count of the one or more 2.16 Gigahertz (GHz) channels is three, and the predefined pilot sequence corresponding to the space-time stream number comprises a fourth predefined pilot sequence, denoted $P_{76}(i_{STS}, :)$, comprising seventy-six pilot values, when the count of the one or more 2.16 Gigahertz (GHz) channels is four.

Example 172 includes the subject matter of any one of Examples 169-171, and optionally, wherein the predefined pilot sequence corresponding to the space-time stream number comprises at least one repetition of a predefined pilot sequence, denoted $P_{16}(i_{STS}, :)$, comprising sixteen pilot values.

Example 173 includes the subject matter of Example 172, and optionally, wherein the pilot sequence $P_{16}(i_{STS}, :)$ is defined based on the space-time stream number, denoted $i_{STS}$, as follows:

| $i_{STS}$ | $P_{16}(i_{STS}, :)$ |
|---|---|
| 1 | [+1 +1 +1 −1 +1 +1 −1 +1 +1 +1 +1 −1 −1 −1 +1 −1] |
| 2 | [−1 −1 −1 +1 −1 −1 +1 −1 +1 +1 +1 −1 −1 −1 +1 −1] |
| 3 | [−1 −1 −1 +1 +1 +1 −1 +1 −1 −1 −1 +1 −1 −1 +1 −1] |
| 4 | [+1 +1 +1 −1 −1 −1 +1 −1 −1 −1 −1 +1 −1 −1 +1 −1] |
| 5 | [−1 −1 +1 −1 −1 −1 −1 +1 −1 −1 +1 −1 +1 +1 +1 −1] |
| 6 | [+1 +1 −1 +1 +1 +1 +1 −1 −1 −1 +1 −1 +1 +1 +1 −1] |
| 7 | [+1 +1 −1 +1 −1 −1 −1 +1 +1 +1 −1 +1 +1 +1 +1 −1] |
| 8 | [−1 −1 +1 −1 +1 +1 +1 −1 +1 +1 −1 +1 +1 +1 +1 −1] |

Example 174 includes the subject matter of any one of Examples 163-173, and optionally, comprising detecting the plurality of pilot values at a plurality of pilot subcarrier indexes, which are frequency-channel dependent, and are independent of the space-time stream number and the OFDM symbol number.

Example 175 includes the subject matter of any one of Examples 163-174, and optionally, comprising receiving the OFDM mode transmission over a channel bandwidth of 2.16 Gigahertz (GHz), 4.32 GHz, 6.48 GHz, or 8.64 GHz.

Example 176 includes a product comprising one or more tangible computer-readable non-transitory storage media comprising computer-executable instructions operable to, when executed by at least one processor, enable the at least one processor to cause an Enhanced Directional Multi-Gigabit (DMG) (EDMG) wireless communication station (STA) to receive an Orthogonal Frequency Division Multiplexing (OFDM) mode transmission of an EDMG Physical Layer (PHY) Protocol Data Unit (PPDU); and process the OFDM mode transmission of the EDMG PPDU based on at least one pilot sequence corresponding to at least one respective space-time stream, the pilot sequence comprising a plurality of pilot values, a pilot value of the plurality of pilot values is based on a space-time stream number of the space-time stream, an Orthogonal Frequency Division Multiplexing (OFDM) symbol number, and a subcarrier index.

Example 177 includes the subject matter of Example 176, and optionally, wherein the instructions, when executed, cause the EDMG STA to determine the pilot value by applying a phase shift to a predefined pilot value, the phase shift is based on the space-time stream number and the OFDM symbol number, the predefined pilot value is based on the space-time stream number and the subcarrier index.

Example 178 includes the subject matter of Example 177, and optionally, wherein the phase shift comprises a product of a deterministic shift and a random shift, the deterministic shift is based on the space-time stream number and the OFDM symbol number, the random shift is based on a scrambler output corresponding to the OFDM symbol number.

Example 179 includes the subject matter of Example 178, and optionally, wherein the deterministic shift is repeated over time with a period equal to a total count of the at least one space-time stream.

Example 180 includes the subject matter of Example 178 or 179, and optionally, wherein the deterministic shift, denoted $W(i_{STS}, n)$, is in accordance with the following definition:

$$W(i_{STS}, n) = \exp\left(-j\frac{2\pi}{N_{STS}} \cdot (i_{STS} - 1) \cdot (n - 1)\right),$$
$$i_{STS} = 1, 2, \ldots, N_{STS};\ n = 1, 2, \ldots, N_{STS}$$

wherein n denotes the OFDM symbol number, $i_{STS}$ denotes the space-time stream number, and $N_{STS}$ denotes a total count of the at least one space-time stream.

Example 181 includes the subject matter of any one of Examples 177-180, and optionally, wherein the phase shift comprises a common phase shift, which is common over subcarriers.

Example 182 includes the subject matter of any one of Examples 177-181, and optionally, wherein the instructions, when executed, cause the EDMG STA to determine the predefined pilot value according to a predefined pilot sequence corresponding to the space-time stream number.

Example 183 includes the subject matter of Example 182, and optionally, wherein the predefined pilot sequence corresponding to the space-time stream number is based on a count of one or more 2.16 Gigahertz (GHz) channels for reception of the EDMG PPDU.

Example 184 includes the subject matter of Example 183, and optionally, wherein:

the predefined pilot sequence corresponding to the space-time stream number comprises a first predefined pilot sequence, denoted $P_{16}(i_{STS}, :)$, comprising sixteen pilot values, when the count of the one or more 2.16 Gigahertz (GHz) channels is one, the predefined pilot sequence corresponding to the space-time stream number comprises a second predefined pilot sequence, denoted $P_{36}(i_{STS}, :)$, comprising thirty-six pilot values, when the count of the one or more 2.16 Gigahertz (GHz) channels is two, the predefined pilot sequence corresponding to the space-time stream number comprises a third predefined pilot sequence, denoted $P_{56}(i_{STS}, :)$, comprising fifty-six pilot values, when the count of the one or more 2.16 Gigahertz (GHz) channels is three, and the predefined pilot sequence corresponding to the space-time stream number comprises a fourth predefined pilot sequence, denoted $P_{76}(i_{STS}, :)$, comprising seventy-six pilot values, when the count of the one or more 2.16 Gigahertz (GHz) channels is four.

Example 185 includes the subject matter of any one of Examples 182-184, and optionally, wherein the predefined pilot sequence corresponding to the space-time stream number comprises at least one repetition of a predefined pilot sequence, denoted $P_{16}(i_{STS}, :)$, comprising sixteen pilot values.

Example 186 includes the subject matter of Example 185, and optionally, wherein the pilot sequence $P_{16}(i_{STS}, :)$ is defined based on the space-time stream number, denoted $i_{STS}$, as follows:

| $i_{STS}$ | $P_{16}(i_{STS}, :)$ |
|---|---|
| 1 | [+1 +1 +1 −1 +1 +1 −1 +1 +1 +1 +1 −1 −1 −1 +1 −1] |
| 2 | [−1 −1 −1 +1 −1 −1 +1 −1 +1 +1 +1 −1 −1 −1 +1 −1] |
| 3 | [−1 −1 −1 +1 +1 +1 −1 +1 −1 −1 −1 +1 −1 −1 +1 −1] |
| 4 | [+1 +1 +1 −1 −1 −1 +1 −1 −1 −1 −1 +1 −1 −1 +1 −1] |
| 5 | [−1 −1 +1 −1 −1 −1 −1 +1 −1 −1 +1 −1 +1 +1 +1 −1] |
| 6 | [+1 +1 −1 +1 +1 +1 +1 −1 −1 −1 +1 −1 +1 +1 +1 −1] |
| 7 | [+1 +1 −1 +1 −1 −1 −1 +1 +1 +1 −1 +1 +1 +1 +1 −1] |
| 8 | [−1 −1 +1 −1 +1 +1 +1 −1 +1 +1 −1 +1 +1 +1 +1 −1] |

Example 187 includes the subject matter of any one of Examples 176-186, and optionally, wherein the instructions, when executed, cause the EDMG STA to detect the plurality of pilot values at a plurality of pilot subcarrier indexes, which are frequency-channel dependent, and are independent of the space-time stream number and the OFDM symbol number.

Example 188 includes the subject matter of any one of Examples 176-187, and optionally, wherein the instructions, when executed, cause the EDMG STA to receive the OFDM mode transmission over a channel bandwidth of 2.16 Gigahertz (GHz), 4.32 GHz, 6.48 GHz, or 8.64 GHz.

Example 189 includes an apparatus of wireless communication by an Enhanced Directional Multi-Gigabit (DMG) (EDMG) wireless communication station (STA), the apparatus comprising means for receiving an Orthogonal Frequency Division Multiplexing (OFDM) mode transmission of an EDMG Physical Layer (PHY) Protocol Data Unit (PPDU); and means for processing the OFDM mode transmission of the EDMG PPDU based on at least one pilot sequence corresponding to at least one respective space-time stream, the pilot sequence comprising a plurality of pilot values, a pilot value of the plurality of pilot values is based on a space-time stream number of the space-time stream, an Orthogonal Frequency Division Multiplexing (OFDM) symbol number, and a subcarrier index.

Example 190 includes the subject matter of Example 189, and optionally, comprising means for determining the pilot value by applying a phase shift to a predefined pilot value, the phase shift is based on the space-time stream number and the OFDM symbol number, the predefined pilot value is based on the space-time stream number and the subcarrier index.

Example 191 includes the subject matter of Example 190, and optionally, wherein the phase shift comprises a product of a deterministic shift and a random shift, the deterministic shift is based on the space-time stream number and the OFDM symbol number, the random shift is based on a scrambler output corresponding to the OFDM symbol number.

Example 192 includes the subject matter of Example 191, and optionally, wherein the deterministic shift is repeated over time with a period equal to a total count of the at least one space-time stream.

Example 193 includes the subject matter of Example 191 or 192, and optionally, wherein the deterministic shift, denoted $W(i_{STS}, n)$, is in accordance with the following definition:

$$W(i_{STS}, n) = \exp\left(-j\frac{2\pi}{N_{STS}} \cdot (i_{STS} - 1) \cdot (n - 1)\right),$$
$$i_{STS} = 1, 2, \ldots, N_{STS}; n = 1, 2, \ldots, N_{STS}$$

wherein n denotes the OFDM symbol number, $i_{STS}$ denotes the space-time stream number, and $N_{ST}S$ denotes a total count of the at least one space-time stream.

Example 194 includes the subject matter of any one of Examples 190-193, and optionally, wherein the phase shift comprises a common phase shift, which is common over subcarriers.

Example 195 includes the subject matter of any one of Examples 190-194, and optionally, comprising means for determining the predefined pilot value according to a predefined pilot sequence corresponding to the space-time stream number.

Example 196 includes the subject matter of Example 195, and optionally, wherein the predefined pilot sequence corresponding to the space-time stream number is based on a count of one or more 2.16 Gigahertz (GHz) channels for reception of the EDMG PPDU.

Example 197 includes the subject matter of Example 196, and optionally, wherein:

the predefined pilot sequence corresponding to the space-time stream number comprises a first predefined pilot sequence, denoted $P_{16}(i_{STS}, :)$, comprising sixteen pilot values, when the count of the one or more 2.16 Gigahertz (GHz) channels is one, the predefined pilot sequence corresponding to the space-time stream number comprises a second predefined pilot sequence, denoted $P_{36}(i_{STS}, :)$, comprising thirty-six pilot values, when the count of the one or more 2.16 Gigahertz (GHz) channels is two, the predefined pilot sequence corresponding to the space-time stream number comprises a third predefined pilot sequence, denoted $P_{56}(i_{STS}, :)$, comprising fifty-six pilot values, when the count of the one or more 2.16 Gigahertz (GHz) channels is three, and the predefined pilot sequence corresponding to the space-time stream number comprises a fourth predefined pilot sequence, denoted $P_{76}(i_{STS}, :)$, comprising seventy-six pilot values, when the count of the one or more 2.16 Gigahertz (GHz) channels is four.

Example 198 includes the subject matter of any one of Examples 195-197, and optionally, wherein the predefined pilot sequence corresponding to the space-time stream number comprises at least one repetition of a predefined pilot sequence, denoted $P_{16}(i_{STS}, :)$, comprising sixteen pilot values.

Example 199 includes the subject matter of Example 198, and optionally, wherein the pilot sequence $P_{16}(i_{STS}, :)$ is defined based on the space-time stream number, denoted $i_{STS}$, as follows:

| $i_{STS}$ | $P_{16}(i_{STS}, :)$ |
|---|---|
| 1 | [+1 +1 +1 −1 +1 +1 −1 +1 +1 +1 +1 −1 −1 −1 +1 −1] |
| 2 | [−1 −1 −1 +1 −1 −1 +1 −1 +1 +1 +1 −1 −1 −1 +1 −1] |
| 3 | [−1 −1 −1 +1 +1 +1 −1 +1 −1 −1 −1 +1 −1 −1 +1 −1] |
| 4 | [+1 +1 +1 −1 −1 −1 +1 −1 −1 −1 −1 +1 −1 −1 +1 −1] |
| 5 | [−1 −1 +1 −1 −1 −1 −1 +1 −1 −1 +1 −1 +1 +1 +1 −1] |
| 6 | [+1 +1 −1 +1 +1 +1 +1 −1 −1 −1 +1 −1 +1 +1 +1 −1] |
| 7 | [+1 +1 −1 +1 −1 −1 −1 +1 +1 +1 −1 +1 +1 +1 +1 −1] |
| 8 | [−1 −1 +1 −1 +1 +1 +1 −1 +1 +1 −1 +1 +1 +1 +1 −1] |

Example 200 includes the subject matter of any one of Examples 189-199, and optionally, comprising means for detecting the plurality of pilot values at a plurality of pilot subcarrier indexes, which are frequency-channel dependent, and are independent of the space-time stream number and the OFDM symbol number.

Example 201 includes the subject matter of any one of Examples 189-200, and optionally, comprising means for receiving the OFDM mode transmission over a channel bandwidth of 2.16 Gigahertz (GHz), 4.32 GHz, 6.48 GHz, or 8.64 GHz.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause an Enhanced Directional Multi-Gigabit (DMG) (EDMG) wireless communication station (STA) to:

generate at least one pilot sequence corresponding to at least one respective space-time stream for an EDMG Physical Layer (PHY) Protocol Data Unit (PPDU), the pilot sequence comprising a plurality of pilot values, a pilot value of the plurality of pilot values is based on a space-time stream number of the space-time stream, an Orthogonal Frequency Division Multiplexing (OFDM) symbol number, and a subcarrier index; and transmit an OFDM mode transmission of the EDMG PPDU comprising the at least one pilot sequence.

2. The apparatus of claim 1 configured to cause the EDMG STA to determine the pilot value by applying a phase shift to a predefined pilot value, the phase shift is based on the space-time stream number and the OFDM symbol number, the predefined pilot value is based on the space-time stream number and the subcarrier index.

3. The apparatus of claim 2, wherein the phase shift comprises a product of a deterministic shift and a random shift, the deterministic shift is based on the space-time stream number and the OFDM symbol number, the random shift is based on a scrambler output corresponding to the OFDM symbol number.

4. The apparatus of claim 3, wherein the deterministic shift is repeated over time with a period equal to a total count of the at least one space-time stream.

5. The apparatus of claim 3, wherein the deterministic shift, denoted $W(i_{STS}, n)$, is in accordance with the following definition:

$$W(i_{STS}, n) = \exp\left(-j\frac{2\pi}{N_{STS}}\cdot(i_{STS}-1)\cdot(n-1)\right),$$
$$i_{STS} = 1, 2, \ldots, N_{STS}; n = 1, 2, \ldots, N_{STS}$$

wherein n denotes the OFDM symbol number, $i_{STS}$ denotes the space-time stream number, and $N_{STS}$ denotes a total count of the at least one space-time stream.

6. The apparatus of claim 2, wherein the phase shift comprises a common phase shift, which is common over subcarriers.

7. The apparatus of claim 2 configured to cause the EDMG STA to determine the predefined pilot value according to a predefined pilot sequence corresponding to the space-time stream number.

8. The apparatus of claim 7, wherein the predefined pilot sequence corresponding to the space-time stream number is based on a count of one or more 2.16 Gigahertz (GHz) channels for transmission of the EDMG PPDU.

9. The apparatus of claim 8, wherein the predefined pilot sequence corresponding to the space-time stream number comprises a predefined pilot sequence, denoted $P_{16}(i_{STS}, :)$, comprising sixteen pilot values, when the count of the one or more 2.16 Gigahertz (GHz) channels is one.

10. The apparatus of claim 8, wherein the predefined pilot sequence corresponding to the space-time stream number comprises a predefined pilot sequence, denoted $P_{36}(i_{STS}, :)$, comprising thirty-six pilot values, when the count of the one or more 2.16 Gigahertz (GHz) channels is two.

11. The apparatus of claim 8, wherein the predefined pilot sequence corresponding to the space-time stream number comprises a predefined pilot sequence, denoted $P_{56}(i_{STS}, :)$, comprising fifty-six pilot values, when the count of the one or more 2.16 Gigahertz (GHz) channels is three.

12. The apparatus of claim 8, wherein the predefined pilot sequence corresponding to the space-time stream number comprises a predefined pilot sequence, denoted $P_{76}(i_{STS}, :)$, comprising seventy-six pilot values, when the count of the one or more 2.16 Gigahertz (GHz) channels is four.

13. The apparatus of claim 7, wherein the predefined pilot sequence corresponding to the space-time stream number comprises at least one repetition of a predefined pilot sequence, denoted $P_{16}(i_{STS}, :)$, comprising sixteen pilot values.

14. The apparatus of claim 13, wherein the pilot sequence $P_{16}(i_{STS}, :)$ is defined based on the space-time stream number, denoted $i_{STS}$, as follows:

| $i_{STS}$ | $P_{16}(i_{STS}, :)$ |
|---|---|
| 1 | [+1 +1 +1 −1 +1 +1 −1 +1 +1 +1 +1 −1 −1 −1 +1 −1] |
| 2 | [−1 −1 −1 +1 −1 −1 +1 −1 +1 +1 +1 −1 −1 −1 +1 −1] |
| 3 | [−1 −1 −1 +1 +1 +1 −1 +1 −1 −1 −1 +1 −1 −1 +1 −1] |
| 4 | [+1 +1 +1 −1 −1 −1 +1 −1 −1 −1 −1 +1 −1 −1 +1 −1] |
| 5 | [−1 −1 +1 −1 −1 −1 −1 +1 −1 −1 +1 −1 +1 +1 +1 −1] |
| 6 | [+1 +1 −1 +1 +1 +1 +1 −1 −1 −1 +1 −1 +1 +1 +1 −1] |
| 7 | [+1 +1 −1 +1 −1 −1 −1 +1 +1 +1 −1 +1 +1 +1 +1 −1] |
| 8 | [−1 −1 +1 −1 +1 +1 +1 −1 +1 +1 −1 +1 +1 +1 +1 −1] |

15. The apparatus of claim 1 configured to cause the EDMG STA to insert the plurality of pilot values at a plurality of pilot subcarrier indexes, which are frequency-channel dependent, and are independent of the space-time stream number and the OFDM symbol number.

16. The apparatus of claim 1 configured to cause the EDMG STA to transmit the OFDM mode transmission of the EDMG PPDU over a channel bandwidth of 2.16 Gigahertz (GHz), 4.32 GHz, 6.48 GHz, or 8.64 GHz.

17. The apparatus of claim 1 comprising a radio to transmit the OFDM mode transmission of the EDMG PPDU.

18. The apparatus of claim 17 comprising one or more antennas connected to the radio, a memory, and a processor to execute instructions of an operating system.

19. A product comprising one or more tangible computer-readable non-transitory storage media comprising computer-executable instructions operable to, when executed by at least one processor, enable the at least one processor to cause an Enhanced Directional Multi-Gigabit (DMG) (EDMG) wireless communication station (STA) to:

generate at least one pilot sequence corresponding to at least one respective space-time stream for an EDMG Physical Layer (PHY) Protocol Data Unit (PPDU), the pilot sequence comprising a plurality of pilot values, a pilot value of the plurality of pilot values is based on a space-time stream number of the space-time stream, an Orthogonal Frequency Division Multiplexing (OFDM) symbol number, and a subcarrier index; and transmit an OFDM mode transmission of the EDMG PPDU comprising the at least one pilot sequence.

20. The product of claim 19, wherein the instructions, when executed, cause the EDMG STA to determine the pilot value by applying a phase shift to a predefined pilot value, the phase shift is based on the space-time stream number and the OFDM symbol number, the predefined pilot value is based on the space-time stream number and the subcarrier index.

21. The product of claim 20, wherein the phase shift comprises a product of a deterministic shift and a random shift, the deterministic shift is based on the space-time stream number and the OFDM symbol number, the random shift is based on a scrambler output corresponding to the OFDM symbol number.

22. The product of claim 20, wherein the instructions, when executed, cause the EDMG STA to determine the predefined pilot value according to a predefined pilot sequence corresponding to the space-time stream number.

23. The product of claim 19, wherein the instructions, when executed, cause the EDMG STA to insert the plurality of pilot values at a plurality of pilot subcarrier indexes, which are frequency-channel dependent, and are independent of the space-time stream number and the OFDM symbol number.

24. An apparatus comprising:

means for generating at an Enhanced Directional Multi-Gigabit (DMG) (EDMG) wireless communication station (STA) at least one pilot sequence corresponding to at least one respective space-time stream for an EDMG Physical Layer (PHY) Protocol Data Unit (PPDU), the pilot sequence comprising a plurality of pilot values, a pilot value of the plurality of pilot values is based on a space-time stream number of the space-time stream, an Orthogonal Frequency Division Multiplexing (OFDM) symbol number, and a subcarrier index; and means for causing the EDMG STA to transmit an OFDM mode transmission of the EDMG PPDU comprising the at least one pilot sequence.

25. The apparatus of claim 24 comprising means for determining the pilot value by applying a phase shift to a predefined pilot value, the phase shift is based on the space-time stream number and the OFDM symbol number, the predefined pilot value is based on the space-time stream number and the subcarrier index.

* * * * *